US012583632B2

(12) United States Patent
Benson et al.

(10) Patent No.: US 12,583,632 B2
(45) Date of Patent: Mar. 24, 2026

(54) SYSTEM AND METHOD FOR ADAPTIVE FLUID DISTRIBUTION USING A HOVERING DEVICE

(71) Applicant: Hunt Energy, L.L.C., Dallas, TX (US)

(72) Inventors: Todd W. Benson, Dallas, TX (US);
Lovis Kauf, Eisenberg (DE);
John-Paul Adams, Carrollton, TX
(US); James A. Hancock, Dallas, TX
(US); John S. Burkhart, Dallas, TX
(US); James D. Franks, Louisville, KY
(US)

(73) Assignee: Hunt Company, L.P., Dallas, TX (US)

( * ) Notice: Subject to any disclaimer, the term of this
patent is extended or adjusted under 35
U.S.C. 154(b) by 0 days.

(21) Appl. No.: 18/410,516

(22) Filed: Jan. 11, 2024

(65) Prior Publication Data

US 2024/0239527 A1 Jul. 18, 2024

Related U.S. Application Data

(60) Provisional application No. 63/471,523, filed on Jun.
7, 2023, provisional application No. 63/465,515, filed
(Continued)

(51) Int. Cl.
B64U 20/70 (2023.01)
B64D 1/18 (2006.01)
(Continued)

(52) U.S. Cl.
CPC .............. B64U 20/70 (2023.01); B64D 1/18
(2013.01); B64U 30/00 (2023.01); B64U
50/16 (2023.01); B64U 2101/45 (2023.01)

(58) Field of Classification Search
CPC .. A62C 3/0242; B64U 50/16; B64U 2101/45;
B64U 2101/47; B64U 10/60; B64C
39/022; B64C 39/024; B64D 1/18; B05B
13/005
See application file for complete search history.

(56) References Cited

U.S. PATENT DOCUMENTS 3,381,922 A * 5/1968 Laing ..................... B64U 10/60
244/17.17
3,700,172 A * 10/1972 Gallegos, Sr. ......... A63H 27/06
239/722

(Continued)

FOREIGN PATENT DOCUMENTS

CN 106983978 A 7/2017
CN 111268128 A 6/2020
(Continued)

OTHER PUBLICATIONS

International Search Report and Written Opinion of the ISA/US,
mailed Apr. 19, 2024, in PCT Application No. PCT/US2024/
011229.

*Primary Examiner* — Cody J Lieuwen
(74) *Attorney, Agent, or Firm* — Law Office of Bill
Naifeh; Timothy F. Bliss

(57) ABSTRACT

A fluid distribution system that uses a hovering distribution
device and methods for using such a system are provided. In
one example, the system may include a reel that provides a
hose for the hovering distribution device. The hovering
distribution device receives pressurized fluid from the hose,
and includes at least one nozzle configured to distribute the
pressurized fluid and provide lift for the hovering distribu-
tion device using the pressurized fluid. A control system may
be configured to execute a fluid distribution plan by con-
trolling at least one of a position and an orientation of the
(Continued)

hovering distribution device in a three dimensional space using a direction of the nozzle.

19 Claims, 114 Drawing Sheets

Related U.S. Application Data on May 10, 2023, provisional application No. 63/479, 962, filed on Jan. 13, 2023.

(51) Int. Cl.
| | | |
|---|---|---|
| *B64U 30/00* | (2023.01) | |
| *B64U 50/16* | (2023.01) | |
| *B64U 101/45* | (2023.01) | |

(56) References Cited

U.S. PATENT DOCUMENTS

| | | | | |
|---|---|---|---|---|
| 4,274,591 | A * | 6/1981 | Sunshine | A63H 29/10 |
| | | | | 239/722 |
| 7,892,151 | B2 | 2/2011 | Colk et al. | |
| 9,440,714 | B2 | 9/2016 | Robinson et al. | |
| 10,150,562 | B2 * | 12/2018 | Hein | B64U 50/16 |
| 10,556,648 | B1 | 2/2020 | Barron | |
| 10,721,881 | B1 | 7/2020 | Fischman | |
| 2013/0134254 | A1 | 5/2013 | Moore | |
| 2013/0297083 | A1 | 11/2013 | Pfrenger et al. | |
| 2015/0129244 | A1 | 5/2015 | Lipson et al. | |
| 2016/0318607 | A1 * | 11/2016 | Desai | B64D 1/16 |
| 2017/0043872 | A1 * | 2/2017 | Whitaker | A62C 3/0242 |
| 2017/0113787 | A1 | 4/2017 | Hein | |
| 2018/0022423 | A1 * | 1/2018 | Low | B64C 39/022 |
| | | | | 414/137.2 |
| 2018/0207456 | A1 * | 7/2018 | Katz | B05B 15/68 |
| 2018/0326441 | A1 * | 11/2018 | Liu | B05B 13/005 |
| 2019/0106212 | A1 * | 4/2019 | Furukawa | B64C 39/024 |
| 2021/0024182 | A1 | 1/2021 | Chen et al. | |
| 2021/0261250 | A1 * | 8/2021 | Cioanta | B64U 10/16 |
| 2022/0063806 | A1 | 3/2022 | Tunovic et al. | |
| 2022/0192175 | A1 * | 6/2022 | Humpal | G06T 7/70 |

FOREIGN PATENT DOCUMENTS

| | | |
|---|---|---|
| JP | 6997144 B2 | 1/2022 |
| KR | 101912740 B1 | 10/2018 |
| KR | 102271938 B1 | 7/2021 |

* cited by examiner

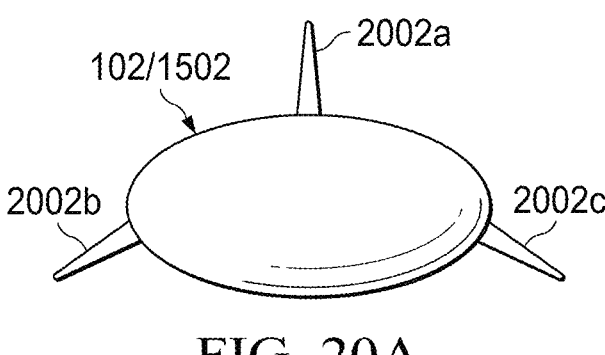
FIG. 20A
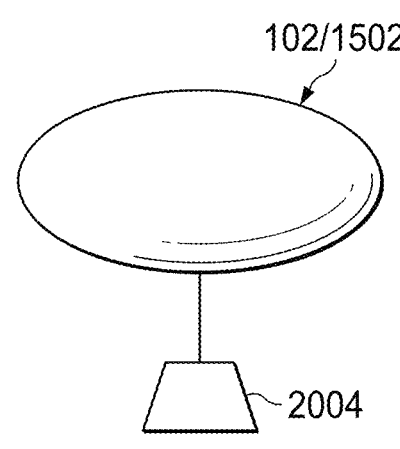
FIG. 20B
FIG. 20C

2500

NOZZLE

2602

2500

NOZZLE

2604

3300

3302

3304

102

3402

102

3402

3402

102

3402          102

102

4014

4006

4016

4012

4002

Y-AXIS

Z-AXIS

5000

4500 — CONTROL SYSTEM

5002 — REMOTE MONITOR/ CONTROLLER

5100

5002 REMOTE MONITOR/ CONTROLLER

CONTROL SYSTEM — 4500a

CONTROL SYSTEM — 4500b

CONTROL SYSTEM — 4500c

CONTROL SYSTEM — 4500d 5306a  5306b  5306c  5306d  5306e 5304a  5304b  5304c  5304d 5302a  5302b  5302c  5302d

5800

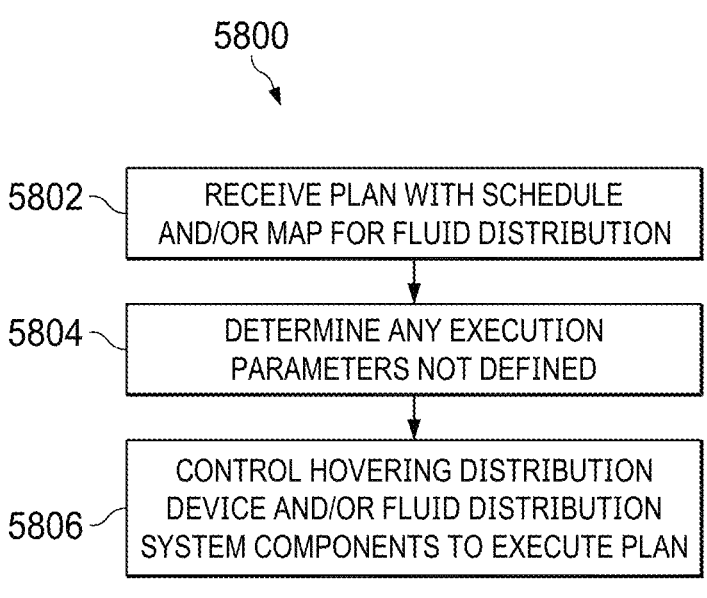

5802 — RECEIVE PLAN WITH SCHEDULE AND/OR MAP FOR FLUID DISTRIBUTION

5804 — DETERMINE ANY EXECUTION PARAMETERS NOT DEFINED

5806 — CONTROL HOVERING DISTRIBUTION DEVICE AND/OR FLUID DISTRIBUTION SYSTEM COMPONENTS TO EXECUTE PLAN

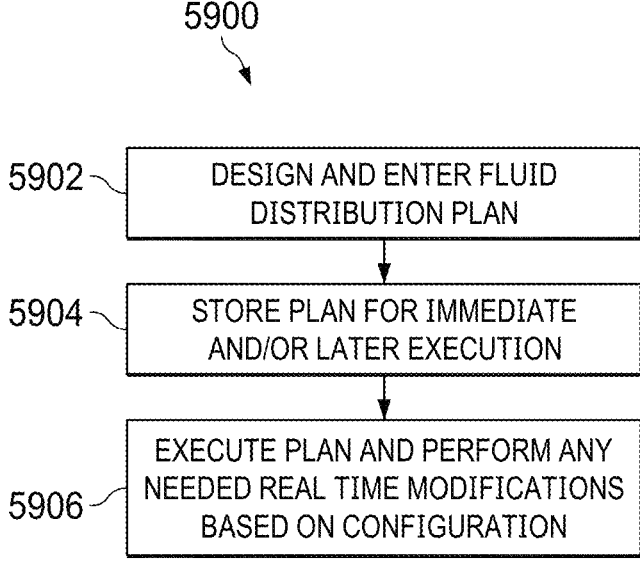

5902 — DESIGN AND ENTER FLUID DISTRIBUTION PLAN

5904 — STORE PLAN FOR IMMEDIATE AND/OR LATER EXECUTION

5906 — EXECUTE PLAN AND PERFORM ANY NEEDED REAL TIME MODIFICATIONS BASED ON CONFIGURATION

FIG. 59

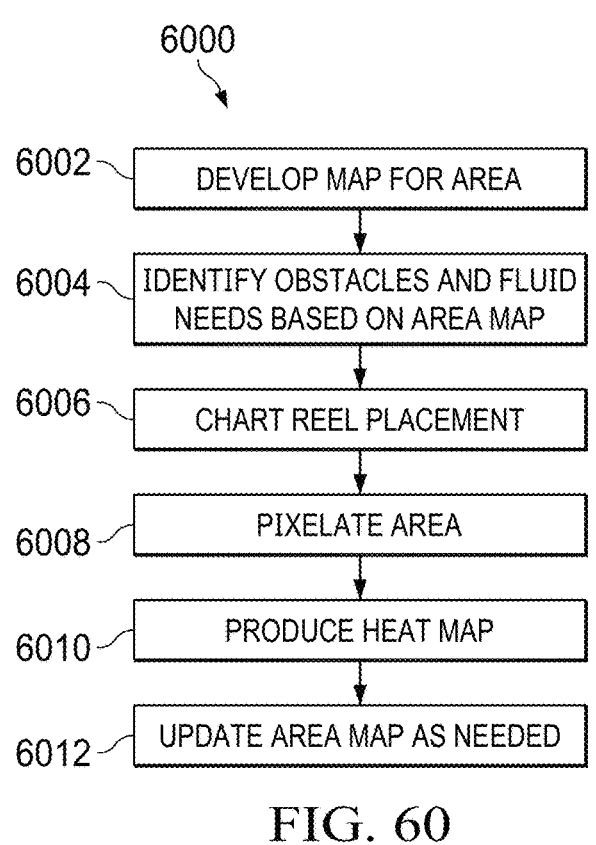

6000

6002 — DEVELOP MAP FOR AREA

6004 — IDENTIFY OBSTACLES AND FLUID NEEDS BASED ON AREA MAP

6006 — CHART REEL PLACEMENT

6008 — PIXELATE AREA

6010 — PRODUCE HEAT MAP

6012 — UPDATE AREA MAP AS NEEDED

FIG. 60

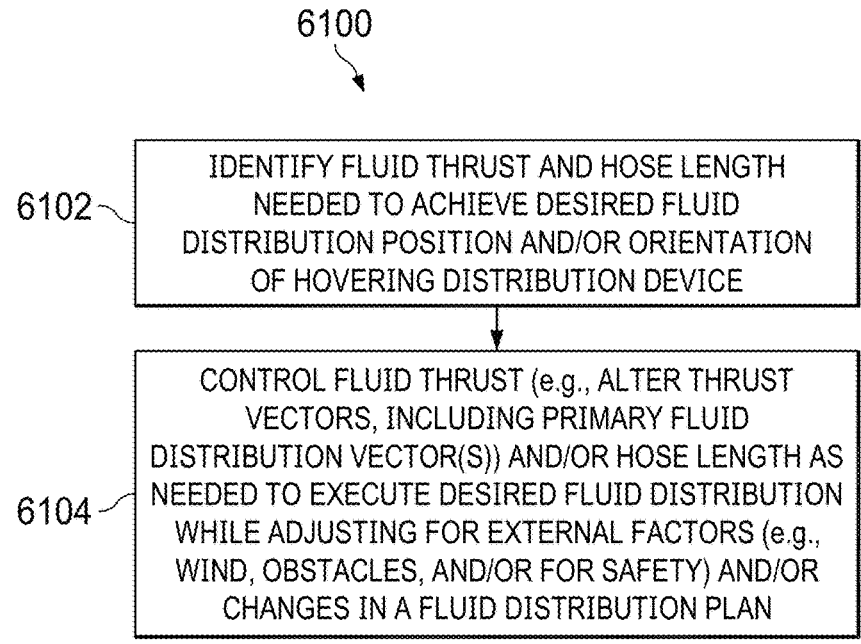

6100

6102 — IDENTIFY FLUID THRUST AND HOSE LENGTH NEEDED TO ACHIEVE DESIRED FLUID DISTRIBUTION POSITION AND/OR ORIENTATION OF HOVERING DISTRIBUTION DEVICE

6104 — CONTROL FLUID THRUST (e.g., ALTER THRUST VECTORS, INCLUDING PRIMARY FLUID DISTRIBUTION VECTOR(S)) AND/OR HOSE LENGTH AS NEEDED TO EXECUTE DESIRED FLUID DISTRIBUTION WHILE ADJUSTING FOR EXTERNAL FACTORS (e.g., WIND, OBSTACLES, AND/OR FOR SAFETY) AND/OR CHANGES IN A FLUID DISTRIBUTION PLAN

FIG. 61

SYSTEM AND METHOD FOR ADAPTIVE FLUID DISTRIBUTION USING A HOVERING DEVICE

CLAIM OF PRIORITY

This application claims the benefit of U.S. Provisional Patent Application 63/479,962, filed on Jan. 13, 2023, and entitled "SYSTEM AND METHOD FOR ADAPTIVE PIXELIZED FLUID DISPERSION USING A HOVERING DEVICE"; U.S. Provisional Patent Application 63/465,515, filed on May 10, 2023, and entitled "SYSTEM AND METHOD FOR ADAPTIVE PIXELIZED FLUID DISPERSION USING A HOVERING DEVICE"; and U.S. Provisional Patent Application 63/471,523, filed on Jun. 7, 2023, and entitled "SYSTEM AND METHOD FOR ADAPTIVE PIXELIZED FLUID DISPERSION USING A HOVERING DEVICE", all of which are hereby incorporated by reference in their entirety.

TECHNICAL FIELD

This application is directed to the design, control, implementation, and use of hovering fluid distribution devices and control systems for such devices.

BACKGROUND

The manner in which fluids such as water, fire suppression fluids and foams, and other substances (e.g., fertilizers, pesticides, and herbicides) are distributed in domestic and commercial environments lacks efficiency. Accordingly, what is needed are a system and method that addresses these issues.

BRIEF DESCRIPTION OF THE DRAWINGS

For a more complete understanding, reference is now made to the following description taken in conjunction with the accompanying Drawings in which:

FIGS. 20A-20C illustrate embodiments of hovering distribution devices and/or aerial support devices;

FIGS. 25-26B illustrate embodiments of a nozzle showing different thrust and/or fluid distribution patterns;

FIGS. 58-61 are flow charts illustrating embodiments of processes that may be executed by a control system.

DETAILED DESCRIPTION

Figures 1, 2:
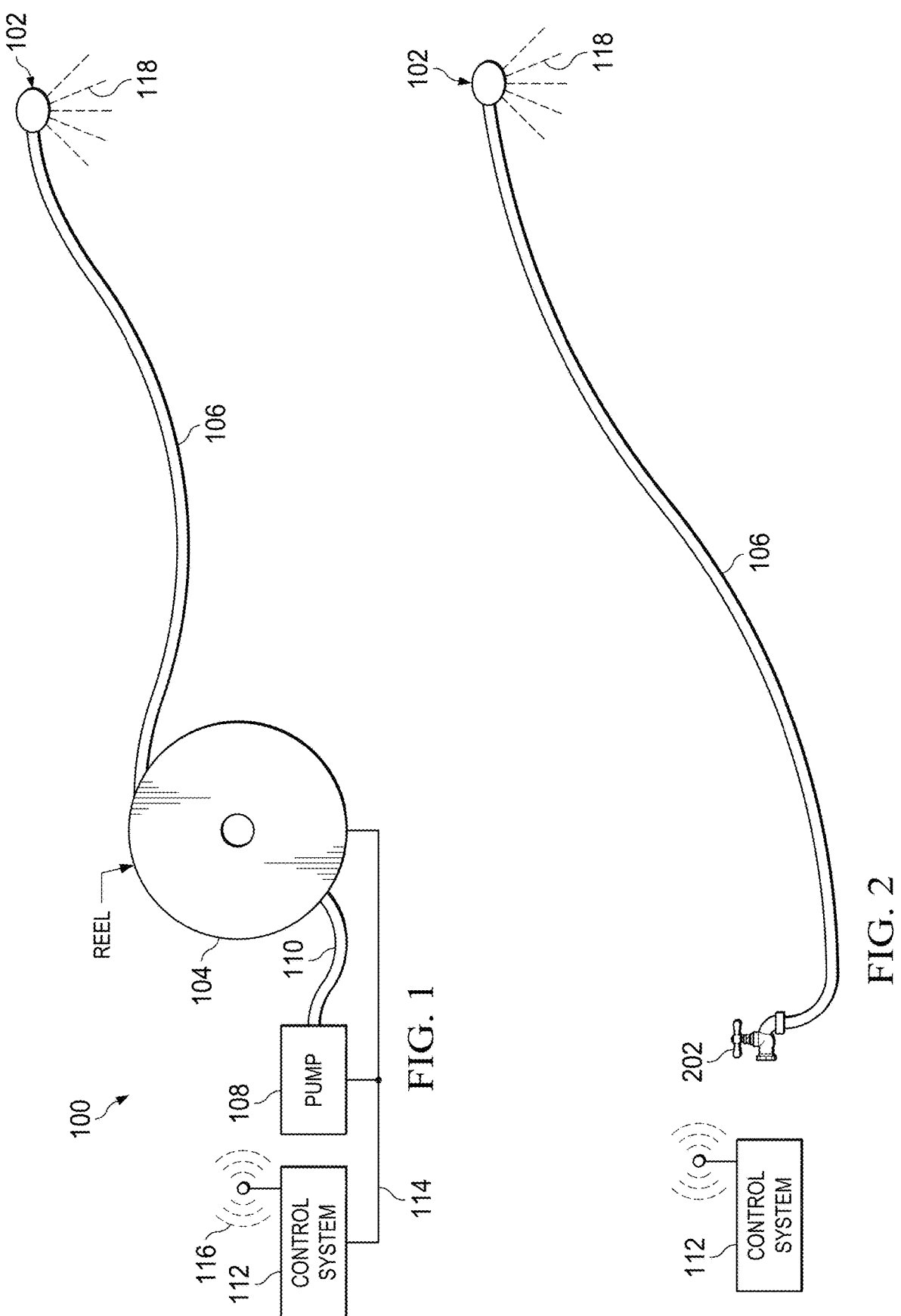
FIG. 1 illustrates one embodiment of a fluid distribution system with a hovering distribution device.
FIG. 2 illustrates one embodiment of a hovering distribution device in an environment lacking some of the components of the fluid distribution system of FIG. 1.

Referring now to the drawings, wherein like reference numbers are used herein to designate like elements throughout, the various views and embodiments of a system and method are illustrated and described, and other possible embodiments are described. The figures are not necessarily drawn to scale, and in some instances, the drawings have been exaggerated and/or simplified in places for illustrative purposes only. One of ordinary skill in the art will appreciate the many possible applications and variations based on the following examples of possible embodiments.

Fluid distribution systems are widely used to control the timing and location of irrigation fluids (e.g., water), fertilizers, pest suppressors (e.g., pesticides), weed suppressors (e.g., herbicides), and other fluids that require providing a fluid over a designated area on a schedule, as needed, or in response to a particular event such as a fire. For example, in irrigation, such systems may be used in relatively small applications (e.g., irrigation for lawns or flowerbeds) or may be used for larger applications (e.g., irrigation for sports venues, golf courses, and crops). In another example, irrigation activities may be relatively scheduled across a defined area, while fire suppression activities may be relatively dynamic across an unfamiliar area.

The control of such distribution systems is important in order to be efficient, and may be complicated due to the different needs of areas across which the fluids are to be distributed. Those needs and the distribution process itself may in turn be affected by environmental conditions. For example, different types of grass or crops may have different moisture requirements and those requirements may differ based on the time of year (e.g., spring versus summer), the latitude and longitude of the plants' location, the presence or absence of rainfall, the composition of the soil, and many other factors. Other factors, such as wind direction and speed, may affect the application of the fluid(s) while the distribution is occurring.

The shape and/or size of an area may also play a role in the efficiency of a fluid distribution system. For example, areas such as yards, flowerbeds, and golf courses may have irregular shapes. While relatively small movable or static sprinklers may be used to irrigate such areas, such sprinklers are generally limited in their operation and performance due to obstacles (e.g., shrubs and trees) and their inability to compensate for wind and other factors. The use of larger, more powerful sprinklers may result in overspray, which may waste water and create hazards.

In another example, while crops are often grown in relatively square or rectangular fields, conventional irrigation systems (e.g., central pivot systems and lateral move systems) intended for use in large areas may have difficulty in effectively watering the corners of the fields without also watering past the edges of the field in other areas. This may not only waste valuable water, but may also create hazards if, for example, overspray causes the water to reach a road that lies outside the edge of the field. Structures, vehicles, pavement, ditches, holes, and other objects located within the area may also cause complications during irrigation.

Due to these and other factors, many different conventional systems may be employed to irrigate, fertilize, and otherwise provide fluid(s) to a particular area. However, such systems are generally inadequate due to their inflexibility, which renders them unable to compensate for different area shapes, watering needs, wind, and other factors.

Referring to FIG. 1, one embodiment of a fluid distribution system 100 is illustrated with a hovering distribution device 102 coupled to a reel 104 via a hose 106. The hovering distribution device 102 may be coupled only to the hose 106, which provides the device 102 with a degree of freedom not possible in most fluid distribution systems. As will be described in greater detail below, the hovering distribution device 102 may provide its own lift via fluid pressure forced from nozzles and/or other mechanisms (e.g., propellers that may be driven by water pressure, electricity, and/or other energy sources), and/or may be aided by other components of the system 100. For example, the hovering distribution device 102 may be a drone with propellors powered entirely by a single energy source (e.g., electricity or another energy source) or a hybrid (e.g., powered by a combination of electricity, water, and/or other energy sources). In some embodiments, one or more other hoses may be coupled to the hovering distribution device 102 to provide compressed air and/or other fluids (e.g., gases or liquids) to provide additional control of fluid flow versus pressure.

Depending on the particular configuration of the system 100 and the hovering distribution device 102, the position and/or orientation of the device 102 may be controlled to achieve a desired fluid coverage of a particular area. It is understood that the hovering distribution device 102 may remain stationary for a period of time or may move relatively frequently or constantly. For example, the hovering distribution device 102 may hover over a single location, may move in a pattern that repeats the coverage of areas already irrigated, or may slowly move across an area to ensure suitable saturation. For purposes of the present disclosure, the term "hover" encompasses both maintaining a static position and any movement of the device in any direction. Furthermore, while a manned version of the hovering distribution device 102 is within the scope of the present disclosure, it is understood that the hovering distribution device described herein is generally an unmanned version.

The hovering distribution device 102 may be used to reach surfaces and/or locations that are otherwise difficult and/or inconvenient to reach, or that present difficulties when attempting to implement more traditional solutions. For example, large vertical or slanted surfaces (e.g., the sides of buildings, including large glass surfaces on skyscrapers and similar structures), solar panels, and similar surfaces, both regular and irregular in shape, size, and orientation, may be accessed more readily using the hovering distribution device 102. Terraced gardens and other areas in which irrigation systems may be difficult to implement due to structural concerns (e.g., installation difficulties such as lack of wall access and/or weight of water pipes, potential damage from leaks, and/or maintenance access difficulties) may also be serviced using the hovering distribution device 102.

One or more fluids may be provided to the hose 106 under pressure by one or more pumps 108 (e.g., a primary pump and a booster pump) and hose 110, and may include water, fertilizers, pesticides, herbicides, fire suppression fluids and foams, paints, sealants, roofing tars, fluids used for deicing and ice prevention (e.g., for airplanes, sidewalks, and/or orchards), cleaning solutions (e.g., for solar panels, side-walks, and/or roofs, including the removal of mildew from roofs, walls, sidewalks, and/or other areas), and/or other fluids and/or solids, including substances that may be dis-tributed via a fluid after being dissolved or mixed with the fluid. It is understood that different fluids and/or mixed solids may have different application needs. For example, with respect to water, factors such as the amount of water needed for an area, the area's current level of saturation, any slopes that may cause runoff, humidity, and/or other factors that may affect the ability to deliver water to the area for effective absorption into the ground may be considered.

It is understood that multiple fluids may be mixed and/or cycled. For example, water and a cleaner (e.g., a liquid soap or soap particulates) may be sprayed simultaneously via the hovering distribution device 102. The cleaner additive may then be turned off during a rinse cycle, leaving only the water as the rinse fluid. In another example, different fer-tilizers may be used for different crops, with each fertilizer mixed into the water at the appropriate time. In yet another example, weed killer may be added to the water when needed, such as when computer recognition identifies the presence of weeds using a camera.

In another example, with respect to paint, it may be desirable to apply the paint in a manner that provides relatively even and consistent coats while preventing drip-ping or running, and while delivering the desired coverage per coat. The properties of the paint, the type of surface (e.g., the structural material and/or previously applied coats of paint or primer), the surface temperature, moisture evapo-ration, and/or other factors may also be taken into consid-eration. Hoses 106 and 110 may be the same hose or may be different hoses. A control system 112 may be coupled to the hovering distribution device 102, the reel 104, and/or the pump 108 via hardwire connections 114 and/or wireless connections 116.

As the pressure of the fluid entering the hose 106 may cause the hose to attempt to pull away from the reel 104, the reel may include or be coupled to a mechanism to minimize the stress such an outward force vector may exert on the reel. This outward force vector may also result in the use of additional electricity as the reel 104 applies rotational force to counteract the outward force vector. Accordingly, a worm drive, a bypass, and/or other mechanisms may be used to reduce the stress placed on the reel 104. In some embodi-ments, water and/or other fluids may be used to cool the reel 104 and/or the stress relieving mechanism(s). There may be hose stress on the reel 104 due to factors such as internal friction and the bend of the hose impacting the pressure rating, and such factors may need to be managed. Fluid may be used with a brake system coupled to the reel 104. For example, fluid may be routed around the brake system to hold the reel 104 in place, with the fluid acting as a booster to aid in braking.

The control system 112 may be configured to manage the positioning and operation of the hovering distribution device 102, including the distribution of fluid(s) 118 being deliv-ered by the system. For example, the control system 112 may control the positioning by controlling the distance between the hovering distribution device 102 and the reel 104, the vertical position of the device 102 above the ground, and/or the angle of the device 102 relative to the ground. In some embodiments, the control system 112 may control the ori-entation of movable nozzles that are part of the hovering distribution device 102. In some embodiments, some or all of the control system 112 may be part of the hovering distribution device 102, with the device 102 executing the functions provided by the control system 112. In still other embodiments, the control system 112 may be configured to interact with a separate control system on the hovering distribution device 102.

If the hovering distribution device 102 is at too high of an altitude, the fluid distribution may be inefficient due to factors such as the available amount of fluid covering too large of an area, fluid loss due to wind, low humidity and/or relatively high air temperatures that may increase the amount of evaporation before the fluid reaches the ground, and/or other factors. Accordingly, there may be an optimal altitude or altitude range within which to operate the fluid distribution device 102 in order to execute a particular irrigation plan or other activity (e.g., fire suppression). In some scenarios, such as during fire suppression, the fluid distribution device 102 may be operated at an altitude or within a range of altitudes that optimizes fluid distribution on the target while also protecting the device 102 and/or hose 106 from potentially damaging temperatures that may compromise the device 102 and/or hose 106.

In terms of controlling the hovering distribution device 102, the control system 112 may be configured in various ways. For example, in one embodiment, the hovering dis-tribution device 102 may be configured to operate at an optimal distribution altitude without causing the hose 106 to drag on the ground and/or objects, and this altitude may vary depending on objects and/or other factors. In another embodiment, the hovering distribution device 102 may be configured to operate at a standardized hover height. The control system 112 may then make other compensations (e.g., reel height, water pressure, and/or other adjustments) to maintain the standardized hover height. In other words, rather than adjusting the spray arc and other parameters in response to changes in the hover height, other adjustments may be made to maintain an ideal hover height.

Fluid delivery from the hovering distribution device 102 may be controlled in a number of ways, including pattern variation (e.g., the pattern of the distributed fluid), flow rate variation, thermal variation (e.g., by heating or cooling the fluid), and by mixing fluids (e.g., dynamic mixing using a fluid mixer as needed). By controlling such factors, the delivery of fluids by the hovering distribution device 102 may be tailored to a specific use case for a specific envi-ronment, enabling fluid delivery in an optimized manner.

When launching the hovering distribution device 102, care may be taken to ensure that control is not lost when fluid is first supplied via the hose 106. For example, if the hovering distribution device 102 is sitting on the ground, the sudden exhaust of pressurized fluid may dig a hole in the ground, damage plants or structures, and/or potentially cause injury. In addition, if the nozzle(s) are not positioned prop-erly, the hovering distribution device 102 may start in an undesirable orientation that may cause it to go out of control or be difficult to orient properly.

Accordingly, in some embodiments, a pole, cable, or other structure may be used to orient the hovering distribution device 102 prior to the provision of fluid via the hose 106 and/or to make sure it is high enough when it receives fluid to prevent damage from occurring. A bracket, loop, or other fixture may be coupled to the pole and the hovering distribution device 102 may be set or otherwise removably coupled to the fixture. In other embodiments, the hovering distribution device 102 may include legs that are statically coupled to the device or that may be extendable. For example, the hovering distribution device 102 may have three legs forming a tripod that enables the device to be launched and/or retrieved in the proper orientation and/or without damage to the surroundings.

In some embodiments, the hovering distribution device 102 may be self-righting after a surface or obstacle impact. For example, the hovering distribution device 102 may include arms, legs, and/or other mechanisms with which the hovering distribution device may push against the surface to right itself, and/or may use one or more fluid streams from its nozzles. Various trigger mechanisms may be used, including solenoids, pressure cycling, and/or direct commands to active components. Pressure cycling may be used to actuate a spring, an arm, and/or other mechanisms, and such pressure cycling may be accomplished before any fluids are distributed. Active methods, such as the extension, manipulation, and/or retraction of articulating arms and/or legs, may be used if, for example, passive measures are not available or are ineffective.

It is understood that the use of such arms, fluid streams, and/or other mechanisms may be dependent on the surface and/or surrounding area in order to prevent damage that may be caused by an attempt at self-righting. For example, if the hovering distribution device 102 is being used to clean a sidewalk or is the middle of a field being irrigated, such mechanisms may be used, while they may be disabled if the hovering distribution device is in a flowerbed (e.g., due to possible damage to the flower bed from the arms and/or high pressure nozzles) or if being used to clean a roof or windows (e.g., due to possible damage and/or breakage). In some environments, some self-righting mechanisms may be enabled (e.g., arms), while others are not enabled (e.g., fluid streams), based on the particular mechanism's effect on the surface and/or the surrounding area.

In the present embodiment, the hovering distribution device 102 is part of the fluid distribution system 100. It is understood that in other embodiments, some or all of the components of the fluid distribution system 100 may be present, but the hovering distribution device 102 may not be part of the system 100. Accordingly, the control system 112 may be configured to control only the fluid distribution system 100, only the hovering distribution device 102, or may be configured to control both. The control system 112 may be self-contained in the hovering distribution device 102, may be completely separate from the device 102 and locally located (e.g., located entirely remotely from the device 102 on the ground), may be remotely located (e.g., in the cloud), or may be distributed (e.g., partly in the device 102 and partly on the ground and/or in the cloud).

In some embodiments, part or all of the fluid distribution system 100 may be mobile. For example, a golf course may have multiple fluid outlets located along the greens, fairways, roughs, and sand traps, or a business park may have multiple fluid outlets located around the grounds. A vehicle that may be manually controlled and/or automated may be used to carry some or all of the control system 112, reel 104, hoses 106 and 110, and/or pump(s) 108. When irrigation is complete at one location, the hovering distribution device 102 may be retrieved, the hose 110 may be removed from the fluid outlet, and the hose 106 may be reeled in. Such actions may be automated and/or manually performed by a groundskeeper or other user.

The vehicle may then proceed to the next fluid outlet on the irrigation plan. After arrival, the hose 110 may be coupled to the fluid outlet, the hose 106 may be let out, and the hovering distribution device 102 may be launched to execute the current plan stage. Such actions may be automated and/or manually performed by a groundskeeper or other user. In this manner, the golf course or other grounds may be irrigated without needing to provide a fluid distribution system 100 at each location. This may also allow for more efficient use of the hose 106, resulting in the need for less hose length and, therefore, less hose weight and water weight that needs to be supported by the hovering distribution device 102.

This mobility may also be applied to areas such as firefighting, providing a manual and/or automated emergency response process with the ability to respond to an event, connect the hose 110 to a fire hydrant or other fluid outlet, and launch the hovering distribution device 102 to begin fire suppression functions. It is understood that such actions, including mobility, may be used inside of structures with appropriately sized vehicles. In other embodiments, a stationary fluid distribution station may be configured to launch a hovering distribution device 102 from a small bay or wall mount with a hose 106 already coupled to a fluid outlet. Such stationary distribution stations may be located inside or outside of structures, or in a separate booth or other enclosure.

Figure 3:
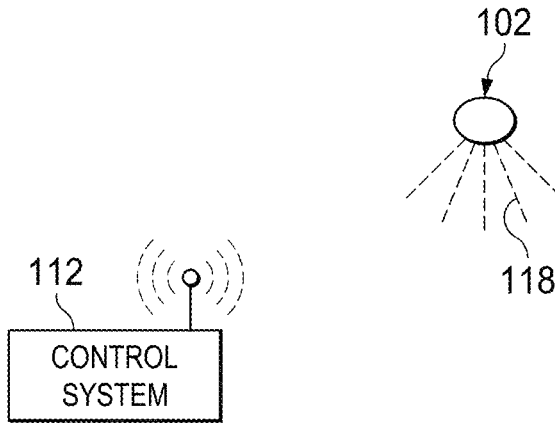
FIG. 3 illustrates one embodiment of a hovering distribution device in an environment without a coupled hose.

Referring to FIGS. 2 and 3, embodiments illustrate the hovering distribution device 102 operating without the fluid distribution system 100 other than the control system 112, which may be part of the hovering distribution device 102 or may be separate. For example, in FIG. 2, the hovering distribution device 102 is illustrated coupled to a fluid outlet 202 (e.g., a faucet), such as may be found at a home or business. It is understood that the fluid outlet 202 may represent a residential or industrial level outlet, including a fire hydrant, but generally no pump is present between the fluid outlet and the hovering distribution device 102.

Although limited by the available water pressure from the fluid outlet 202, the hovering distribution device 102 may be operated in such environments where other components (e.g., the pump 108 and/or reel 104) are not present. FIG. 3 illustrates the hovering distribution device 102 operating without the hose 106. In such embodiments, the hovering distribution device 102 may contain its own fluid supply, such as in one or more fluid tanks on a drone or similar aerial vehicle.

Figure 4:
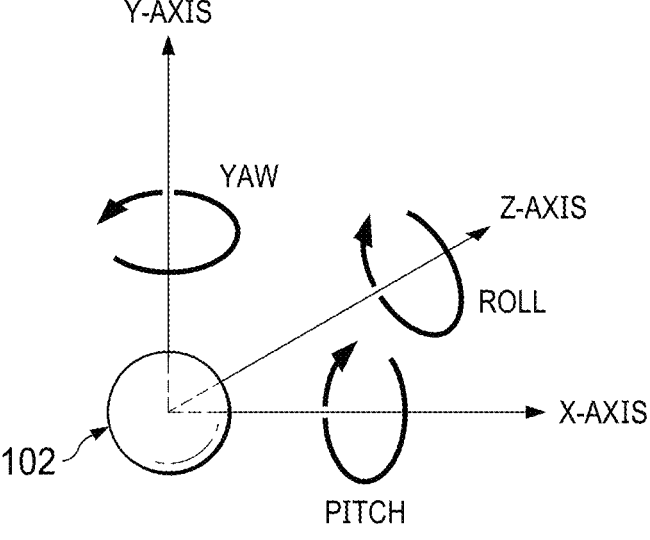
FIG. 4 illustrates one embodiment of six degrees of movement that may be applied to control a hovering distribution device.

Referring to FIG. 4, in one embodiment, the position of the hovering distribution device 102 may be viewed as its location in a three dimensional space. The three dimensional space may use absolute coordinates for the position of the hovering distribution device 102 (e.g., global positioning system (GPS) coordinates providing the latitude, longitude, and altitude of the device), relative coordinates (e.g., the distance, angle, and altitude of the device relative to the reel 104 or another marker), other position and/or orientation identifiers, including a past or current position and/or orientation of the hovering distribution device 102 itself, and/or a combination thereof.

Accordingly, relative to the reel 104 or another marker in the direction of the hose 106, the hovering distribution device 102 may move forward and backward (along the z-axis), up and down (along the y-axis), and left and right (along the x-axis). It is understood that such movement may be more of an arc than a straight line due to the presence of the hose 106, unless such movement includes modifying the length of the hose 106 between the hovering distribution device 102 and the reel 104, or otherwise accounting for the distance limitation imposed by a particular hose length.

In some embodiments, the roll, pitch, and yaw of the hovering distribution device 102 may also be taken into account. Accordingly, the orientation of the hovering distribution device 102 may vary as the device 102 experiences roll (rotational movement around the z-axis), yaw (rotational movement around the y-axis), and/or pitch (rotational movement around the x-axis). It is understood that the freedom of rotational movement around one or more of the axes may be limited by factors such as the attachment point and attachment type of the hose 106. For example, a rigid attachment of the hose 106 on the side of the hovering distribution device 102 may hinder roll, pitch, and/or yaw relative to the attachment point due to the force exerted by the hose, while an attachment point using a bearing or other flexible coupling that allows at least some movement between the hose and the system may provide more freedom of movement in one or more of the orientations.

In some embodiments, the hovering distribution device 102 may include a swivel coupling and/or other anti-twist mechanism for the hose 106. The swivel coupling may enable the hose 106 to rotate where it connects to the hovering distribution device 102, thereby preventing the hose 106 from twisting along its length and placing an undesirable rotational force on the hovering distribution device 102. In other embodiments, such a swivel may not be used, and rotational force imparted by the hose 106 to the hovering distribution device 102 may be used to orient and/or otherwise anchor the hovering distribution device 102. For example, the force imparted by the hose 106 may be used in calculations for the orientation of the device 102. In embodiments where a swivel or other anti-twist mechanism is used, the hovering distribution device 102 may be configured to account for failure of the anti-twist mechanism by factoring in the force imparted by the hose 106 if such a failure occurs.

In still other embodiments, the hovering distribution device 102 may include a control mechanism such as a servo that is coupled to the hose connector via a gear, belt, drive, or other controllable mechanical interface. The servo may be used to rotate the hovering distribution device 102 relative to the hose. In such scenarios, the hovering distribution device 102 may use the twist of the hose or may even intentionally twist the hose relative to the device 102 in order to position and/or orient the device 102. For example, the hose 106 may provide a somewhat rigid structure for the hovering distribution device 102 to push against for purposes of position and/or orientation.

Figure 5:
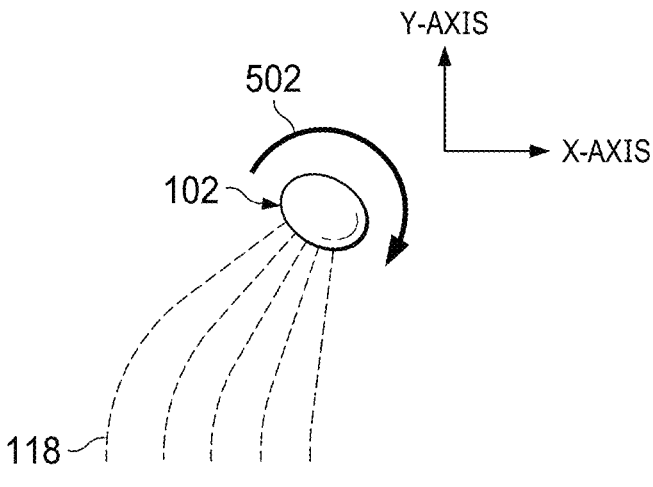
FIGS. 5 and 6 illustrate a hovering distribution device rotating about an axis.
Figure 6:
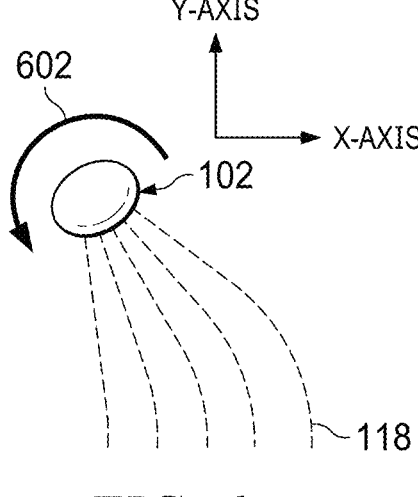

Referring to FIGS. 5 and 6, two orientations of the hovering distribution device 102 are illustrated after rotation in a first direction as indicated by arrow 502 (FIG. 5) and a second direction as indicated by arrow 602 (FIG. 6). For example, assuming the z-axis is perpendicular to the surface of the figure, the first and second directions would indicate roll around the z-axis. As shown, the orientation of the hovering distribution device 102 may affect the distribution of fluids 118 depending on whether the nozzles are fixed or movable, and, if movable, their orientation. If individual adjustment of a nozzle's orientation is not possible, adjusting the fluid distribution pattern may be accomplished by adjusting the position and/or orientation of the hovering distribution device 102 by, for example, varying the amount of pressure exiting one or more of the nozzles to move the device 102.

If individual adjustment of the nozzle(s) is possible, adjusting the fluid distribution pattern may be accomplished by adjusting the position and/or orientation of the nozzle(s) and/or the hovering distribution device 102. For example, the nozzle(s) of the hovering distribution device 102 may be adjustable, enabling fluid distribution to be manipulated without changing the position and/or orientation of the device 102. Alternatively, or additionally, the nozzle(s) may be adjusted in addition to changing the position and/or orientation of the device 102. For example, the nozzle(s) may be adjusted to maintain a desired distribution pattern even if the hovering distribution device 102 itself is moving due to wind and/or other factors.

It is understood that, regardless of whether the nozzles themselves are adjustable, the pattern of fluid distribution may depend on such factors as the pressure of the fluid, the number of nozzles, the physical configuration of the nozzles (e.g., channel width, exit size, and exit shape), the distribution of the nozzles' exits on the hovering distribution device 102, and the position and orientation of the hovering distribution device 102 relative to the area across which the fluid is being distributed. These and/or other factors may be viewed as operational parameters that can be controlled to define the trajectory and volume of the fluid as it is distributed. External factors, such as wind speed and direction, may also affect the distribution process.

Figure 7:
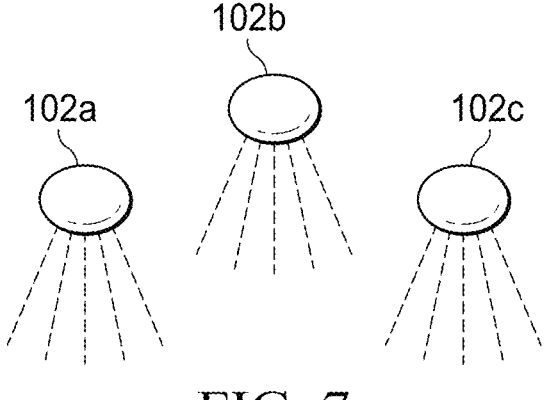
FIGS. 7-9 illustrate embodiments of a system with multiple hovering distribution devices.

Referring to FIG. 7, in one embodiment, multiple hovering distribution devices 102a, 102b, and 102c are illustrated. In some environments, multiple hovering distribution devices may be used to cover additional areas, to cover an area more quickly, to cover an area more thoroughly in a given amount of time (e.g., to distribute fluid over multiple areas simultaneously for an allocated period of time, thereby providing more fluid to each area than would be possible for a single device 102 in the same period of time), and/or for other reasons. The hovering distribution devices 102a, 102b, and 102c may be controlled separately, may be controlled in subsets (e.g., two and one), or may be controlled as a single unit. In this manner, additional hovering distribution devices 102 may be integrated into a fluid distribution process and control of those devices may be divided or combined as desired. This enables the fluid coverage provided by multiple hovering distribution devices 102 to be synchronized in order to execute a plan or other desired tasks (e.g., fire suppression).

Each hovering distribution device 102a, 102b, and 102c may be coupled to its own fluid distribution system 100 (although a control system 112 may be shared), or one or more hovering distribution devices may be coupled to a single pump 108 and/or hose 106 (e.g., using a splitter). It is understood that water pressure may be taken into account for such systems, as too many hovering distribution devices may compromise the desired volume of fluid reaching each device for distribution. In addition, depending on the distance of a splitter from the reel 104, changes in hose weight relative to a single hose setup may be taken into consideration.

Figure 8:
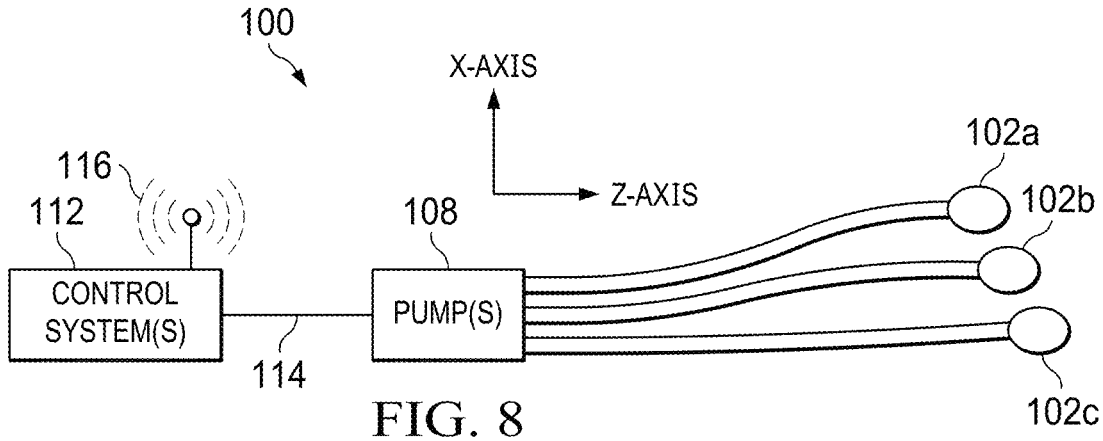
Figure 9:
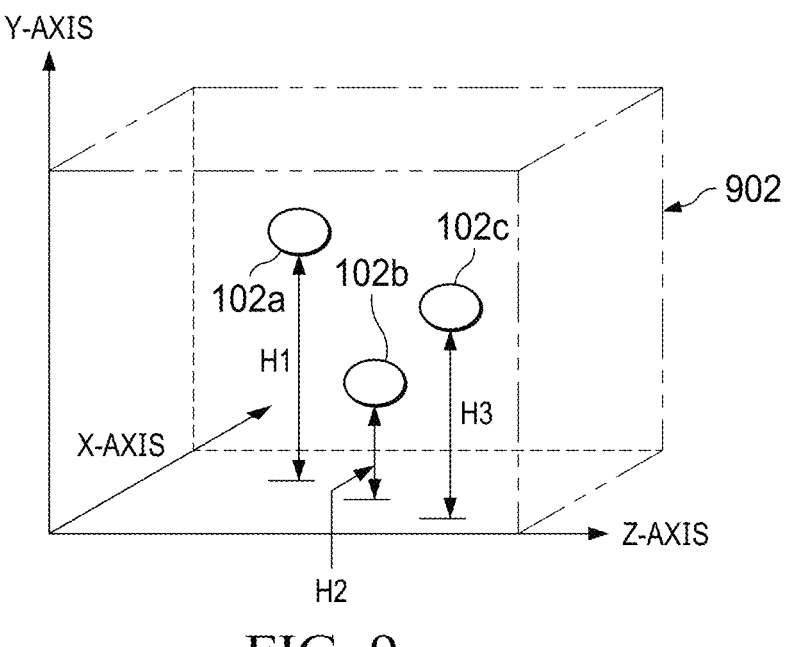

Referring to FIGS. 8 and 9, the hovering distribution devices 102a, 102b, and 102c are shown from above as being distributed along the x-axis and the z-axis (FIG. 8) and from a perspective view in a three dimensional space 902 illustrating their relative positions along all three axes (FIG. 9). In FIG. 8, the hovering distribution devices 102a, 102b, and 102c are shown at altitudes H1, H2, and H3, respectively, with H2<H3<H1. Because the position and/or orientation of each hovering distribution device 102a, 102b, and 102c may be controlled separately, a great deal of flexibility may be provided when using multiple hovering distribution devices. In other embodiments, the hovering distribution devices 102a, 102b, and 102c of FIGS. 7-9 may represent different positions of a single device, such as during the execution of a fluid distribution schedule over a period of time.

Figures 10A, 10B:
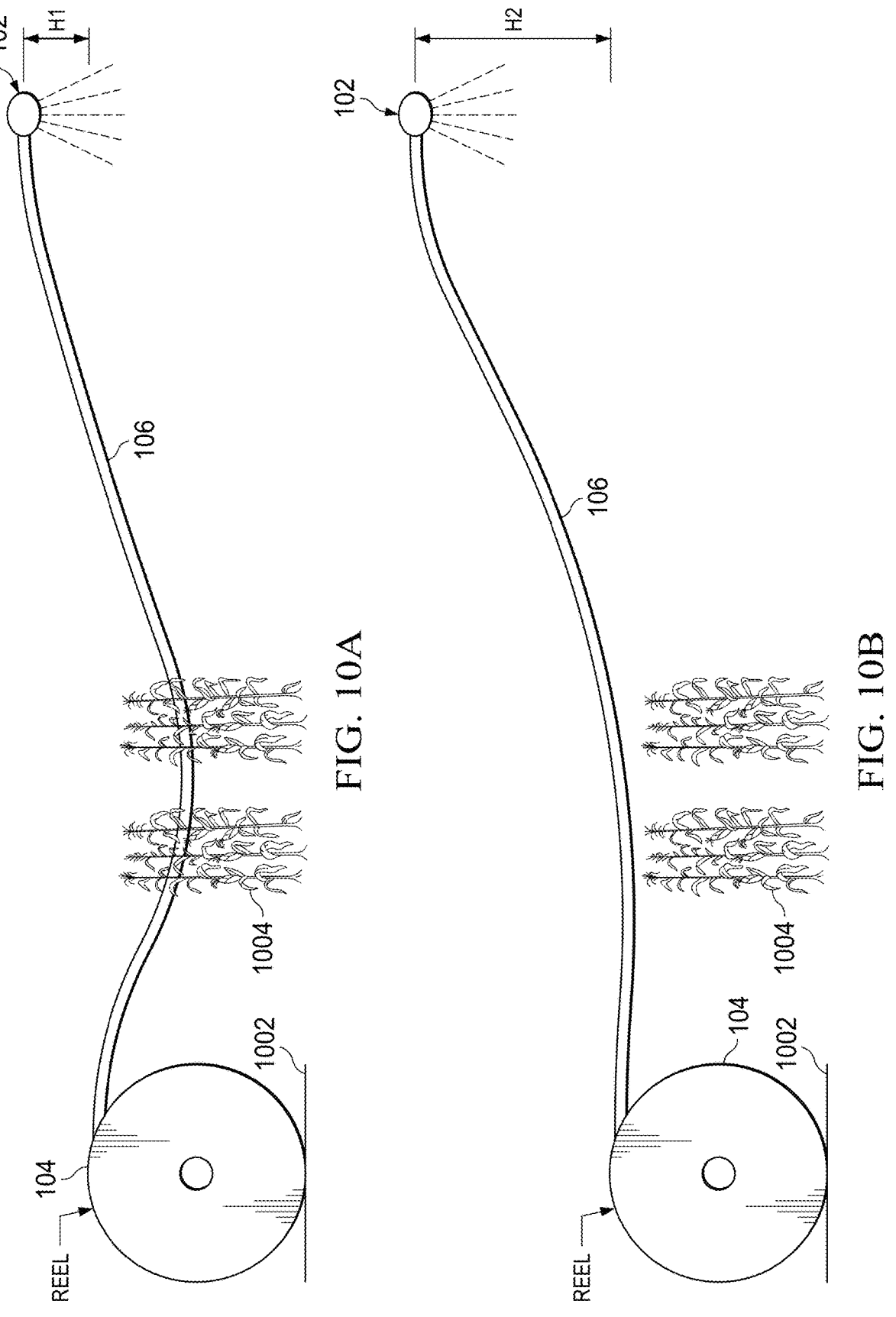
FIGS. 10A-10D illustrate embodiments of an environment in which obstacles may be present that may interfere with a hose coupled to a hovering distribution device.

Referring to FIGS. 10A-10D, in one embodiment, the reel 104 may be adjustable. Referring specifically to FIG. 10A, the reel 104 is positioned on a surface 1002, which may be at ground level or may be elevated on a stationary platform. As shown, with the current vertical position of the hovering distribution device 102 being at a height H1 relative to the top of the reel 104, the hose 106 may connect with one or more objects 1004. It is understood that the height of the objects 1004 may vary, and the objects 1004 may be crops, flowers, shrubs, golf course flags, utility poles, trees, structures, vehicles, or any other object that interferes with, or may be affected by, the hose 106. It is further understood that the height of the objects 1004, the length of the hose 106, and the proximity of the objects to the reel 104 and the hovering distribution device 102 may impact whether such interference occurs and/or the difficulty in overcoming the interference. For example, objects 1004 that may cause interference when under the lowest part of the hose 106 may not cause interference when closer to the hovering distribution device 102.

Referring specifically to FIG. 10B, one possible solution to prevent contact between the hose 106 and the objects 1004 is to increase the altitude of the hovering distribution device 102. By increasing the altitude of the hovering distribution device 102 as shown to a height H2 relative to the top of the reel 104, the hose 106 may be raised above the objects 1004. While this may be a solution in some scenarios, increasing the altitude of the hovering distribution device 102 may not be feasible or desirable in other scenarios. For example, the weight of the hose 106 that needs to be supported by the hovering distribution device 102 may be increased more than the device 102 can manage, as the altitude of the device 102 relative to the reel 104 impacts the weight distribution of the hose between the device and the reel. In another example, increasing the altitude of the hovering distribution device 102 to a sufficient level to avoid the objects 1004 may negatively impact the fluid distribution plan. Accordingly, simply increasing the altitude of the hovering distribution device 102 to a sufficient height to provide clearance for the hose 106 over the objects 1004 may not be a feasible or desirable solution.

Figures 10C, 10D:
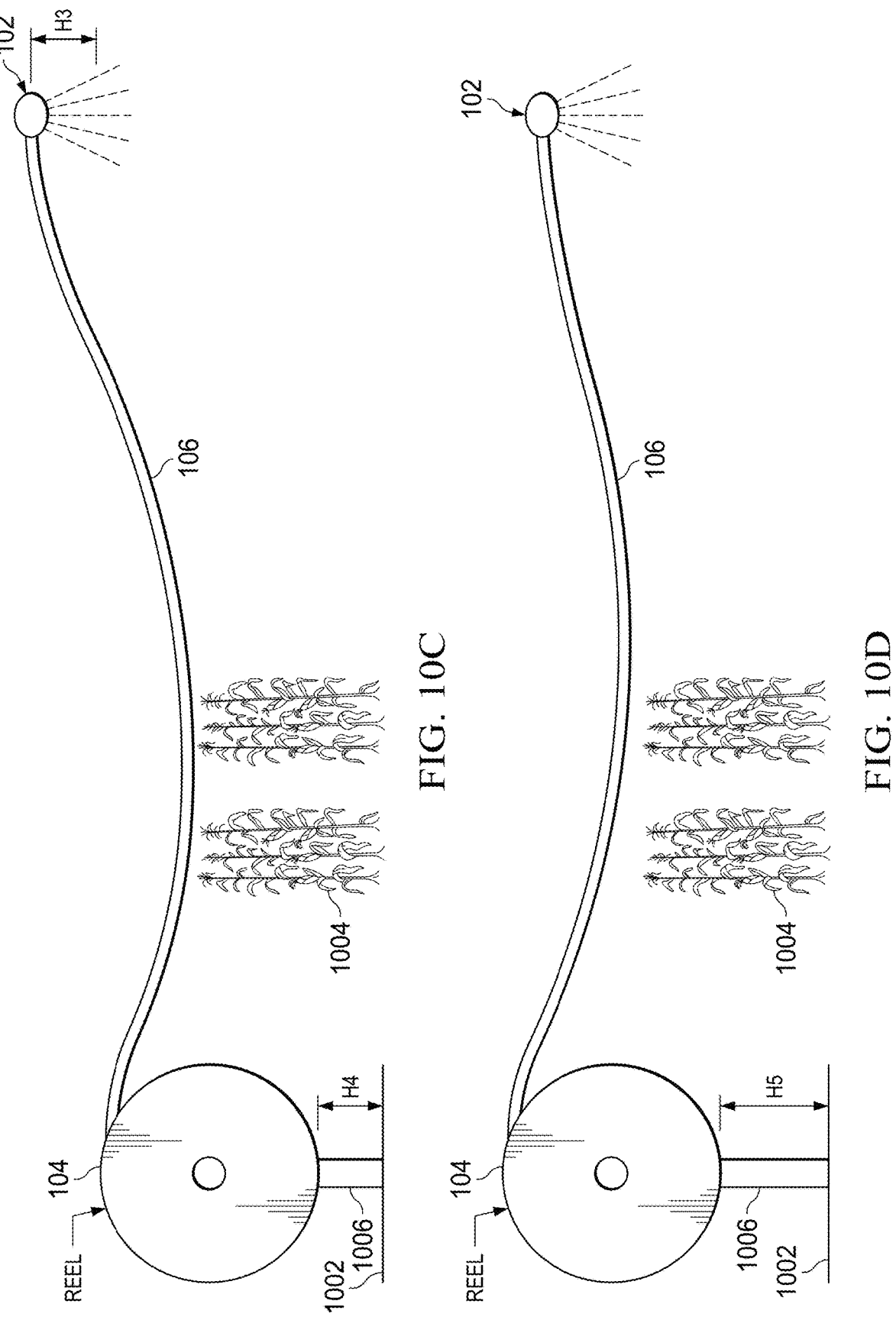

Referring specifically to FIG. 10C, the reel 104 may be coupled to a controllable lift or other device 1006 capable of vertically altering the position of the reel relative to the surface 1002. The lift 1006 may be any type of mechanism capable of vertically repositioning the reel 104, such as a telescoping piston, a scissor lift, or a cable lift. In some embodiments, the reel 104/lift 1006 may be designed to retract into a structure and/or underground (e.g., below grade) when not in use, and the lift 1006 may be used to extend the reel 104 for use and retract the reel when not in use. For example, a below grade enclosure may be used to hide or otherwise remove the reel 104/lift 1006 from sight when not in use, thereby minimizing the visual profile of the reel/lift when not in use, protecting the reel/lift from the elements, and/or removing the reel/lift as a potential obstacle during other operations. In some embodiments, the reel 104 may be configured to automatically retract the hose 106 when the fluid distribution system 100 and/or the hovering distribution device 102 is shutdown.

For example, in areas where freezing occurs, the liquid may be purged from the hose 106 with air or a similar fluid to protect the hose from damage that may be caused by the expansion of frozen liquid. The hose 106 may then be retracted and stored. In other embodiments, the hose 106 may be purged to prevent freezing but not retracted.

As shown, by lifting the reel 104 to a height H4 above the surface 1002, the height of the hovering distribution device 102 now needs to be only a height H3 relative to the top of the reel in order for the hose to clear the object 104. In the present embodiment, H3 is equal to H1 of FIG. 10A, meaning that the initial weight configuration of FIG. 10A is maintained by raising the reel 104 and the hovering distribution device 102 as shown in FIG. 10C. It is understood that increasing the altitude of the hovering distribution device 102 to a sufficient height to provide clearance for the hose 106 over the objects 1004 may be accounted for when calculating fluid distribution, as the fluid distribution profile may be changed compared to that of FIG. 10A where the device 102 is lower.

Raising the height of the reel 104 may increase the amount of hose 106 that can be fed out from the reel. For example, as the height of the reel 104 increases relative to the altitude of the hovering distribution device 102, less force may be needed by the device 102 to keep the hose 106 lifted above the ground and/or objects 1004. This in turn means that more hose 106 may be used, with the amount of hose that can be fed out dependent on such factors as the weight of the hose and the water, and the height of the reel 104 relative to the height of the hovering distribution device 102.

In some embodiments, the reel 104 may include one or more springs that adjust the vertical height provided by the lift 1006. For example, as the reel 104 becomes lighter because the hose 106 is being fed out and there is less hose and water weight on the reel, the spring may force the reel higher in the air, thereby automatically aiding in compensating for sag in the hose. Additionally, or alternatively, various other mechanisms may be used to adjust the height of the reel 104, such as worm drives, hydraulic systems, and/or other suitable mechanisms.

In some embodiments, control of the vertical height of the reel 104 may be automated to adjust for a desired height of the hovering distribution device 102. For example, if computer vision detects that the hovering distribution device 102 is nearing a flagpole as it washes windows, the vertical height of the reel 104 may be adjusted to compensate. In another example, if the reel 104 is part of a firetruck, the reel 104 may be raised if a tree is detected between the firetruck and the fire for which the hovering distribution device 102 is being deployed. Such vertical height and/or extension adjustments may use telescoping poles and/or other mechanisms, which may or may not be part of the reel 104.

Referring specifically to FIG. 10D, the reel 104 may be raised by a height H5 using the controllable lift 1006. In this embodiment, the height H5 enables the hose 106 to clear the objects 1004 while enabling the hovering distribution device 102 to maintain its original hovering altitude of FIG. 10A relative to the surface 1002. Accordingly, adjustments to the height of the reel 104 may be used to allow, for example, the hovering distribution device 102 to maintain an optimal hover height.

Figures 11, 12A, 12B:
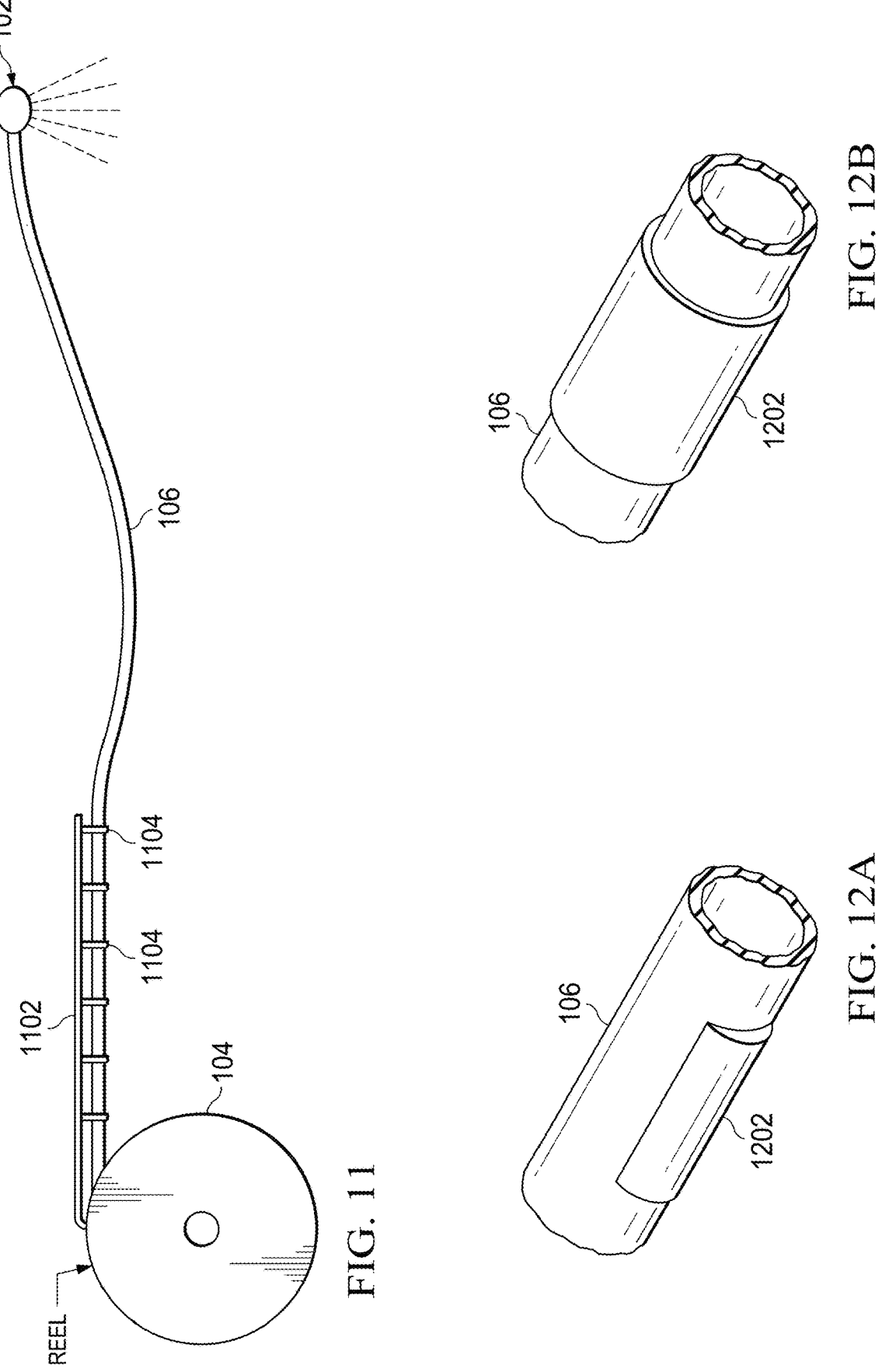
FIG. 11 illustrates one embodiment of a support structure coupled to a reel.
FIGS. 12A and 12B illustrate embodiments of support structures that may be coupled to a hose.

Referring to FIG. 11, in one embodiment, a support structure 1102 (e.g., a rod) may be coupled to the reel 104 to provide an extension capable of supporting the hose 106.

The support structure 1102 may aid in reducing the weight of the hose 106 on the hovering distribution device 102 by extending support for the hose past the reel and towards the device 102. In the present example, the support structure 1102 includes rings 1104 that support the hose 106, but it is understood that the hose may be movably held by the support structure in many different ways. For example, the hose 106 may be movably held by the support structure 1102 in many different ways, including laying on top of, or within, the support structure 1102, and may lay within a channel and/or be constrained by rings, sidewalls, and/or other mechanisms to ensure that the hose 106 remains in position. As the hose 106 may be reeled in and out, the support structure 1102 is configured to allow the hose to move while still providing support. In some embodiments, sensors may be positioned along the hose 106 and/or on the support structure 1102 to indicate hose direction based on the relative locations of the sensors. For example, this may be used to detect left/right motion of the hose (e.g., motion along the x-axis).

The support structure 1102 may be flexible or inflexible. The support structure 1102 may be extendable in some embodiments. For example, the support structure 1102 may be designed to extend in a telescoping manner (e.g., via the use of concentric cylinders or other slidable components), using hinged sections that are able to be moved and locked into place, by attaching additional extensions that are separate from the support structure 1102, and/or using other suitable extension mechanisms. Additionally, or alternatively, spring loaded cables and/or other support mechanisms may be used to aid in removing hose weight from the hovering distribution device 102. In some embodiments, a lift (e.g., a scissor lift) may be used as a support structure. In such embodiments, a guidance mechanism (e.g., a rollout cable track) may be used to ensure the lift is correctly positioned. In cases where the lift is motorized or is coupled to a movement mechanism, the position of the lift along the path of the hose 106 may be altered as needed.

In some embodiments, a support structure may be designed to provide a locking system when deployed. For example, a track like structure may be extended relative to the reel 104. The track like structure, which may be unrolled or otherwise deployed, may be designed so that each piece locks relative to the previous piece when extended to a certain point. In such embodiments, each track section may reach a point that is "flat" relative to the preceding section, and the design may stop the track section from extending past that point. In this manner, the support structure may be deployed to provide a relatively rigid structure to support the hose 106, but may also be retrieved and stored in a compact manner.

In some embodiments, cable systems may be used, such as those used for controlling the movement of suspended cameras in sport stadiums. Such cable systems may be permanent or temporary, and may use existing infrastructure or may use infrastructure specifically installed for use with the hovering distribution device 102, hose 106, and/or other components of the fluid distribution system 100. Such cable systems may be used in outdoor environments (e.g., to provide water to fields, nurseries, or gardens, or to provide a targeted fire suppression system over an arca) or may be used indoors (e.g., to provide water in greenhouses or to provide a targeted fire suppression system over an area such as a factory floor).

Referring to FIGS. 12A and 12B, embodiments of the hose 106 are illustrated with one or more support structures 1202 that may aid in maintaining the hose in a straight position. For example, the hose 106 may be constructed with one or more sheaths or layers 1202 that provide a relatively constant force that operates to straighten the hose. The layer(s) may be a mesh covering coupled to the surface of the hose 106 and/or any other material or combination of materials that provide the desired force. The layer(s) 1202 may be designed with many different shapes and profiles. Additionally, or alternatively, the support structures 1202 may be positioned inside the hose 106.

The layer(s) 1202 may run along one side of the hose 106 (e.g., along the length of the hose, rather than around the hose) as shown in FIG. 12A, may completely encircle the hose in one or more places as shown in FIG. 12B, or may be configured as a combination thereof (e.g., the single strand of FIG. 12A but coiled around the hose). In some embodiments, the layer(s) may force the hose to "snap" into place much like a spring-loaded metal retractable tape measure does when extended. Due to this force that pushes the hose 106 to remain straight, the reel 104 needs to be able to apply enough rotational force to overcome the straightening force in order to reel the hose in and out. Additionally, or alternatively, other mechanisms may be used with the hose 106, such as a coil/spiral type of spring. For example, similar to the mechanism provided by a garden hose spring protector, one or more spiral springs may be positioned along the outside of the hose 106, with the spring(s) producing a force that works to straighten the hose. In some embodiments, the hose 106 may be auto lengthening. For example, as pressure within the hose increases, the hose may telescope out or otherwise lengthen. In some embodiments, a pressure delta within the hose 106 may be used to stiffen the hose.

In some embodiments, the hose 106 may include an outer casing and/or other containment mechanism that contains helium and/or other lighter-than-air gasses. Such outer casings may be used to provide lift to the hose, and may be designed with materials that are resistant to punctures, ruptures, and/or other breaches. In some examples, such casings may be provided by sleeves that are wrapped around or otherwise coupled to the hose 106 (e.g., via a hook or other attachment mechanism that couples to the hose or wraps around the hose). The sleeves may include chambers that contain the lighter-than-air gas(ses). Such sleeves may be of different lengths, different diameters, have multiple chambers, and/or have different chamber sizes, and may enable a hose to be provided with lift along selected areas of the hose or along the entire hose. The amount of lift may be controlled by the use of more sleeves, the use of longer sleeves, the use of sleeves configured to hold more lighter-than-air gasses (e.g., sleeves with bigger and/or more chambers), and/or by varying the amount of lighter-than-air gasses in a particular sleeve.

In some embodiments, the hose 106 may include one or more mechanisms to conductively isolate the hose from electricity. For example, if the hose 106 hits a power line or is hit by lightning, the hose may be designed to manage the electrical surge by shunting the electricity into the ground and/or handling it in other ways. Such mechanisms may be built into the hose 106 (e.g., as conductive components within the hose itself) and/or coupled to the hose (e.g., as wires that drag along the ground to couple the hose to the ground).

In some embodiments, coiled/spiral wires may be used to provide power to the hovering distribution device 102 and/or to provide heat to prevent freezing. For example, if the hovering distribution device 102 is to be used for deicing and/or ice prevention operations (e.g., for airplanes or orchards), it is undesirable for the fluid inside the hose 106 to freeze. However, the environment in which the hovering distribution device 102 may be deployed for such operations may be well below freezing. Accordingly, by using wires, conductive sheaths, and/or other heating elements, the temperature of the fluid may be kept above freezing. In some embodiments, the wires and/or other electrically conductive paths may be used for power and/or signaling, but may be designed so that they generate a needed amount of heat when an electrical load is applied. In still other embodiments, the fluid itself may be heated and/or chemically regulated (e.g., to alter its freezing point) in order to prevent it from freezing.

Referring to FIGS. 13A-13G, embodiments of a support structure 1302 are illustrated. The support structure 1302 may be coupled to the reel 104 (e.g., as shown in FIGS. 10C and 10D) or may be separate (as shown in FIGS. 13A-13G). The support structure 1302 may be configured in many different ways and may be fixed or movable. In FIGS. 13A-13G, the support structure 1302 is formed with telescoping sections that may be retracted and extended as desired to provide additional height and/or distance for the hose 106. It is understood that other movement and/or support mechanisms may be used in addition to, or as an alternative to, the telescoping structure illustrated, such as those described previously with respect to the support structure 1102 of FIG. 11. For purposes of example, the height of the support structure 1302 may refer to the height at which the support structure provides support for the hose 106, rather than the overall height of the structure itself (which may extend above the hose).

In some embodiments, the support structure 1302 may automatically extend and retract as needed. For example, automatic extension and/or retraction may occur to achieve a desired range and/or altitude of the hovering distribution device 102, to avoid obstacles, to compensate for wind, and/or for safety or other reasons. Such automated performance may be based on sensors, cameras, defined fluid distribution plans, and/or based on other information, and may use computer vision, artificial intelligence, and/or other processing methods.

Rings and/or other mechanisms 1304 may be used to restrain the hose 106 relative to the support structure 1302 while still allowing movement of the hose. It is understood that the hose 106 may be movably held by the support structure 1302 in many different ways. For example, the hose 106 may lay on top of, or within, the support structure 1302, and may lay within a channel and/or be constrained by rings, sidewalls, and/or other mechanisms to ensure that the hose 106 remains in position. While shown with the support structure 1102 of FIG. 11, it is understood that some embodiments may not include such a support structure.

The height of the support structure 1302 may be controlled relative to the height of the hovering distribution device 102 in many different ways to accomplish one or more objectives. As described above with respect to 10C and 10D, the height of the support structure 1302 may be controlled to lift the hose 106 above various obstacles. Such changes in the height of the support structure 1302 relative to height of the hovering distribution device 102 may alter the weight distribution of the hose 106 by changing how much of the hose is supported by the support structure 1302 and how much of the hose is supported by the hovering distribution device 102.

Generally, the higher the support structure 1302 is relative to the hovering distribution device 102, the more the weight of the hose 106 will be shifted to the support structure 1302 (assuming the hose is of uniform weight along the suspended length), thereby reducing the hose weight that needs to be supported by the hovering distribution device 102. Conversely, the lower the support structure 1302 is relative to the hovering distribution device 102, the less the weight of the hose 106 will be shifted to the support structure 1302, thereby increasing the hose weight that needs to be supported by the hovering distribution device 102.

Figure 13A:
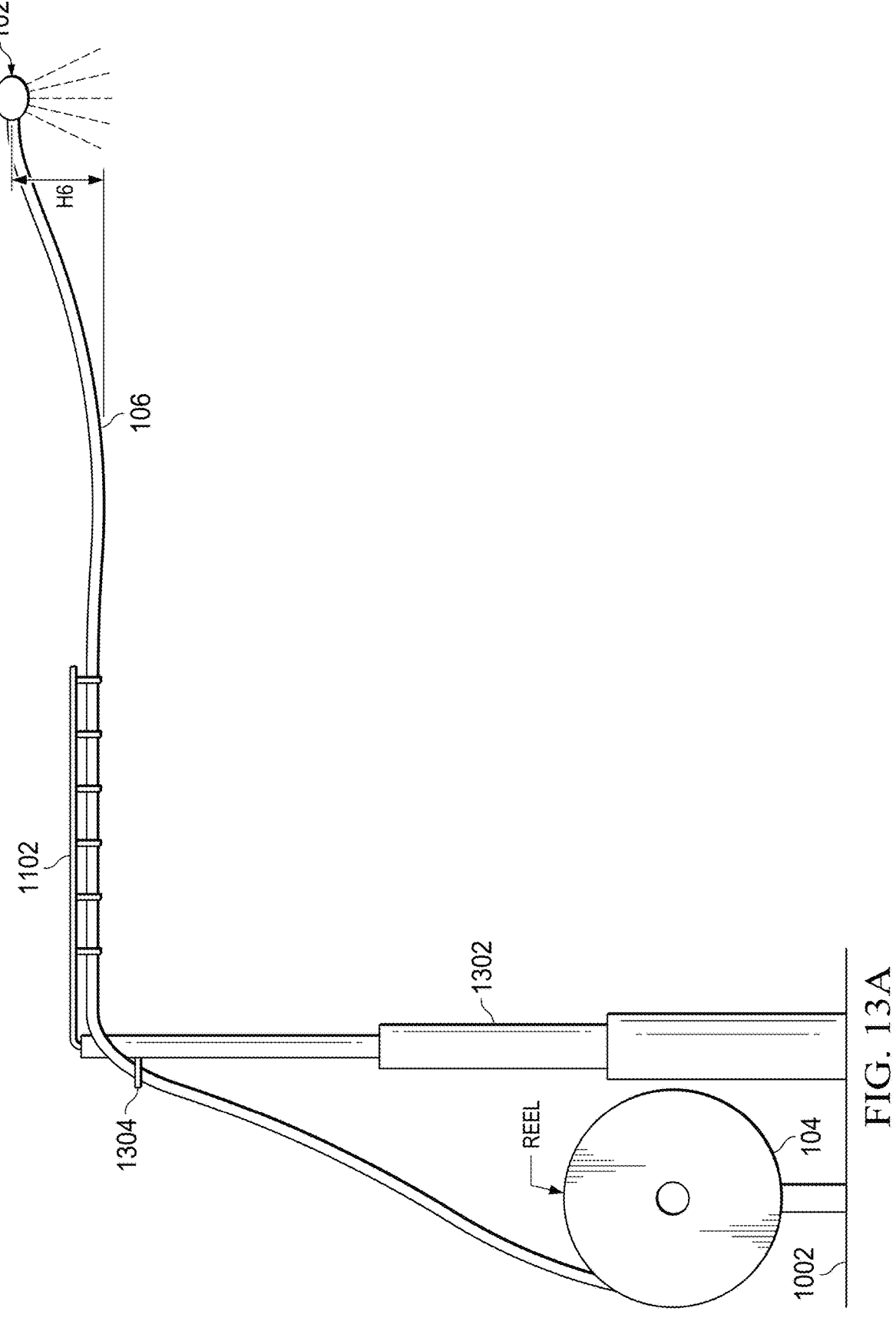
FIGS. 13A-13G illustrate embodiments of support structures that may be used to provide height, rotation, and/or extension support to a hose.

For example, in FIG. 13A, the relative height of the support structure 1302 is lower than the height of the hovering distribution device 102 as indicated by a height H6, and the hovering distribution device 102 may bear some additional weight of the hose 106 relative to the support structure 1302.

Figure 13B:
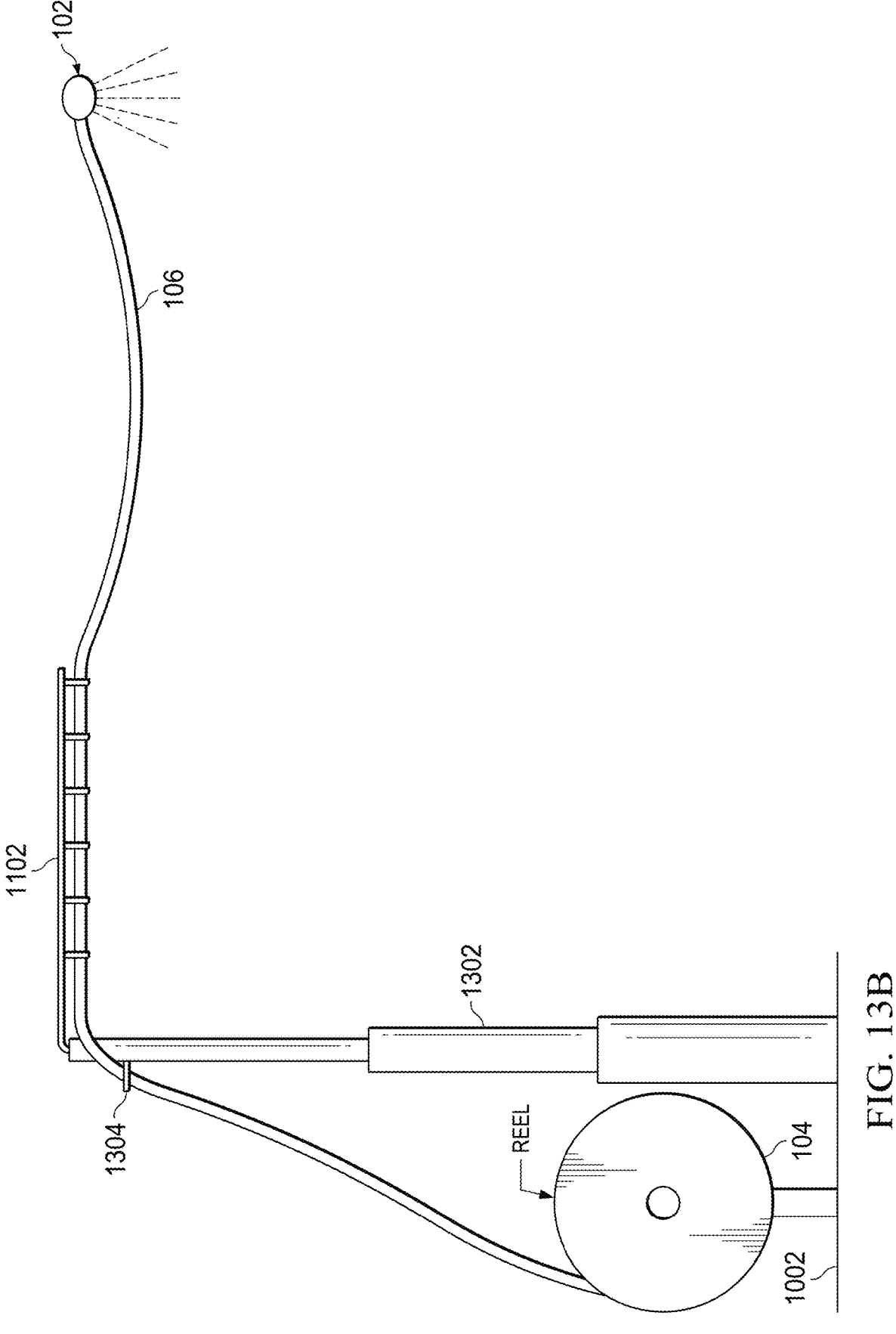

In FIG. 13B, the relative height of the support structure 1302 is similar to the height of the hovering distribution device 102, and the weight of the hose 106 may be relatively evenly distributed.

Figure 13C:
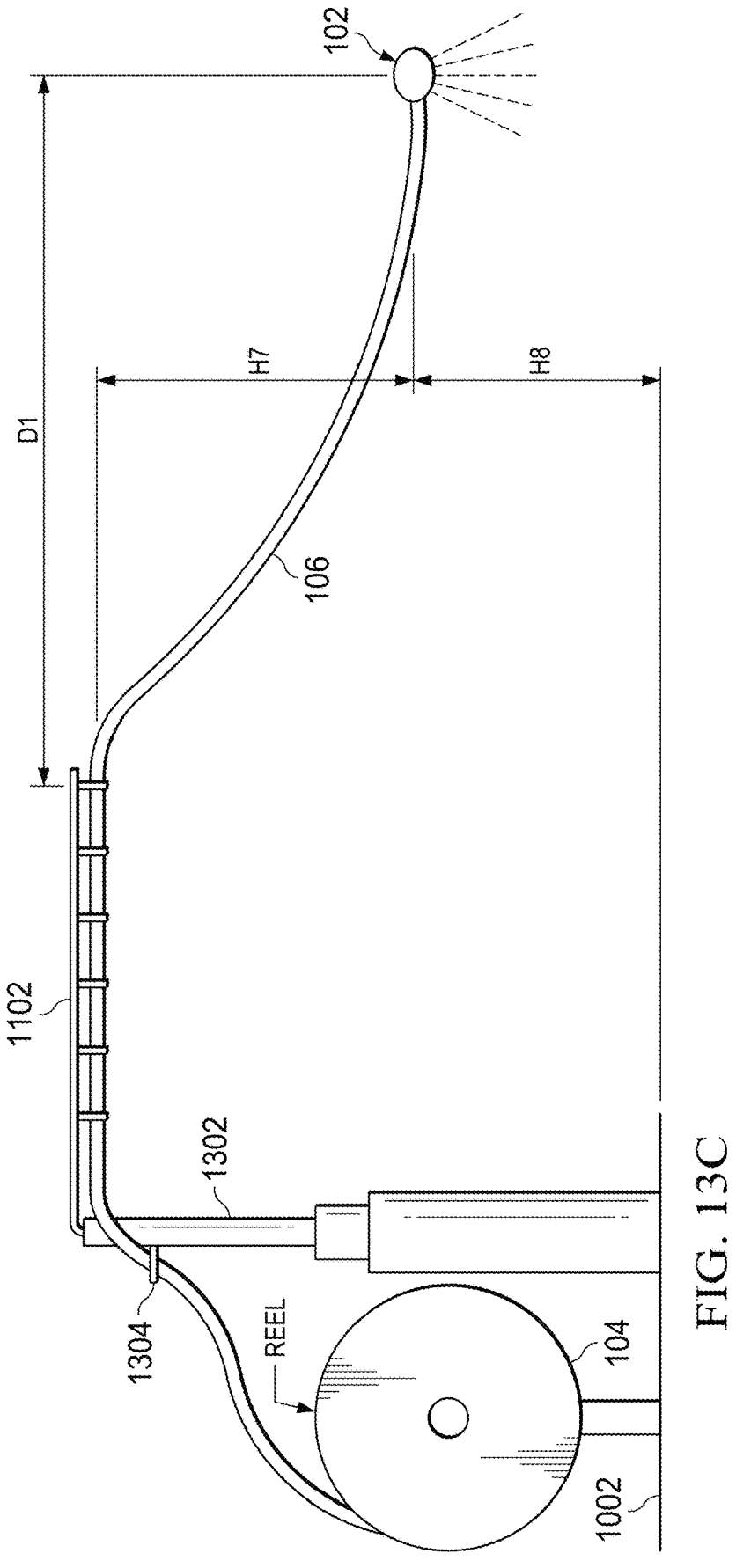

In FIG. 13C, the relative height of the support structure 1302 is higher that the height of the hovering distribution device 102 as indicated by a height H7. Accordingly, the support structure 1302 may bear some additional weight of the hose 106 relative to the hovering distribution device 102. This configuration where the support structure 1302 is relatively higher than the hovering distribution device 102 may provide benefits in range, overcoming obstacles, and/or the fluid distribution process of the hovering distribution device 102.

For example, the hovering distribution device 102 may be limited to lifting a maximum amount of hose weight. The maximum lift capability of a particular hovering distribution device 102 may be determined by a number of factors, including the weight of the hose 106, the weight of fluids carried by the hose (e.g., as based on the inner volume of the hose and the weight of the fluid per unit volume), the thrust vectors achievable by the hovering distribution device 102 (which may be limited by a particular fluid distribution plan, the available fluid pressure from the hose, and/or the design of the device itself), the surface on which fluid is to be distributed (e.g., high pressures may not be permitted), and/or other factors. The type of hose may also be a factor, such as the presence or absence of rigidity structures and/or other components that may be coupled to, or are part of, the hose 106. Accordingly, the lift capability of the hovering distribution device 102 is limited, which in turn limits the length of the hose 106 (e.g., the range) that may be supported by the device.

With continued reference to FIG. 13C, the hovering distribution device 102 is at a height H8 above the surface 1002 and a distance D1 from the support structure 1302. For purposes of example, the distance D1 is the maximum distance possible for the hovering distribution device 102 in the current configuration of the support structure 1302. However, by raising the relative height of the support structure 1302 and lessening the weight of hose 106 that must be lifted by the hovering distribution device 102 at a given range, the range of the hovering distribution device 102 may be extended without needing additional lift capability by the device.

Figure 13D:
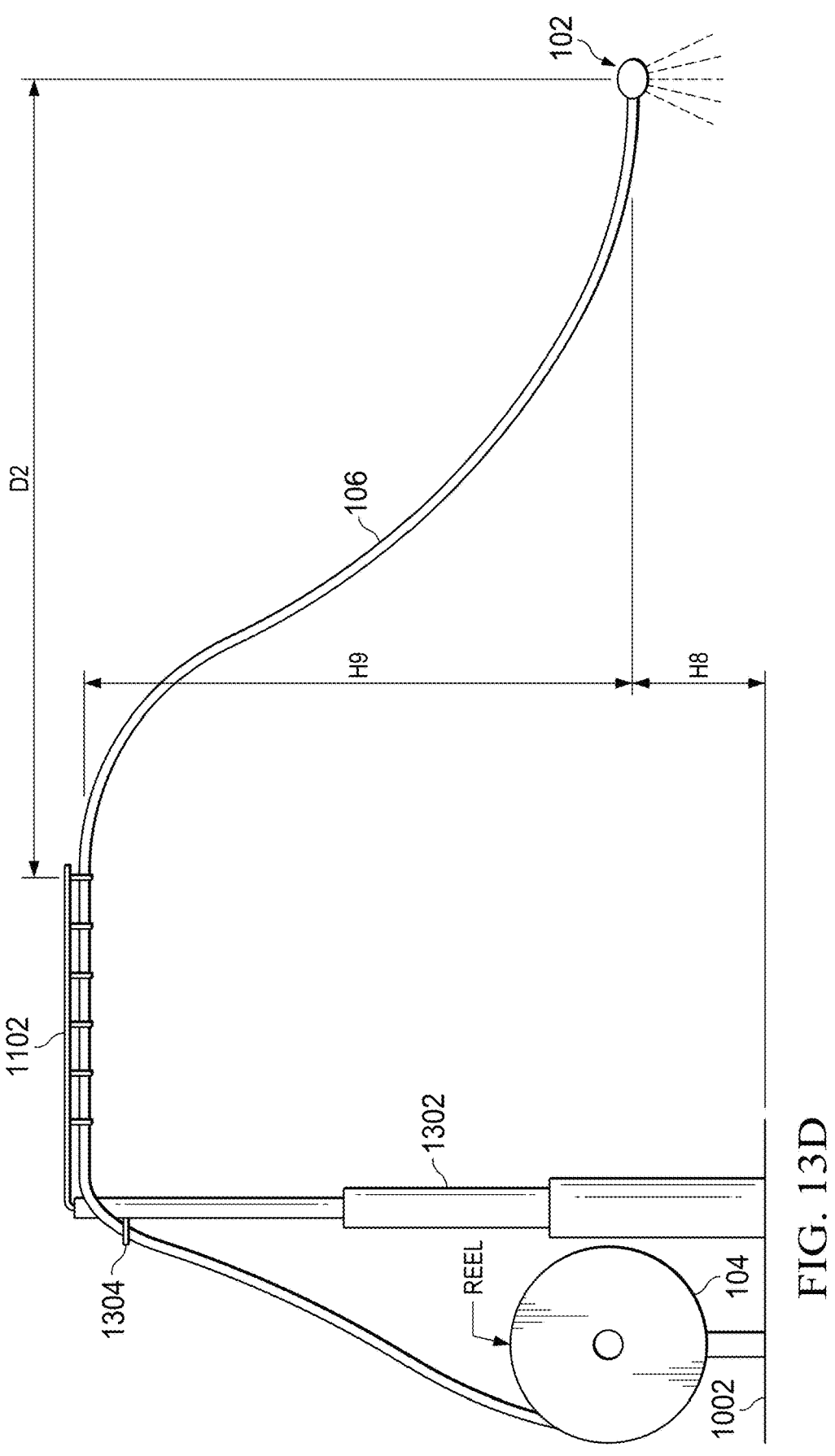

With additional reference to FIG. 13D, this additional range is illustrated. In FIG. 13D, the hovering distribution device 102 has maintained its height H8 above the surface 1002. However, the support structure 1302 has been raised, and the relative height of the support structure 1302 is now a height H9. The height H9 is greater than the height H7 of FIG. 13C, which enables the hovering distribution device 102 to move a distance D2 from the support structure 1302 (where D2 is greater than D1) while maintaining its height H8. Accordingly, by raising the height of the support structure 1302 (and/or extending it as illustrated below in FIG. 13E), additional hose may be used and the range of the hovering distribution device 102 may be extended.

This configuration may also benefit the fluid distribution process because the hovering distribution device 102 may not need as much thrust due to a lighter relative hose weight. For example, if a particular amount of thrust is needed to lift the hovering distribution device 102 and that thrust is more than desired (e.g., may have an undesirable effect on the surface upon which the thrust is acting), the support structure 1302 may be raised while the current range is maintained. This reduces the amount of thrust needed by the hovering distribution device 102 to maintain its vertical position, which in turn lessens the pressure of the fluid on the underlying surface.

Figure 13E:
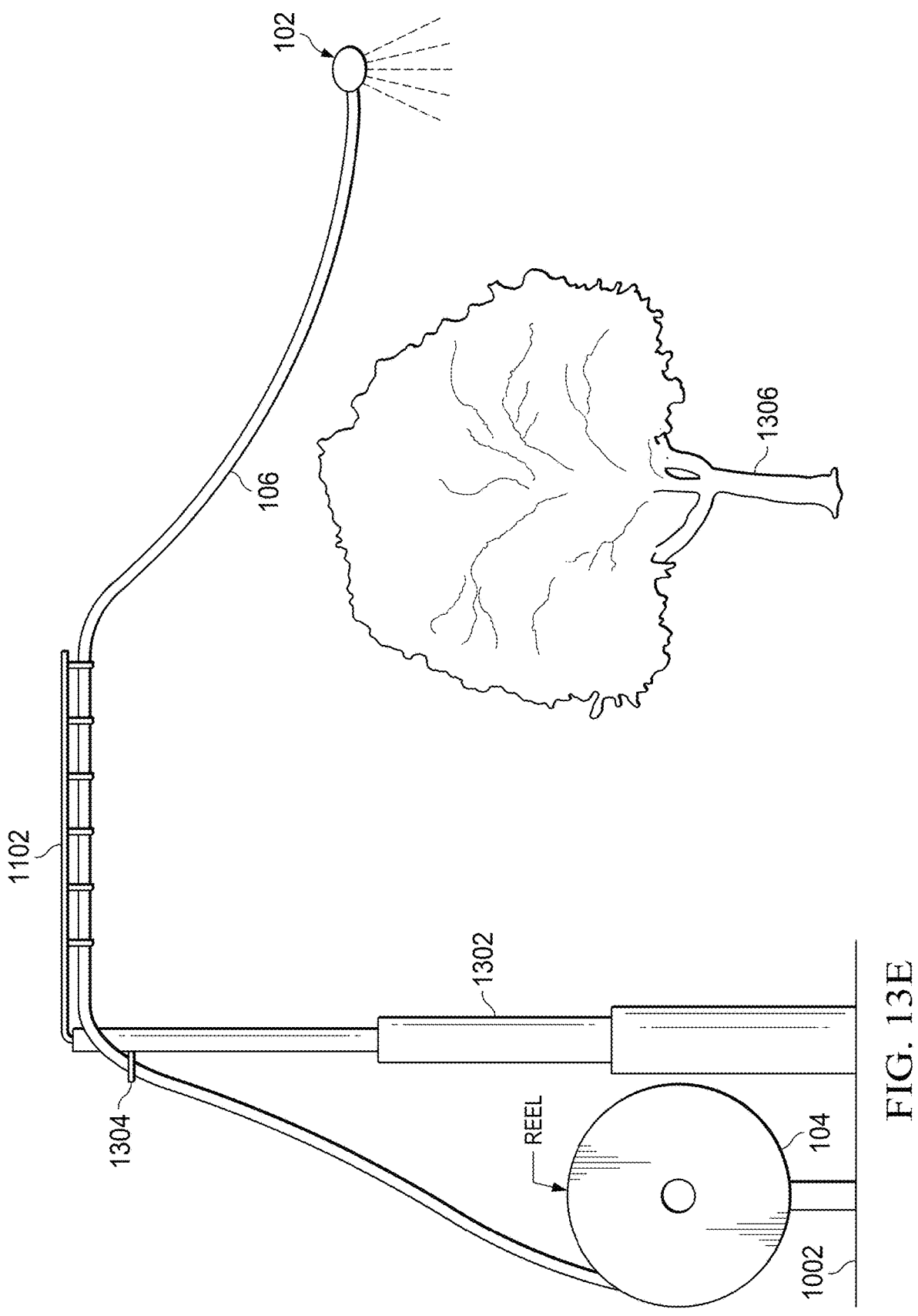
Figure 13F:
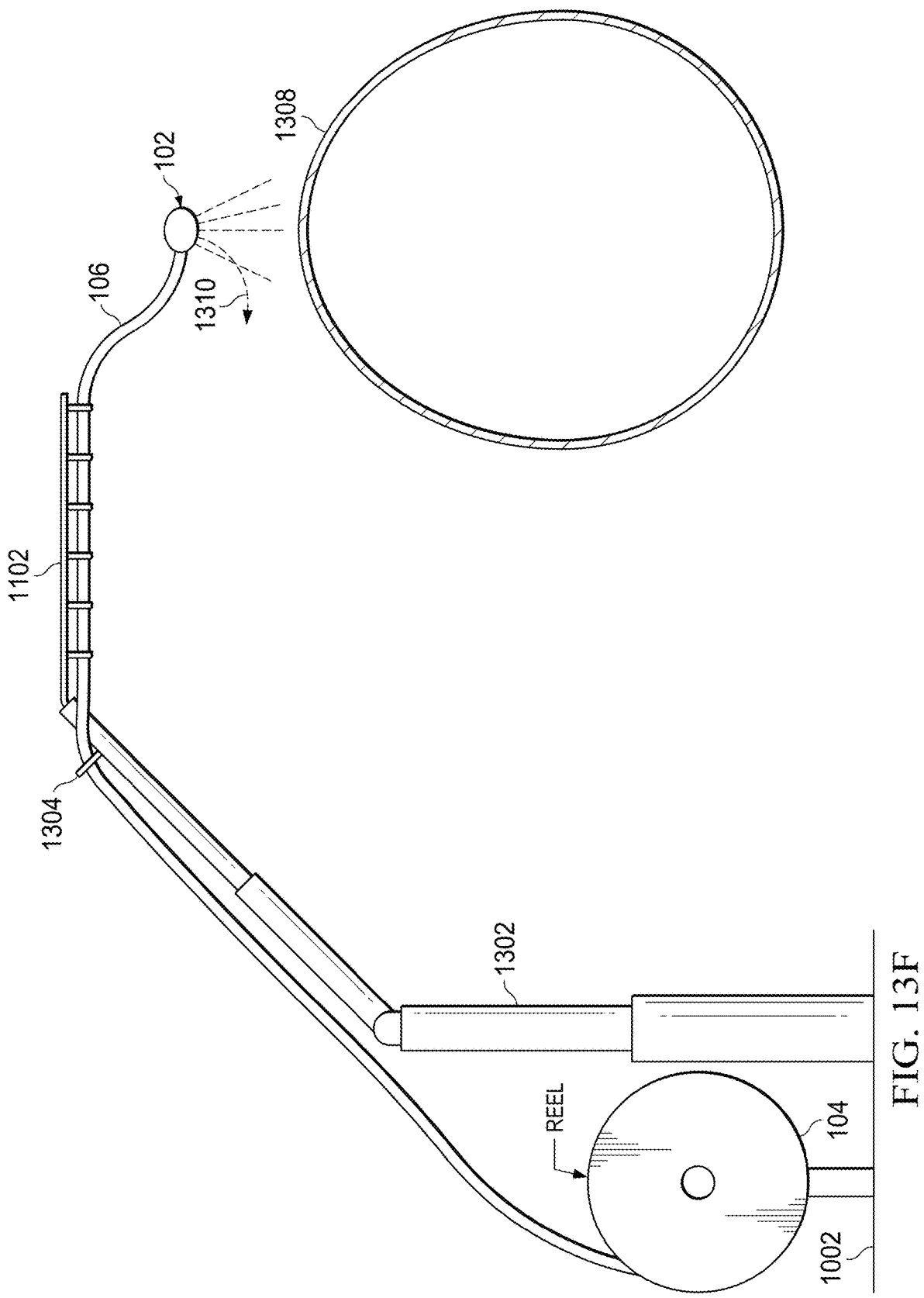

With additional reference to FIG. 13E, the configuration of FIG. 13C is illustrated with an obstacle 1306. The use of the support structure 1302 that is higher relative to the hovering distribution device 102 may enable the hovering distribution device 102 to be maintained at a desired altitude despite the presence of the obstacle 1306. This may reduce or eliminate the need for additional thrust by the hovering distribution device 102 to compensate for the obstacle 1306.

Figure 13G:
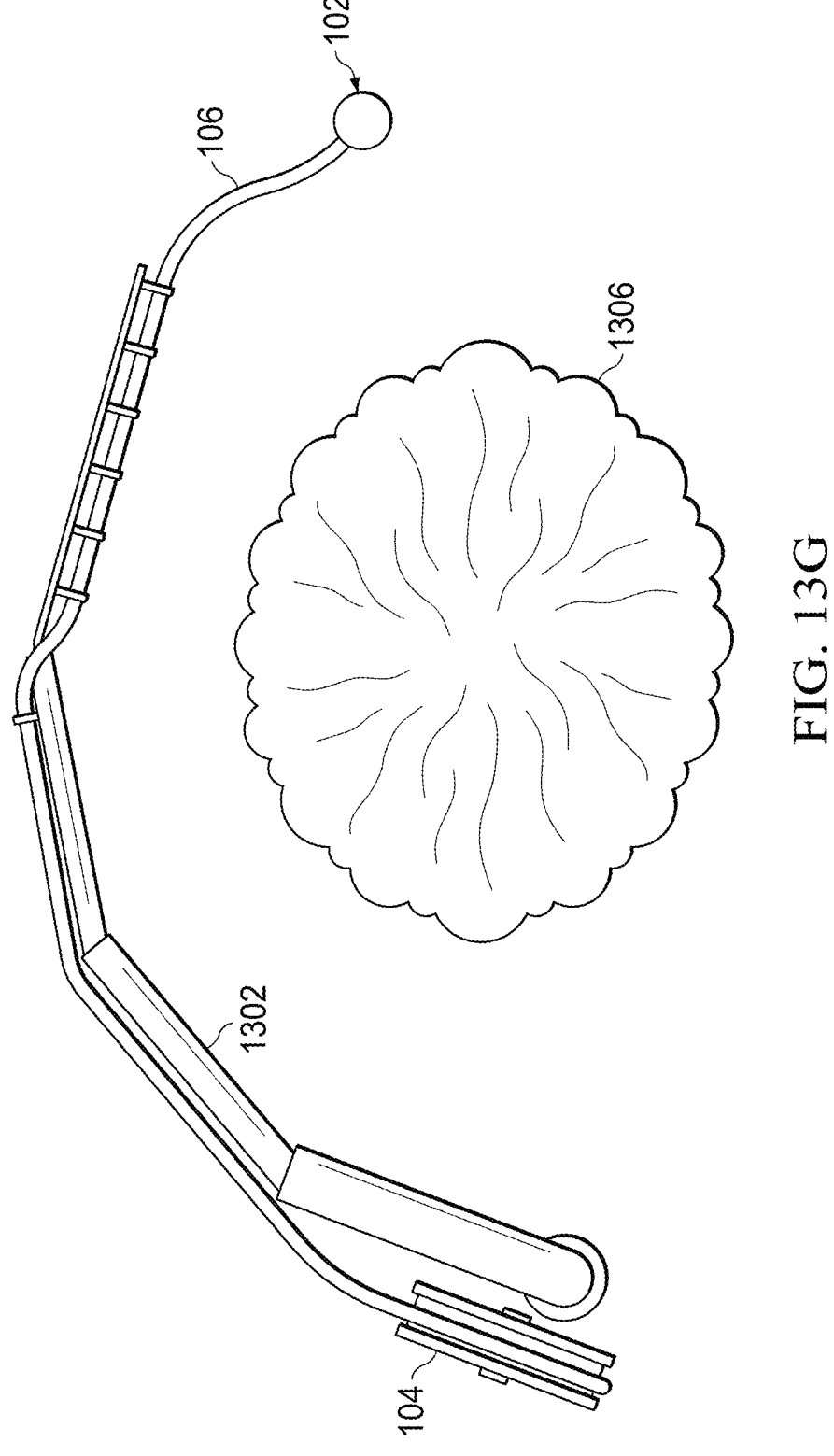

In FIG. 13G, the support structure 1302 is illustrated with an angled portion. This configuration may enable the support structure 1302 to provide additional range, to provide additional clearance over obstacles, and/or to provide a safer working environment. For example, the hovering distribution device 102 is shown relative to a surface 1308, which may be any shape and at any orientation. For purposes of example, the surface 1308 is an airplane fuselage and the hovering distribution device 102 is applying cleaning and/or de-icing fluid to the surface.

If the support structure 1302 is low or even in height relative to the hovering distribution device 102, failure of the device (e.g., loss of pressure, nozzle failure, and/or other failures) may result in the device dropping and striking the surface 1308, which may cause damage, trigger the need for inspections, and/or otherwise create problems. Using a higher and/or extending support structure 1302 may result in the hovering distribution device 102 swinging away from the surface 1308 in case of failure as shown by arrow 1310. This enables the hose 106 to be used as a physical safety tether for the hovering distribution device 102, while enabling the device to perform the desired fluid distribution functions.

Referring to FIG. 13G, which illustrates a top down view, the obstacle 1306 of FIG. 13E may be avoided by going around the obstacle, rather than over as shown in FIG. 13E. The reel 104 and the support structure 1302 may rotate to feed the hose 106 at an angle relative to the obstacle 1306, although the reel 104 may not rotate in some embodiments. The support structure 1302 may include multiple articulating segments than can be individually adjusted to provide both left/right and up/down movement, enabling the hose 106 to be deployed at many different angles and heights. This may enable the hovering distribution device 102 to be deployed behind objects and/or around corners without needing to rely solely on changes in height. Such adjustments may be useful in many different scenarios, including bypassing poles, trees, and/or other obstacles for irrigation, firefighting, and/ or other purposes.

Figure 14A:
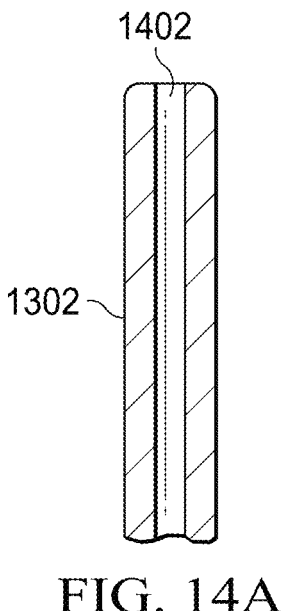
FIGS. 14A and 14B illustrate embodiments of a portion of a support structure having a channel disposed therein for a hose.
Figure 14B:
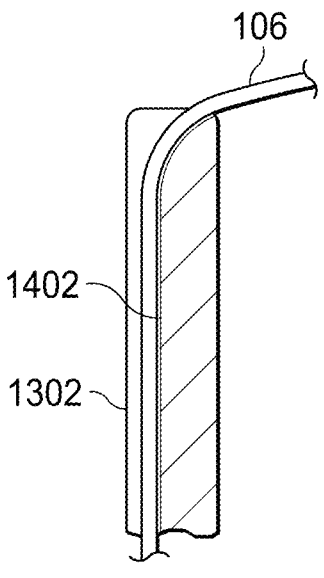

With additional reference to FIGS. 14A and 14B, some or all portions of the support structure 1302 of FIGS. 13A-13F may include a channel 1402 designed to receive the hose 106. The channel 1402 may be curved and/or otherwise shaped and/or lined to reduce hose wear due to friction. Rings and/or other mechanisms (not shown) may be used to restrain the hose 106 relative to the channel 1402 while still allowing movement of the hose.

Referring to FIGS. 15-19, various embodiments illustrate the use of aerial support devices 1502 to aid in lessening the weight of the hovering distribution device 102 and/or the hose 106. The aerial support devices 1502 may include powered or unpowered lighter than air devices (e.g., balloons of various shapes and sizes) and/or heavier powered flying devices such as drones and helicopters. The aerial support device 1502 provides additional lift to the hovering distribution device 102 and/or the hose 106, and may be controllable to provide more or less lift. For example, with a balloon as the aerial support device 1502, a heater may be used to control lift by varying the temperature of the gas in the balloon, and/or a line or attached tank in conjunction with a release valve may be used to control a volume of gas (e.g., helium, ammonia, methane, and/or other lighter than air gases and combinations thereof) present in the balloon. The position of the aerial support device 1502 may be controlled to account for left/right movements of the hose 106 relative to the reel 104, as well as vertical positioning. For example, the aerial support device 1502 may be moved to one side to aid in altering the position of the hose 106.

Figure 16:
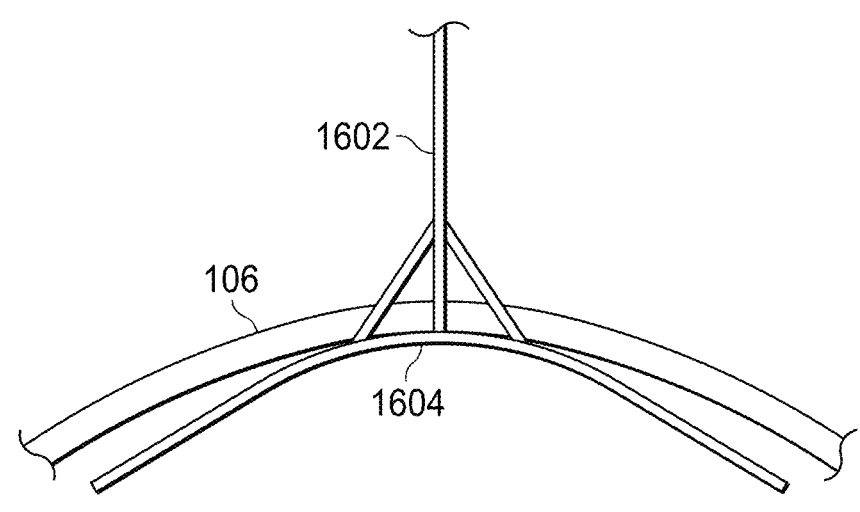
Figure 18:
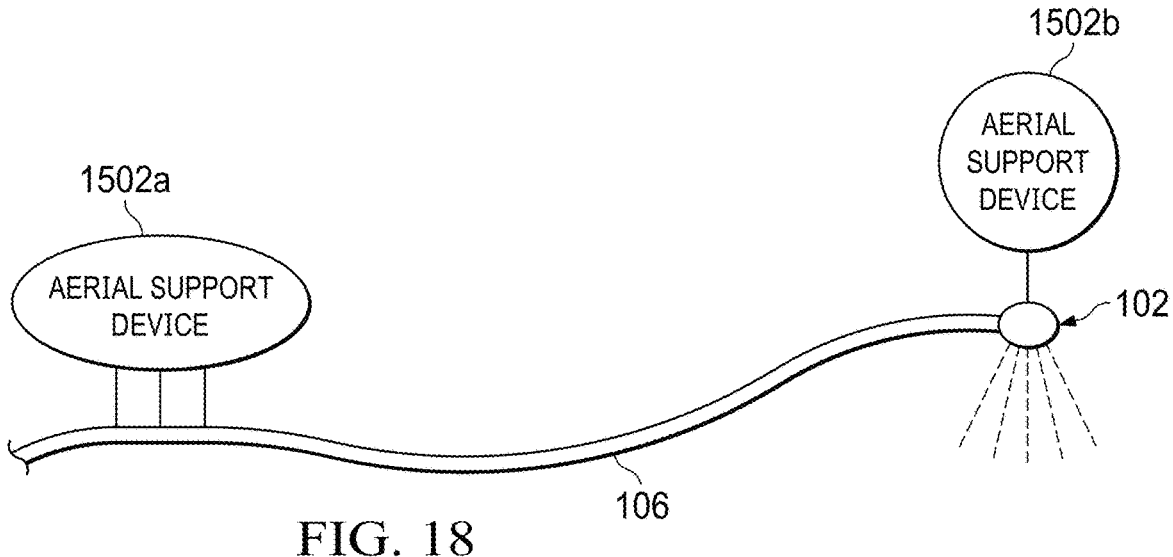

It is understood that many different devices may be used to provide additional lift, and the lift provided by such devices may be static or dynamic. It is further understood that the hose 106 may be coupled to the aerial support device 1502 in a manner that prevents the hose from being crimped or otherwise bent in such a way that the water flow is unduly restricted. Accordingly, as illustrated in FIG. 16, the aerial support device 1502 may use a hanger 1602 with a curved or otherwise elongated support 1604. Additionally, or alternatively, the aerial support device 1502 may be coupled to the hose 106 at multiple points (as shown in FIG. 18) to provide support for an uninterrupted fluid flow path.

In some embodiments, an aerial support device 1502 may provide fluid to one or more hovering distribution devices 102 in addition to, or as an alternative to, fluid from the hose 106. For example, the aerial support device 1502 may be a ballon that includes fluid chamber, and the fluid may be pumped or otherwise transferred to the hovering distribution device 102. This may enable the hovering distribution device 102 to be deployed in environments where a ground-based hose 106 is not viable or desirable, or to provide additional fluid if a ground-based hose is also present. If the aerial support device 1502 is positioned above the hovering distribution device 102, the weight of the hose between the aerial support device 1502 and the hovering distribution device 102 may be minimized.

Figure 15:
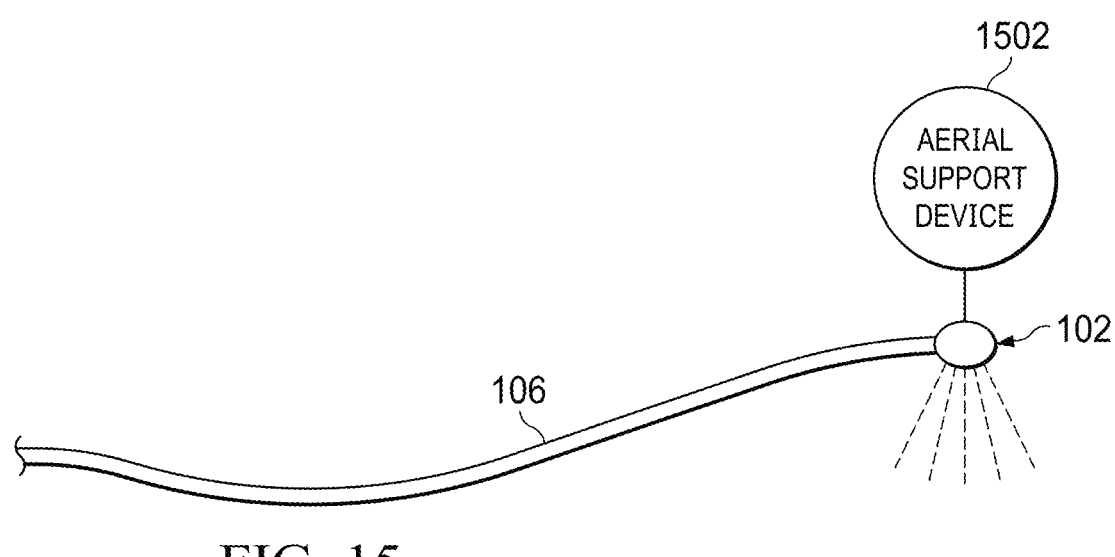
FIGS. 15-19 illustrate environments within which one or more aerial support devices may be used (FIGS. 15, 17, 18, and 19), and a hanger that may be suspended from such an aerial support device (FIG. 16)

Referring specifically to FIG. 15, the aerial support device 1502 may be a balloon coupled to the hovering distribution device 102. By providing additional lift to the hovering distribution device 102, less force is needed from the device 102 itself to generate altitude. This may enable the hovering distribution device 102 to distribute fluid in different ways (as less downward force may be needed from the device 102 itself), and/or may enable the device 102 to maintain an altitude that the fluid pressure available as an input to the device 102 is not capable of supporting.

Figure 17:
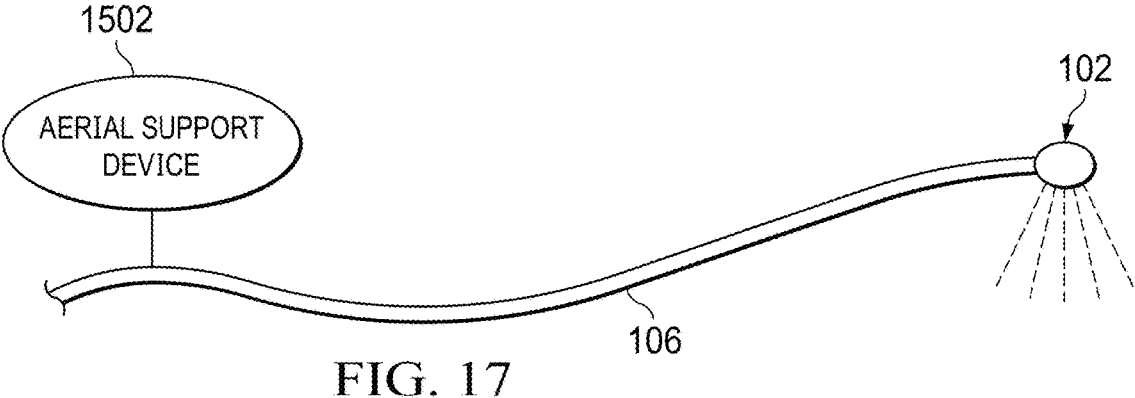

Referring specifically to FIG. 17, the aerial support device 1502 may be a balloon coupled to the hose 106. By providing additional lift to the hose 106, less force is needed from the device 102 itself to support the hose. This may enable the hovering distribution device 102 to maintain an altitude that the weight of the hose 106 would otherwise prevent the device 102 from attaining. Additionally, or alternatively, the aerial support device 1502 may enable the hovering distribution device 102 to move farther from the reel 104 (e.g., along the z-axis), as the weight of the hose 106 from the reel to the device will be lessened due to the lift provided by the aerial support device. In some embodiments, multiple aerial support devices 1502 may be used along the length of the hose 106 to further lessen the weight, particularly if the hose is relatively long.

Referring specifically to FIG. 18, multiple aerial support devices may be used, with the aerial support device 1502*a* being coupled to the hose 106 and the aerial support device 1502*b* being coupled to the hovering distribution device 102. By using multiple aerial support devices 1502 and attaching them at desired points along the hose 106 and/or the hovering distribution device 102, support can be provided as needed. In some embodiments, one or more aerial support devices 1502 may be used in addition to the support structures 1102 of FIGS. 11 and/or 1302 of FIGS. 13A-13G.

Figure 19:
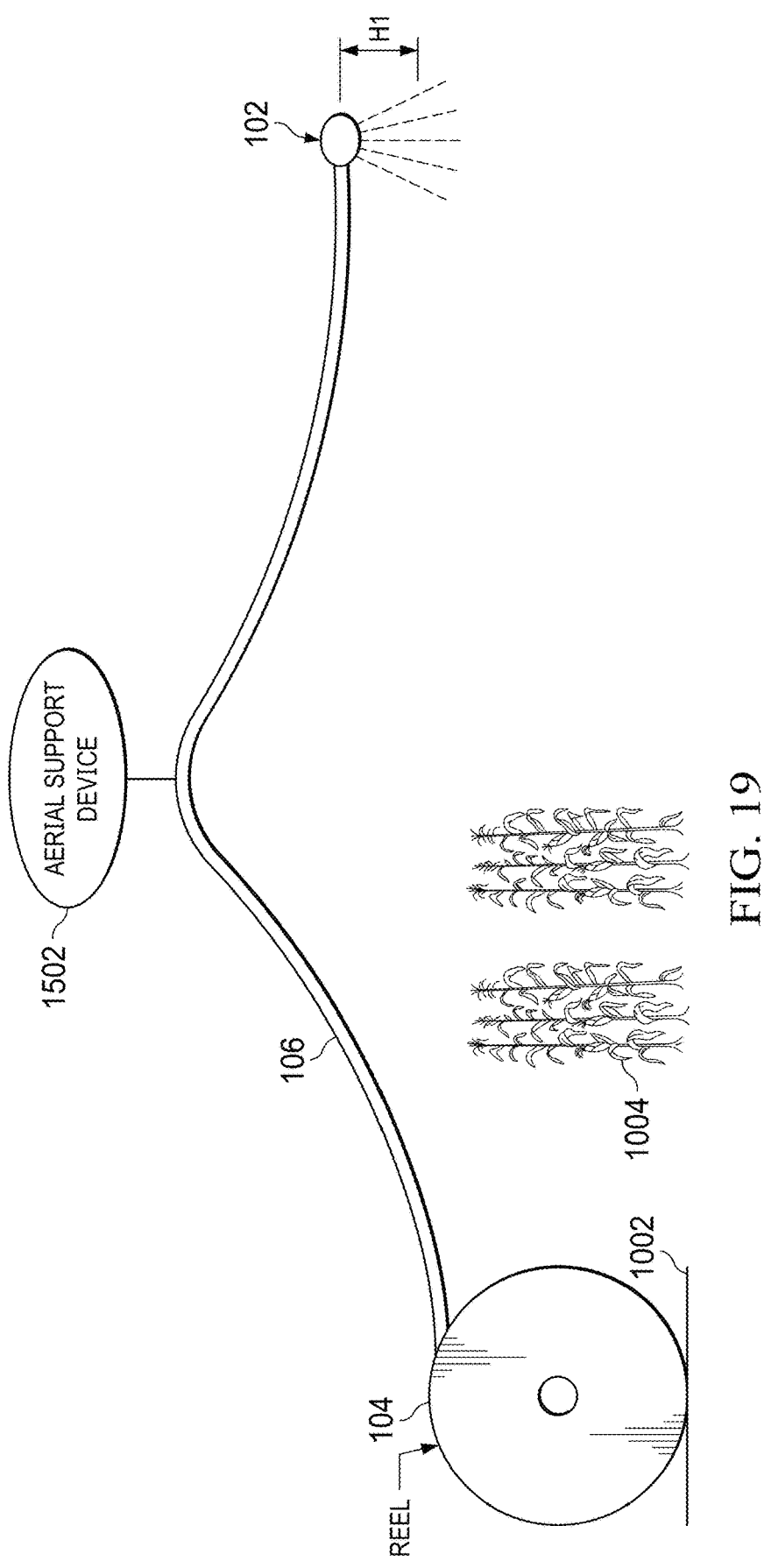

Referring specifically to FIG. 19, one or more aerial support devices 1502 may be used to prevent interference of objects 1004 with the hose 106 as described with respect to FIGS. 10A-10D. In the present embodiment, rather than lifting the reel 104, one or more aerial support devices 1502 may be used to lift the hose 106 above the objects 1004. In such a scenario, the aerial support device(s) 1502 may be positioned as needed relative to the objects 1004 and may be configured to provide the desired amount of lift. One potential advantage of lifting the hose 106 is that the hovering distribution device 102 may remain at a lower altitude, thereby lessening the distance the fluids need to travel to the ground. This may be advantageous, for example, if there is enough wind to negatively affect the fluids being distributed. In some embodiments, the aerial support device 1502 may be used in conjunction with the lift 506 (FIGS. 10C and 10D).

Referring to FIGS. 20A-20C, embodiments illustrate the use of stabilization mechanisms with the hovering distribution device 102 and/or the aerial support device 1502. In some embodiments, one or more stabilization mechanisms may be used with the hose 106 (e.g., to reduce swaying along the length of the hose). Referring specifically to FIG. 20A, the hovering distribution device 102/aerial support device 1502 may include one or more fins 2002*a*, 2002*b*, and 2002*c*. The fin(s) may be of any size and/or shape, may be located on any surface of the device 102/1502 at any location, and may be immovable or may be controllable. In embodiments with controllable fins, the fins may be used to position and/or orient the hovering distribution device 102/aerial support device 1502 by, for example, leveraging the wind to turn or maintain a particular orientation.

Referring specifically to FIG. 20B, one or more weights 2004 may be coupled to the hovering distribution device 102/aerial support device 1502 to provide stabilization. The weight(s) may be of any size, shape, and/or mass, and may be coupled to the hovering distribution device 102/aerial support device 1502 in many different ways with one or more lines, braces, slings, and/or other mechanisms. Referring specifically to FIG. 20C, the hovering distribution device 102/aerial support device 1502 is illustrated with fins (FIG. 20A) and a weight (FIG. 20B). It is understood that any combination of fins and/or weights may be used. A particular combination may be selected based on factors such as the size, weight, and profile of the hovering distribution device 102/aerial support device 1502, the amount of wind expected during operation of the device 102/1502, the weight of the hose and water to be supported by the device 102/1502, and/or other factors.

Figure 21A:
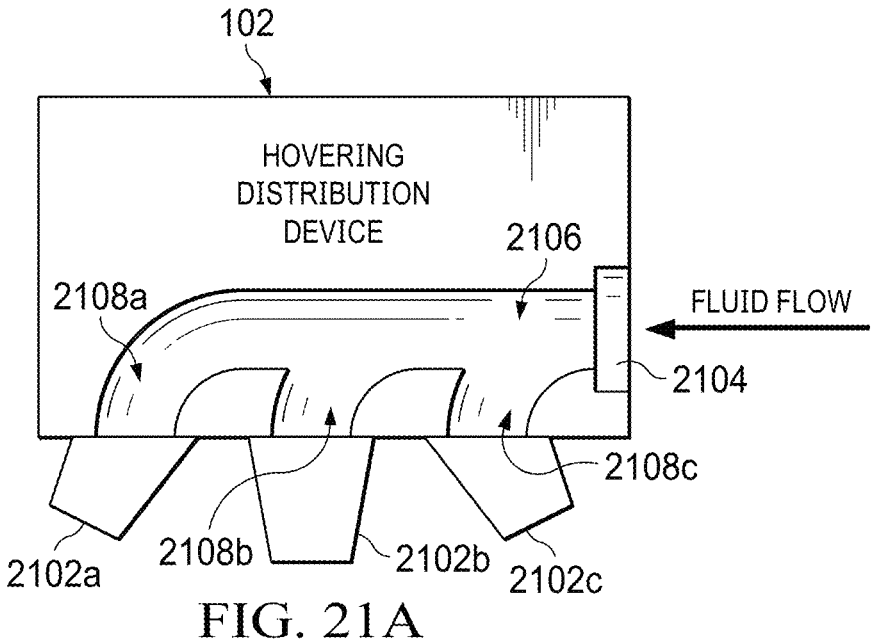
FIGS. 21A-21C illustrate embodiments of a hovering distribution device.
Figure 21B:
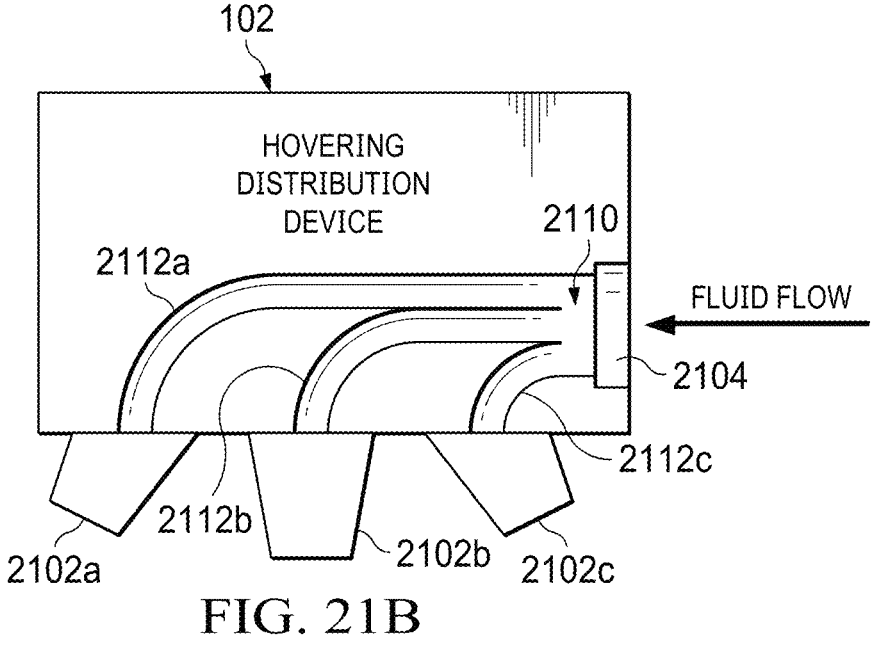
Figure 21C:
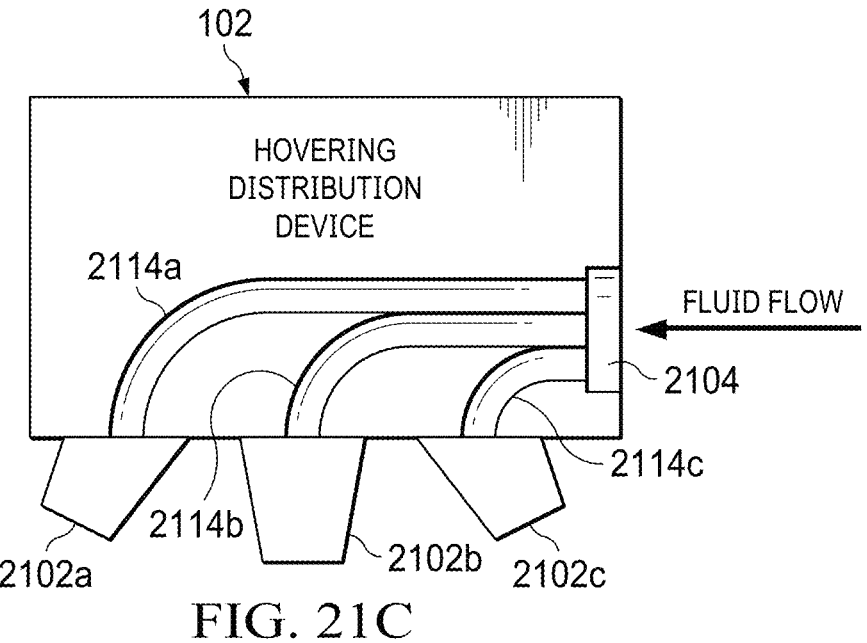

Referring to FIGS. 21A-21C, various embodiments illustrate the hovering distribution device 102 with nozzles 2102*a*, 2102*b*, and 2102*c*. Although three nozzles are illustrated in the present examples, the hovering distribution device 102 may have any number of nozzles, the nozzles may be arranged in many different configurations, the nozzles may be straight (nozzle 2102*b*) or angled (nozzles 2102*a* and 2102*c*), and the nozzles may be fixed or movable.

Although the nozzles illustrated in the present embodiments point downward for fluid distribution processes such as irrigation, it is understood that other types of tasks may use nozzles that are on the sides and/or top of the hovering distribution device 102 in addition to, or as alternatives to, the downward facing nozzles. For example, if the hovering distribution device 102 is intended for firefighting around structures and/or vehicles, side mounted nozzles may be used to distribute fluid through windows and doors with relatively high pressures, while bottom mounted nozzles may be used to distribute fluid across roofs and to soak surrounding areas to prevent the fire from spreading. Similarly, a hovering distribution device 102 intended for deicing, cleaning (e.g., solar panels or roofs), non-lethal crowd control (e.g., as used to deliver pressurized water, dye packs, and/or tear gas) and/or deterring unauthorized incursions onto property, including ships, and/or for other particular purposes may be configured to efficiently perform the needed task(s) in the appropriate environment(s).

Each nozzle 2102*a*, 2102*b*, and 2102*c* is in fluid communication with an inlet port 2104 configured to receive the hose 106 (FIG. 1). The internal structure of the hovering distribution device 102 may vary depending on the number of nozzles, the control mechanism(s) used to control the position and/or orientation of the device 102 and any movable nozzles, expected water pressure, number of inputs (e.g., one or more hoses 106), and/or other factors.

In FIG. 21A, the inlet port 2104 opens to a large internal channel 2106. Smaller channels 2108*a*, 2108*b*, and 2108*c* may branch off to the nozzles 2102*a*, 2102*b*, and 2102*c*, respectively. In FIG. 21B, the inlet port 2104 opens to an internal chamber 2110. Smaller channels 2112*a*, 2112*b*, and 2112*c* may lead from the chamber 2110 to the nozzles 2102*a*, 2102*b*, and 2102*c*, respectively. In FIG. 21C, the inlet port 2104 opens directly to multiple channels 2114*a*, 2114*b*, and 2114*c* that lead to the nozzles 2102*a*, 2102*b*, and 2102*c*, respectively.

The internal structure of the hovering distribution device 102 may include valves and/or other control mechanisms. Such control mechanisms may be manipulated using water pressure, electric signals, and/or other types of control signals. The control mechanisms may be used to adjust fluid flow to one or more nozzles, thereby allowing control over how fluid is distributed. By varying the fluid pressure, the channels used, and/or the position of movable nozzles, the position and/or orientation of the hovering distribution device 102 may be controlled. For example, the angle of one or more nozzles may be modulated to provide additional stability in high winds, with a narrower field of distribution potentially offering advantages for control purposes compared to a wider field of distribution.

Figure 22:
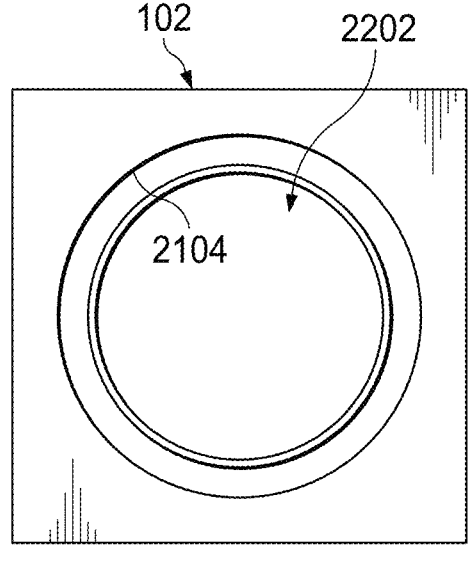
FIGS. 22 and 23 illustrate embodiments of fluid inlet ports that may be used with the hovering distribution devices of FIGS. 21A-21C.
Figures 23, 24A:
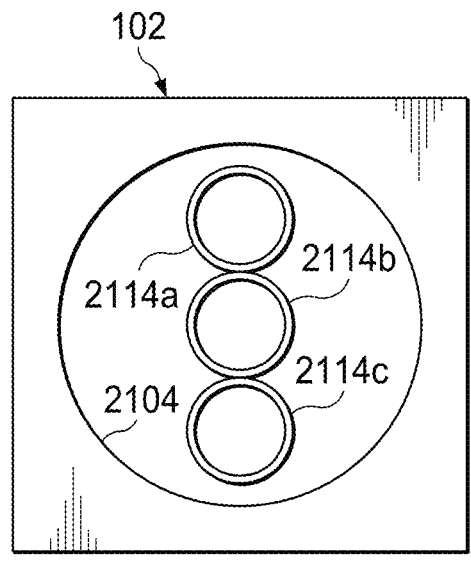
FIGS. 24A-24K illustrate embodiments of a hovering distribution device showing force vectors that may be used for fluid distribution and/or for controlling position (including altitude) and/or orientation.

Referring to FIGS. 22 and 23, embodiments of the inlet port 2104 are illustrated. In FIG. 22, the inlet port 2104 provides a single channel 2202. This may be similar to the internal structure of FIGS. 21A and 21B, where the inlet port 2104 leads to the channel 2108 (FIG. 21A) and the chamber 2110 (FIG. 21B). In FIG. 23, the inlet port 2104 interfaces with multiple channels, such as the channels 2114a-2114c of FIG. 21C.

Referring to FIG. 24A, one embodiment of the hovering distribution device 102 is illustrated with three force vectors FA, FB, and FC, although more or fewer force vectors may be provided for a particular configuration of the device 102. Each force vector may be manipulated by changing the fluid pressure provided to the corresponding nozzle and/or to multiple openings in a single nozzle. In some embodiments, internal adjustment mechanisms may be used to redirect the fluid flow within a nozzle in order to manipulate the force vector from that nozzle and/or from one or more openings of a nozzle. It is understood that manipulation of one or more of the force vectors FA, FB, and FC may be used to control the position and/or orientation of the hovering distribution device 102.

In some embodiments, the force vectors FA and FC may be the primary force vectors for control and altitude, and the force vector FB may be manipulated for purposes of fluid distribution. For example, fluid providing the force vector FB may be distributed across a larger area, thereby weakening the ability of the force vector FB to provide control over position and/or orientation of the hovering distribution device 102. In contrast, the force vectors FA and FC may be tighter, higher pressure streams of fluid, thereby providing more control over the hovering distribution device 102 when the force vectors are redirected. For example, by pointing the force vectors FA and FC outward (similar to that shown in FIG. 24A), the hovering distribution device 102 may be provided with lift and stability. It is understood that different volumes and/or pressures of fluid may be provided to different nozzles if desired.

During operation, one of more of the nozzles of the hovering distribution device 102 may become partially or completely clogged, damaged, and/or otherwise unable to fully function or even function at all. This may result in variations in the nozzle's fluid distribution pattern, which in turn may affect the operation of the hovering distribution device 102 from a control and/or fluid distribution perspective. Accordingly, other nozzles of the hovering distribution device 102 may be adjusted to compensate for the altered functionality of the impacted nozzle. For example, other nozzles may be provided with a higher fluid flow, higher fluid pressure, be pointed in another direction, and/or have their distribution patterns modified in order to maintain the overall performance of the hovering distribution device 102 within desired operational parameters. To prevent and/or minimize such clogging, filters may be used.

Figure 25:
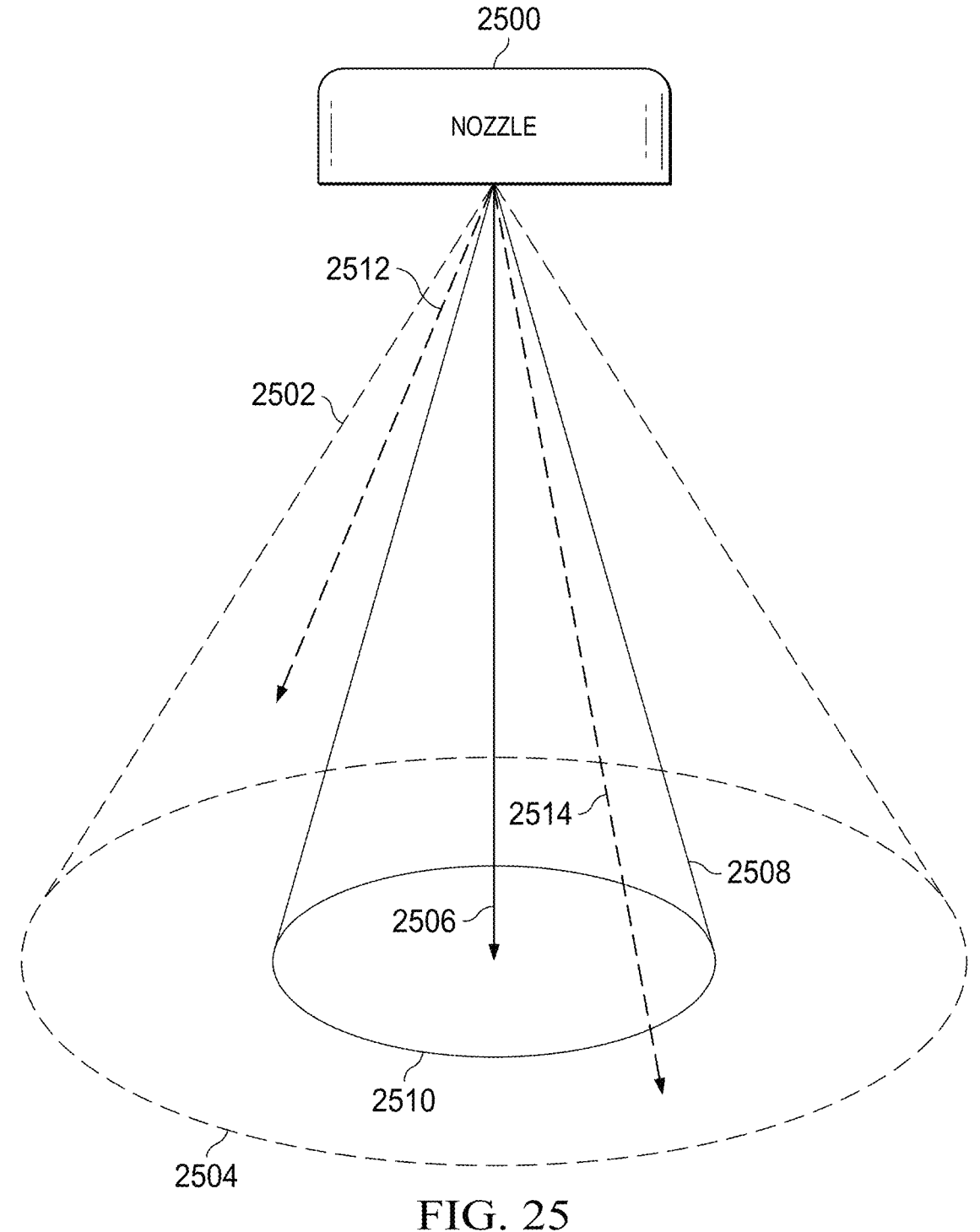

With additional reference to FIG. 25, a nozzle 2500 is illustrated with a cone 2502 having a base 2504 that displays an area of maximum vector direction. In other words, a force vector of the nozzle 2500 may be moved anywhere within the cone 2502 up to any edge of the cone 2502 or base 2504. The current vector is illustrated by a line 2506, resulting in a cone 2508 with a base 2510, but may be oriented in many different ways as illustrated by possible vector lines 2512 and 2514. By altering the nozzle's fluid stream (e.g., by narrowing or widening the nozzle's output, by altering an angle of the nozzle's stream relative to the hovering distribution device, and/or by increasing or reducing the force of fluid to the nozzle) the altitude, position, and/or orientation of the hovering distribution device 102 to which the nozzle 2500 is coupled may be modified, as may the area of distribution and the force of the fluid hitting the surface. Such control may be used to control an area of distribution and/or to control the movement and/or orientation of the hovering distribution device 102. Accordingly, the behavior of a particular nozzle may be changed by controlling the operational parameters of a nozzle (e.g., water pressure and/or nozzle orientation), or by replacing the nozzle with another nozzle that provides the desired operational parameters.

Figures 26A, 26B:
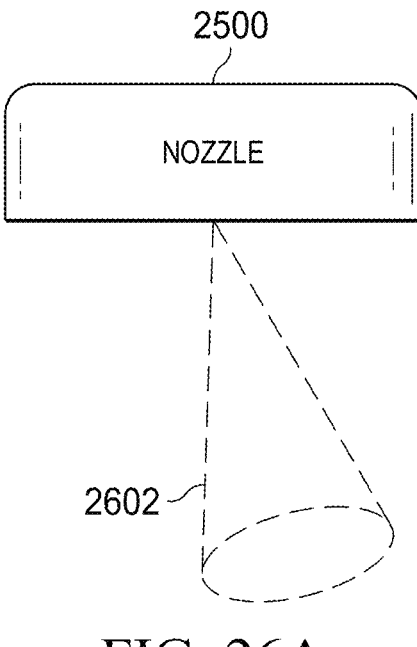

With additional reference to FIGS. 26A and 26B, fluid distribution cones 2602 and 2604, respectively, are illustrated. As shown, the fluid distribution cones 2602 and 2604 have different angles and areas of distribution relative to the nozzle 2500. It is understood that, although cone shaped distribution patterns are illustrated in FIGS. 25-26B, a distribution pattern may have many different shapes and a single nozzle may be configurable to vary its distribution of fluid in one and/or multiple streams. Furthermore, as external factors (e.g., wind) may affect the distribution pattern, a nozzle's distribution stream(s) may be adjusted to account for such external factors.

Figure 24B:
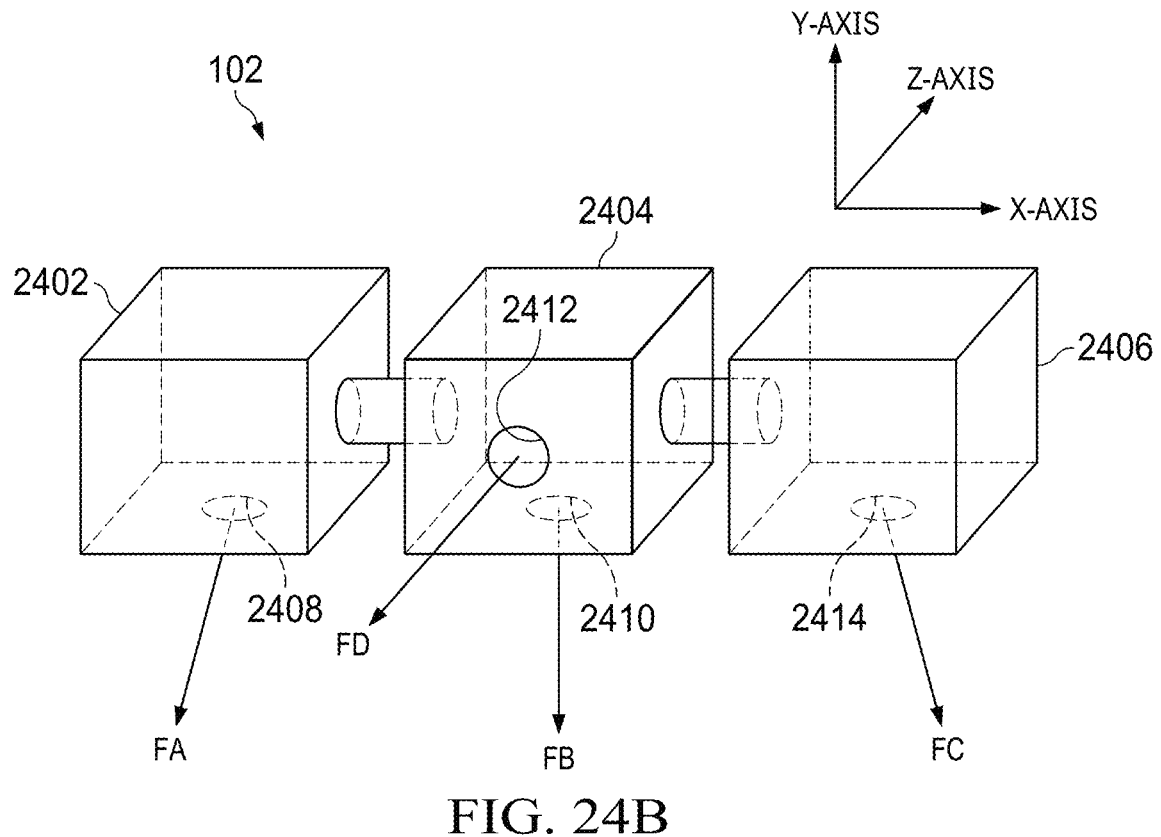
Figure 24C:
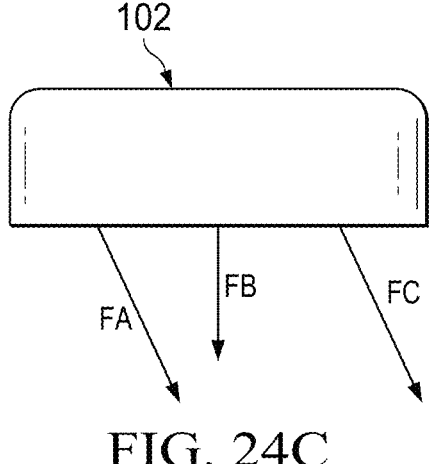
Figure 24D:
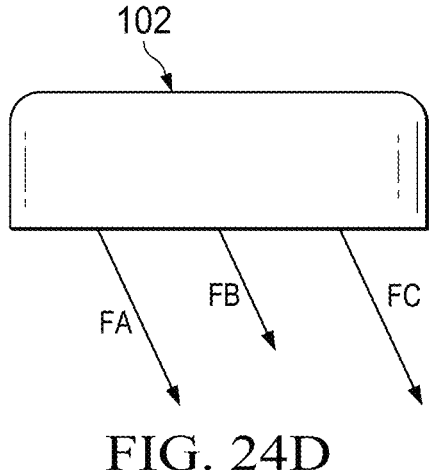

Referring to FIG. 24B, one embodiment of the hovering distribution device 102 provides a more detailed example of the hovering distribution device of FIG. 25A. In the present example, the hovering distribution device 102 is illustrated with the three force vectors FA, FB, and FC, as well as a fourth force vector FD, although more or fewer force vectors may be provided for a particular configuration of the device 102. In the present example, the hovering distribution device 102 includes three sections 2402, 2404, and 2406. The section 2402 includes a nozzle exit 2408 for the vector FA, the section 2404 includes a nozzle exit 2410 for the vector FB and a fluid inlet 2412 (e.g., for the hose 106) for the vector FD, and the section 2406 includes a nozzle exit 2414 for the vector FC. It is understood that more or fewer sections may be present and/or positioned differently relative to one another, more or fewer nozzle exits/fluid inlets may be present and/or positioned differently, the fluid inlet may be positioned differently, and additional fluid inlets may be present.

The fourth vector FD represents the directional force (e.g., the pull) exerted by the hose 106 on the hovering distribution device 102. As described elsewhere herein, the force vector FD may change due to various external factors, including the weight of the hose 106, the weight of the fluid present in the hose, the amount of sag present in the hose (e.g., how much of the hose's weight must be lifted by the hovering distribution device 102), and/or other factors. Accordingly, the force vectors FA, FB, and/or FC may be controlled to account for the vector FD, which may change over time and which may be controllable, if at all, based largely on external factors. It is understood that, in some embodiments, the vector FD may be somewhat controllable by the hovering distribution device 102 if the device is configured to enable such control, such as by controlling an angle at which the fluid inlet 2412 is coupled to the hose 106.

As described with respect to FIG. 24A, each force vector may be manipulated by changing the fluid pressure provided to the corresponding nozzle and/or to multiple openings in a single nozzle. For example, the force vectors FA and FC may be used primarily for thrust, with FA directed along the negative Y-axis and negative X-axis, and FC directed along the negative Y-axis and X-axis. By pointing the primary thrust vectors down and out on their respective sides, they may provide upward thrust and stability in conjunction with the FD vector resulting from the hose 106. It is understood that FA and FC may not be exactly along the stated axes, but may also be directed somewhat along the z-axis. For example, FA and FC may also have a z-axis component to offset the pull of the vector FD. The vector FB may be primarily used for fluid distribution. In some embodiments, FB may provide minimal thrust that is ignored for control purposes, while in other embodiments it may provide enough thrust to be taken into account and may even provide more thrust than FA and/or FC.

Figure 24E:
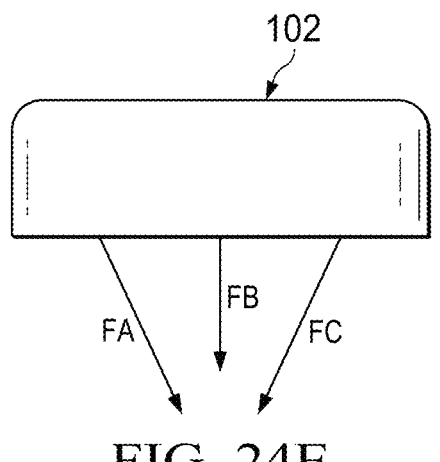
Figure 24F:
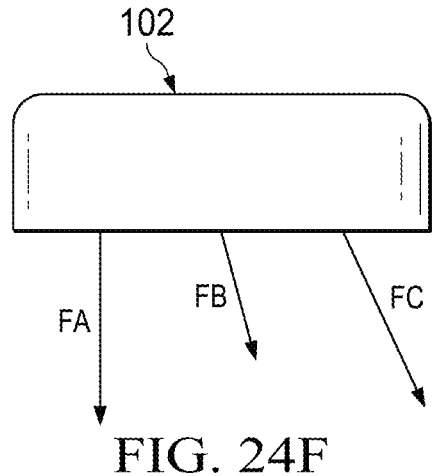
Figure 24G:
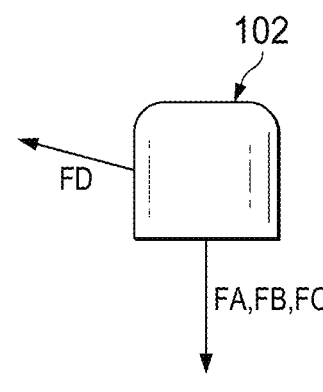
Figure 24H:
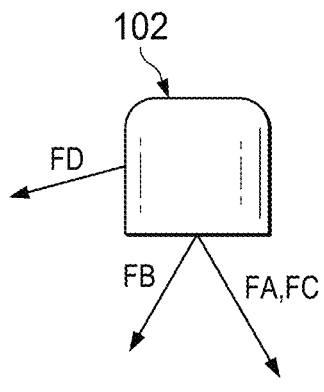

In some embodiments, two or more of the force vectors FA, FB, and/or FC may be intentionally directed into or towards one another beneath the hovering distribution device 102 (e.g., as in FIG. 24E). In such embodiments, the fluid forming the vectors may be directed to collide at some distance below the hovering distribution device 102. For example, the force vectors FA and FC may be directed towards each other, rather than outward. This may reduce the fluid's velocity, thereby dispersing the fluid's energy prior to impact with the ground and/or other surface(s) and centralizing the fluid's pattern, while still providing lift and stability for the hovering distribution device 102. Such collisions may be executed far enough from the hovering distribution device 102 to minimize or negate any negative effect on thrust, as there may be little or no back pressure in unconstrained air if the distance is sufficiently large.

Referring to FIGS. 24C-24K, embodiments of the hovering distribution device 102 are illustrated with force vectors FA, FB, and FC, and some with force vector FD. FIGS. 24C-24F may represent a front or back view of the hovering distribution device 102, and FIGS. 24G-24K may represent a side view. It is understood that the vectors FA-FD in FIGS. 24A-24K may not be scaled to represent relative force, but may simply represent examples of different vector directions.

Figure 24I:
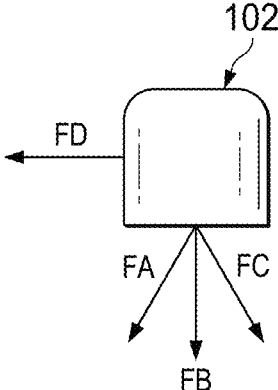
Figure 24J:
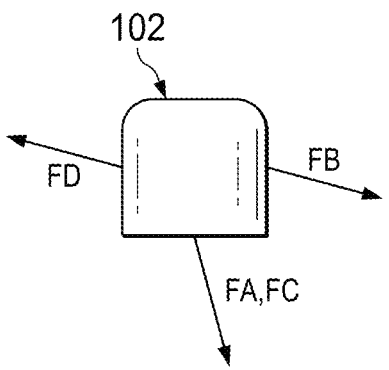
Figure 24K:
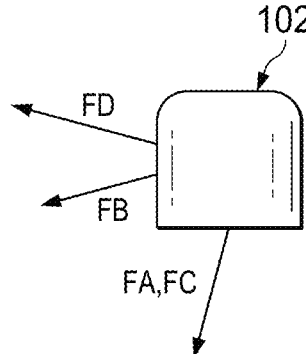

For purposes of orientation, FB may be viewed as extending from the bottom of, or from a lower or bottom surface of, the hovering distribution device 102 in FIG. 24I, and FB may be viewed as extending from the side of, or from a side surface of, the hovering distribution device 102 in FIG. 29J. While not shown, some embodiments may have one or more force vectors produced from the top of, or the top surface of, the hovering distribution device 102 from nozzles and/or other fluid outlets positioned on those sides/surfaces. In still other embodiments, the hose 106 may be coupled to the bottom or top of the hovering distribution device 102, resulting in a corresponding force vector from that side or surface.

In some embodiments, the hovering distribution device 102 may be modular. Such modularity may enable a base configuration to be expanded with different components, including additional sections, nozzles, control mechanisms (e.g., valves, sensors, gyroscopes, and other hardware), and/or other features. If the hovering distribution device 102 includes software, such software may be updated, additional features may be unlocked (e.g., with a subscription or other payment), or replaced entirely with new software. Accordingly, many different configurations of the hovering distribution device 102 may be implemented and such configurations may include many different hardware and/or software components.

Referring to FIGS. 27A-34H, embodiments of nozzles and control mechanisms are illustrated. The hovering distribution device 102 may be steered in various ways, including the use of varying pressures in one or more nozzles. For example, a primary nozzle may be used as a propulsion jet for lift (e.g., a thruster), and two or more smaller nozzles may be used for steering. By varying the amount of fluid pressure supplied to each of the steering nozzles and/or by altering the orientation of the nozzles if they are controllable, the hovering distribution device 102 may be moved in a controllable manner. The pressure supplied to the propulsion nozzle may be varied to provide more or less lift in order to control altitude. In other embodiments, one or more secondary nozzles may feed into a main nozzle. In still other embodiments, a single nozzle or dual nozzles may be used.

Various fluid flow control mechanisms may be used to control the spray pattern, pressure, and/or orientation provided to a nozzle, including needle valves, injector valves, and/or other fluid flow control mechanisms. Such mechanisms may be controlled using changes in water pressure (e.g., modulation that may be used to actuate an indexing mechanism (e.g., using mechanical springs) or a series of valves that open based on pressure), electric and electronic signals, hydraulics, sonic signals, and/or other methods. Such signals may direct a nozzle to tilt, open or close holes, move overlapping discs with holes, and/or perform other functions to achieve a desired fluid flow and/or spray pattern.

The signals may be transmitted to the hovering distribution device 102 using water provided by the hose 106, using wires coupled to the hose or otherwise provided to the hovering distribution device 102 (e.g., wires run from an aerial support device 1502), using the layer(s) 1202 (FIGS. 12A and 12B) to carry the wires and/or to conduct signals directly via the layer material, using mechanical cables (e.g., similar or identical to control cables used with remote control aircraft), and/or wireless communications. For example, a nozzle may be designed with an indexing mechanism that enables the nozzle to move through a series of indexed pressure states and/or positions based on a pressure-based or other signal. Such indexing mechanisms may be purely mechanical and/or may include non-mechanical components.

Incoming fluid may be used a cushion/bearing within a nozzle and/or any ball swivel/pivot mechanism that may be present within the hovering distribution device 102. For example, fluid may be routed to "float' or otherwise suspend a ball or needle pivot by water pressure in a way that reduces the friction needed for actuation. Such implementations may use grooves that direct fluid flow, various shapes (e.g., an eyeball) with a small reservoir, and/or other mechanisms that direct fluid flow to provide such functionality.

In some embodiments, a nozzle may include a digital control system in the nozzle's head, and fluid flow may be used to create the electricity needed to operate the digital control system. In other embodiments, an accelerometer may be used to read orientation angle information of a nozzle head. In still other embodiments, control mechanisms such as servos may be used to control the pressure and/or orientation of a nozzle.

Figure 27B:
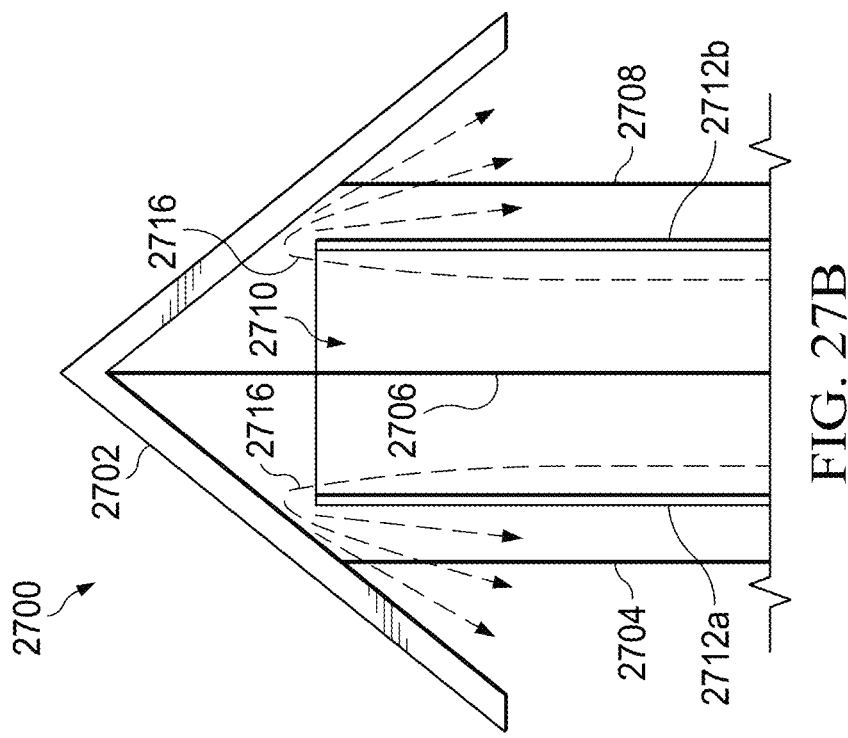
FIGS. 27A-27C illustrate one embodiment of a portion of a nozzle.
Figure 27A:
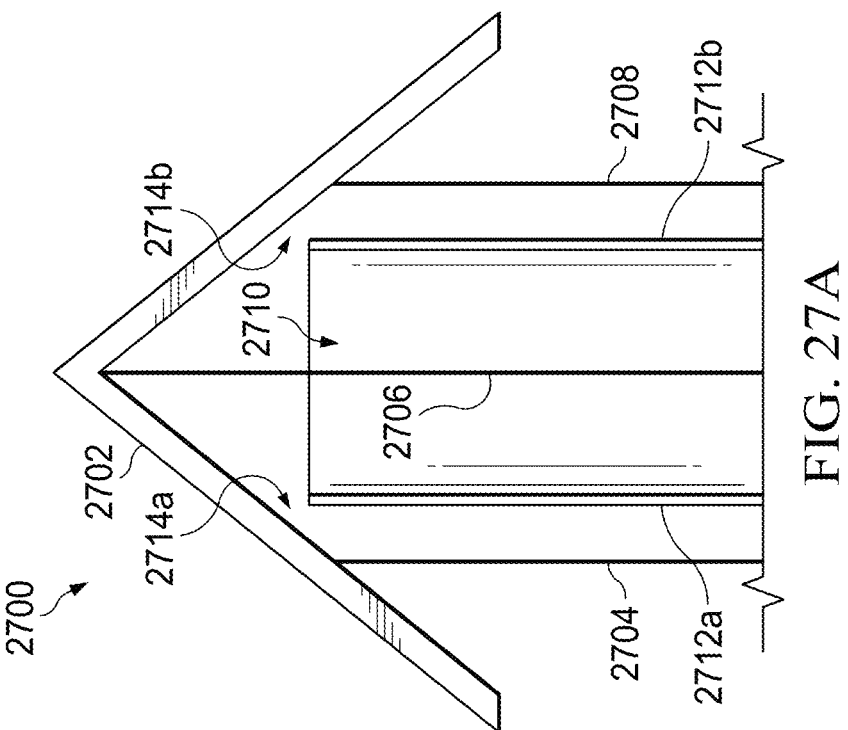
Figure 27C:
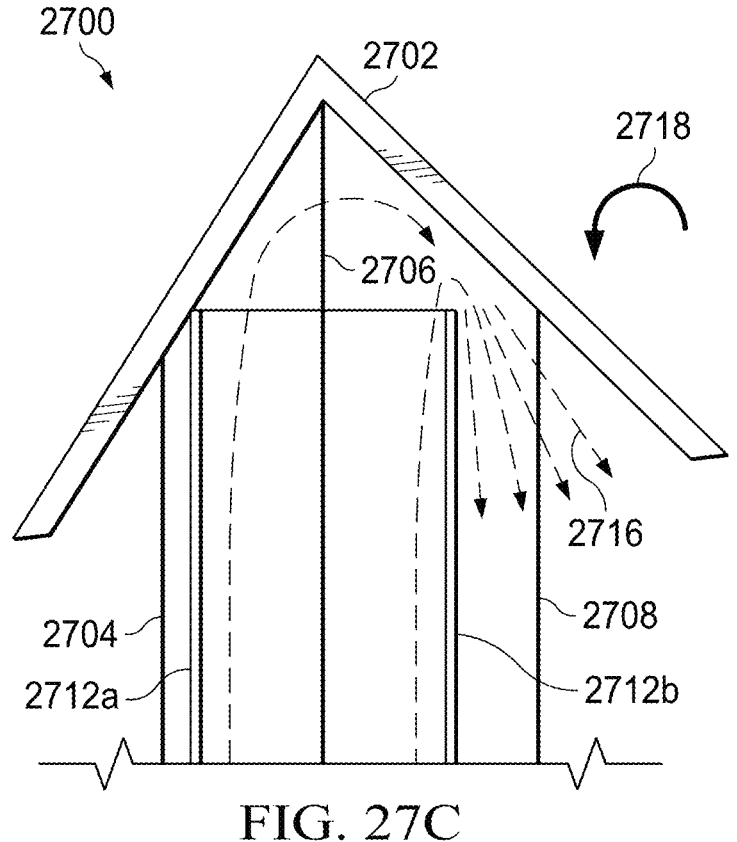

Referring specifically to FIGS. 27A-27C, a nozzle portion 2700 is illustrated. The nozzle portion 2700 includes a body 2702 having a v-shaped or wedge shaped interior, although other shapes may be used to accomplish the desired purpose. One or more cables 2704, 2706, and 2708 may be coupled to the inside surface of the body 2702. The cable 2706 may be positioned inside a fluid channel 2710 formed by one or more walls 2712a and 2712b. The wall 2712a and body 2702 may be spaced from one another to form an opening 2714a, and the wall 2712b and body 2702 may be spaced from one another to form an opening 2714b.

The fluid channel 2710 carries incoming fluid 2716 from the hose 106 towards the interior of the body 2702. The fluid 2716 then exits via the one or more openings 2714a and 2714b. It is understood that there may be any number of openings, and such openings may be of any shape and/or size. By manipulating the length of the cables 2704, 2706, and/or 2708, the body 2702 may be turned to direct the incoming fluid in a different direction. This enables the nozzle portion 2700 to be used to alter the position and/or orientation of the hovering distribution device 102 based on which cable(s) are pulled, as this in turn redirects the force vector(s) produced by the exiting fluid 2716. In some embodiments, the openings may be arranged to provide force vectors in three dimensions for additional control (e.g., multiple openings around the channel 2710).

In FIGS. 27A and 27B, the cables 2704, 2706, and 2708 are neutral and the body 2702 is in a neutral orientation. In this orientation, fluid 2716 is able to flow in through the channel 2710 and out of the openings 2714*a* and 2714*c*. In FIG. 27C, the cable 2704 has been shortened (e.g., pulled), which causes rotation of the body 2702 in the direction of the cable 2704 as indicated by arrow 2718. This serves to funnel the fluid being discharged from the body 2702 in a different direction than that of FIG. 27A. More specifically, the cable 2704 has been shortened enough to pull the body 102 against the wall 2712*a*, thereby closing the opening 2714*a*. This forces the fluid 2716 to exit only via the opening 2714*b*. It is understood that the opening 2714*a* need not be closed entirely, but that the cable 2704 may be adjusted to different lengths in order to manipulate the size of the opening 2714*a*. Pulling only the cable 2708 would cause rotation of the body 2702 in the opposite direction. Pulling all three cables simultaneously may reduce the size of the openings 2714*a* and 2714*b* but leave them of equal size, thereby altering the pressure of the exiting fluid 2716. It is understood that more or fewer cables may be used to provide different control levels for the body 2702.

Figure 28A:
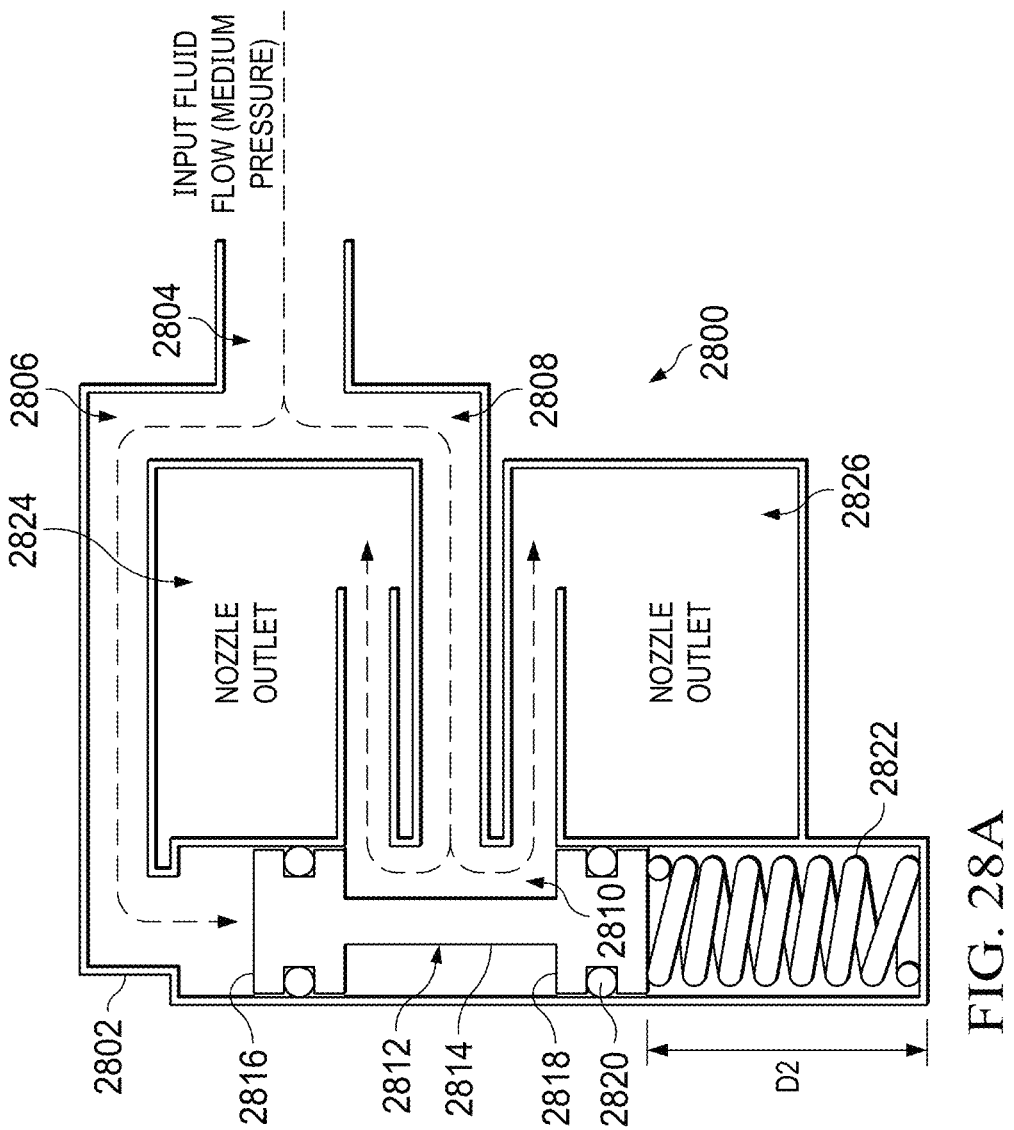
FIGS. 28A-28C illustrate another embodiment of a portion of a nozzle.
Figure 28B:
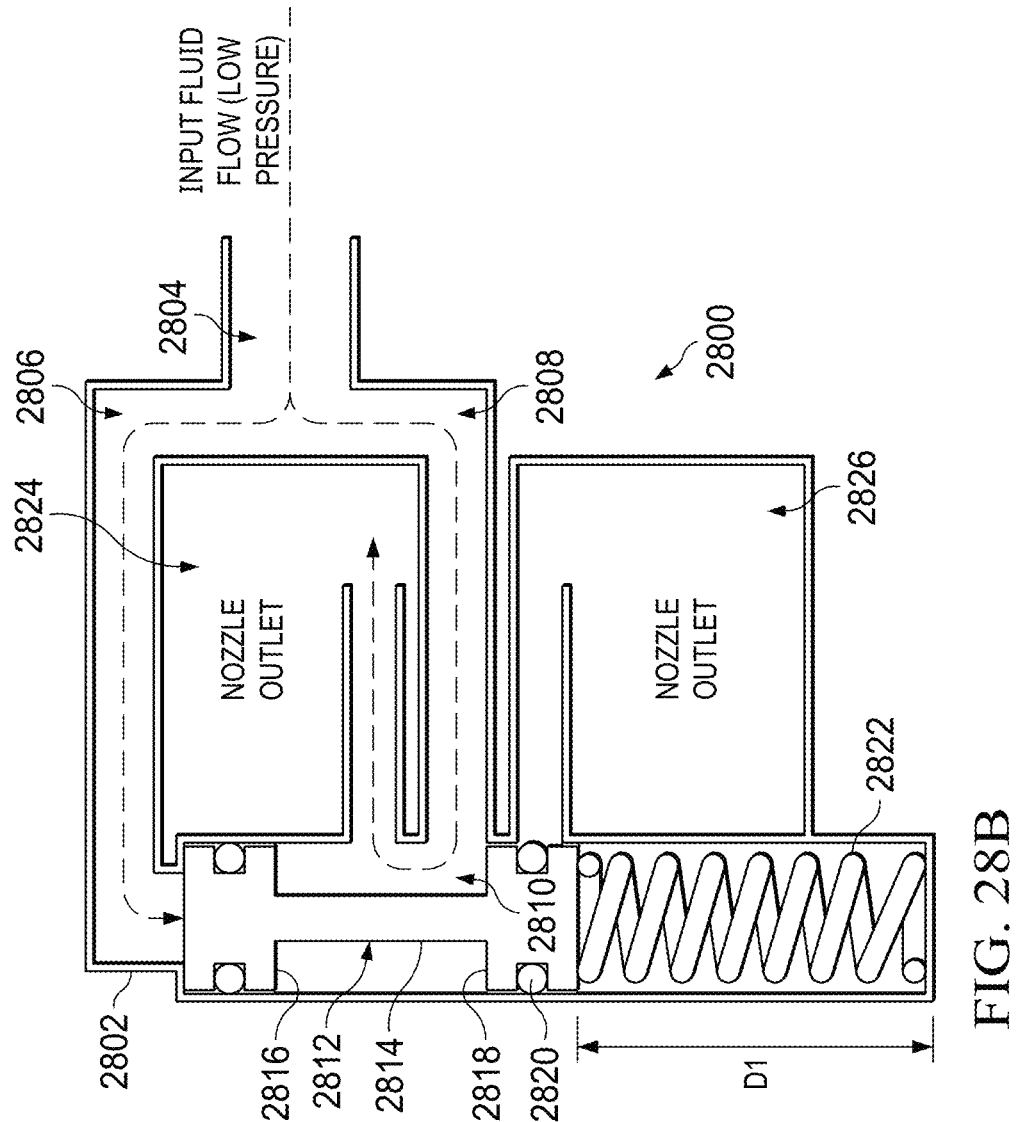
Figure 28C:
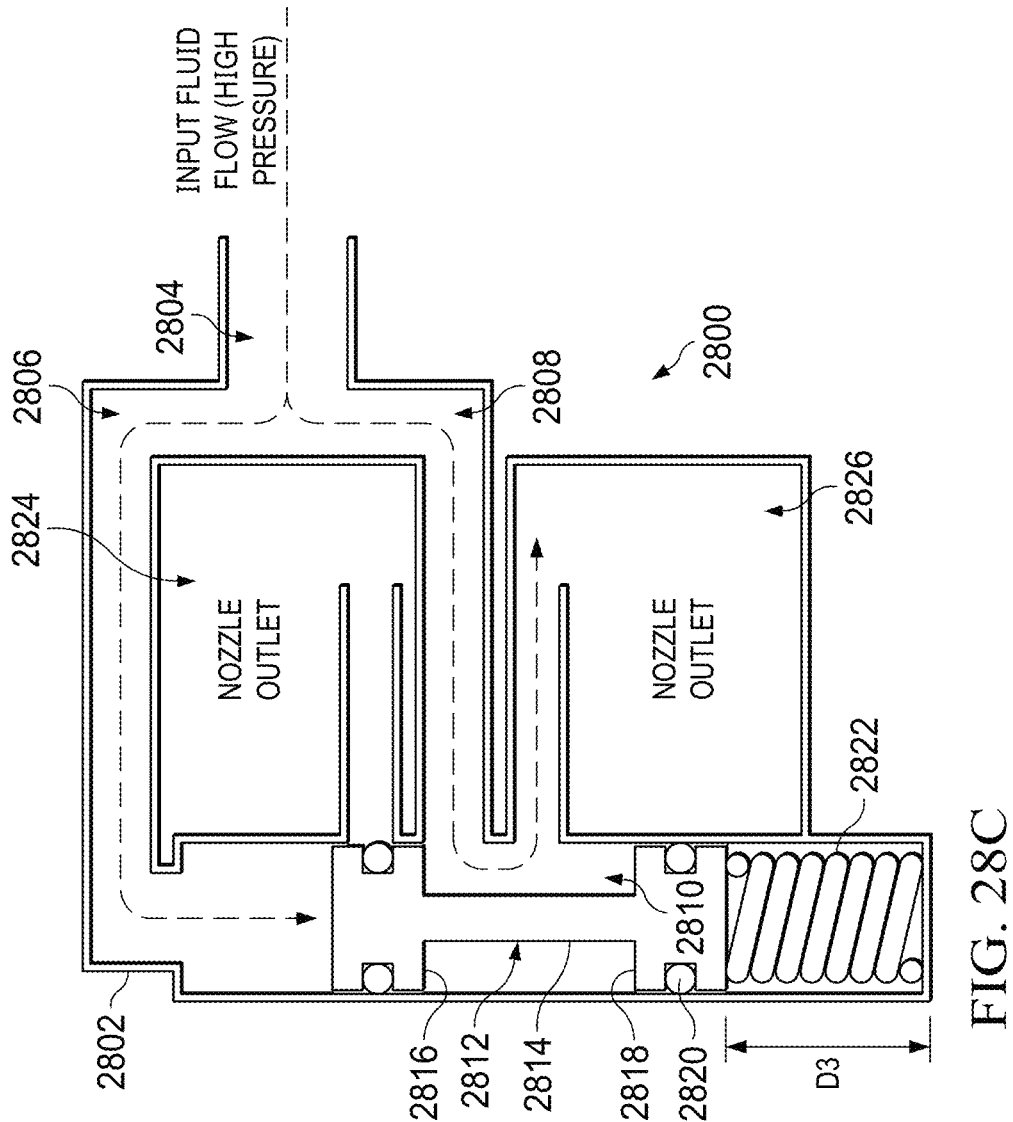

Referring specifically to FIGS. 28A-28C, a nozzle portion 2800 is illustrated. The nozzle portion 2800 may be configured to respond to pressure changes of incoming fluid in order to modify which nozzle outlets are used to discharge the fluid. This enables the nozzle portion 2800 to be used to alter the position and/or orientation of the hovering distribution device 102 based on pressure changes from, for example, the hose 106 or a regulator coupled to, or positioned inside, the device 102.

The nozzle portion 2800 includes a body 2802 having multiple channels disposed therein, with a fluid input channel 2804 dividing into channels 2806 and 2808. The channels 2806 and 2808 both intersect a cavity 2810. An object (e.g., a piston) 2812 may be positioned in the cavity 2810. In the present example, the piston 2812 includes a shaft 2814 that connects an upper head 2816 and a lower head 2818. Bearings and/or other mechanisms 2820 may be used to facilitate movement of the piston 2812 within the cavity. The cavity 2810 includes a spring 2822 that may exert pressure on the head 2818 and through the shaft 2814, thereby potentially moving the piston 2812 within the cavity.

Depending on the position of the piston 2812, fluid from the channel 2806 may enter a nozzle outlet 2824, and fluid from the channel 2808 may enter one or both of the nozzle outlet 2824 and a nozzle outlet 2826. The spring 2822 responds to pressure from the channel 2806. As the pressure increases, the spring 2822 is compressed as the force applied by the pressure from the channel 2806 is passed through the piston 2812 to the spring. As the pressure increases, the piston 2812 is forced towards the spring 2822. This means that access to the nozzle outlets 2824 and 2826 may be manipulated by altering the input pressure of the fluid entering the channel 2806.

In FIG. 28A, the input pressure is medium. With this input pressure, the spring 2822 is compressed to the point where the piston 2812 is in a neutral position. This position blocks the channel 2806, but enables fluid from the channel 2808 to enter the cavity 2810 and then enter both of the nozzle outlets 2824 and 2826. Accordingly, both of the nozzle outlets 2824 and 2826 may discharge fluid evenly. This may be used, for example, to maintain a neutral position and/or orientation of the hovering distribution device 102.

In FIG. 28B, the input pressure is low. With this input pressure, the spring 2822 has expanded relative to FIG. 28A, and the piston 2812 has been pushed to the opposite end of the cavity 2810 from the spring. This position blocks the channel 2806 and the nozzle outlet 2826, but enables fluid from the channel 2808 to enter the cavity 2810 and then enter the nozzle outlet 2824. Accordingly, only the nozzle outlet 2824 may discharge fluid. This may be used, for example, to bias the position and/or orientation of the hovering distribution device 102 in one direction.

In other embodiments, the channel 2806 may be a separate channel from the channel 2804. For example, the channel 2806 may be isolated from the channel 2804 and may represent a pneumatic or other control line that is used to control the position of the piston 2812. Accordingly, it is understood that control of the piston's position may be accomplished in many different ways, and may be integrated into the fluid flow path or may be separate. It is further understood that various electric, magnetic, and/or other control mechanisms may be used.

In FIG. 28C, the input pressure is high. With this input pressure, the spring 2822 has compressed relative to FIG. 28A, and the piston 2812 has been pushed to the same end of the cavity 2810 as the spring. This position blocks the channel 2806 and the nozzle outlet 2824, but enables fluid from the channel 2808 to enter the cavity 2810 and then enter the nozzle outlet 2826. Accordingly, only the nozzle outlet 2826 may discharge fluid. This may be used, for example, to bias the position and/or orientation of the hovering distribution device 102 in a different direction from that of FIG. 28B.

Referring specifically to FIGS. 29A-29D, a nozzle portion 2900 is illustrated. The nozzle portion 2900 may be configured with a water bearing or another mechanism to respond to the redirection of incoming fluid in order to modify which exit channel(s) may be used to discharge the fluid. This enables the nozzle portion 2900 to be used to alter the position and/or orientation of the hovering distribution device 102 based on the selected exit channel(s).

The nozzle portion 2900 includes a body 2902 with two elongated members 2904 and 2906. The members 2904 and 2906 are spaced from one another to form a fluid input channel 2908 for incoming fluid. One end of each member 2904 and 2906 is disposed within a cavity to form exit channels 2910 and 2912, respectively. An actuator 2914 (e.g., a solenoid) is positioned in the body 2902 and is coupled to a member 2916 (e.g., an armature such as an arm, rod, or other member that is able to be extended and retracted). The end of the member 2916 opposite the actuator 2914 is shaped to enable the member 2916 to allow fluid flow through both of the exit channels 2910 and 2912, or to block the input channel 2908 or one of the exit channels.

Figure 29A:
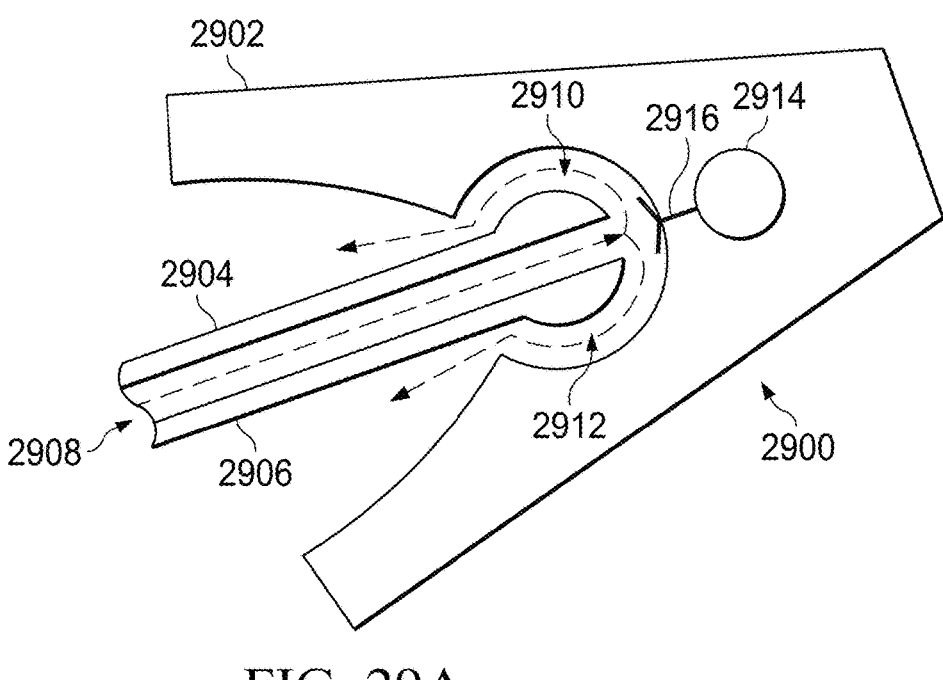
FIGS. 29A-29D illustrate yet another embodiment of a portion of a nozzle.

In FIG. 29A, the member 2916 is retracted and fluid is able to flow through the input channel 2908 and out both of the exit channels 2910 and 2912. Accordingly, both of the exit channels 2910 and 2912 may discharge fluid evenly. This places the body 2902 in a neutral position. This may be used, for example, to maintain a neutral position and/or orientation of the hovering distribution device 102.

Figure 29B:
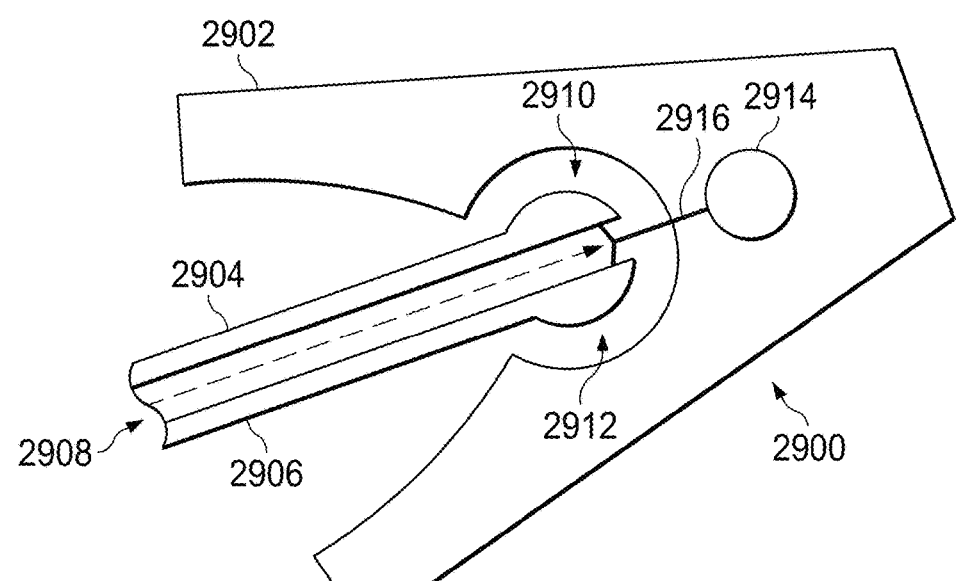

In FIG. 29B, the member 2916 is extended fully into the input channel 2908, which blocks both of the exit channels 2910 and 2912. Accordingly, neither of the exit channels 2910 and 2912 may discharge fluid. This places the body 2902 in a neutral position, but removes any force vector that may be produced by the nozzle portion 2900. This may be used, for example, to enable other nozzle portions and/or nozzles to influence the position and/or orientation of the hovering distribution device 102 without input from the nozzle portion 2900.

Figure 29C:
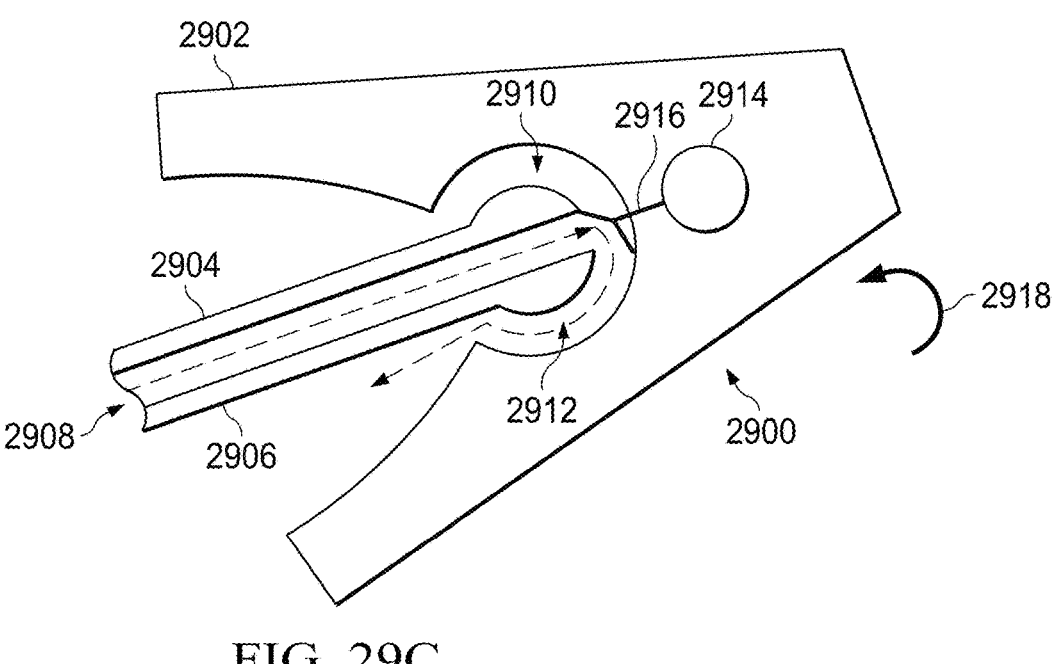

In FIG. 29C, the member 2916 is extended partially and is blocking the exit channel 2910, but allows fluid to enter the exit channel 2912. Accordingly, only the exit channel 2912 may discharge fluid. This may cause rotation of the body 2902 as indicated by arrow 2918. This may be used, for example, to bias the position and/or orientation of the hovering distribution device 102.

Figure 29D:
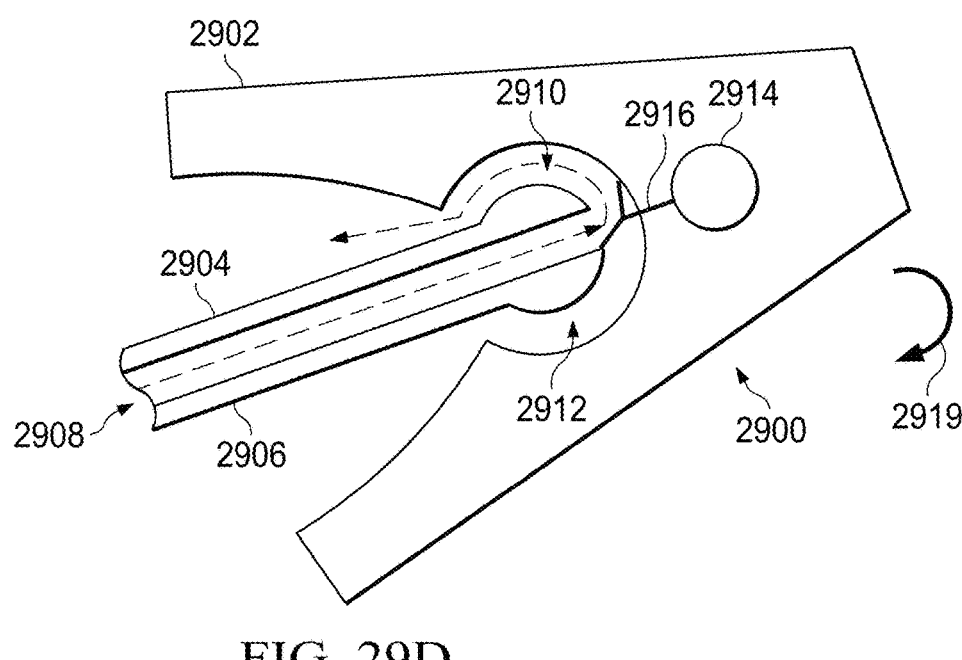

In FIG. 29D, the member 2916 is extended partially and is blocking the exit channel 2912, but allows fluid to enter the exit channel 2910. Accordingly, only the exit channel 2910 may discharge fluid. This may cause rotation of the body 2902 as indicated by arrow 2919. This may be used, for example, to bias the position and/or orientation of the hovering distribution device 102 in the opposite direction from that of FIG. 29C.

Figure 30A:
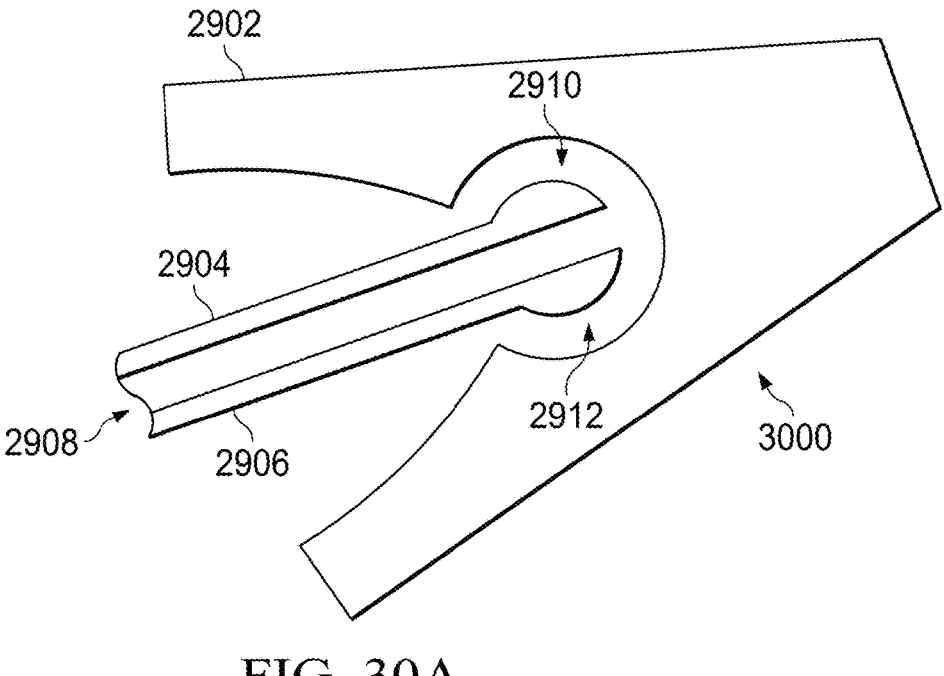
FIGS. 30A-30C illustrate still another embodiment of a portion of a nozzle.
Figure 30B:
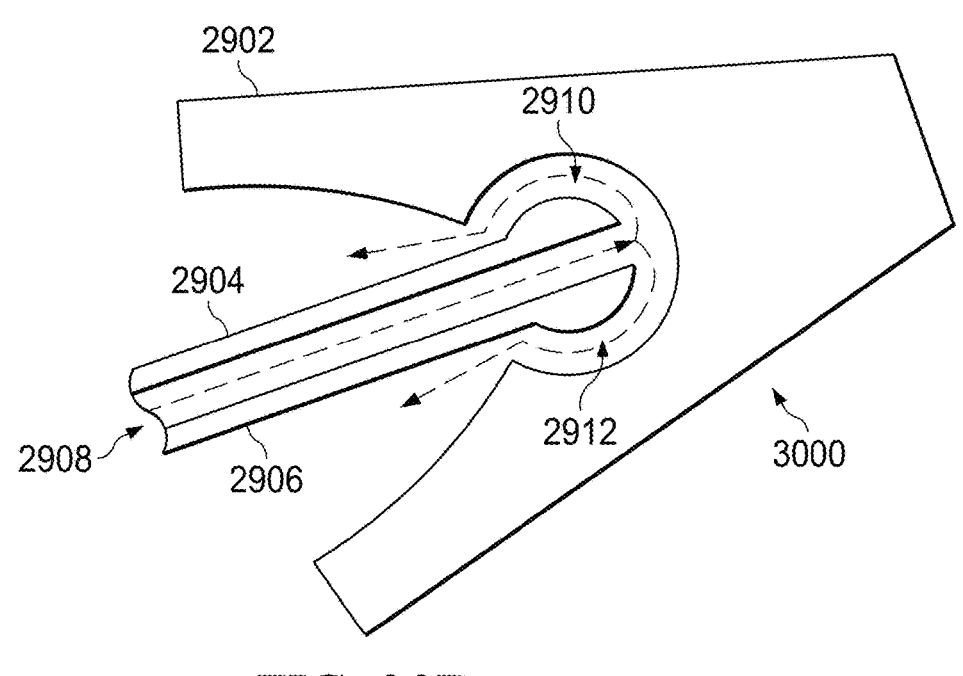
Figure 30C:
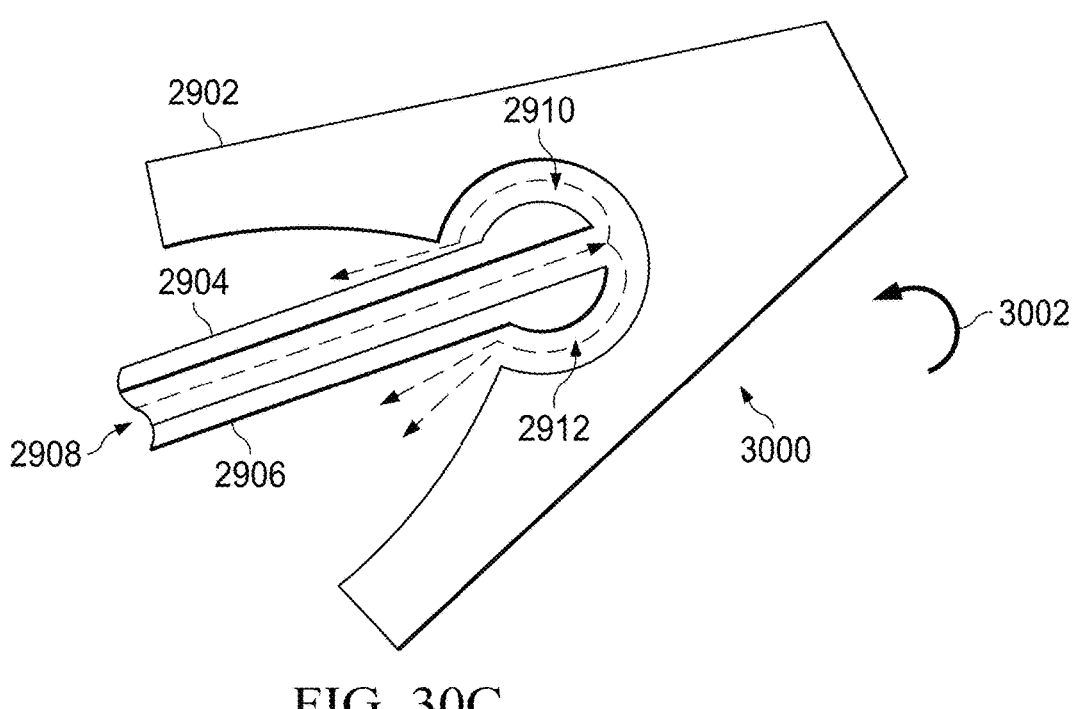

Referring specifically to FIGS. 30A-30C, a nozzle portion 3000 is illustrated. The nozzle portion 3000 may be similar or identical to the nozzle portion 2900 (FIGS. 29A-29D). In the present example, the ends of the arms 2904 and 2906 inside the cavity of the body 2902 form a bearing that floats or is otherwise supported and/or lubricated using incoming fluid. The arms 2904 and 2906 may remain stationary while the body 2902 rotates around the bearing.

In FIG. 30B, fluid is able to flow through the input channel 2908 and out both of the exit channels 2910 and 2912. Accordingly, both of the exit channels 2910 and 2912 may discharge fluid evenly. This occurs when the body 2902 is in a neutral position relative to the arms 2904 and 2906. This may be used, for example, to maintain a neutral position and/or orientation of the hovering distribution device 102.

In FIG. 30C, the body 2902 has been rotated relative to the arms 2904 and 2906, which remain stationary, as indicated by arrow 3002. This at least partially closes the exit channel 2910 and widens the opening of the exit channel 2912. Rotation in the opposite direction would at least partially close the exit channel 2912 and widen the opening of the exit channel 2910. This enables the nozzle portion 3000 to be used to alter the position and/or orientation of the hovering distribution device 102 based on the rotation of the body 2902 relative to the selected exit channel(s) and/or the width of their openings.

Figure 31:
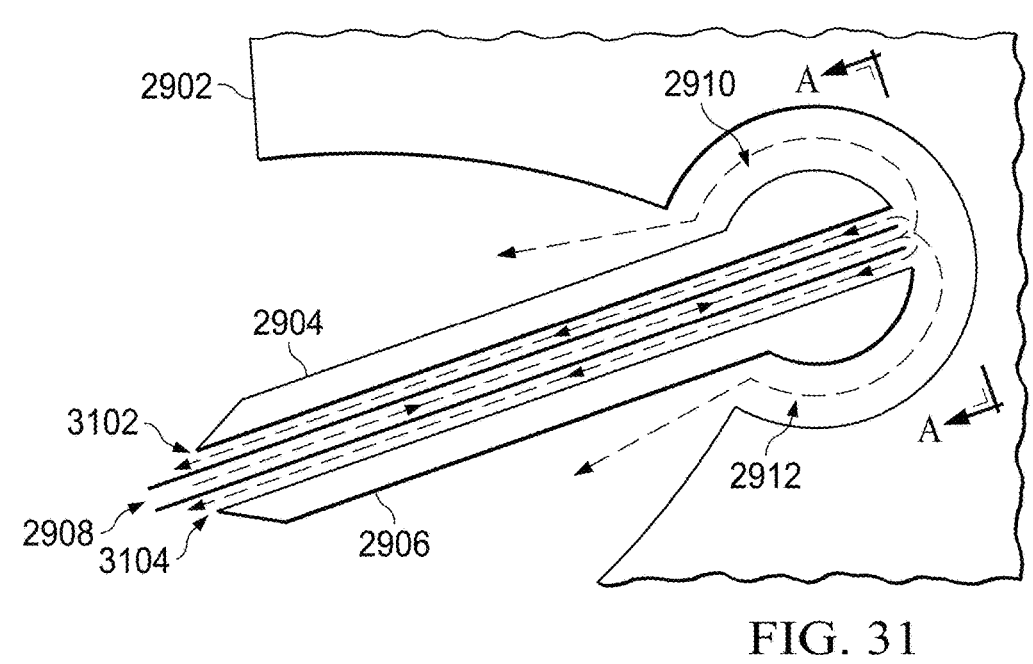
FIGS. 31 and 32 illustrate another embodiment of a portion of a nozzle.
Figure 32:
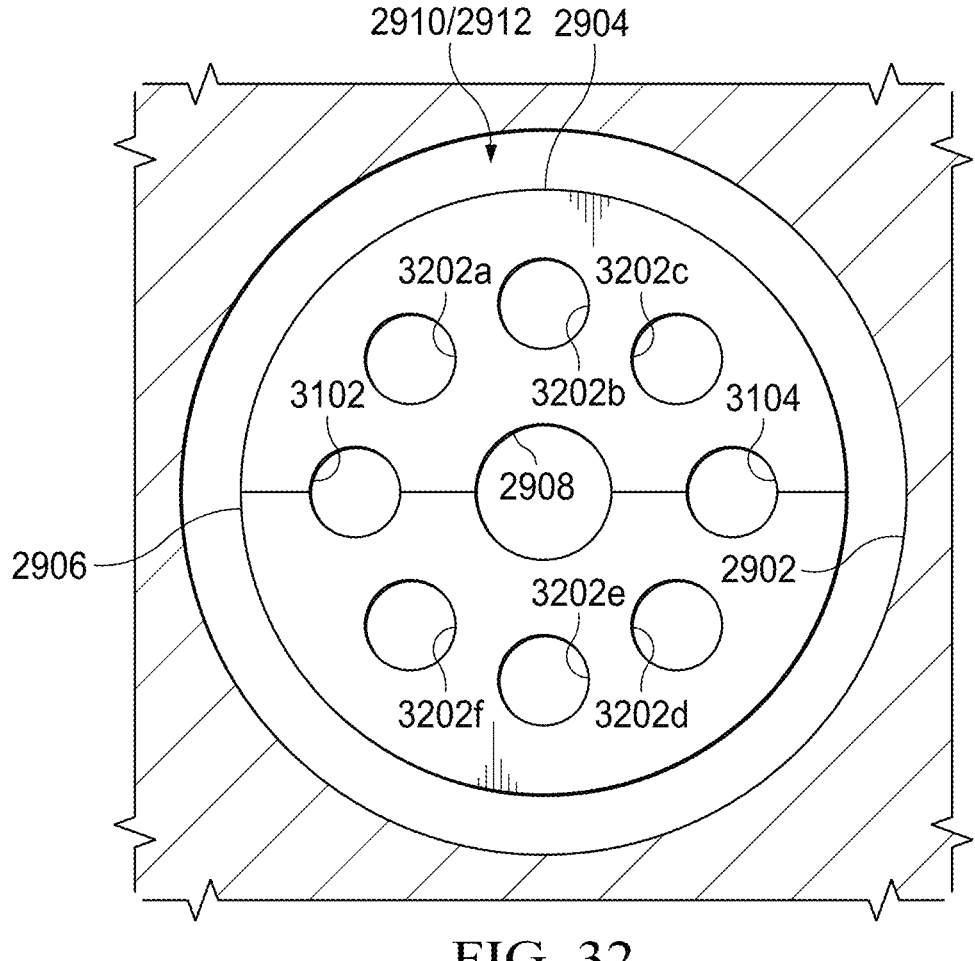

Referring specifically to FIGS. 31 and 32, the arms 2904 and 2906 are illustrated with respect to a portion of the body 2902. As with FIGS. 29A-30C, the ends of the arms 2904 and 2906 form partial bearing shapes that, when combined, form a bearing inside the cavity. In the present example, additional exit channels are present. In FIG. 31, additional exit channels are shown in cross-section as channels 3102 and 3104. In FIG. 32, additional exit channels are shown from view A-A of FIG. 31 (e.g., positioned around an axis running parallel to the fluid channel 2908) as channels 3102, 3104, and 3202a-3202f.

As shown, by using multiple exit channels, additional control may be provided by creating more potential force vectors using dispelled water. The channels 3102, 3104, and 3202a-3202f may be angled or otherwise shaped and/or oriented to define desired exit paths. In FIG. 32, the exit channels 2910 and 2912 of FIG. 31 are illustrated as a single channel. This may provide additional control as the body 2902 may be rotated relative to the channel 2910/2912, opening or closing portions of the channel as needed.

Figure 33A:
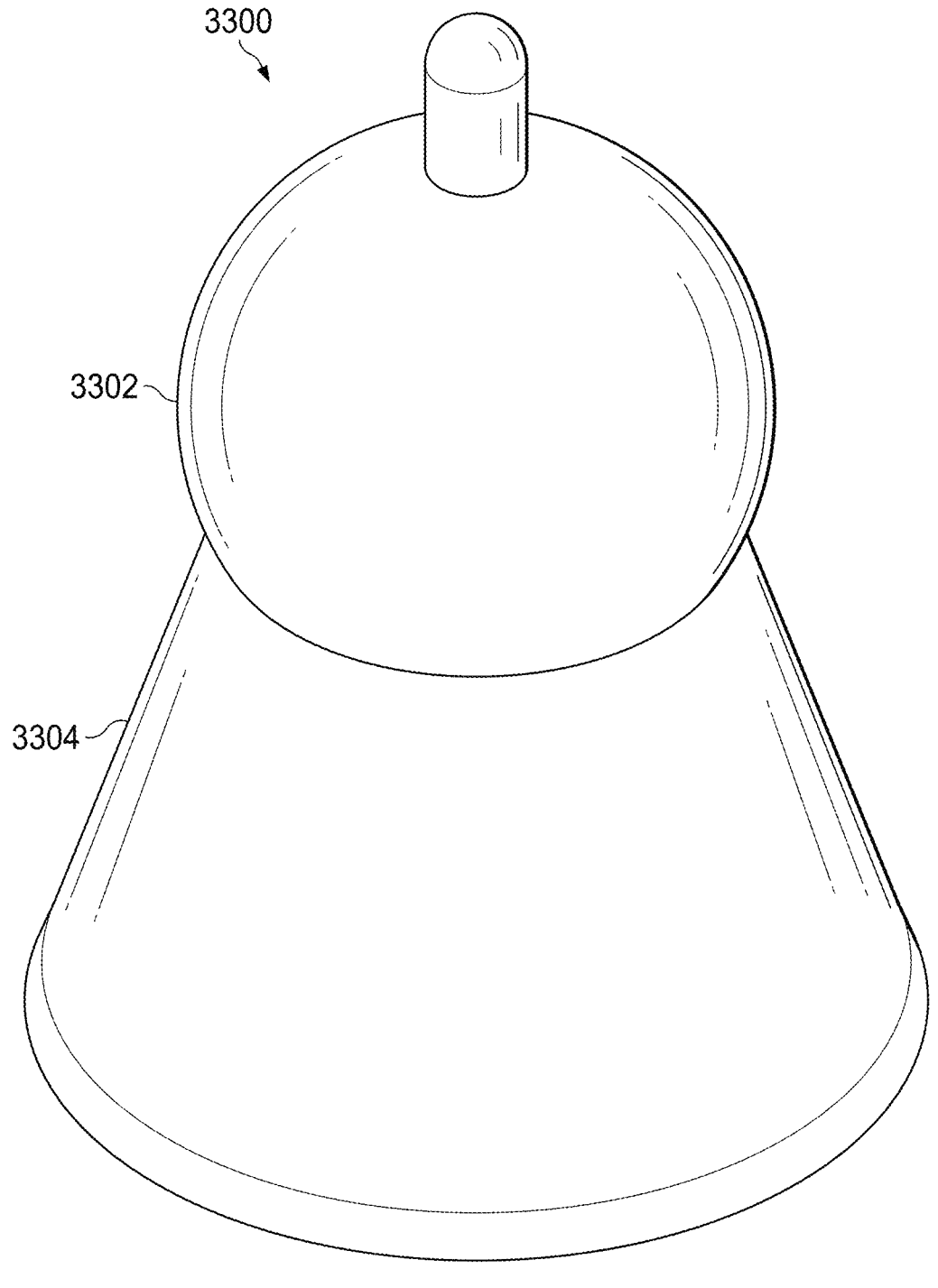
FIGS. 33A-33G illustrate embodiments of a bell and plunger assembly for a nozzle.
Figure 33B:
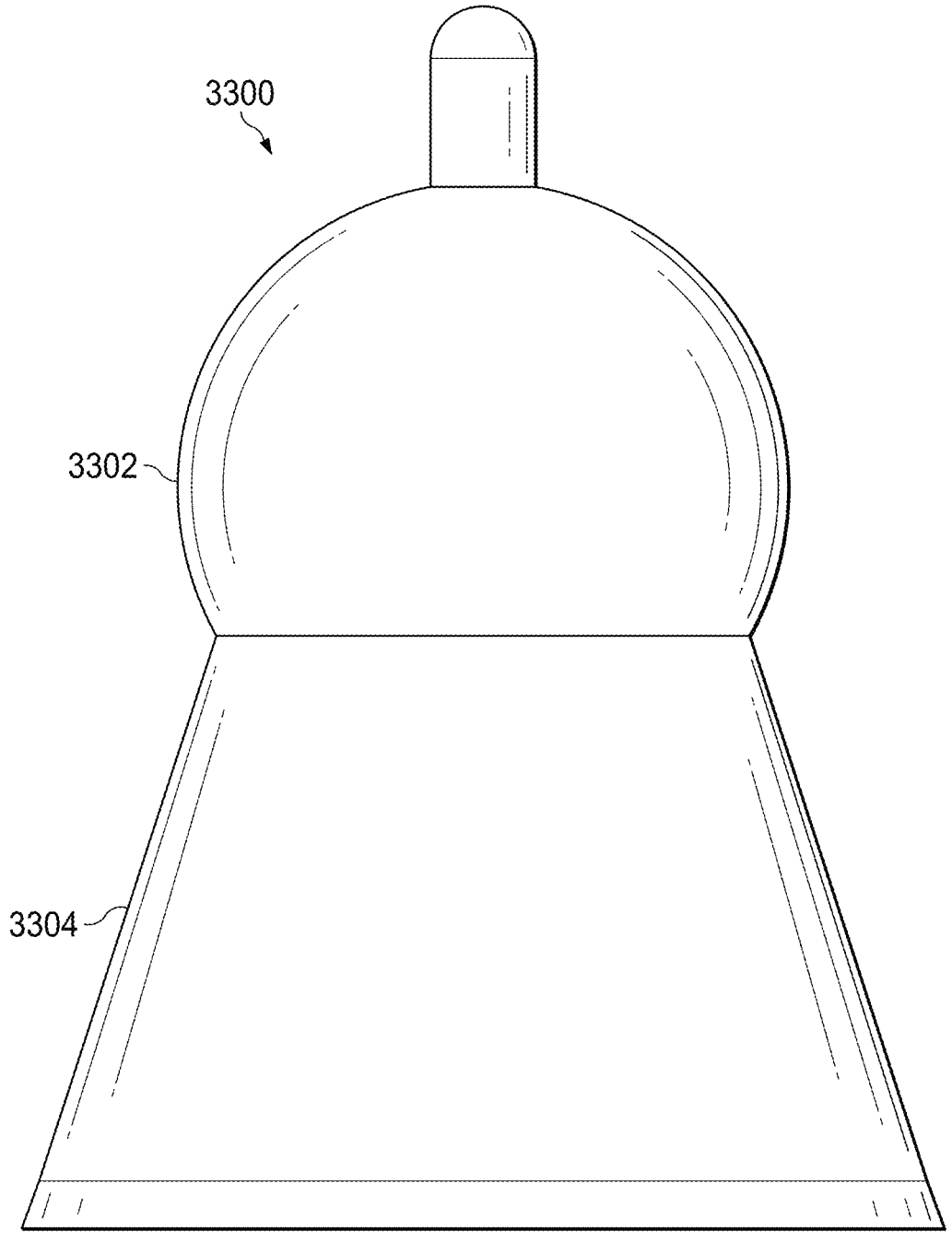
Figure 33C:
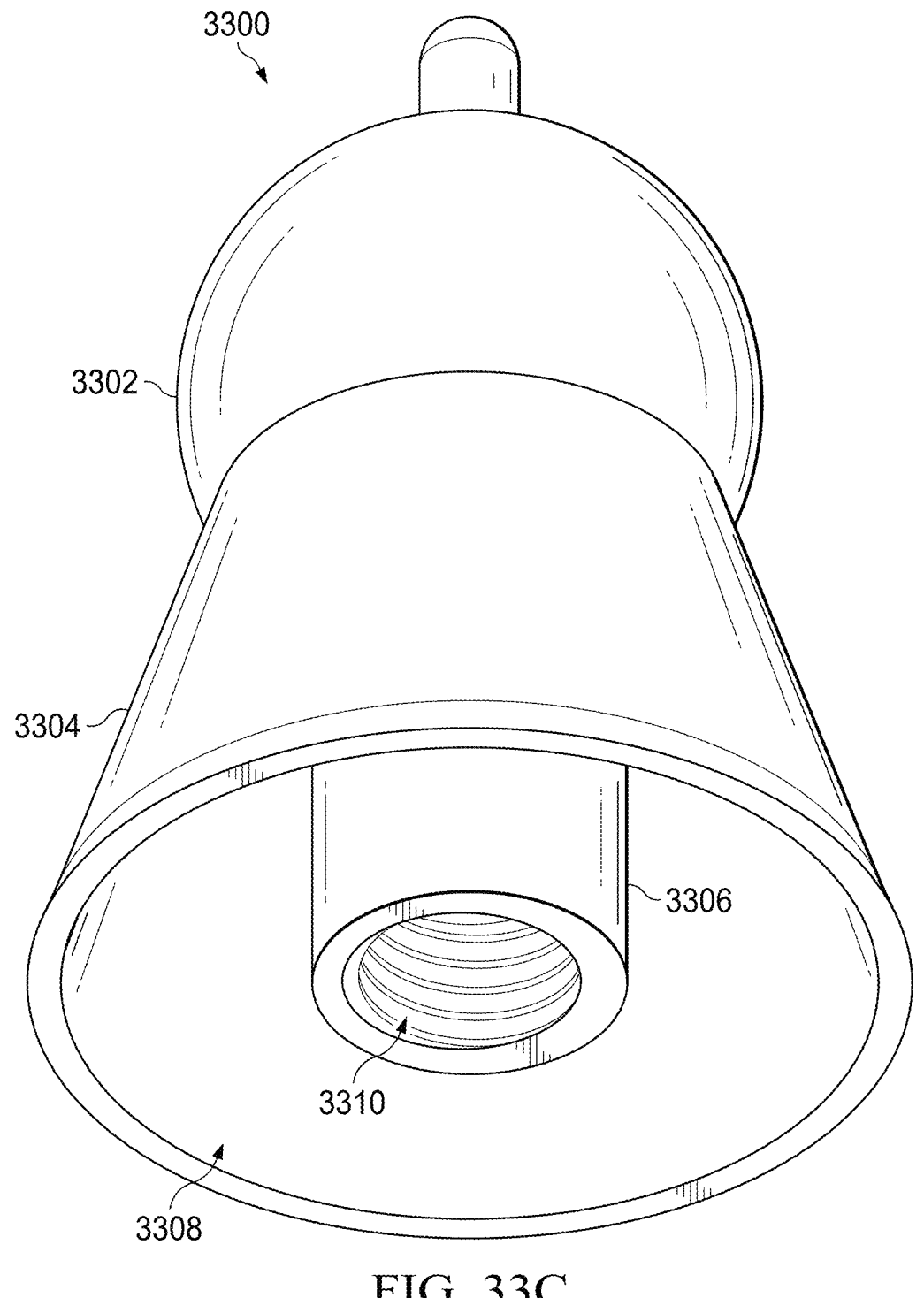
Figure 33D:
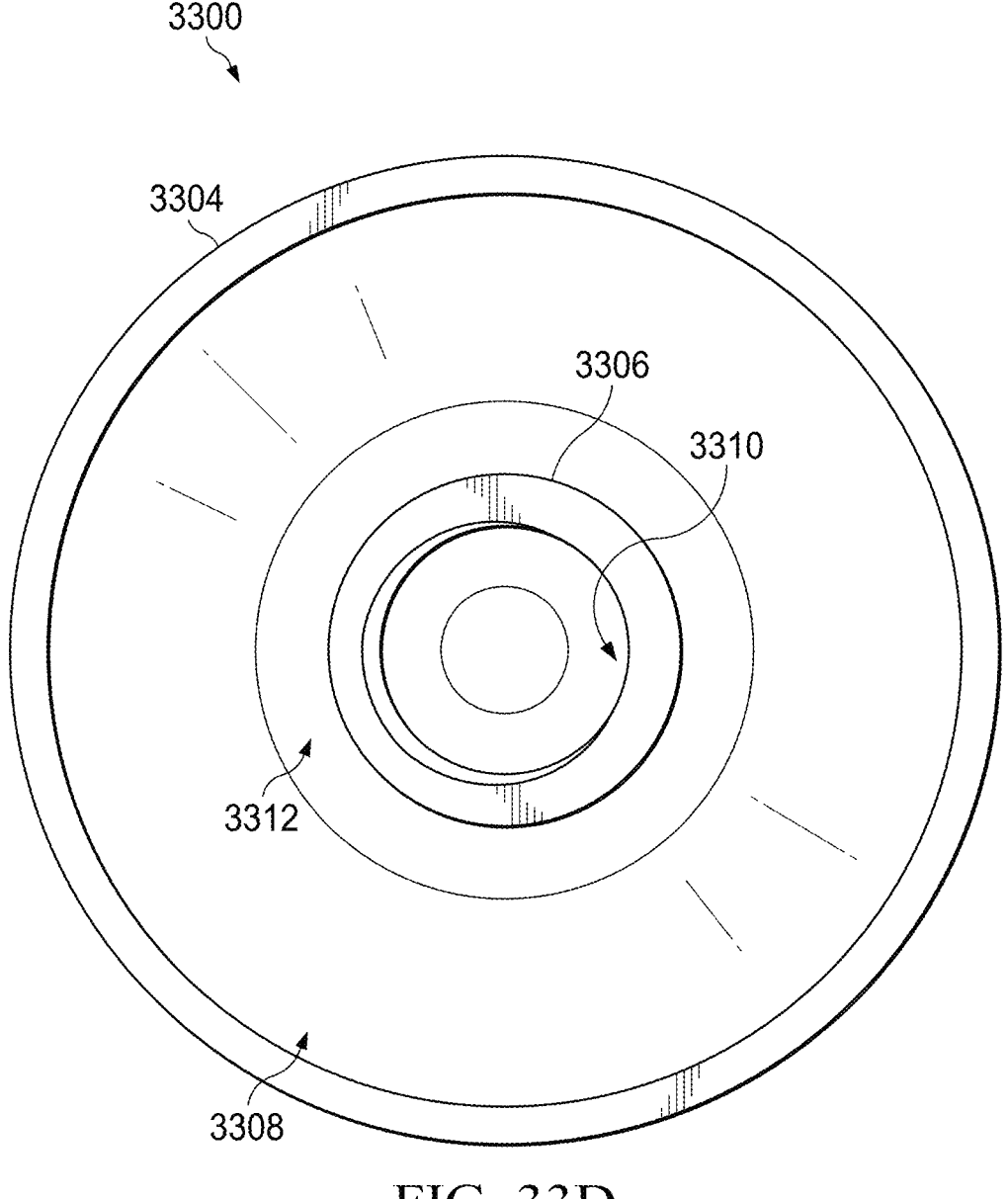
Figure 33E:
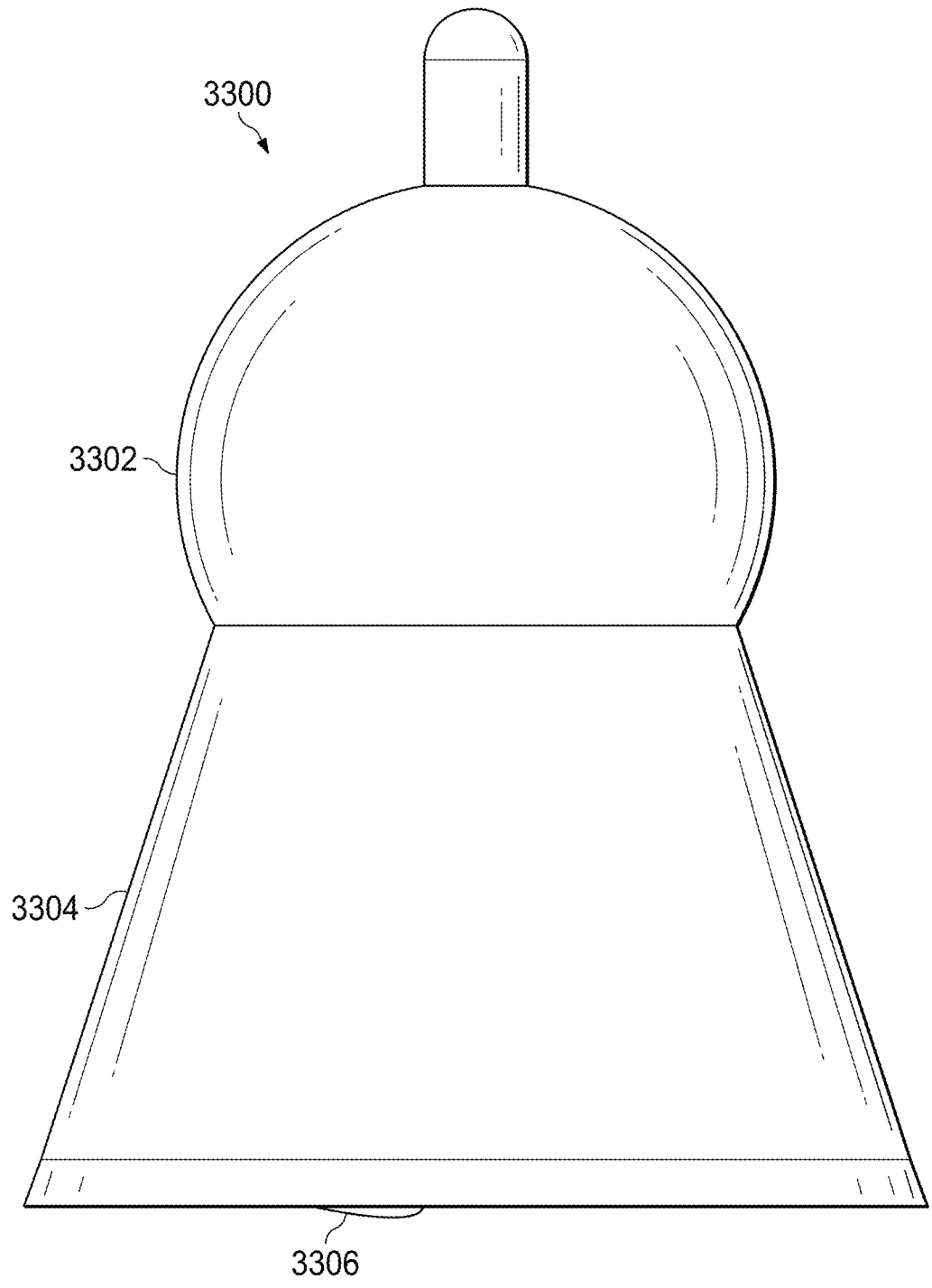
Figure 33F:
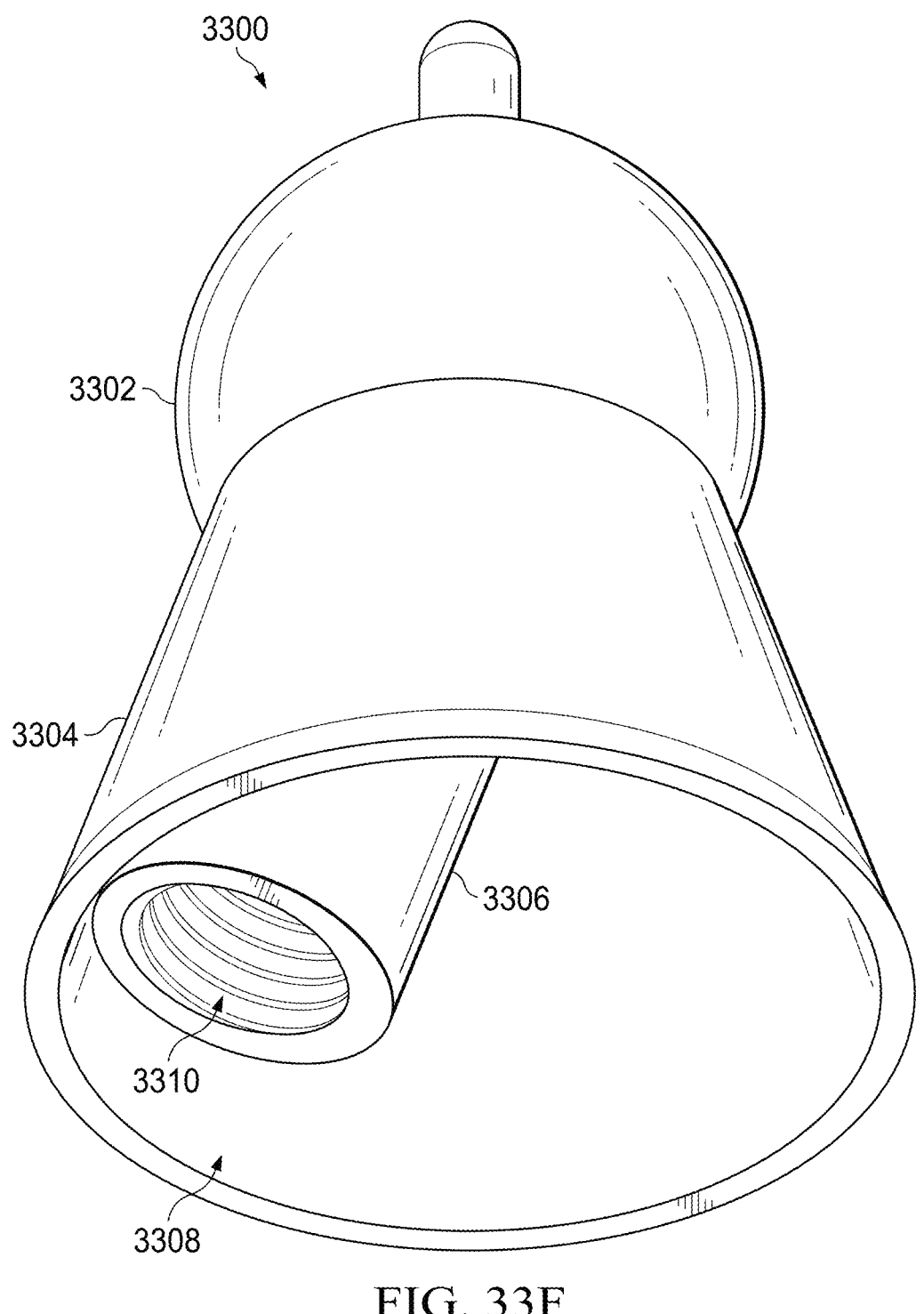
Figure 33G:
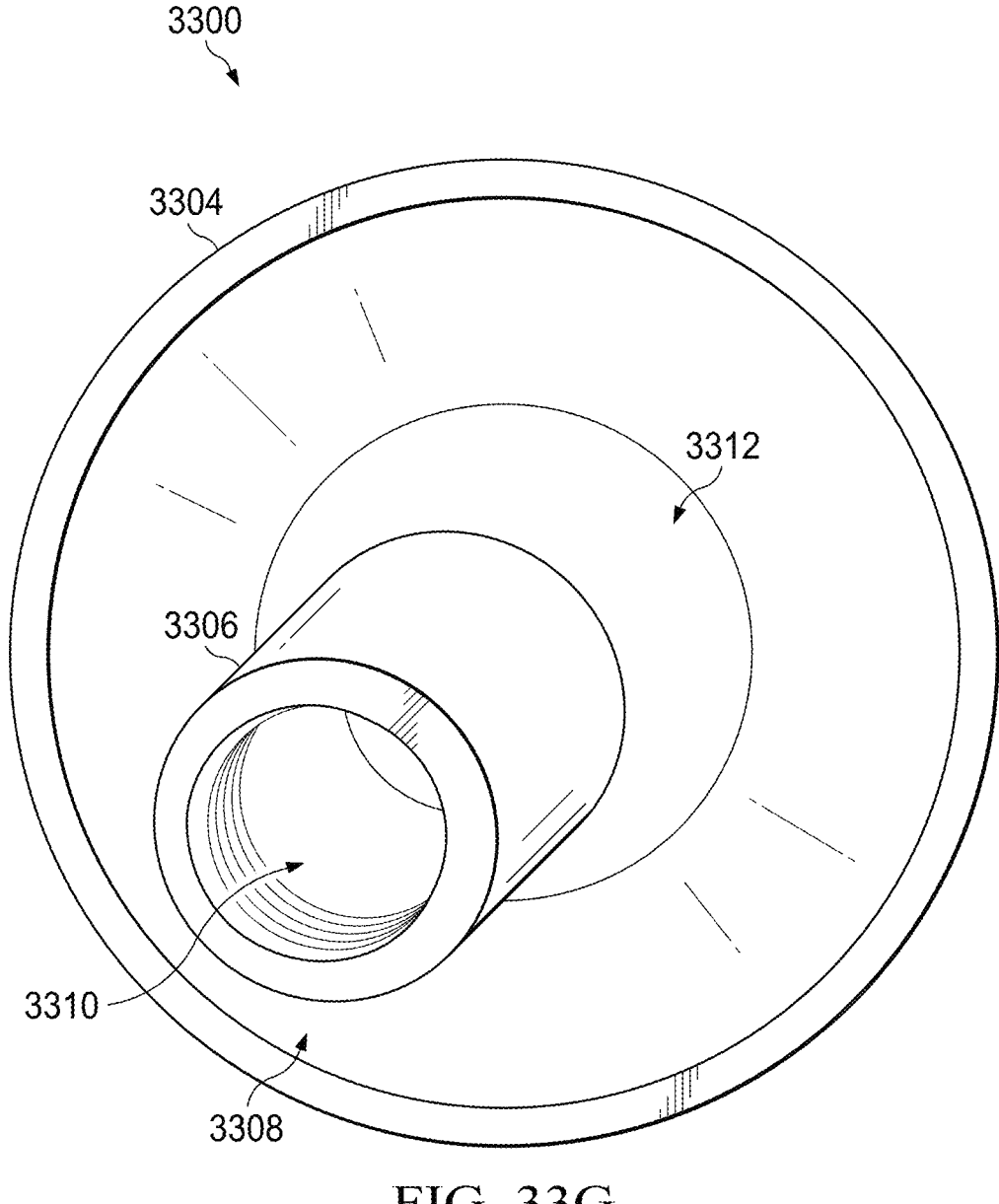
Figures 34A, 34B:
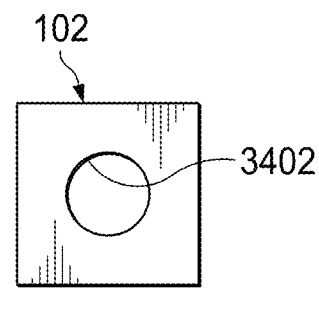
FIGS. 34A-34H illustrate embodiments of nozzle arrangements that may be used with a hovering distribution device.
Figure 34C:
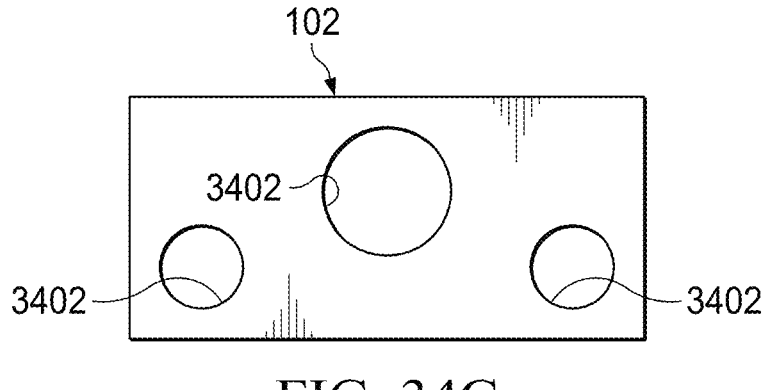
Figure 34D:
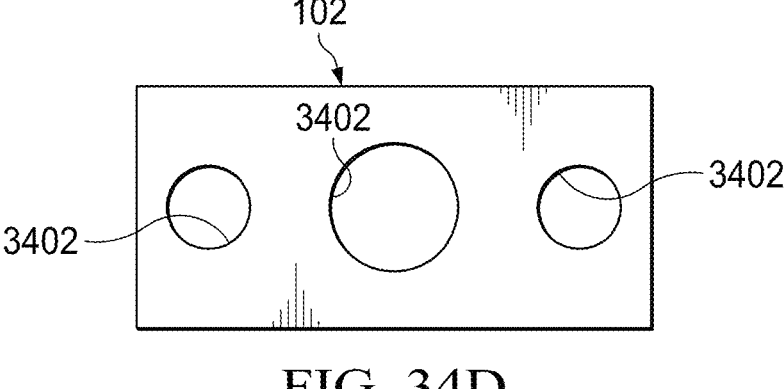
Figure 34E:
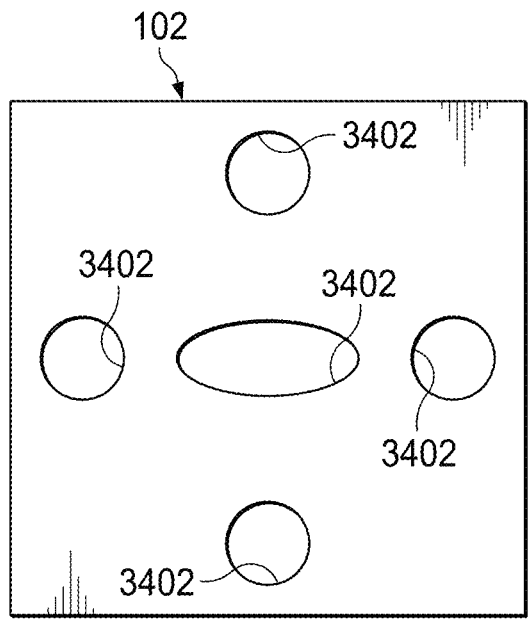
Figure 34F:
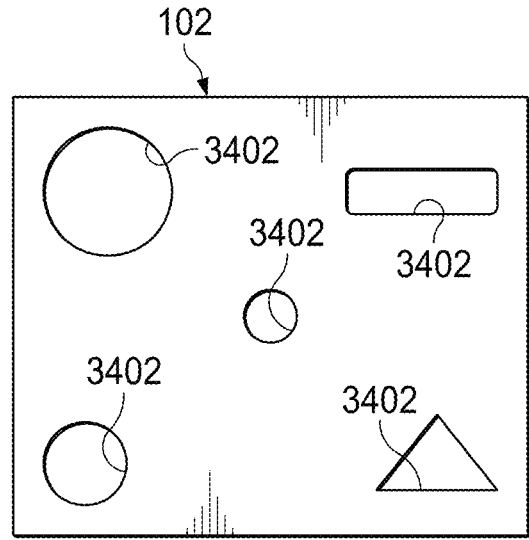
Figure 34G:
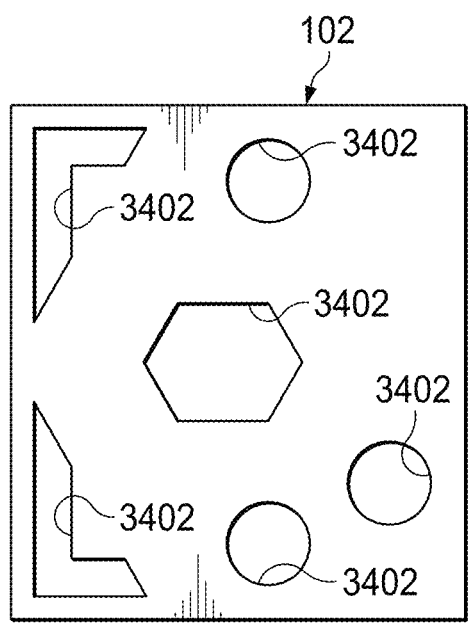
Figure 34H:
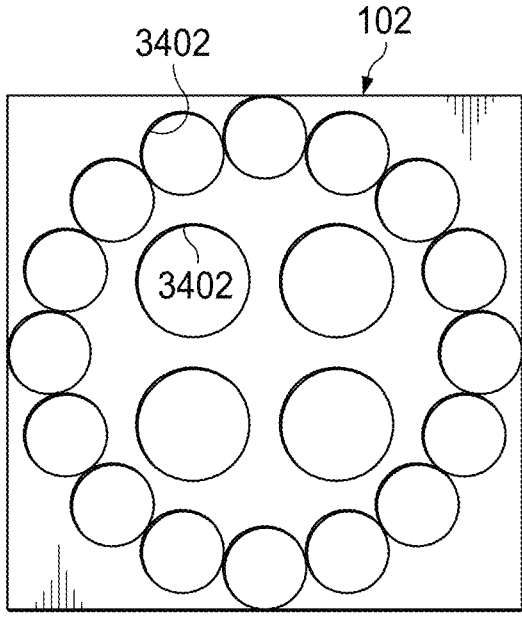

Referring to FIGS. 33A-33G, one embodiment of a bell and plunger assembly 3300 is illustrated, such as may be used as all or part of the nozzle portion 2900 and 3000 of FIGS. 29A-31. The assembly 3300 includes a ball 3302 coupled to a bell or cone 3304. A plunger 3306 is positioned inside a cavity 3308 of the bell 3304 and includes a fluid passage 3310 configured to receive a hose (e.g., the hose 106 of FIG. 1). The plunger 3306 is able to rotate in the manner of a ball and socket joint, which alters the size and position of a fluid passage 3312 provided for exiting fluid. It is understood that the plunger 3306 may not be visible as shown in FIG. 33E in all embodiments depending on the relative dimensions of the cone 3304 and plunger 3306.

Referring to FIGS. 34A-34H, various embodiments of nozzle arrangements are illustrated. It is understood that, although shown on a single surface, the nozzles 3402 may be positioned on different surfaces and/or components of the hovering distribution device 102. As shown, the number of nozzles 3402 may be one or greater. The nozzles 3402 may be different sizes, may be arranged symmetrically or asymmetrically, and may be arranged in many different patterns, including concentric circles and spirals. In some embodiments, one or more nozzles may be used primarily for lift and/or movement, while one or more other nozzles are used primarily for fluid distribution. In other embodiments, all nozzles may be used for both lift/movement and fluid distribution, or nozzles may be dynamically repurposed as needed.

Referring to FIGS. 35A-44G, various embodiments of the hovering distribution device 102 are illustrated. It is understood that many variations may exist and that sections, arm assemblies, and/or other components may be shaped in many different ways and/or coupled in many different configurations, and more or fewer components may be present. For example, components shown in sections may be formed using fewer parts or even a single part, single components may be formed using multiple parts, and additional sections may be added. It is understood that the various axes may be positioned, labeled, and their directions changed as desired, and they are oriented as shown in a given figure simply to provide a frame of reference similar to that used with respect to FIGS. 4-6, 8, and 9.

Many different types of control mechanisms and mechanical interfaces that enable the movement of components of the hovering distribution device 102 may be used with the embodiments of 35A-44G, including those that use gears, wheels, sprockets, belts, chains, drives, and/or pistons, whether based on mechanical, electrical, hydraulic, pneumatic, and/or other principles. Such movement may be relative to other components of the hovering distribution device 102 and/or or relative to one or more external reference points (e.g., the reel 104, the hose 106, and/or a coordinate system such as GPS). In addition, aspects of different embodiments illustrated herein may be combined in different ways.

Figure 35A:
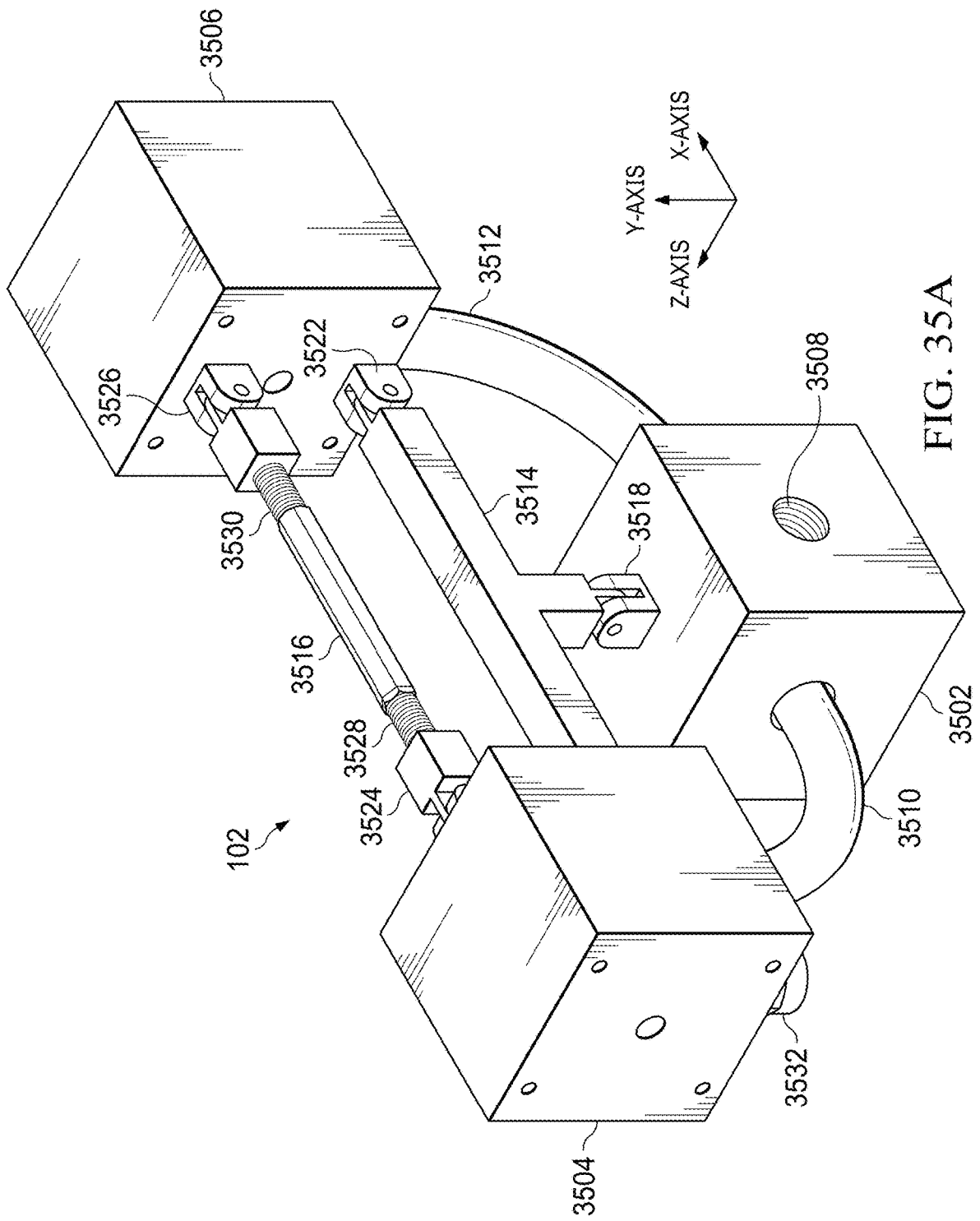
FIGS. 35A-35C illustrate one embodiment of a hovering distribution device.
Figure 35B:
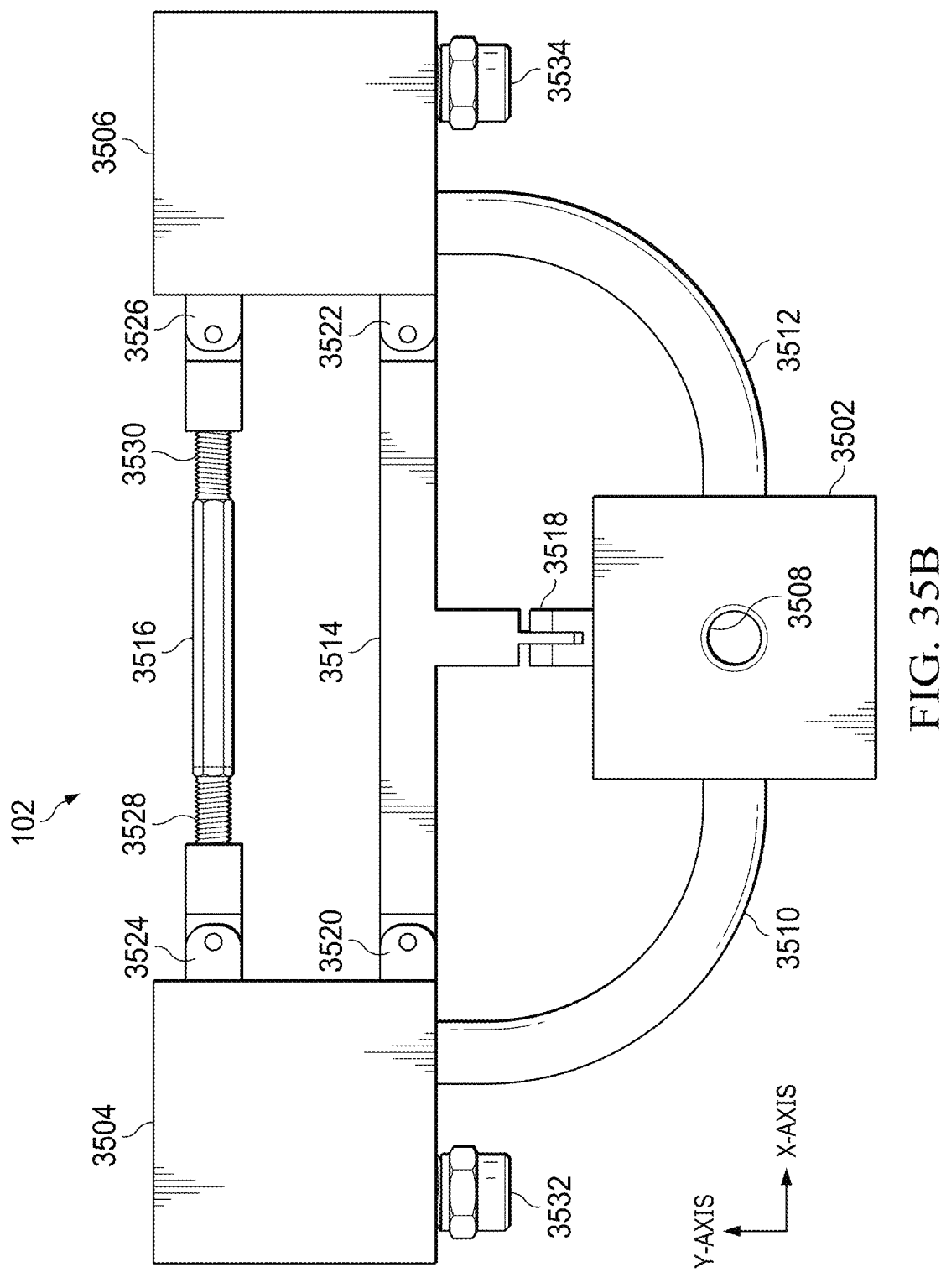
Figure 35C:
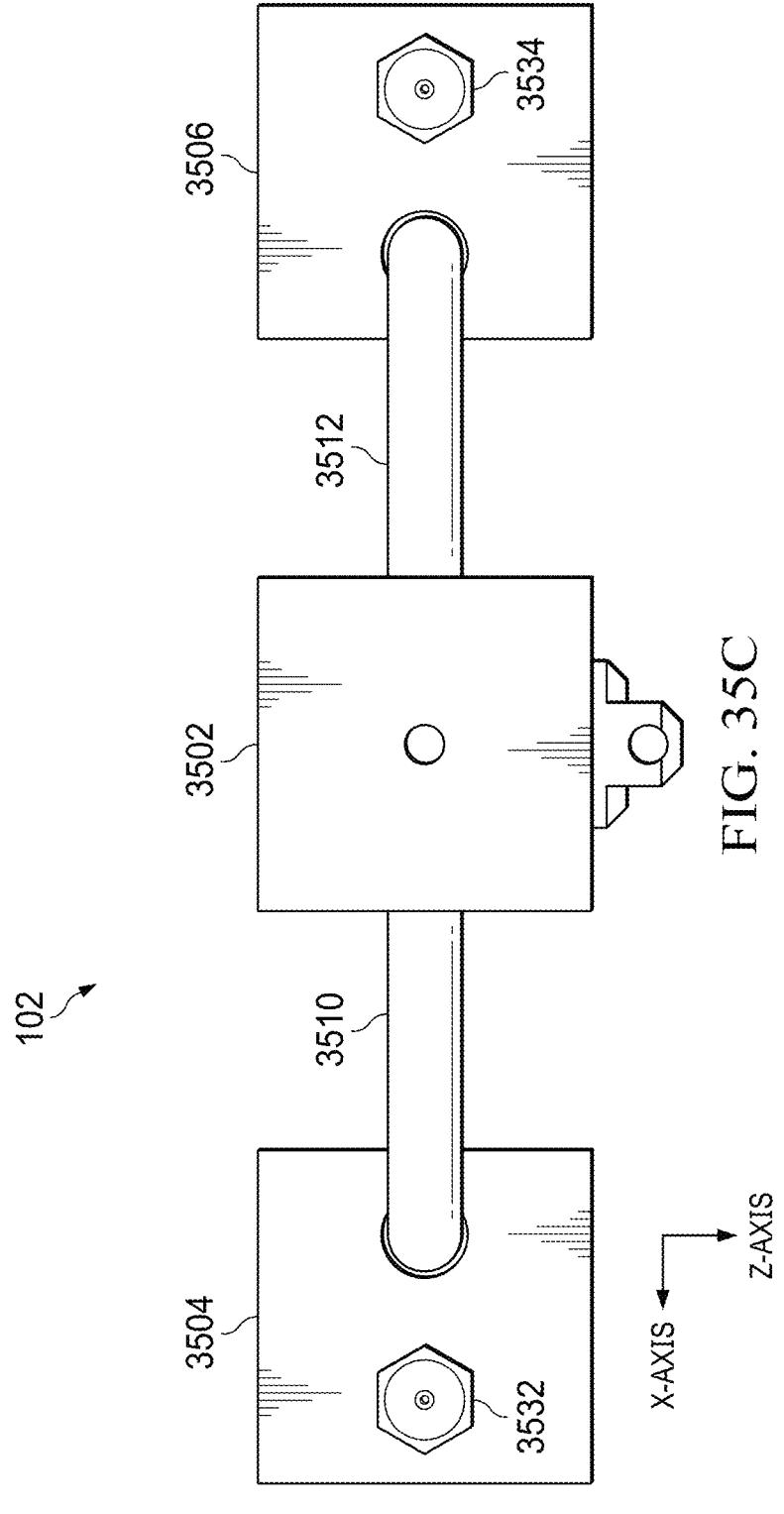

Referring to FIGS. 35A-35C, one embodiment of the hovering distribution device 102 is illustrated. In the present example, the hovering distribution device 102 includes three sections 3502, 3504, and 3506. The three sections 3502, 3504, and 3506 may be coupled together to allow some movement of the sections relative to one another. The section 3502 includes an inlet port 3508 configured to receive a hose (e.g., the hose 106 of FIG. 1) and may be coupled to the sections 3504 and 3506 by arms 3510 and 3512, respectively.

The arms 3510 and 3512 may be rigid or flexible. Even if rigid, the arms 3510 and 3512 may be coupled to the section 3502 in a manner that enables rotation of the arms around the x-axis relative to the section 3502. (It is understood that the various axes may be positioned, labeled, and their directions changed as desired, and they are oriented as shown in FIGS. 35A-35C simply to provide a frame of reference similar to that used with respect to FIGS. 4-6, 8, and 9.) The arms 3510 and 3512 provide fluid channels that pass fluid from the fluid port 3508 to their respective sections 3504 and 3506. Sections 3504 and 3506 may include nozzles 3532 and 3534, respectively, that are in fluid communication with the arms 3510 and 3512.

A T-bar support 3514 may couple the top of the section 3502 to the interior sides of the sections 3504 and 3506. As shown, the T-bar support 3514 may be coupled to the section 3502 via a hinge 3518 in a manner that enables rotation of the section 3502 around the x-axis relative to the T-bar support 3514. The T-bar support 3514 may be coupled to the sections 3504 and 3506 via hinges 3520 and 3522, respectively, in a manner that enables rotation of the sections 3504 and 3506 around the z-axis relative to the T-bar support 3514. Additional rotation may be possible if the arms 3510 and 3512 are at least somewhat flexible, or are attached in a manner that provides some level of movement.

A support bar 3516 may couple the sections 3504 and 3506 on their interior sides. The support bar 3516 may be coupled to each of the sections 3504 and 3506 via hinges 3524 and 3526, respectively, in a manner that enables rotation of the sections 3504 and 3506 around the z-axis relative to the support bar 3516. The support bar 3516 may include threaded ends 3528 and 3530 that allow the distance between the sections 3504 and 3506 to be adjusted. Adjusting the distance using the threaded ends 3528 and 3530 may adjust the orientation of the sections 3504 and 3506 relative to each other and the section 3502, as such adjustments may rotate the sections 3504 and/or 3506 around the z-axis.

Figure 36A:
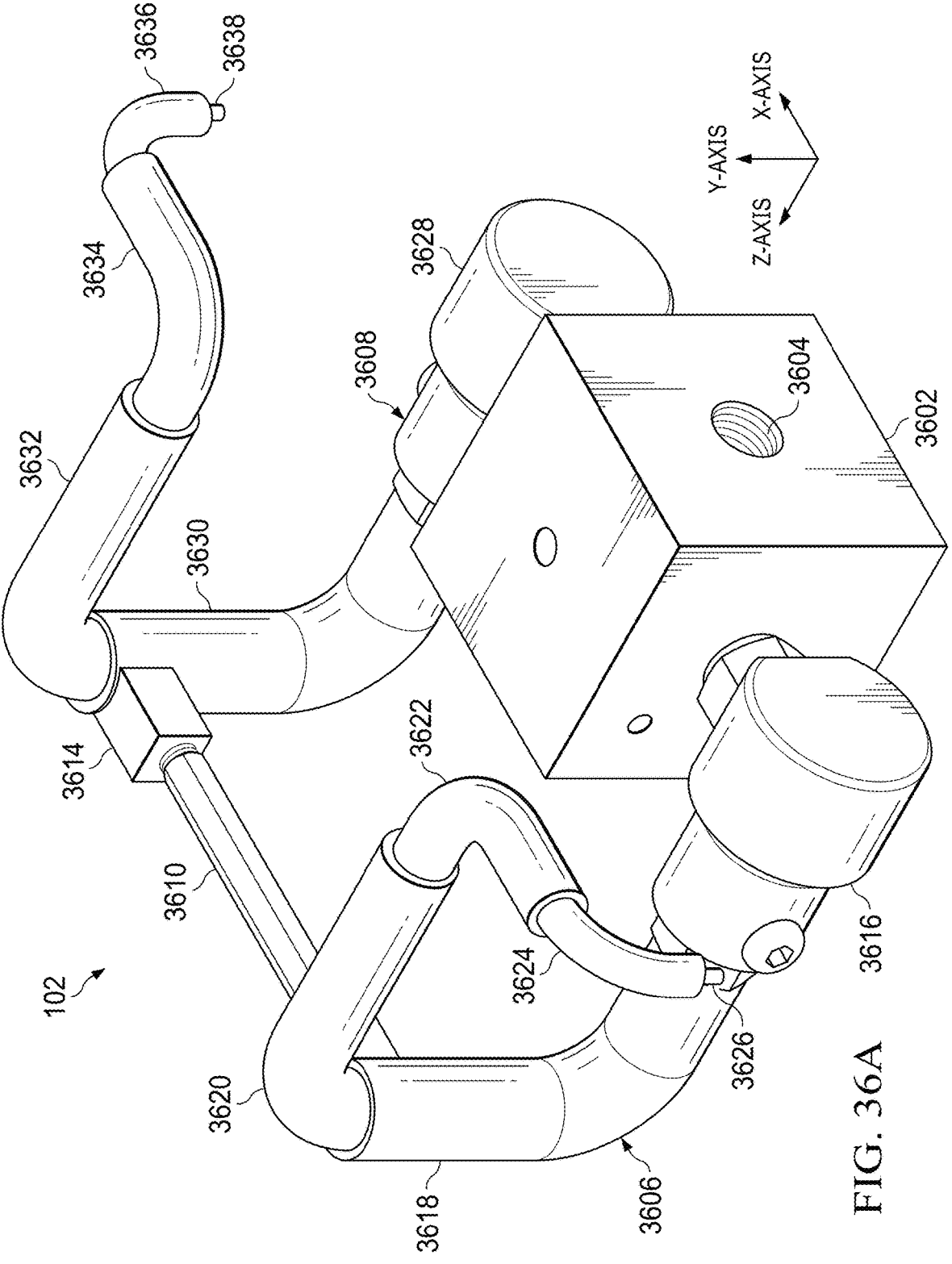
FIGS. 36A-36C illustrate another embodiment of a hovering distribution device.
Figure 36B:
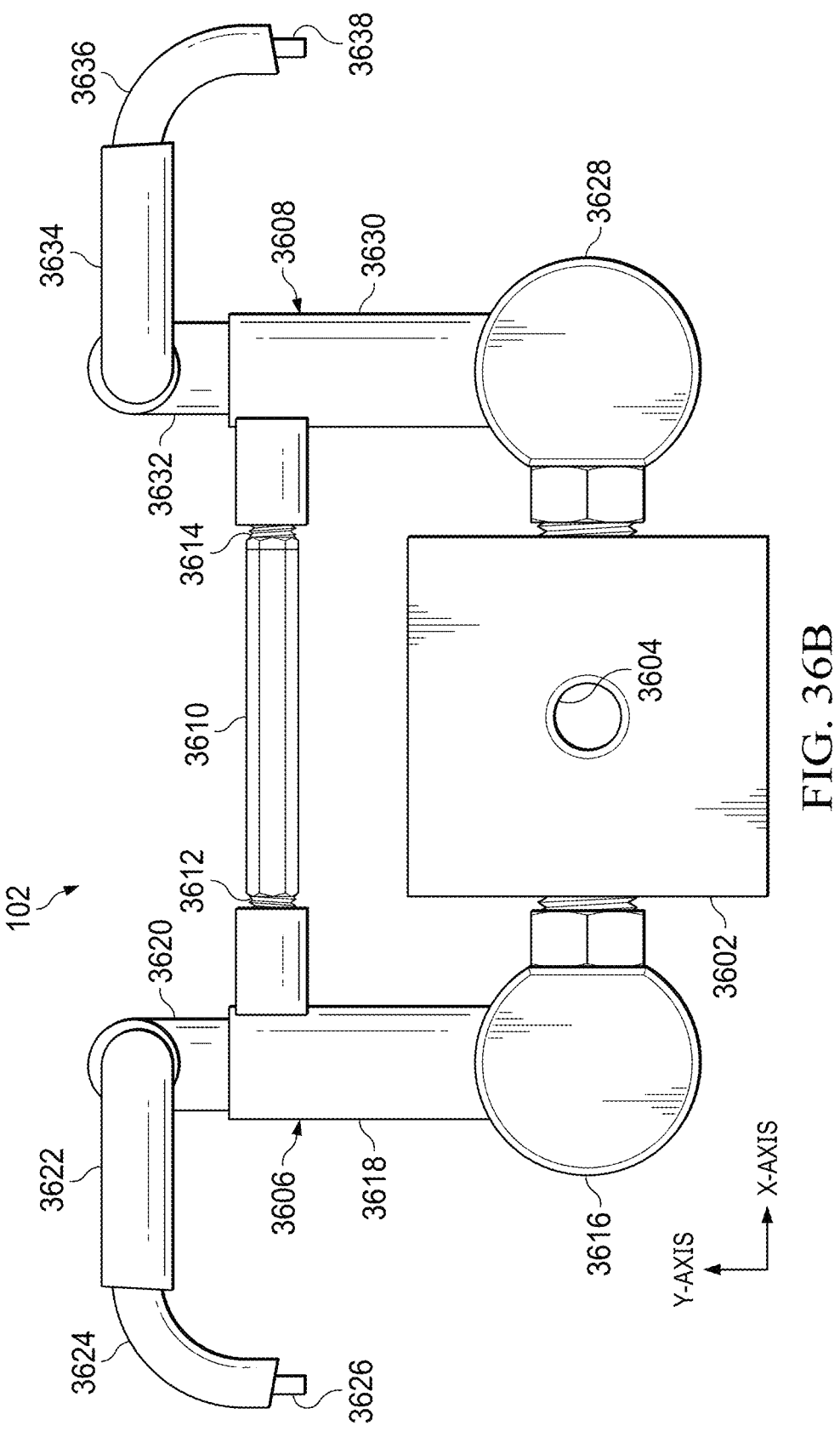
Figure 36C:
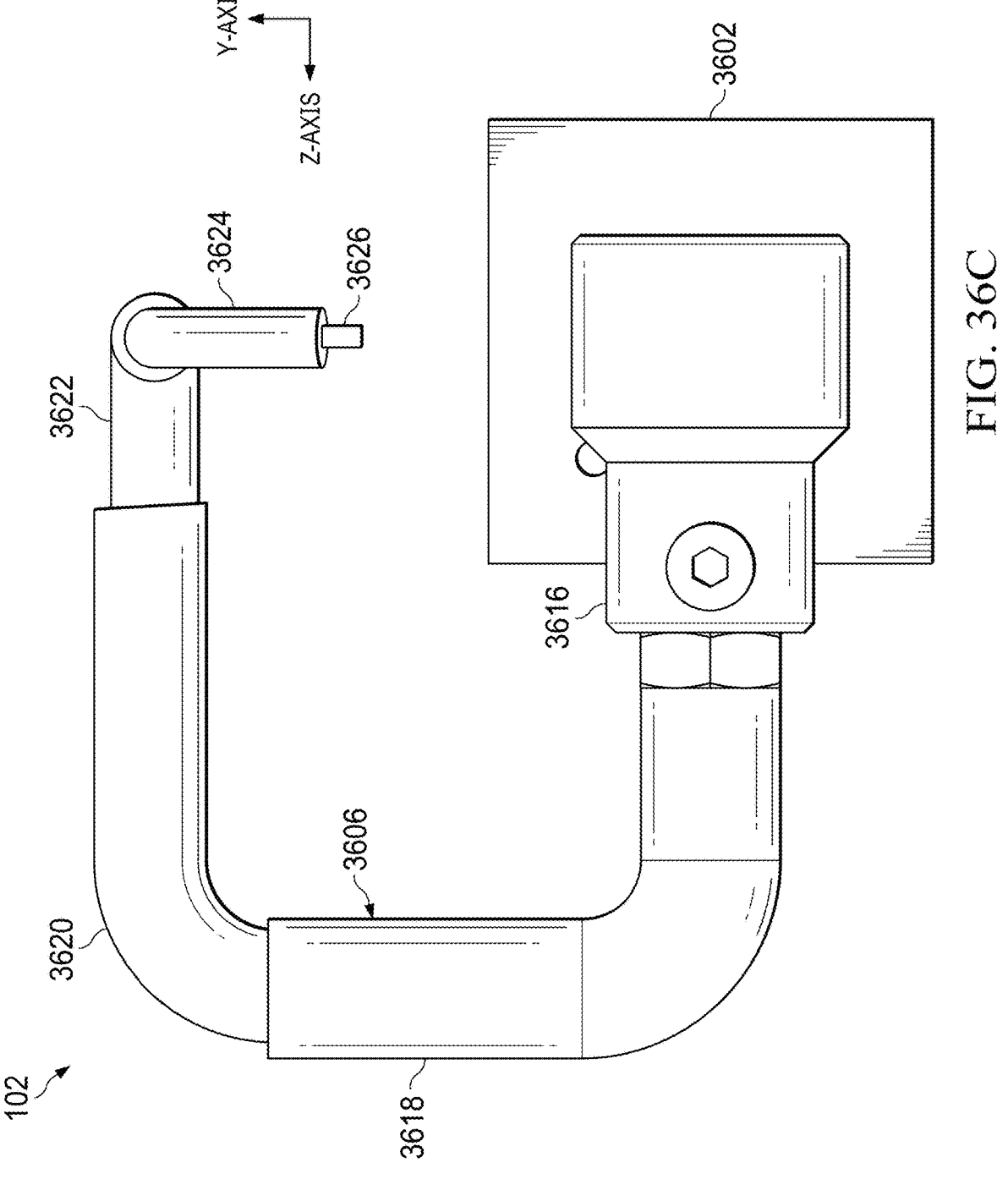
Figure 37A:
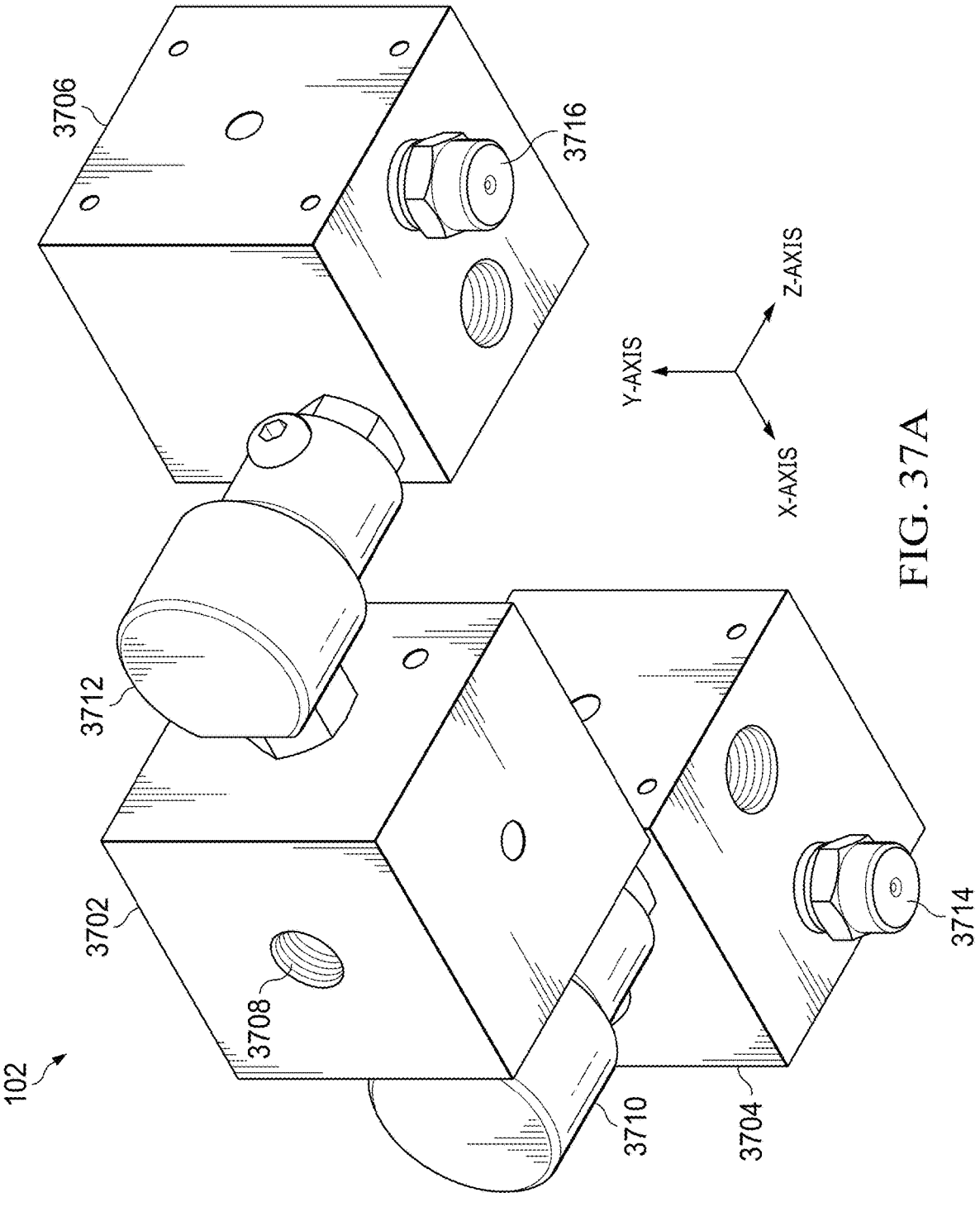
FIGS. 37A-37D illustrate yet another embodiment of a hovering distribution device.
Figure 37B:
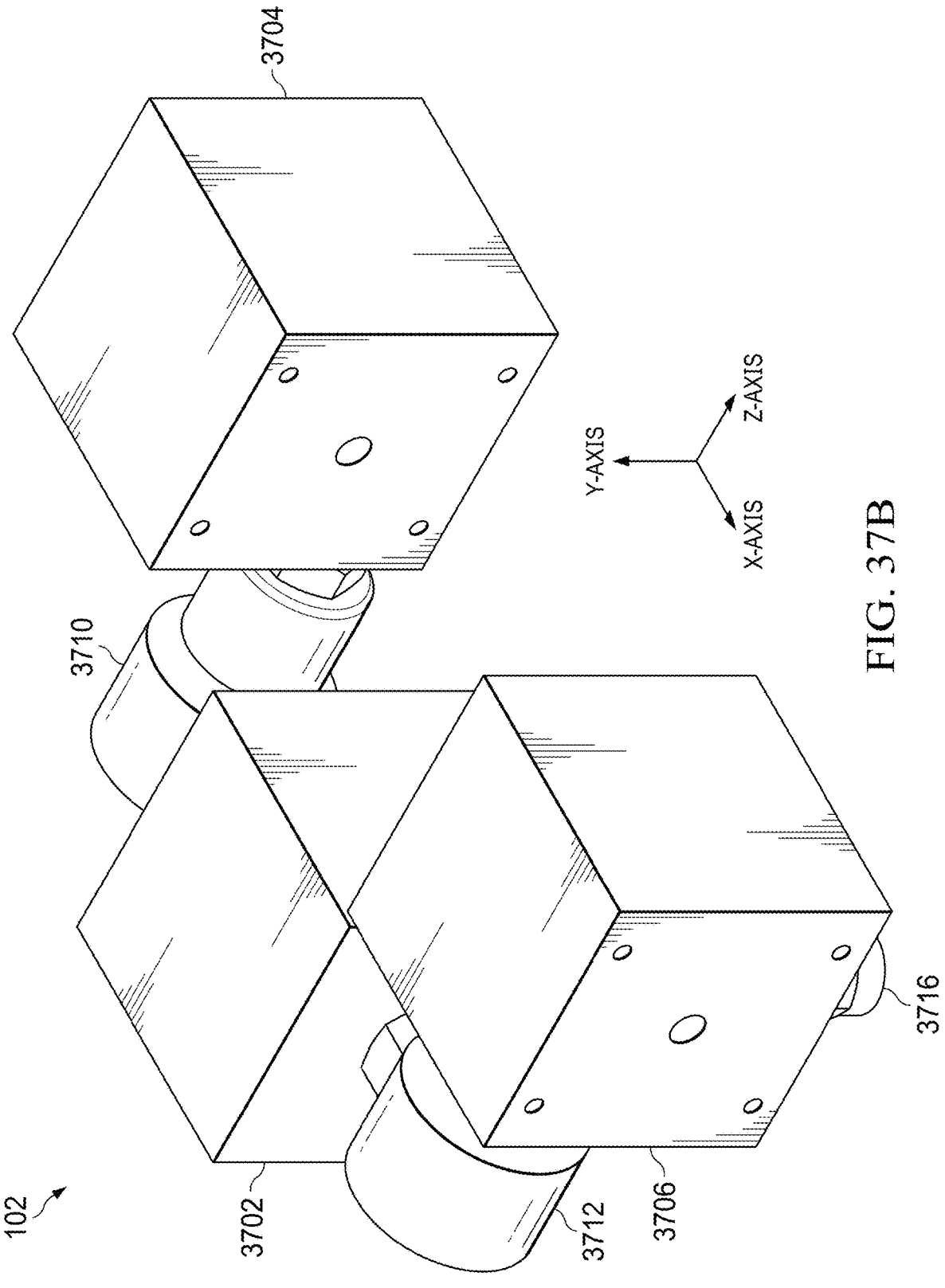
Figure 37C:
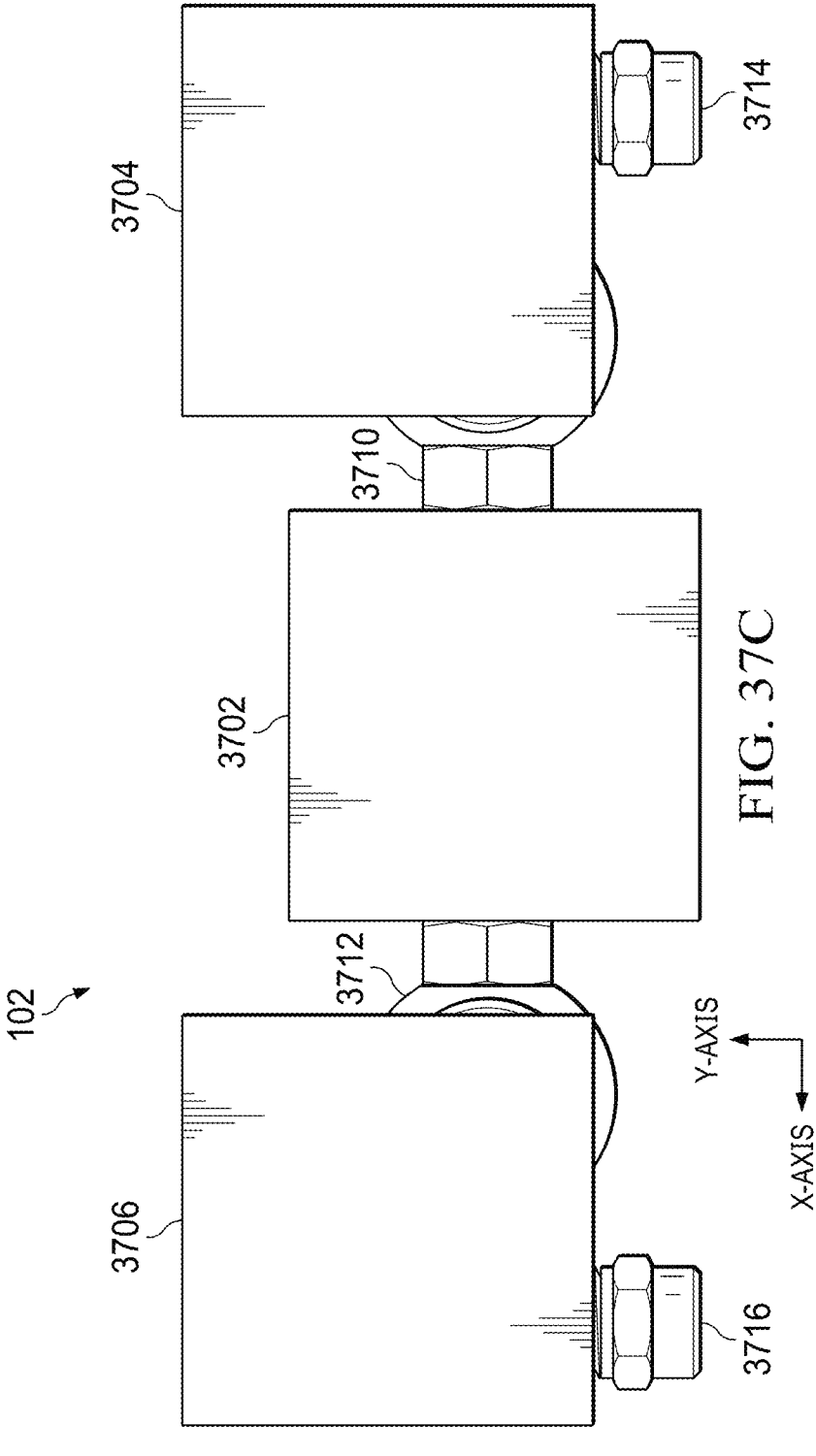
Figure 37D:
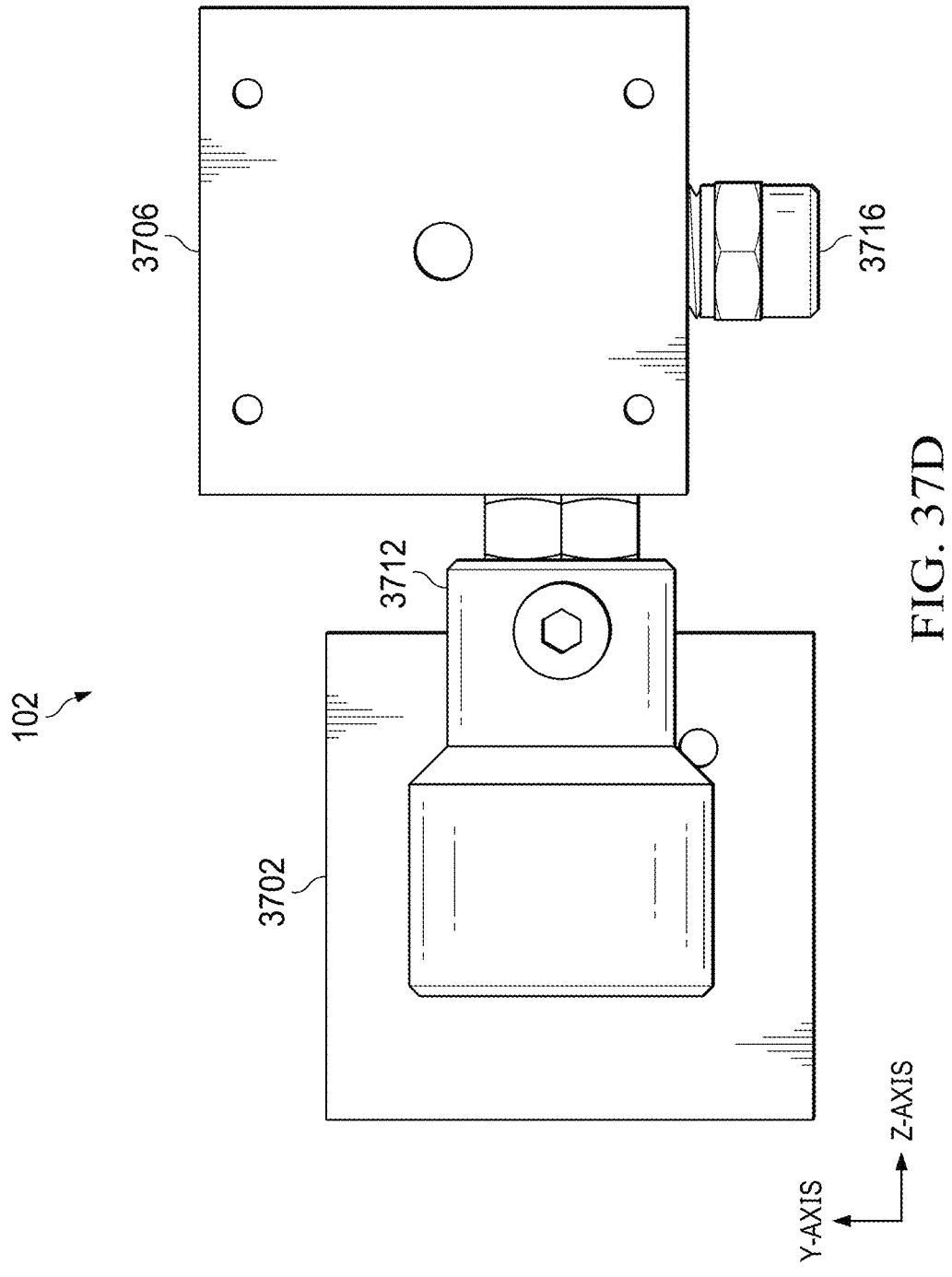

Referring to FIGS. 36A-36C, another embodiment of the hovering distribution device 102 is illustrated. In the present example, the hovering distribution device 102 includes a single section 3602. The section 3602 includes an inlet port 3604 configured to receive a hose (e.g., the hose 106 of FIG. 1) and may be coupled to arm assemblies 3606 and 3608. The arm assemblies 3606 and 3608 may be immovably coupled to the section 3602, or may be movably coupled in a manner that enables rotation of the arm assemblies around the x-axis relative to the section 3602.

The arm assembly 3606 may include multiple arm sections with an arm section 3616 coupled to the section 3602, an arm section 3618 coupled to the arm section 3616, an arm section 3620 coupled to the arm section 3618, an arm section 3622 coupled to the arm section 3620, and an arm section 3624 coupled to the arm section 3622. It is understood that the number of arm sections may vary, with more or fewer used in other embodiments. A nozzle 3626 may be coupled to the arm section 3624.

In the present embodiment, the arm sections 3618, 3620, 3622, and 1364 may be adjusted relative to one another. Such adjustments may be manual (e.g., before the fluid distribution vehicle 102 is airborne) and/or may be controlled via control mechanisms in the device 102. For example, as illustrated, the arm section 3620 may be coupled to the arm section 3618 in a manner that enables rotation of the arm section 3620 around the y-axis relative to the arm section 3618. The arm section 3622 may be coupled to the arm section 3620 in a manner that enables rotation of the arm section 3622 around the z-axis relative to the arm section 3620. The arm section 3624 may be coupled to the arm section 3622 in a manner that enables rotation of the arm section 3624 around the x-axis relative to the arm section 3622. In other embodiments, one or more of the arm sections 3618, 3620, 3622, and 1364 may be fixed to prevent movement relative to an adjoining arm section.

The arm assembly 3608 may include multiple arm sections with an arm section 3628 coupled to the section 3602, an arm section 3630 coupled to the arm section 3628, an arm section 3632 coupled to the arm section 3630, an arm section 3634 coupled to the arm section 3632, and an arm section 3636 coupled to the arm section 3634. It is understood that the number of arm sections may vary, with more or fewer used in other embodiments. A nozzle 3638 may be coupled to the arm section 3636. As described with respect to the arm assembly 3606, some or all of the arm sections 3630, 3632, 3634, and 3636 of the arm assembly 3608 may be able to rotate relative to an adjoining arm section or may be immovably coupled.

A support bar 3610 may be used to couple the arm assemblies 3606 and 3608. The support bar 3610 may include threaded ends 3612 and 3614 that allow the distance between the arm assemblies 3606 and 3608 to be adjusted.

Referring to FIGS. 37A-37D, yet another embodiment of the hovering distribution device 102 is illustrated. In the present example, the hovering distribution device 102 includes three sections 3702, 3704, and 3706. The three sections 3702, 3704, and 3706 may be coupled together to allow some movement of the sections relative to one another, but are rigidly coupled in the present example. The section 3702 includes an inlet port 3708 configured to receive a hose (e.g., the hose 106 of FIG. 1) and may be coupled to the sections 3704 and 3706 by arms 3710 and 3712, respectively. The sections 3704 and 3706 include nozzles 3714 and 3716, respectively.

Figure 38:
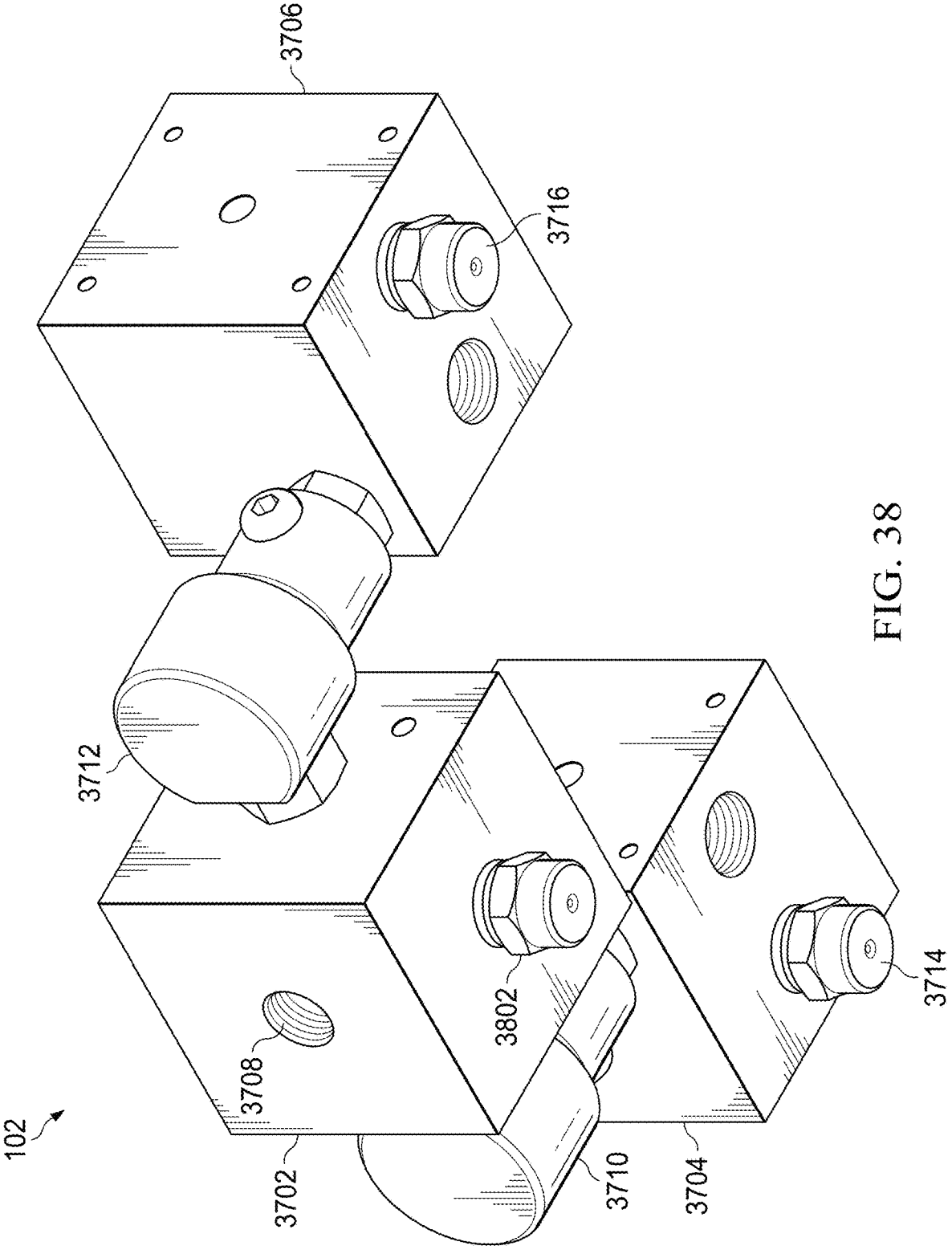
FIG. 38 illustrates still another embodiment of a hovering distribution device that is a variation of the hovering distribution device of FIG. 37A.

Referring to FIG. 38, an embodiment of the hovering distribution device 102 of FIGS. 37A-37D is illustrated with an additional nozzle 3802 coupled to the section 3702.

Figure 39A:
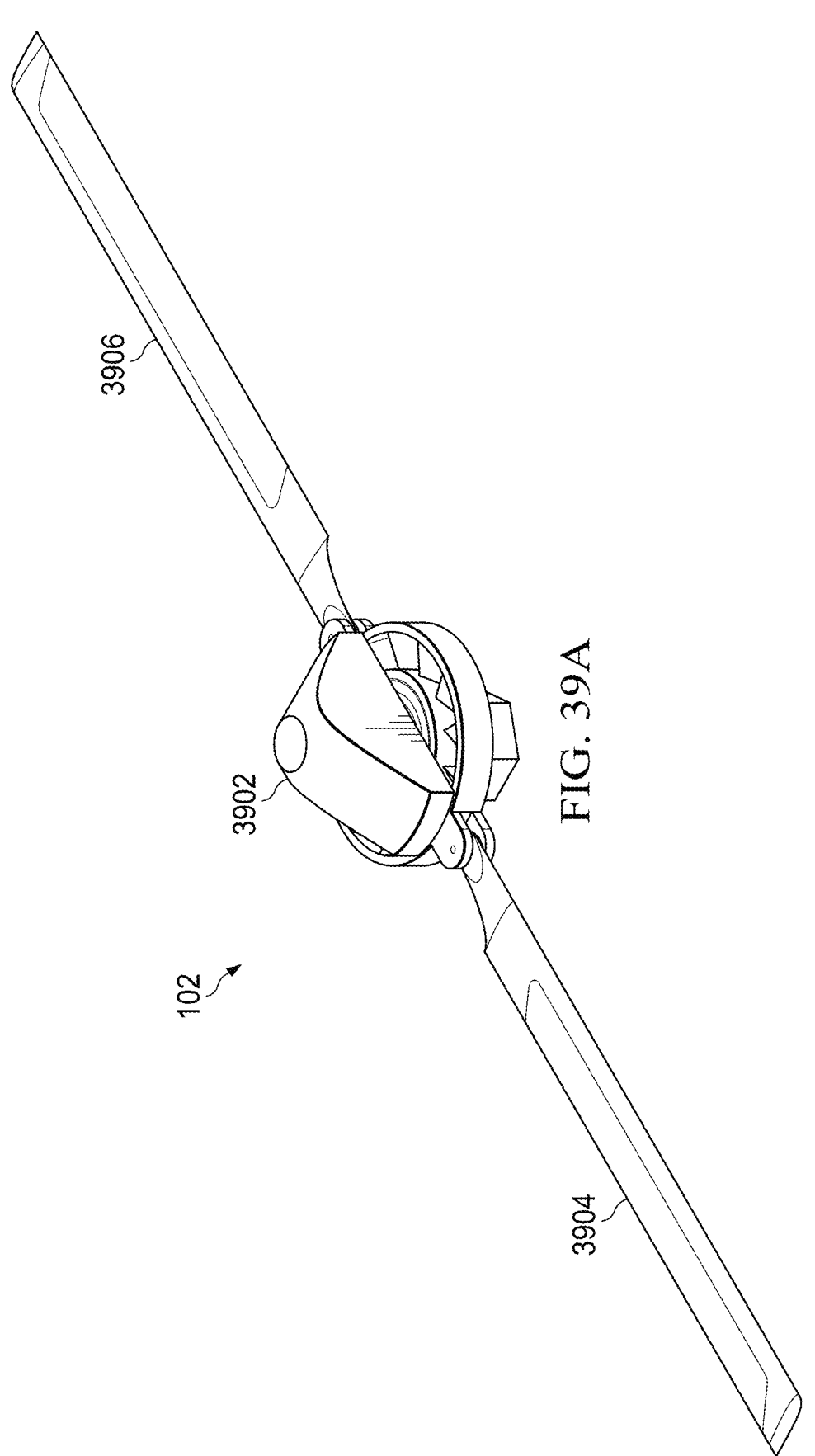
FIGS. 39A-39C illustrate another embodiment of a hovering distribution device.
Figures 39B, 39C:
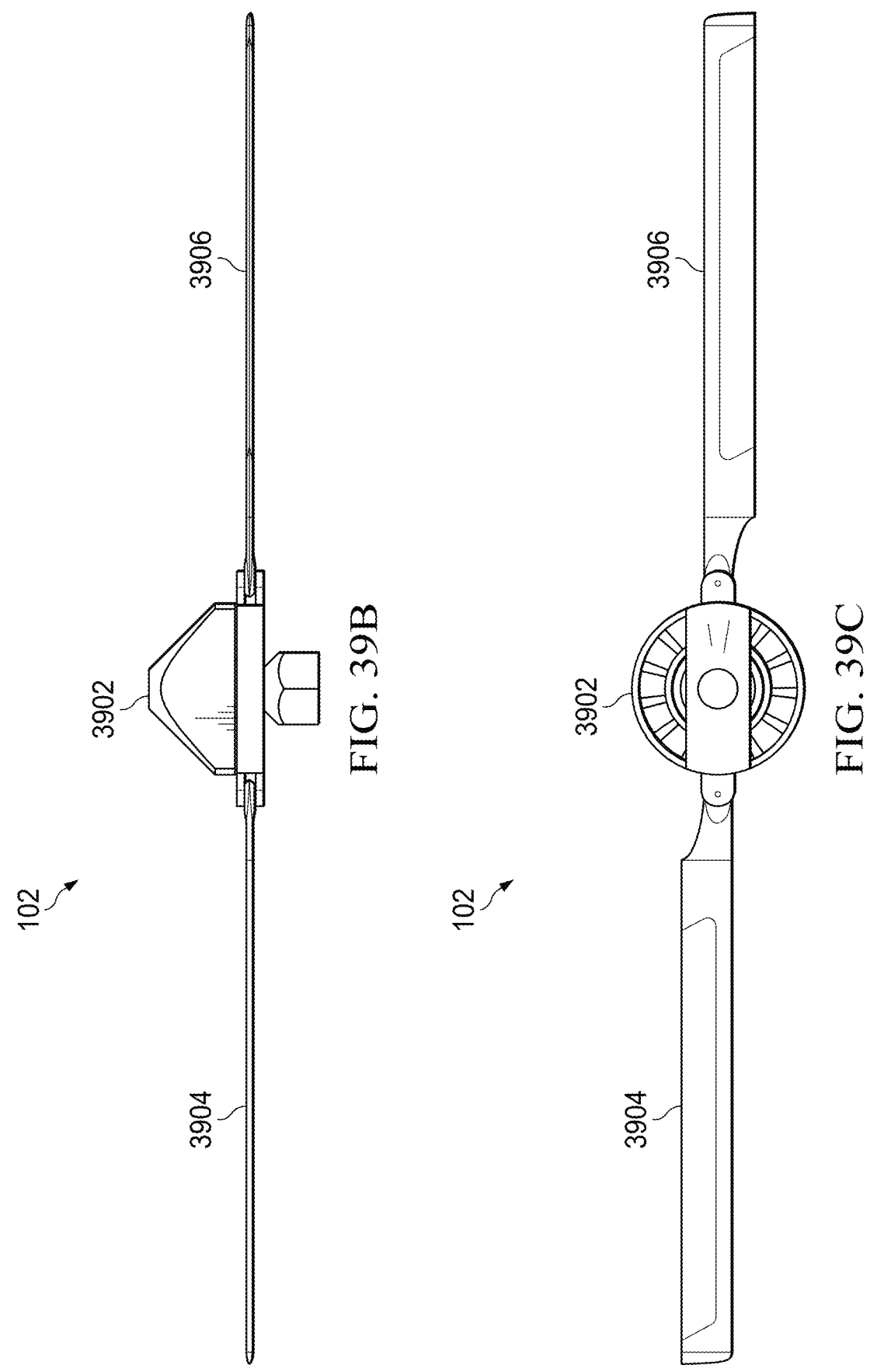
Figure 40A:
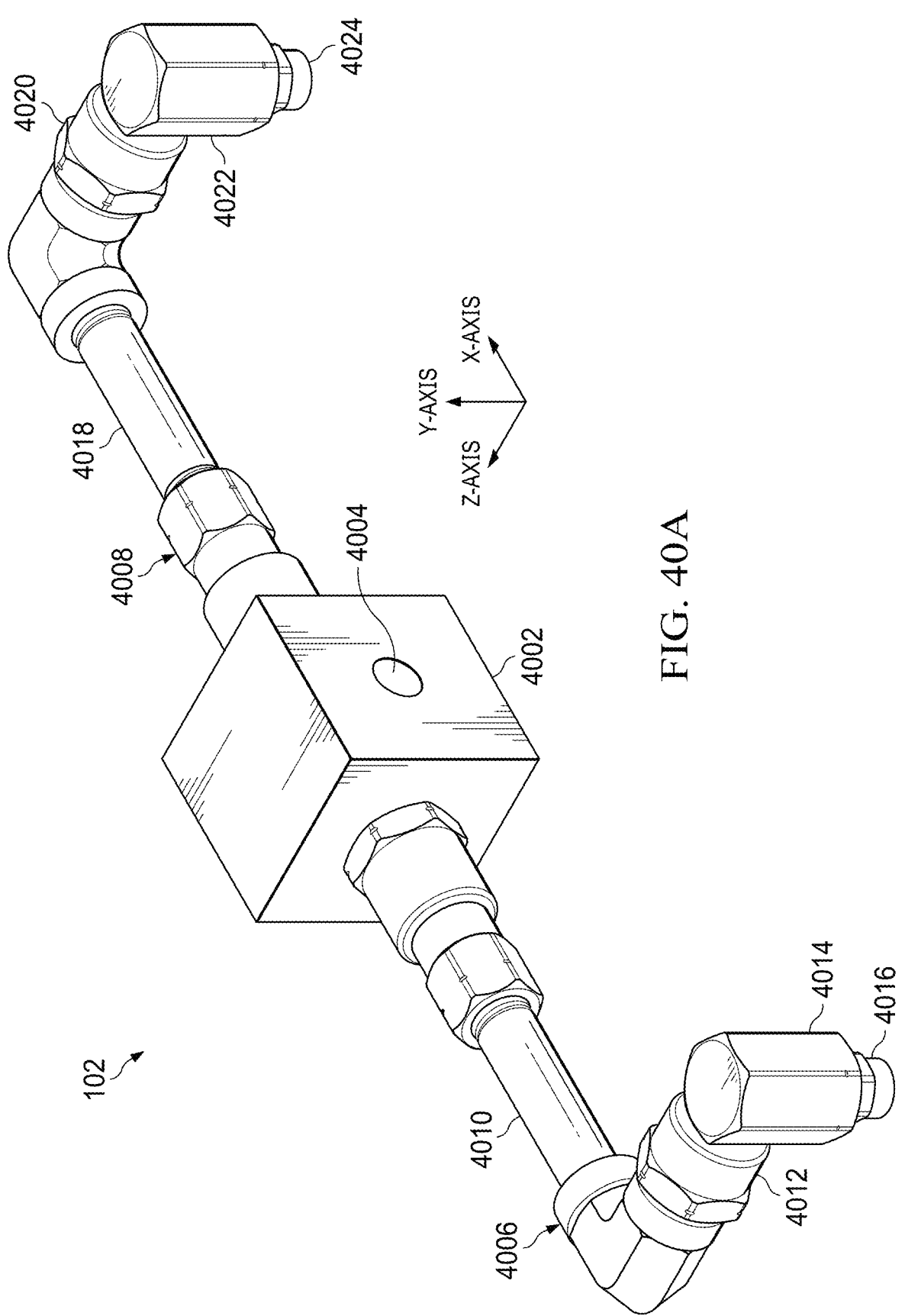
FIGS. 40A-40D illustrate another embodiment of a hovering distribution device.
Figure 40B:
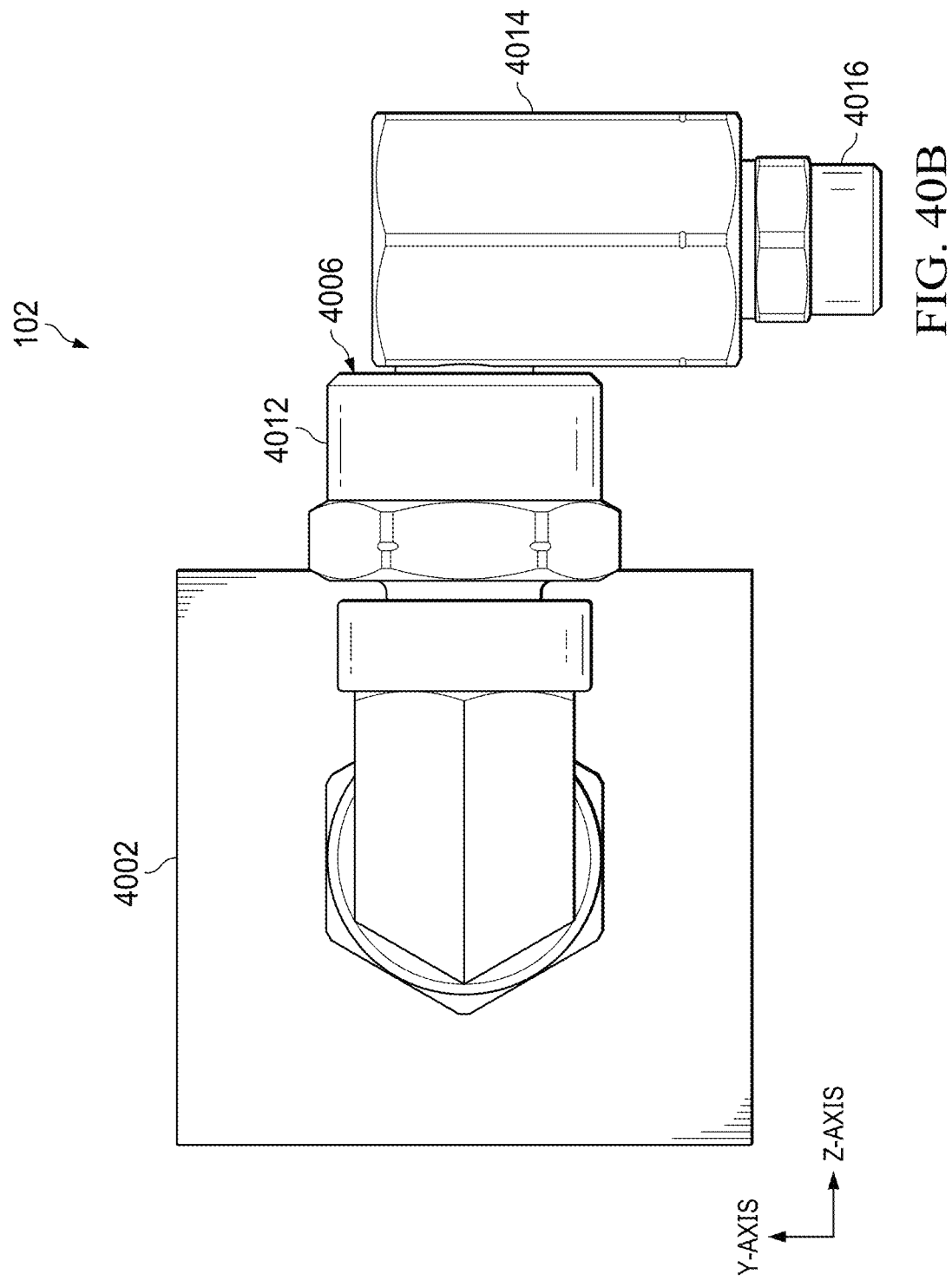
Figure 40C:
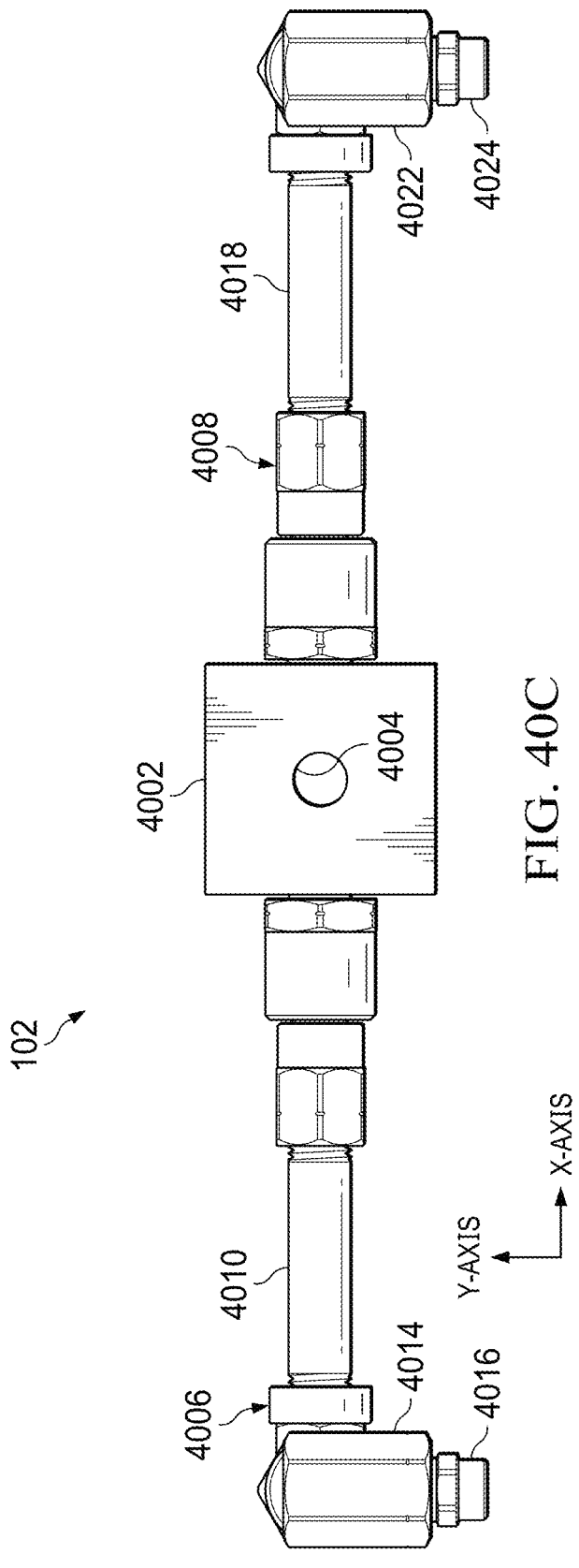
Figure 40D:
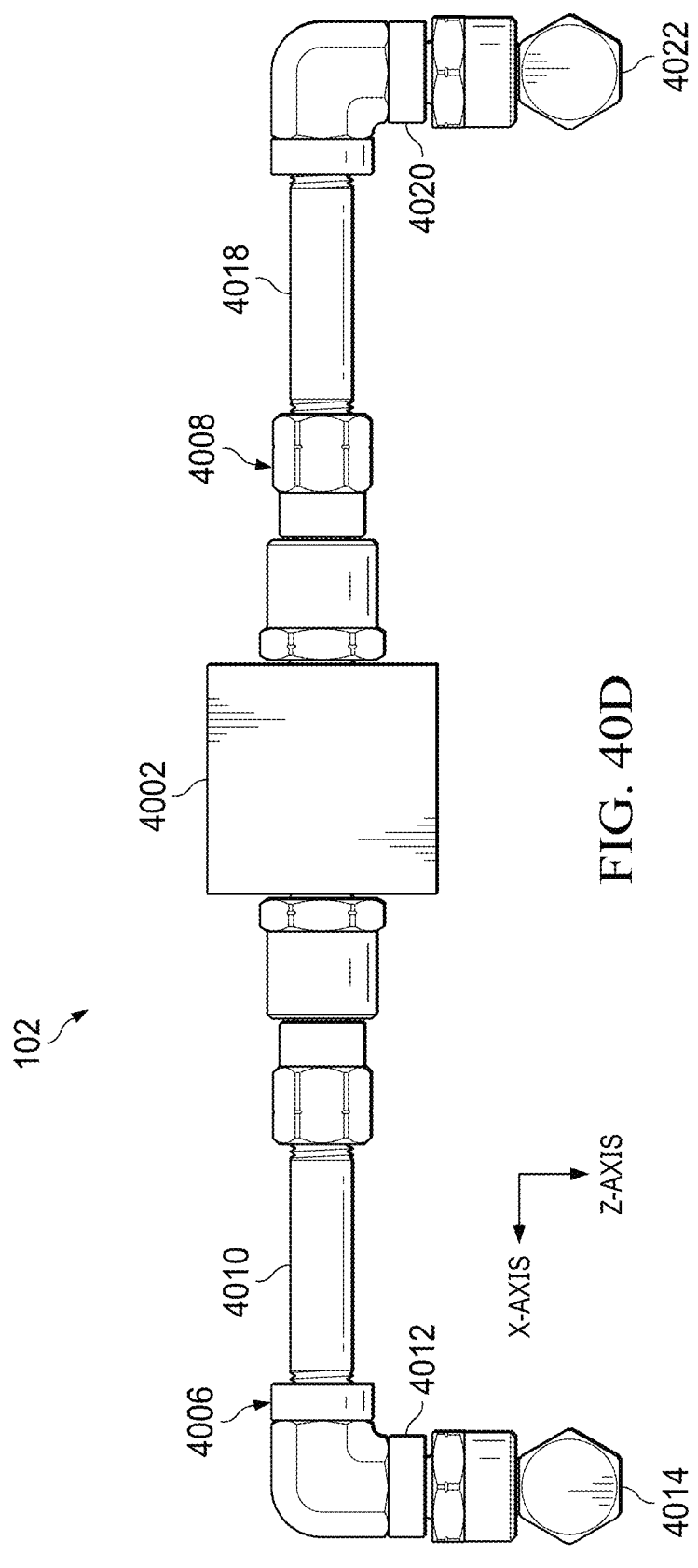
Figure 41A:
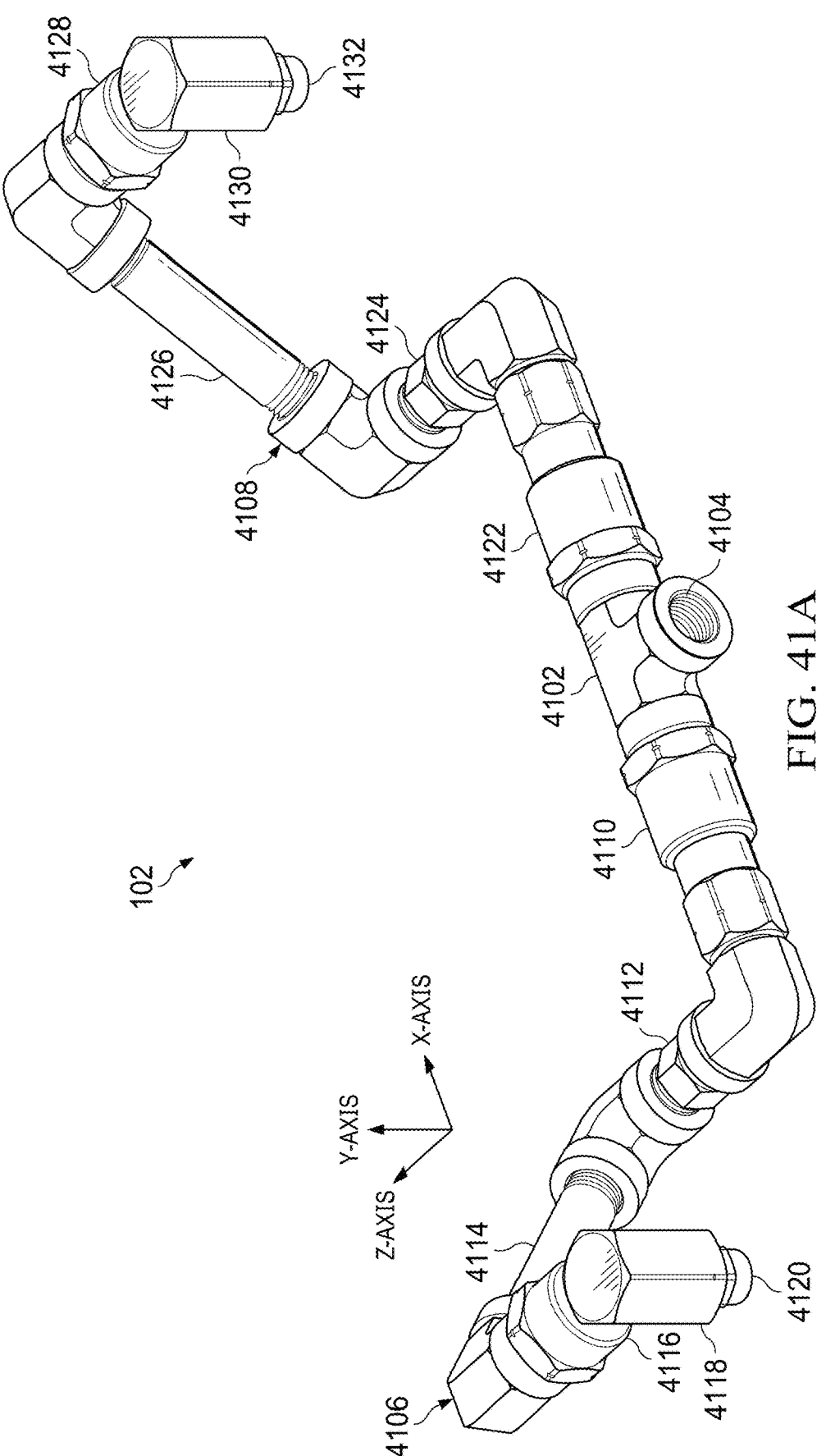
FIGS. 41A-41D illustrate another embodiment of a hovering distribution device.
Figure 41B:
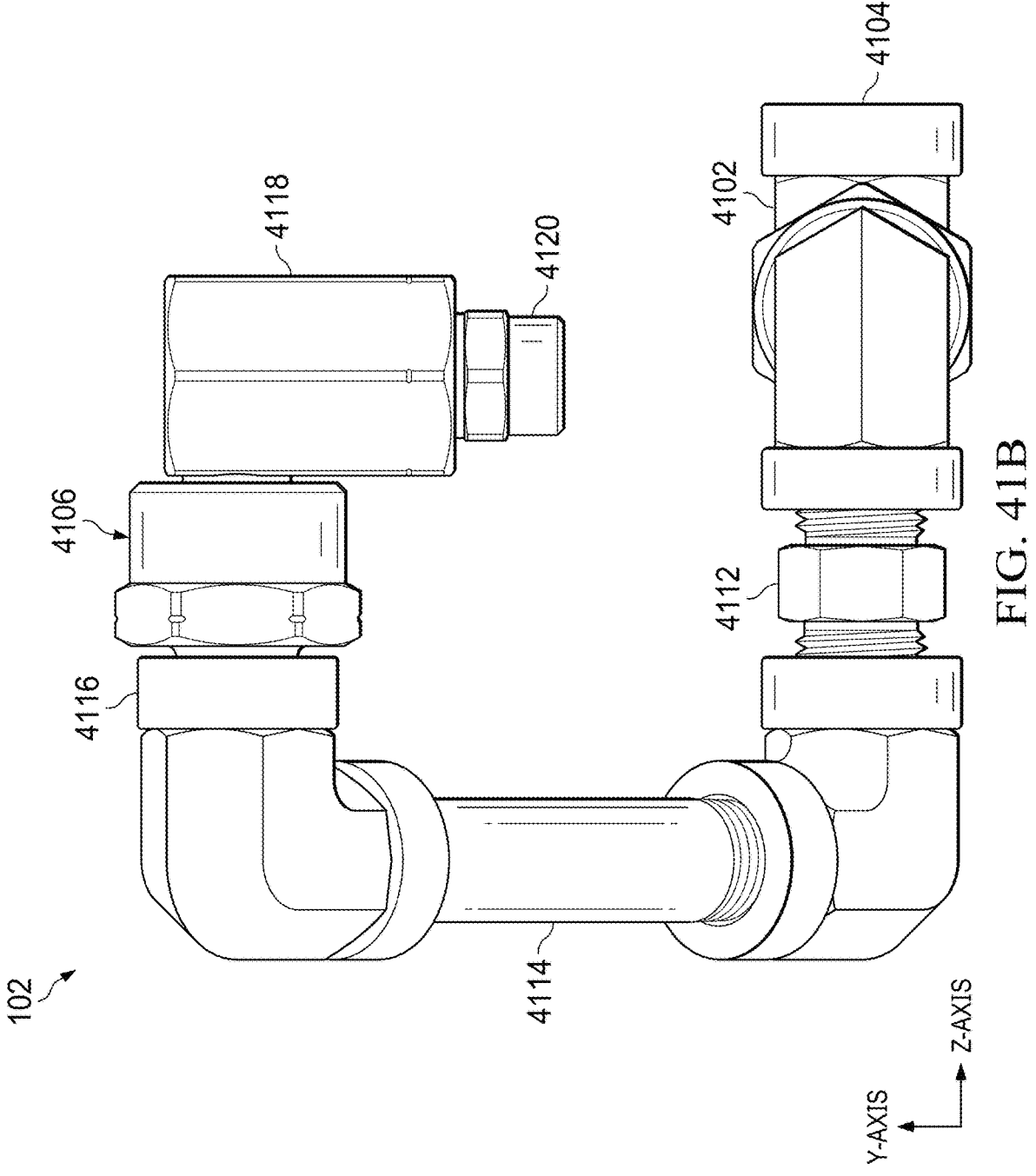
Figure 41C:
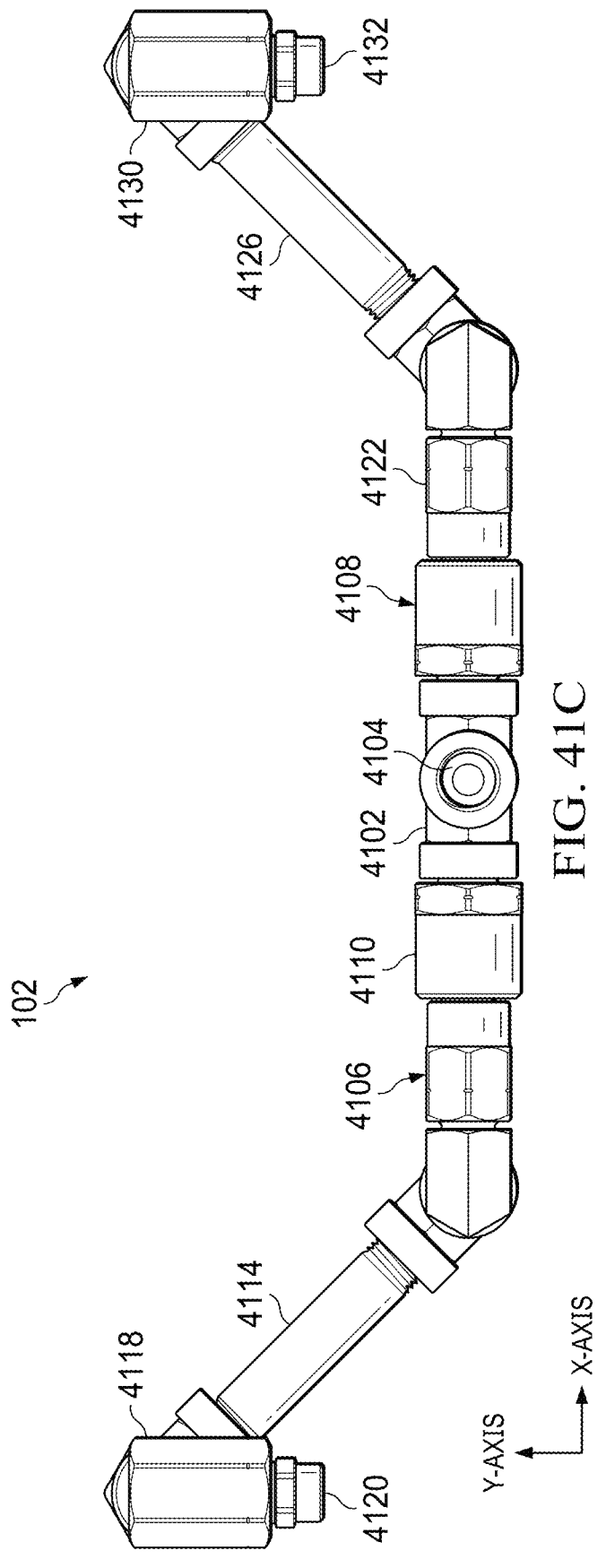
Figure 41D:
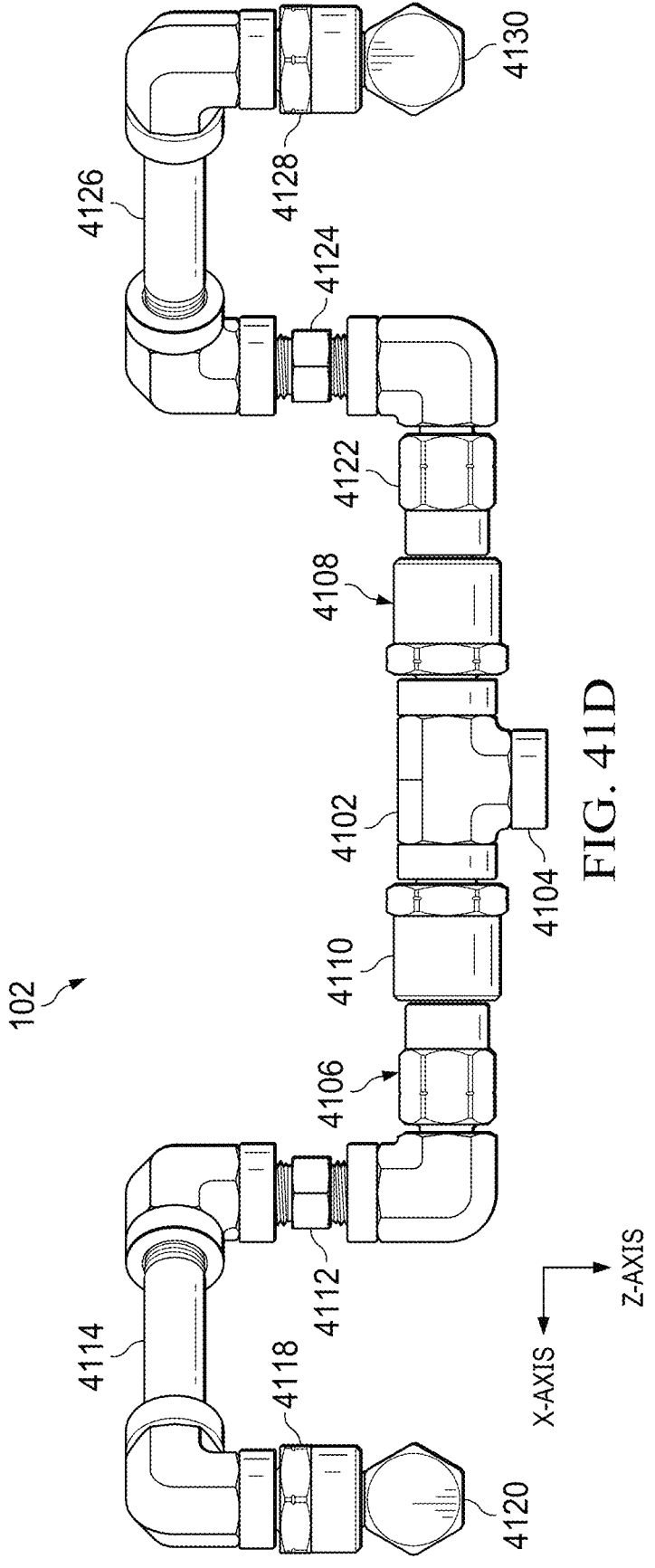
Figure 42A:
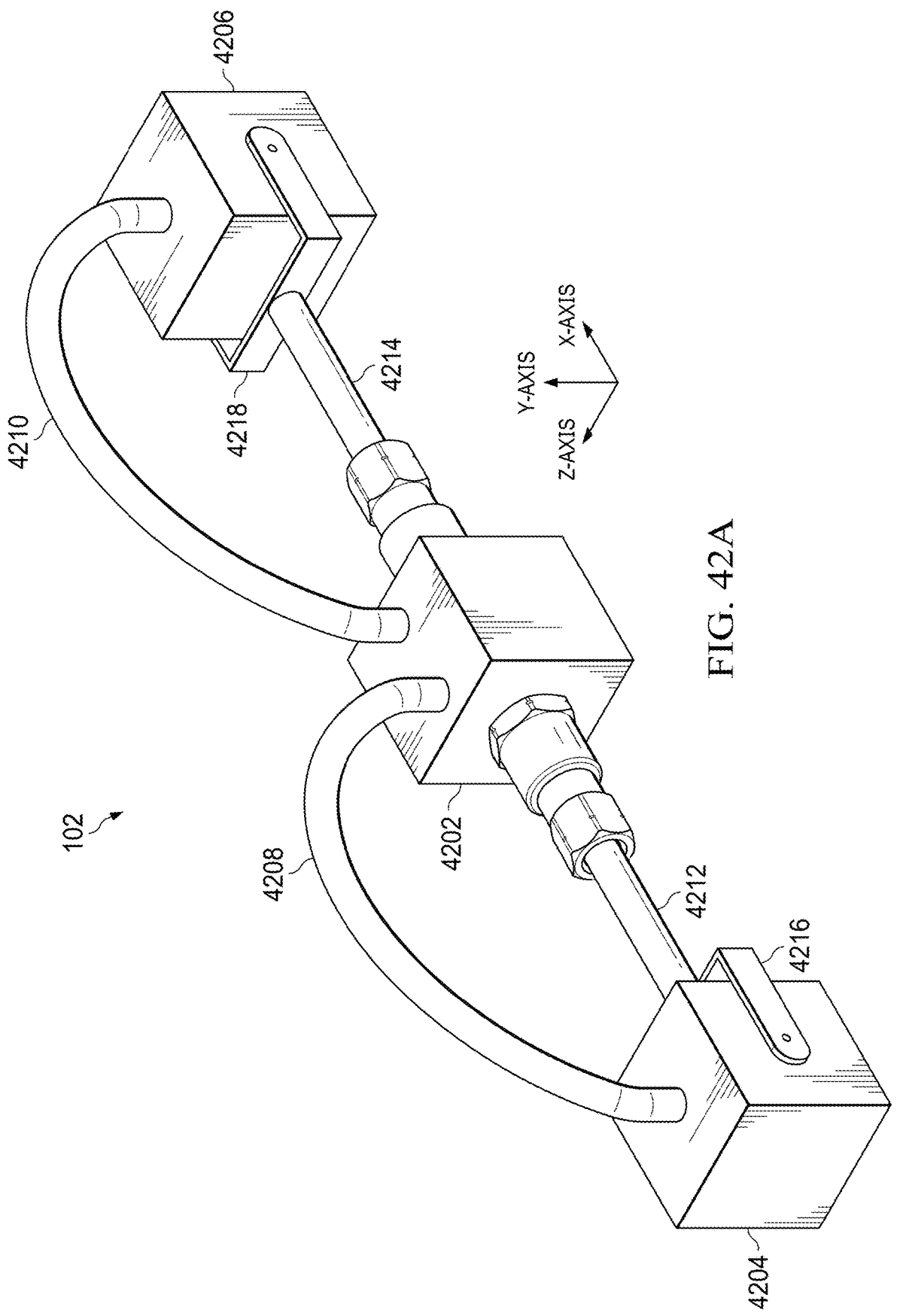
FIGS. 42A-42E illustrate another embodiment of a hovering distribution device.
Figure 42B:
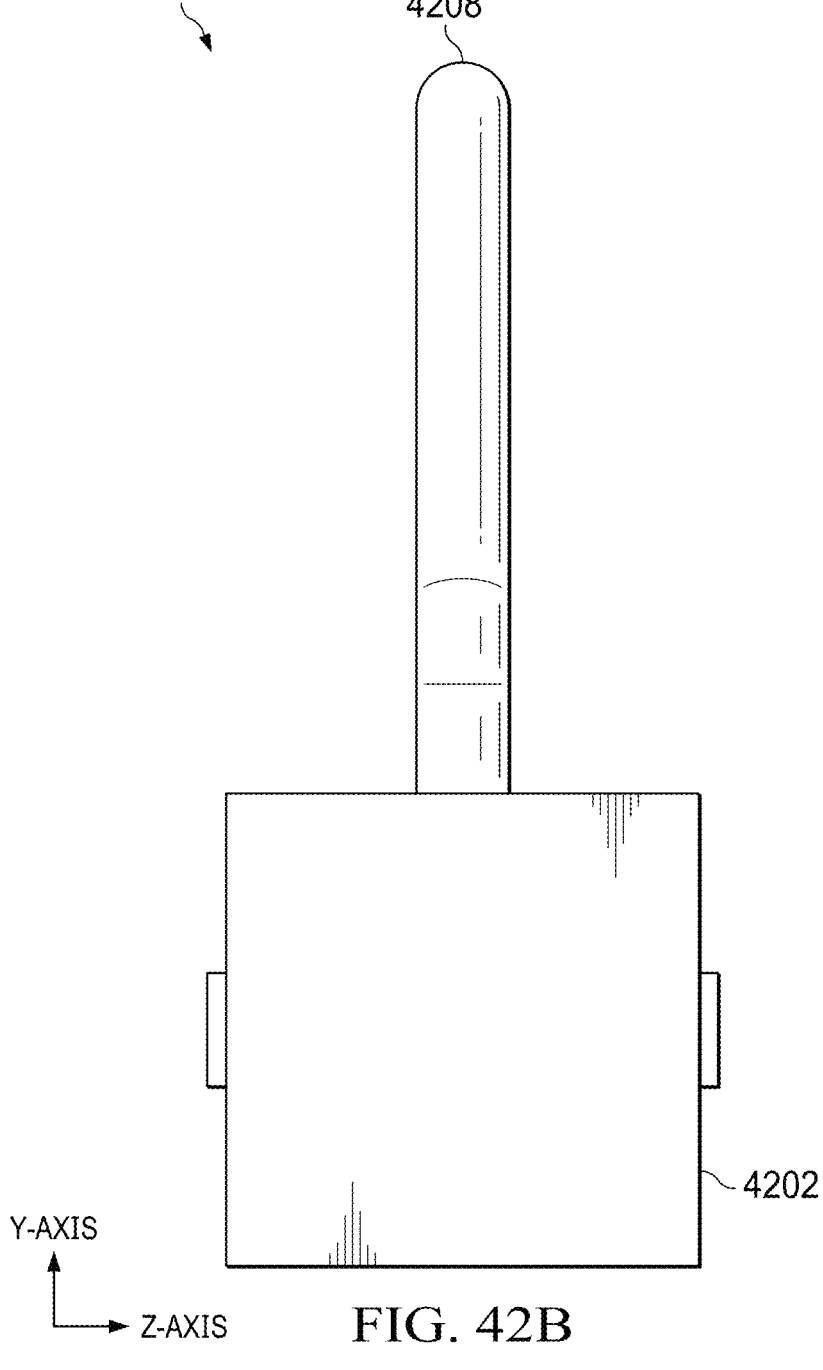
Figure 42C:
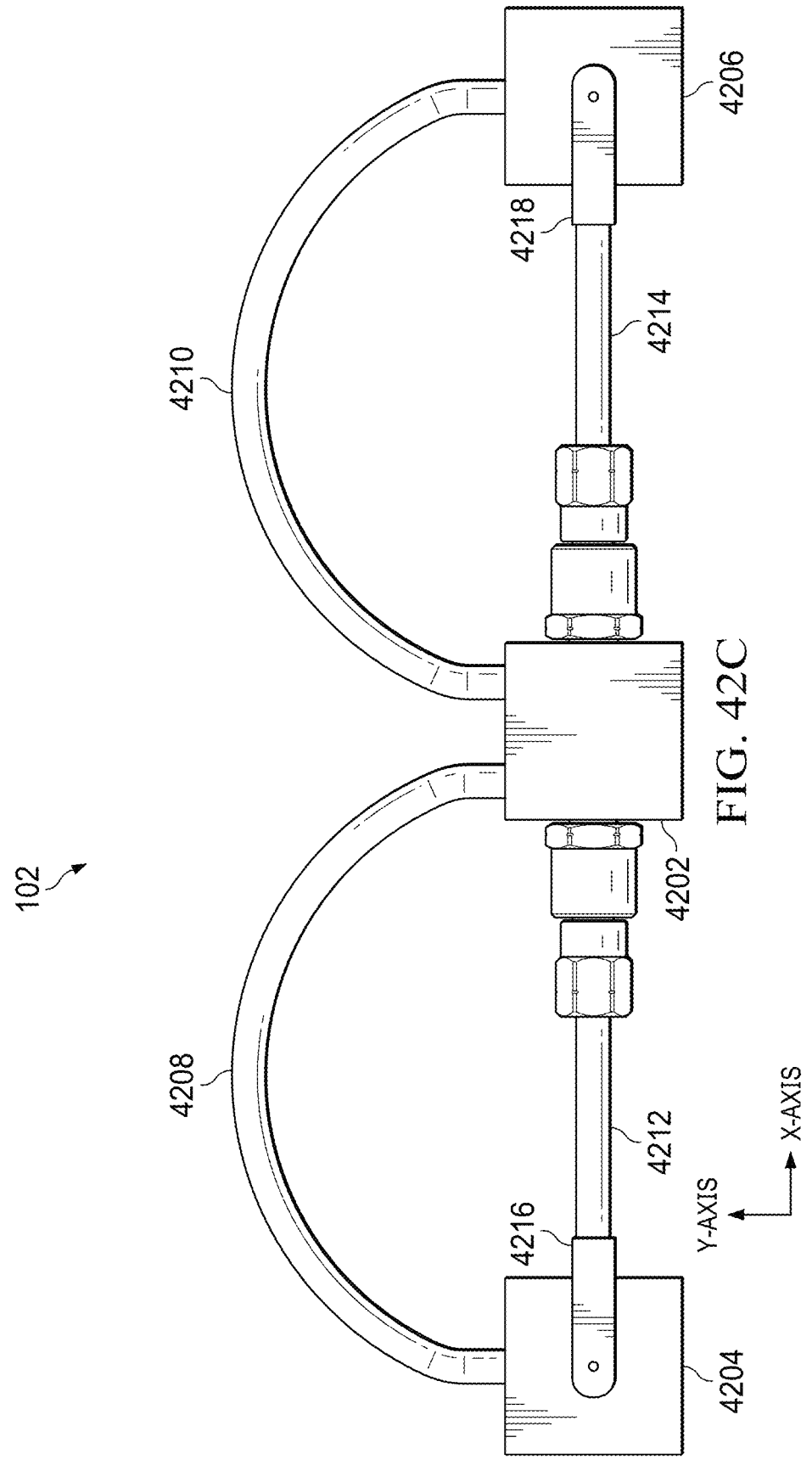
Figure 42D:
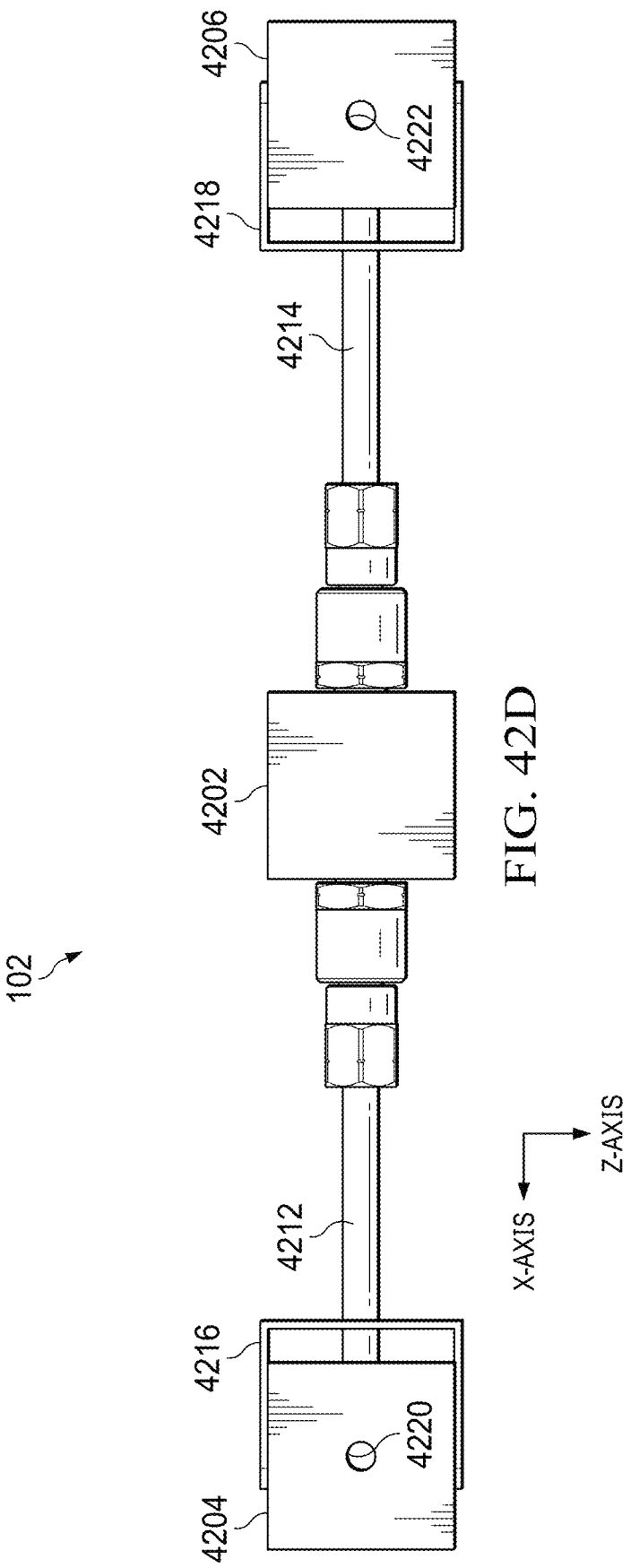
Figure 42E:
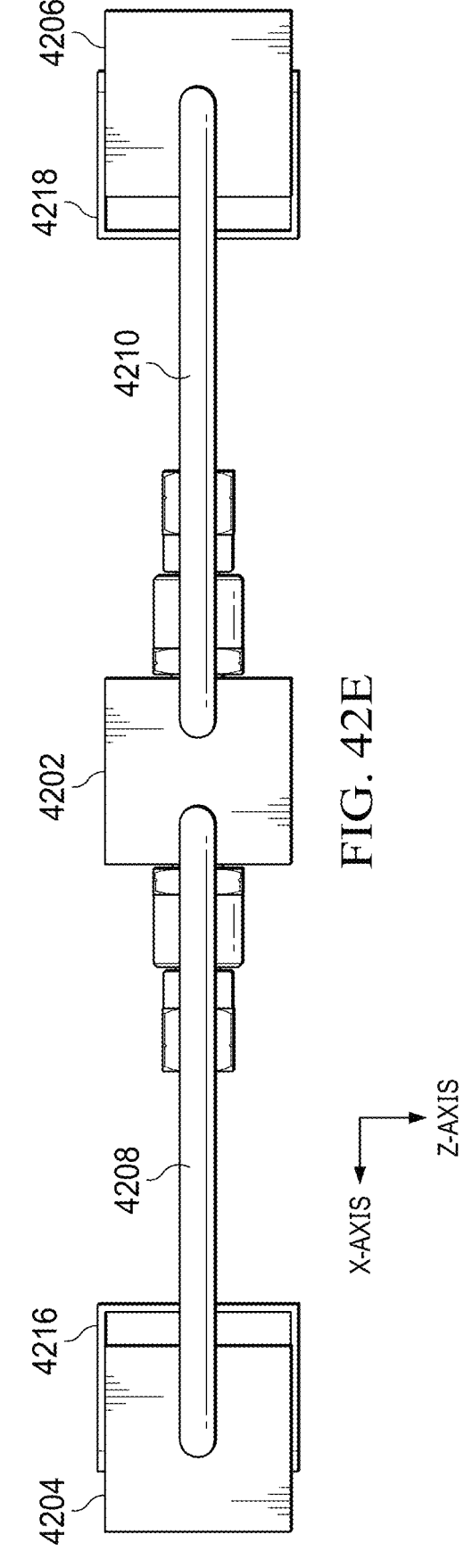

Referring to FIGS. 39A-39C, another embodiment of the hovering distribution device 102 is illustrated. In the present example, the hovering distribution device 102 includes a central section 3902 with two propeller blades 3904 and 3906. The propeller blades 3904 and 3906 may be used to provide lift and/or orientation control for the hovering distribution device 102 in addition to, or as an alternative to, other lift/orientation control sources such as nozzles. In other embodiments, the central section 3902 and the propeller blades 3904/3906 may be smaller components of the hovering distribution device 102, and may be incorporated into a nozzle and/or other portion of the device 102.

Referring to FIGS. 40A-40D, another embodiment of the hovering distribution device 102 is illustrated. In the present example, the hovering distribution device 102 includes a single section 4002. The section 4002 includes an inlet port 4004 configured to receive a hose (e.g., the hose 106 of FIG. 1) and may be coupled to arm assemblies 4006 and 4008. The arm assemblies 4006 and 4008 may be immovably coupled to the section 4002, or may be movably coupled in a manner that enables rotation of the arm assemblies around the x-axis relative to the section 4002.

The arm assembly 4006 may include multiple arm sections with an arm section 4010 coupled to the section 4002, an arm section 4012 coupled to the arm section 4010, and an arm section 4014 coupled to the arm section 4012. A nozzle 4016 may be coupled to the arm section 4014 or the nozzle 4016 may replace the arm section 4014 (e.g., the arm section 4014 may be the nozzle 4016). It is understood that the number of arm sections may vary, with more or fewer used in other embodiments.

In the present embodiment, the arm sections 4010, 4012, and 4014 may be adjusted relative to one another. Such adjustments may be manual (e.g., before the fluid distribution vehicle 102 is airborne) and/or may be controlled via control mechanisms in the device 102. For example, as illustrated, the arm section 4010 may be coupled to the section 4002 in a manner that enables rotation of the arm section 4010 around the x-axis relative to the section 4002. The arm section 4012 may be coupled to the arm section 4010 in a manner that enables rotation of the arm section 4012 around the x-axis relative to the arm section 4010. The arm section 4014 may be coupled to the arm section 4012 in a manner that enables rotation of the arm section 4014 around the z-axis relative to the arm section 4012. In other embodiments, one or more of the arm sections 4010, 4012, and 4014 may be fixed to prevent movement relative to an adjoining arm section.

The arm assembly 4008 may include multiple arm sections with an arm section 4018 coupled to the section 4002, an arm section 4020 coupled to the arm section 4018, and an arm section 4022 coupled to the arm section 4020. A nozzle 4024 may be coupled to the arm section 4022 or the nozzle 4024 may replace the arm section 4022 (e.g., the arm section 4022 may be the nozzle 4024). It is understood that the number of arm sections may vary, with more or fewer used in other embodiments. As described with respect to the arm assembly 4006, some or all of the arm sections 4018, 4020, and 4022 of the arm assembly 4008 may be able to rotate relative to an adjoining arm section or may be immovably coupled.

Referring to FIGS. 41A-41D, another embodiment of the hovering distribution device 102 is illustrated. In the present example, the hovering distribution device 102 includes a single section 4102. The section 4102 includes an inlet port 4104 configured to receive a hose (e.g., the hose 106 of FIG. 1) and may be coupled to arm assemblies 4106 and 4108. The arm assemblies 4106 and 4108 may be immovably coupled to the section 4102, or may be movably coupled in a manner that enables rotation of the arm assemblies around the x-axis relative to the section 4102.

The arm assembly 4106 may include multiple arm sections with an arm section 4110 coupled to the section 4102, an arm section 4112 coupled to the arm section 4110, an arm section 4114 coupled to the arm section 4112, an arm section 4116 coupled to the arm section 4114, and an arm section 4118 coupled to the arm section 4116. A nozzle 4120 may be coupled to the arm section 4118 or the nozzle 4120 may replace the arm section 4118 (e.g., the arm section 4118 may be the nozzle 4120). It is understood that the number of arm sections may vary, with more or fewer used in other embodiments.

In the present embodiment, the arm sections 4110, 4112, 4114, 4116, and 4120 may be adjusted relative to one another. Such adjustments may be manual (e.g., before the fluid distribution vehicle 102 is airborne) and/or may be controlled via control mechanisms in the device 102. For example, as illustrated, the arm section 4110 may be coupled to the section 4102 in a manner that enables rotation of the arm section 4110 around the x-axis relative to the section 4102. The arm section 4112 may be coupled to the arm section 4110 in a manner that enables rotation of the arm section 4112 around the z-axis relative to the arm section 4110. The arm section 4114 may be coupled to the arm section 4112 in a manner that enables rotation of the arm section 4114 around the x-axis and/or y-axis relative to the arm section 4112. The arm section 4118 may be coupled to the arm section 4116 in a manner that enables rotation of the arm section 4118 around the z-axis relative to the arm section 4116. In other embodiments, one or more of the arm sections 4110, 4112, 4114, 4116, and 4120 may be fixed to prevent movement relative to an adjoining arm section.

The arm assembly 4108 may include multiple arm sections with an arm section 4122 coupled to the section 4102, an arm section 4124 coupled to the arm section 4122, an arm section 4126 coupled to the arm section 4124, an arm section 4128 coupled to the arm section 4126, and an arm section 4130 coupled to the arm section 4128. A nozzle 4132 may be coupled to the arm section 4130 or the nozzle 4132 may replace the arm section 4130 (e.g., the arm section 4130 may be the nozzle 4132). It is understood that the number of arm sections may vary, with more or fewer used in other embodiments. As described with respect to the arm assembly 4106, some or all of the arm sections 4122, 4124, 4126, 4128, and 4130 of the arm assembly 4108 may be able to rotate relative to an adjoining arm section or may be immovably coupled.

Referring to FIGS. 42A-42E, another embodiment of the hovering distribution device 102 is illustrated. In the present example, the hovering distribution device 102 includes three sections 4202, 4204, and 4206. The three sections 4202, 4204, and 4206 may be coupled together to allow some movement of the sections relative to one another. The section 4202 includes an inlet port (not shown, but may be in the bottom or on one of the sides) configured to receive a hose (e.g., the hose 106 of FIG. 1) and may be coupled to the sections 4204 and 4206 by arms 4212 and 4214, respectively.

The arms 4212 and 4214 may be rigid or flexible. Even if rigid, the arms 4212 and 4214 may be coupled to the section 4202 in a manner that enables rotation of the arms around the x-axis relative to the section 4202. As shown, the arms 4212 and 4214 may be coupled to the sections 4204 and 4206, respectively, via brackets 4216 and 4218 in a manner that enables some rotation of the sections around the z-axis relative to the section 4202. Hoses 4208 and 4210 provide fluid channels that pass fluid from the section 4202 to their respective sections 4204 and 4206. Sections 4204 and 4206 may include nozzles 4220 and 4222 (FIG. 42D), respectively, that are in fluid communication with the hoses 4208 and 4210.

Figure 43A:
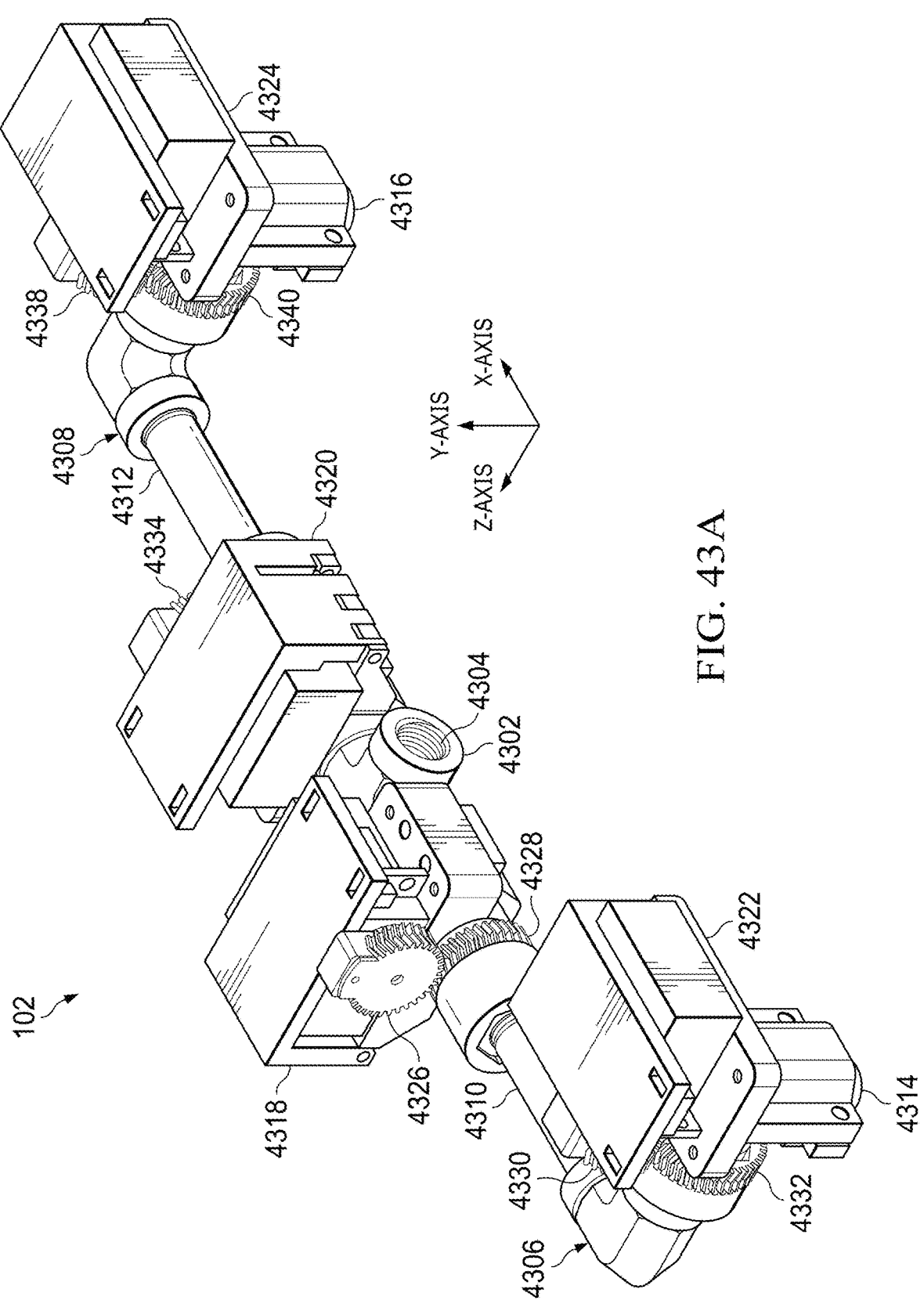
FIGS. 43A-43O illustrate another embodiment of a hovering distribution device.
Figure 43B:
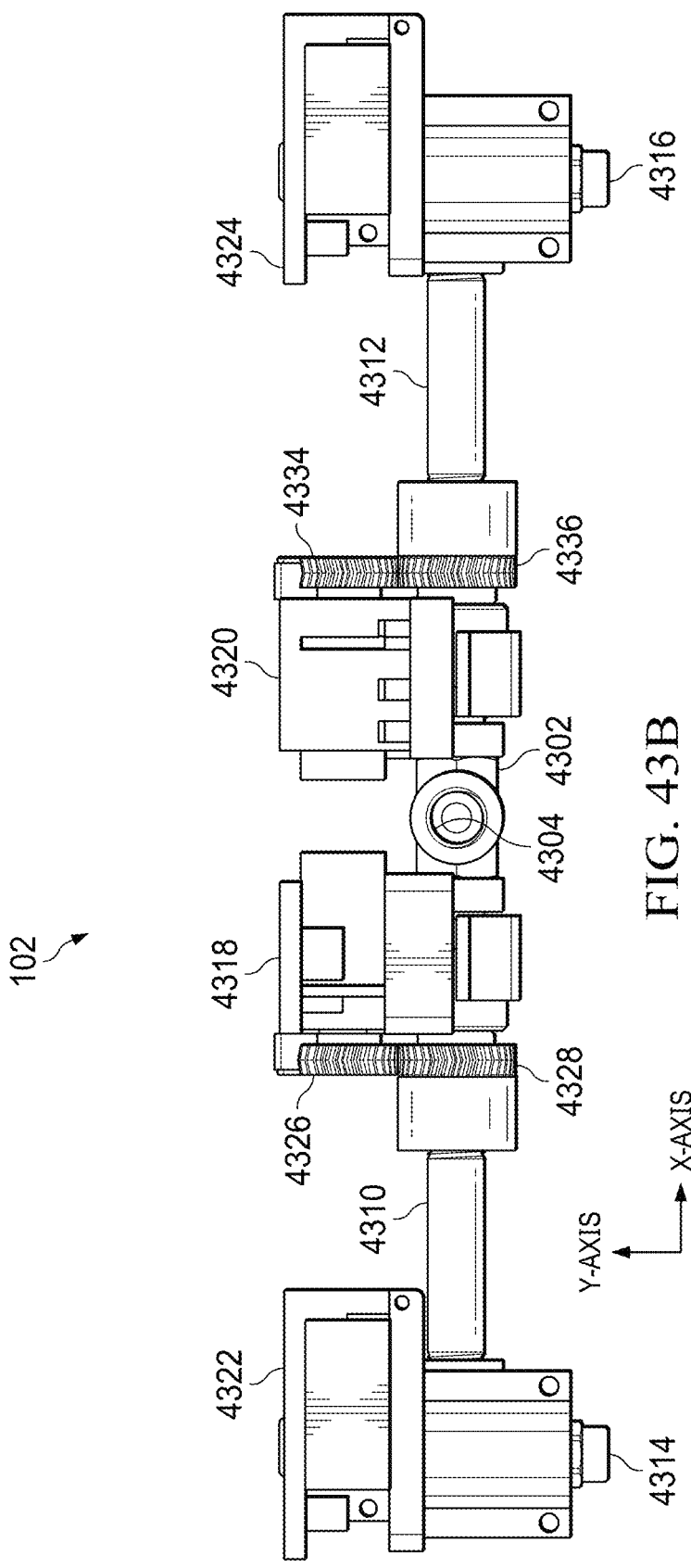
Figure 43C:
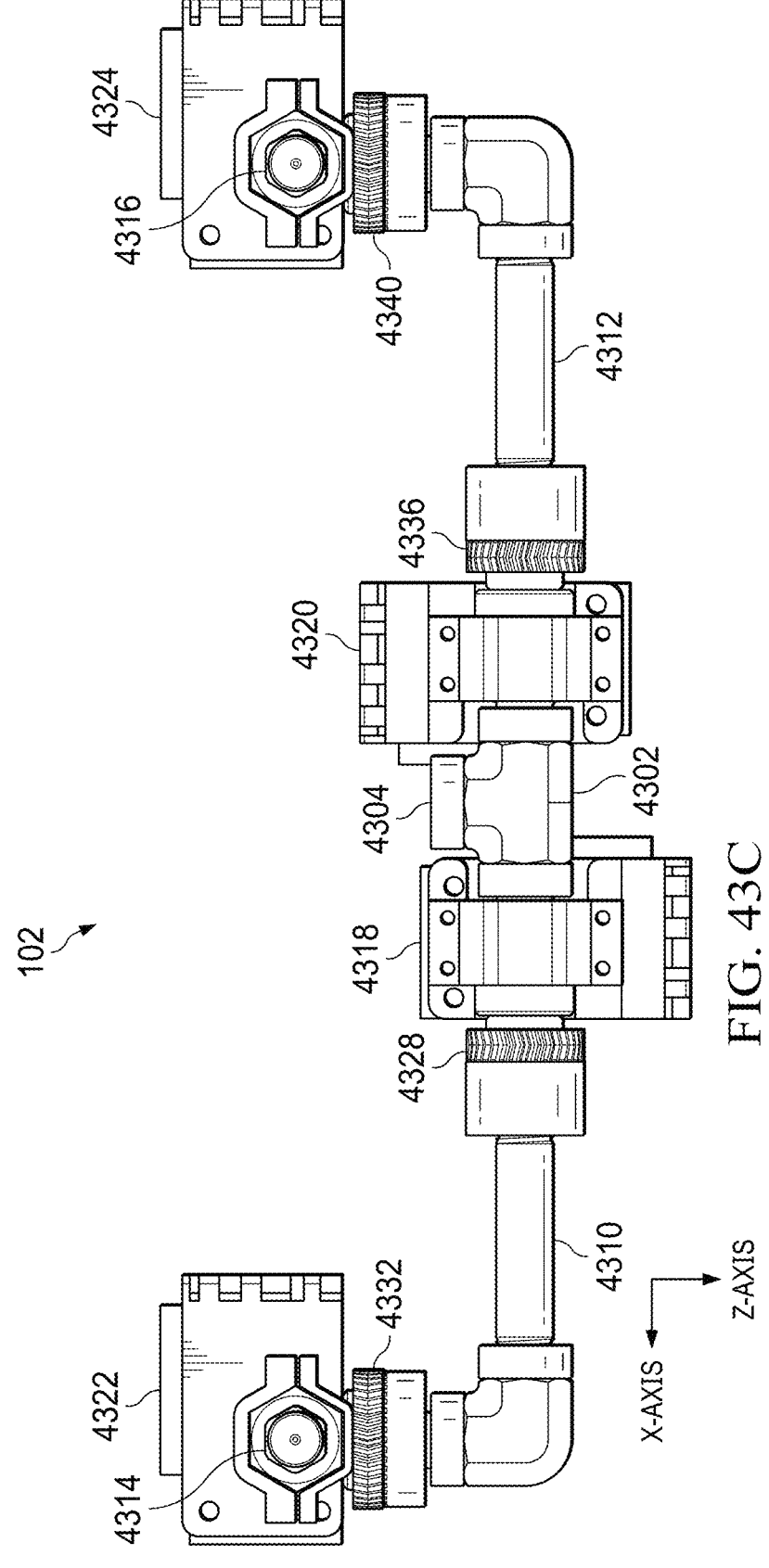
Figure 43D:
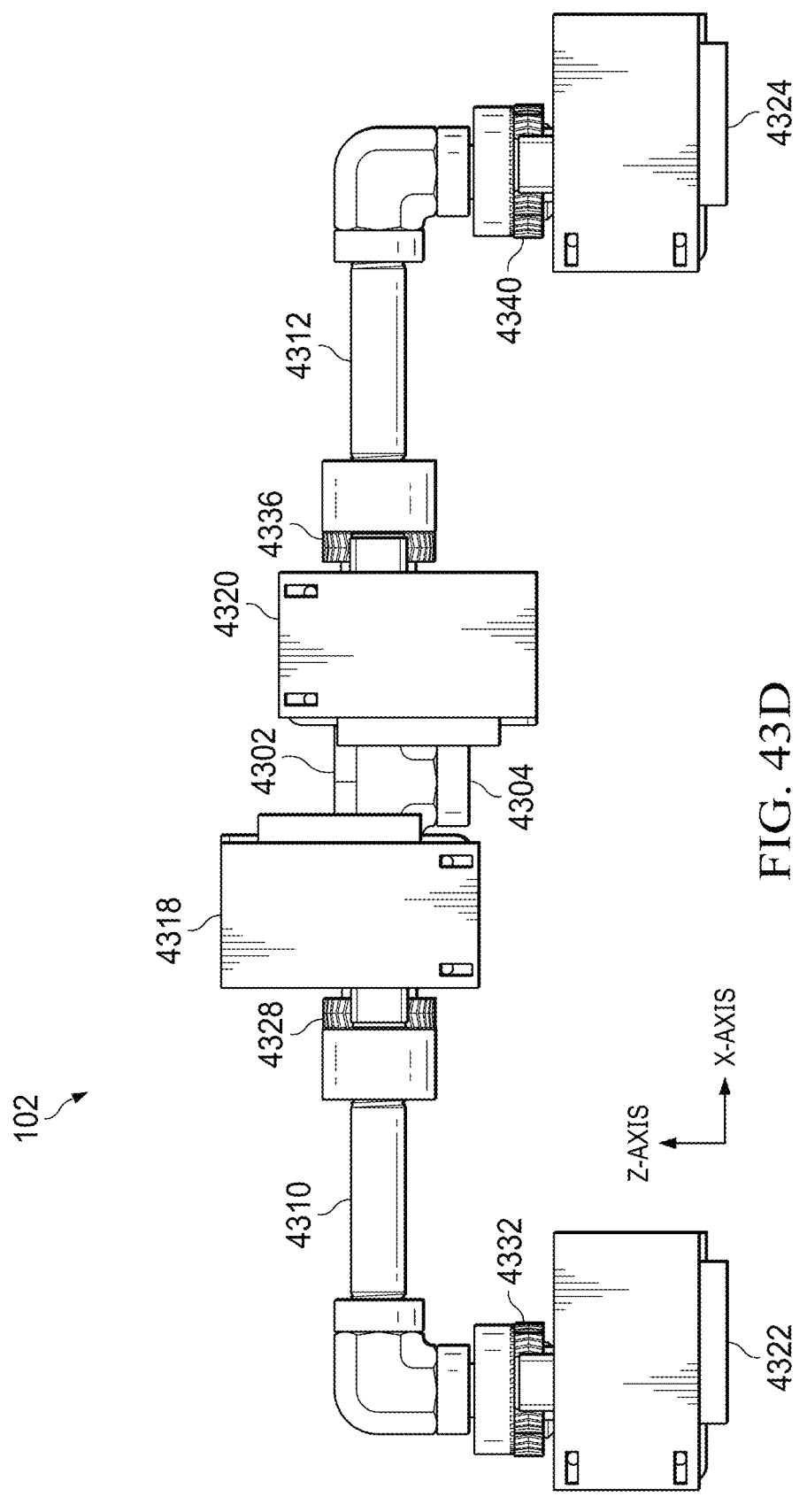
Figure 43E:
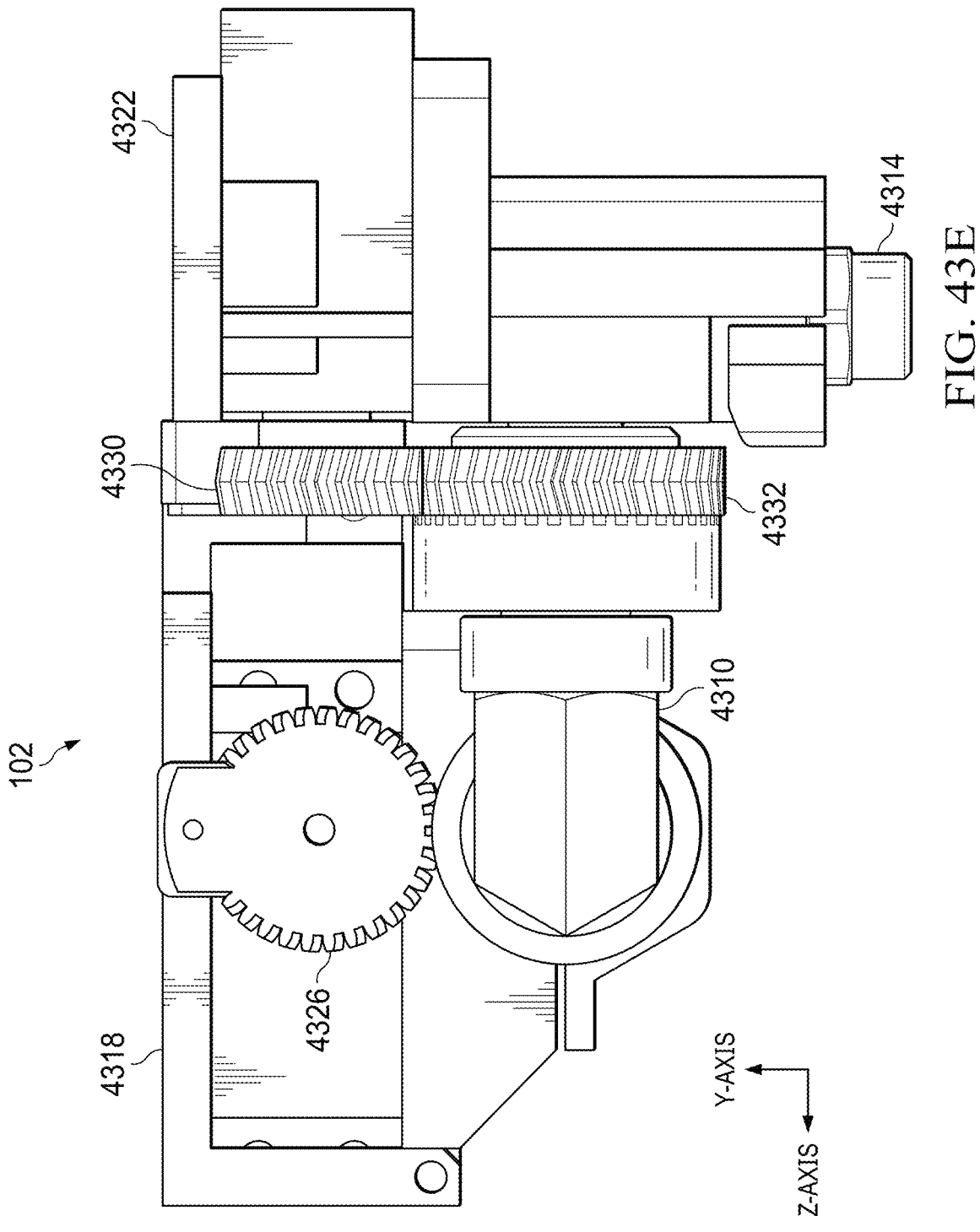
Figure 43F:
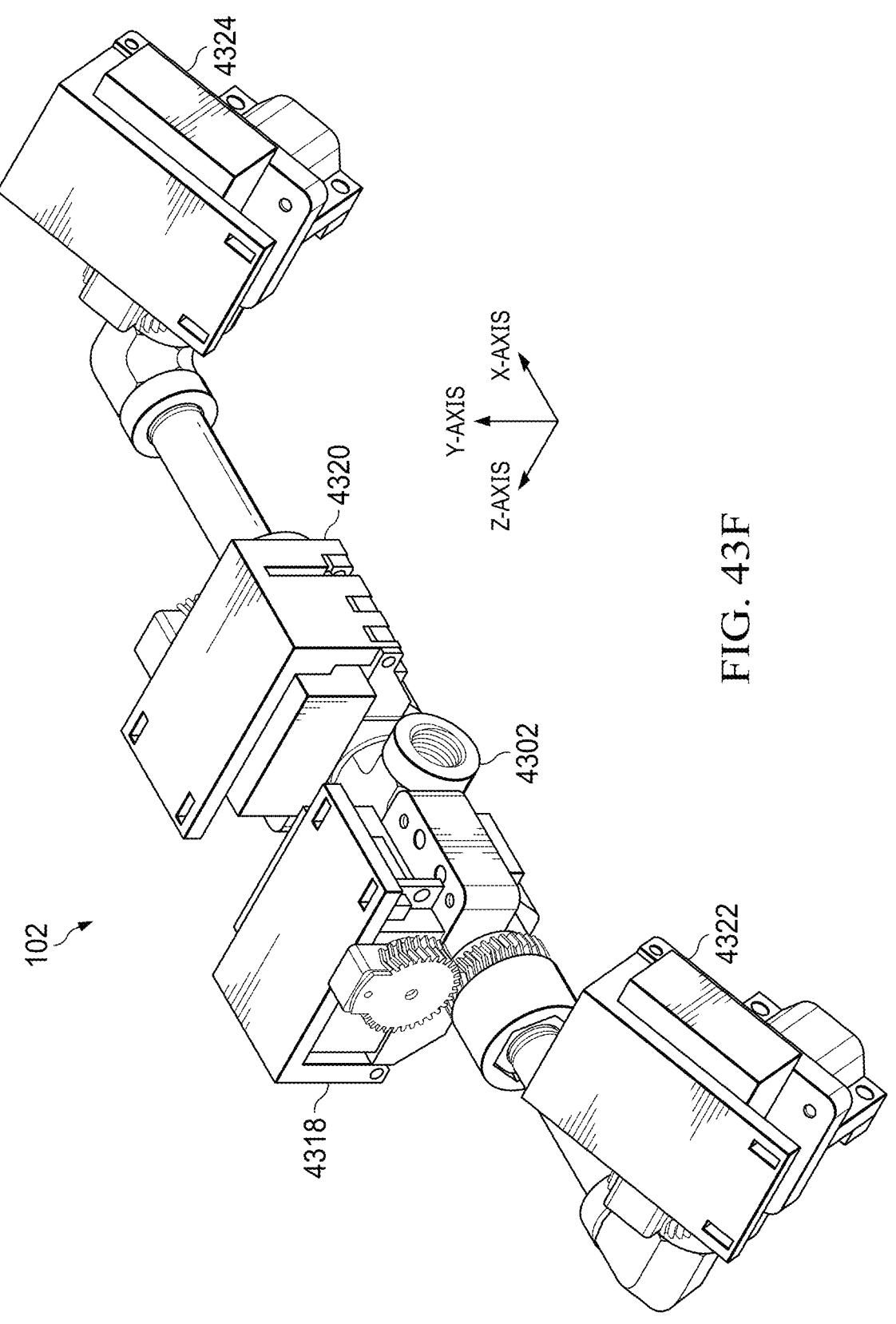
Figure 43G:
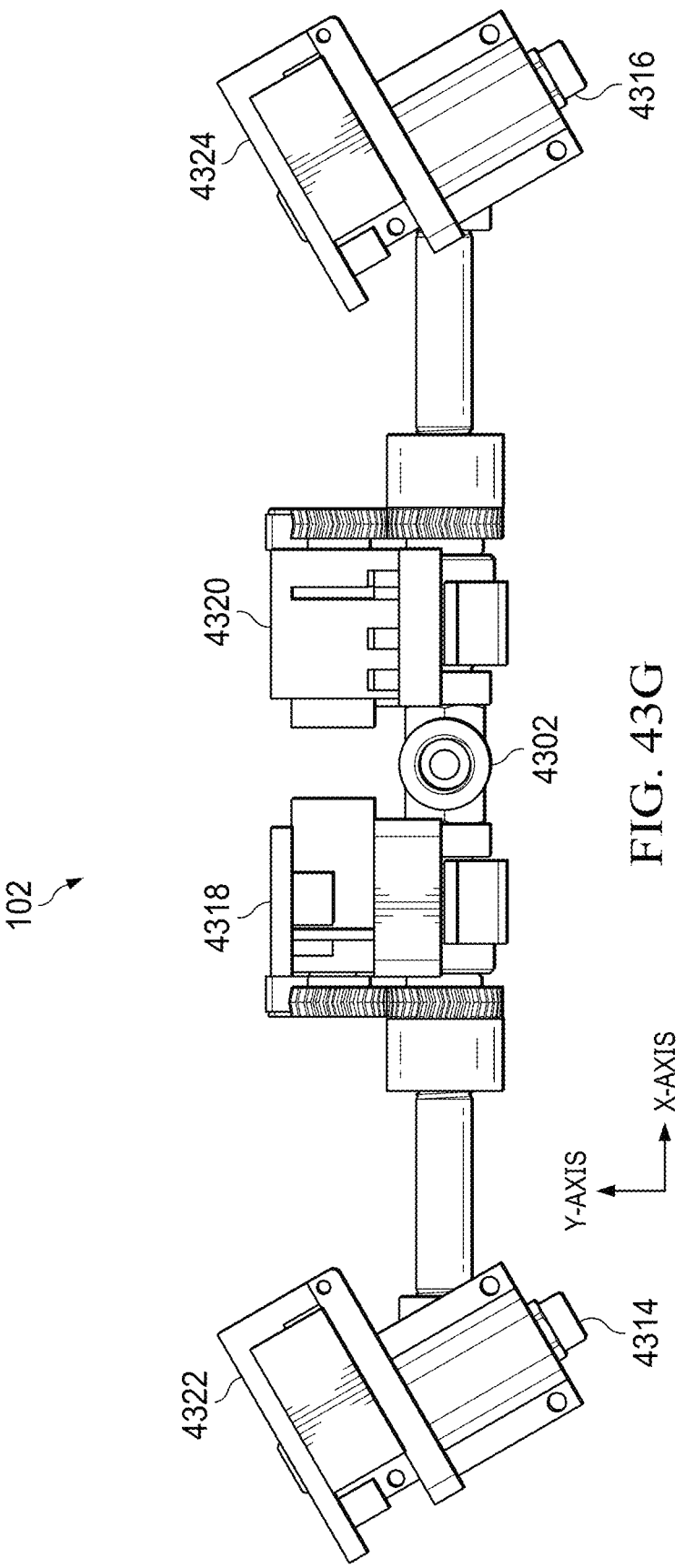
Figure 43H:
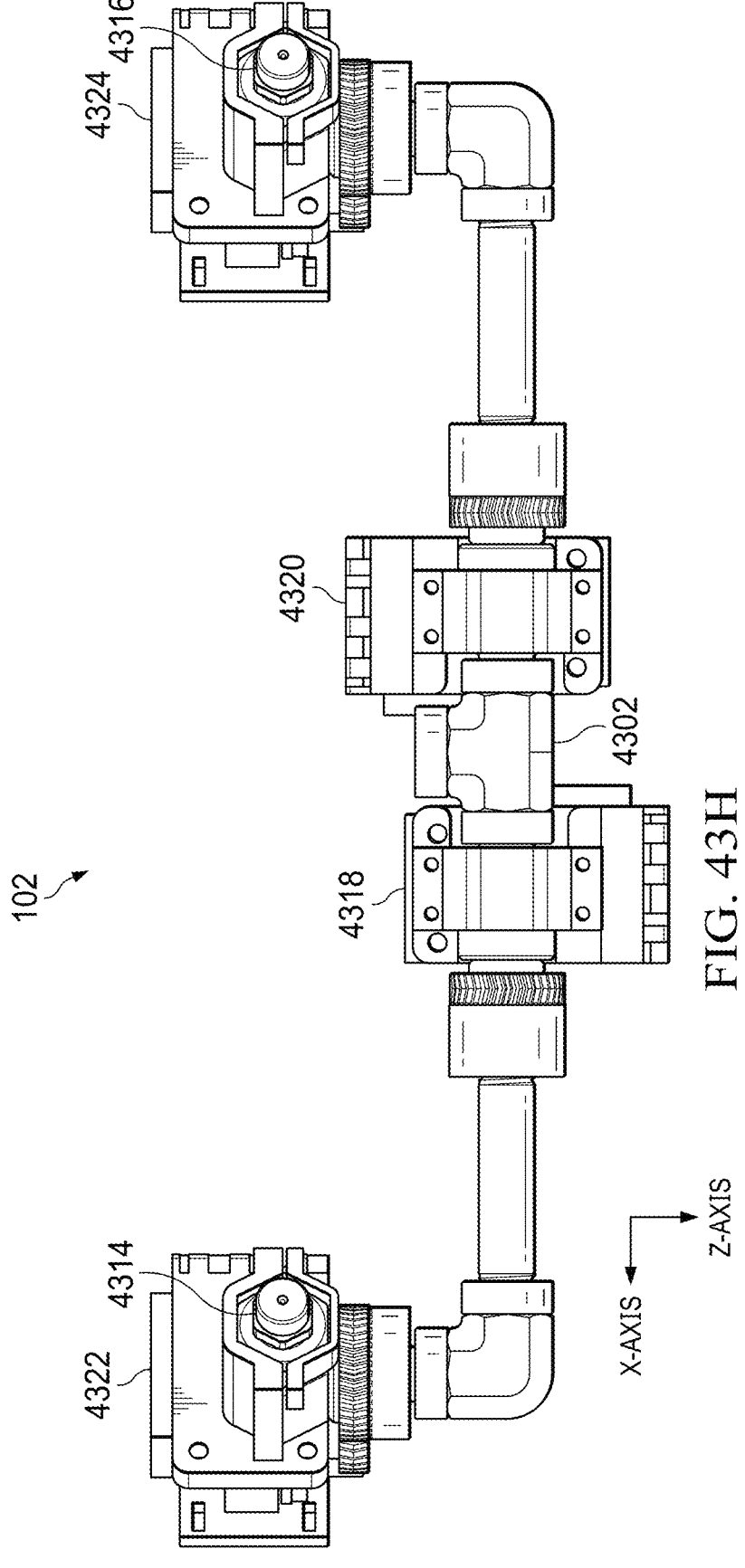
Figure 43I:
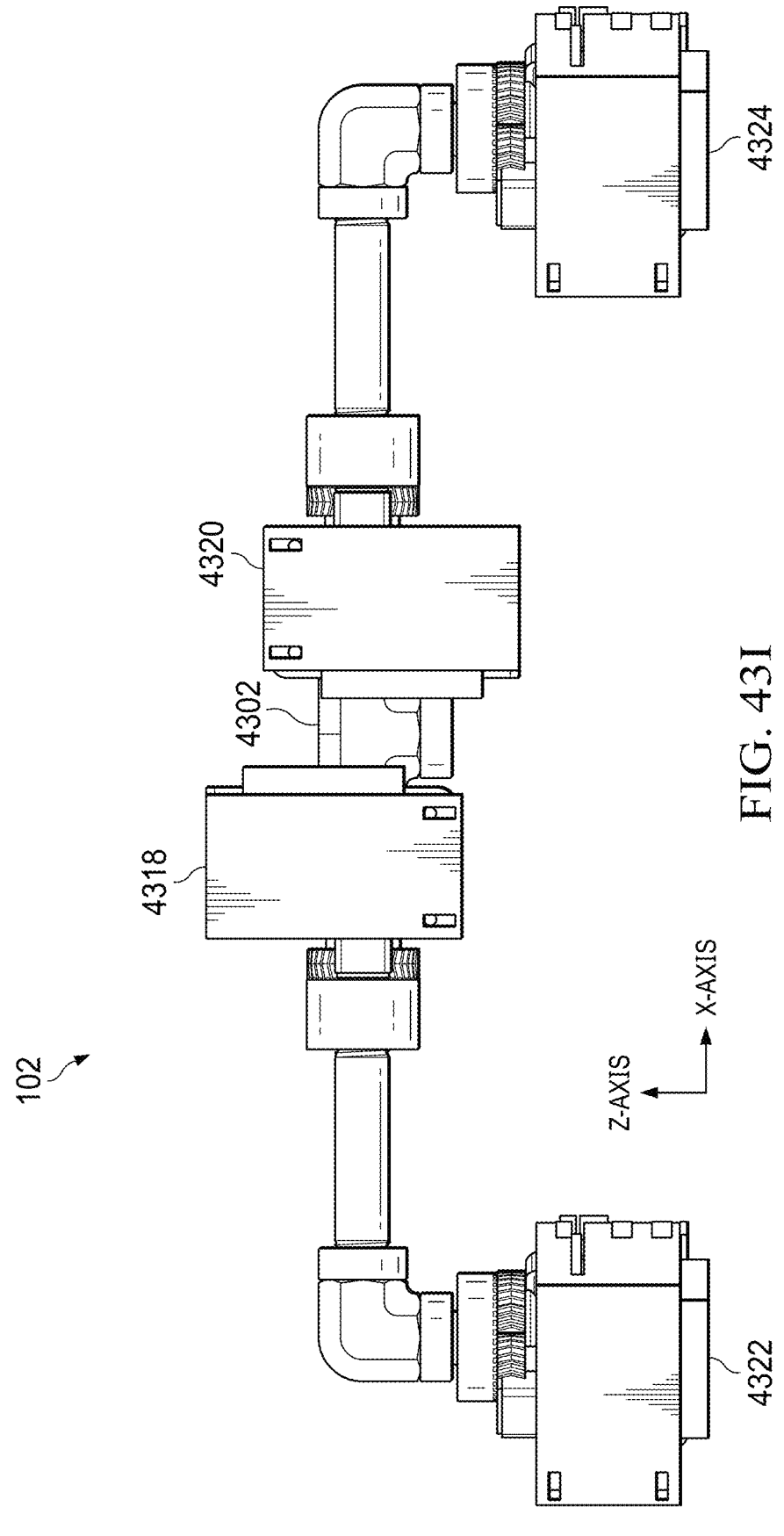
Figure 43J:
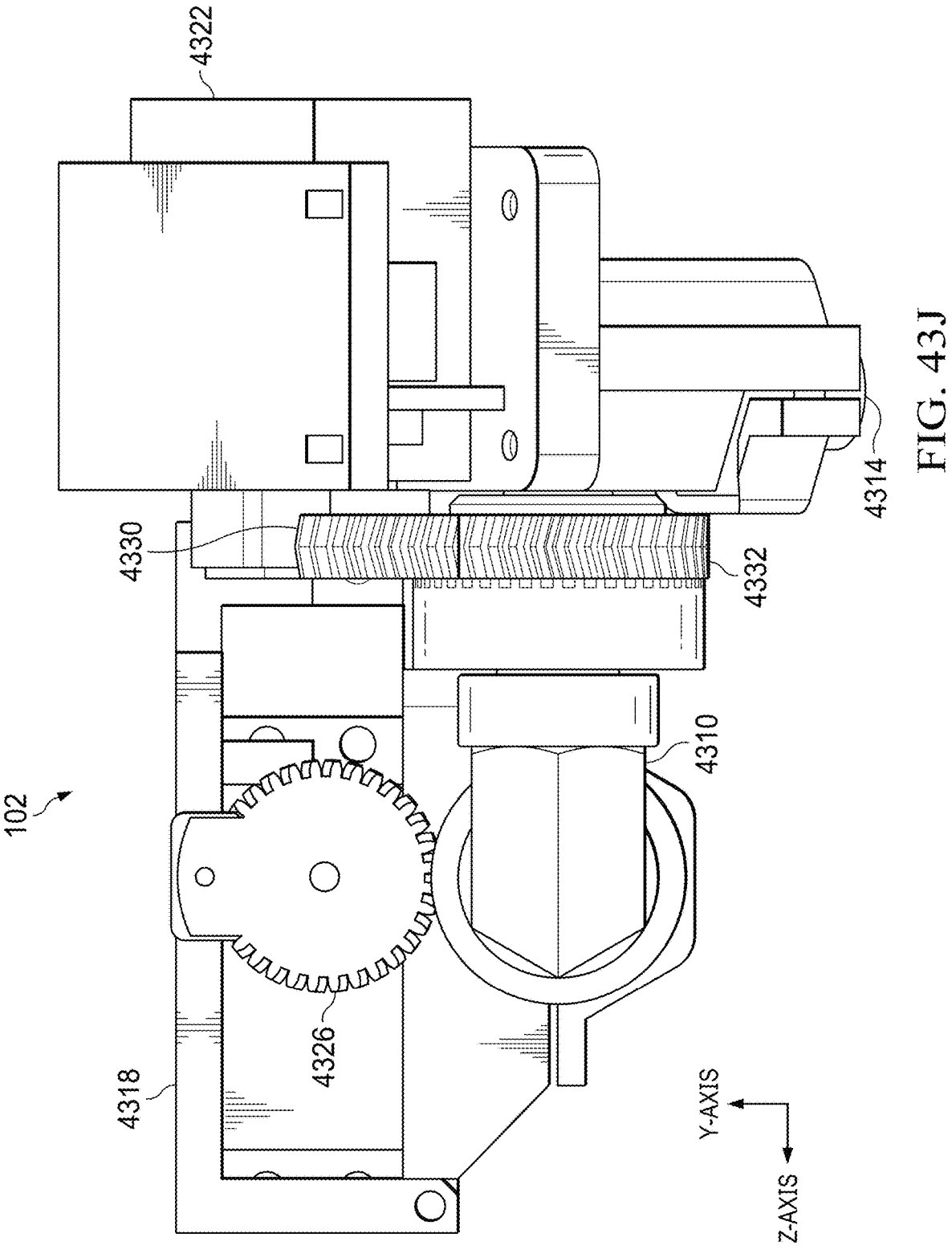
Figure 43K:
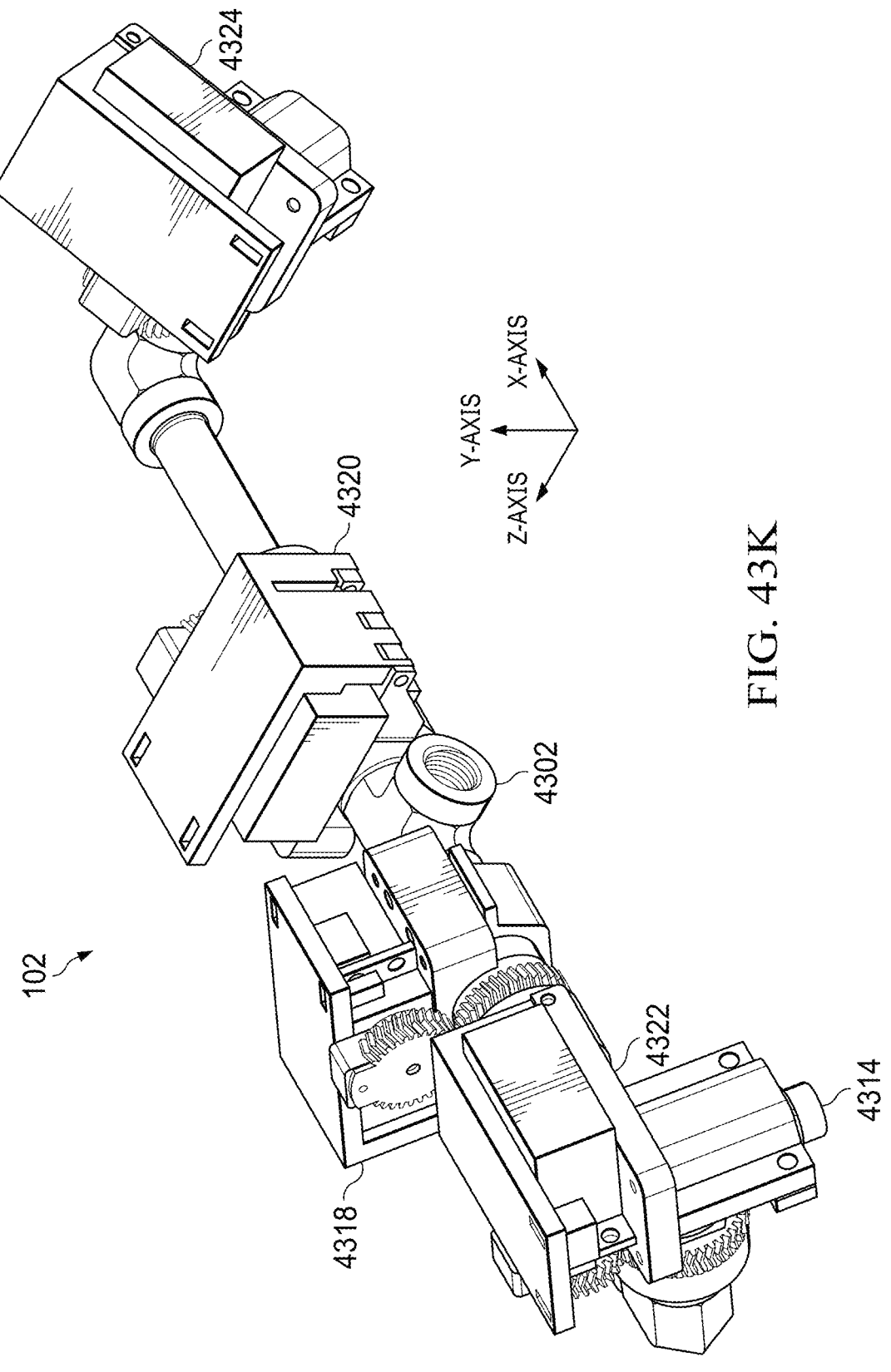
Figure 43L:
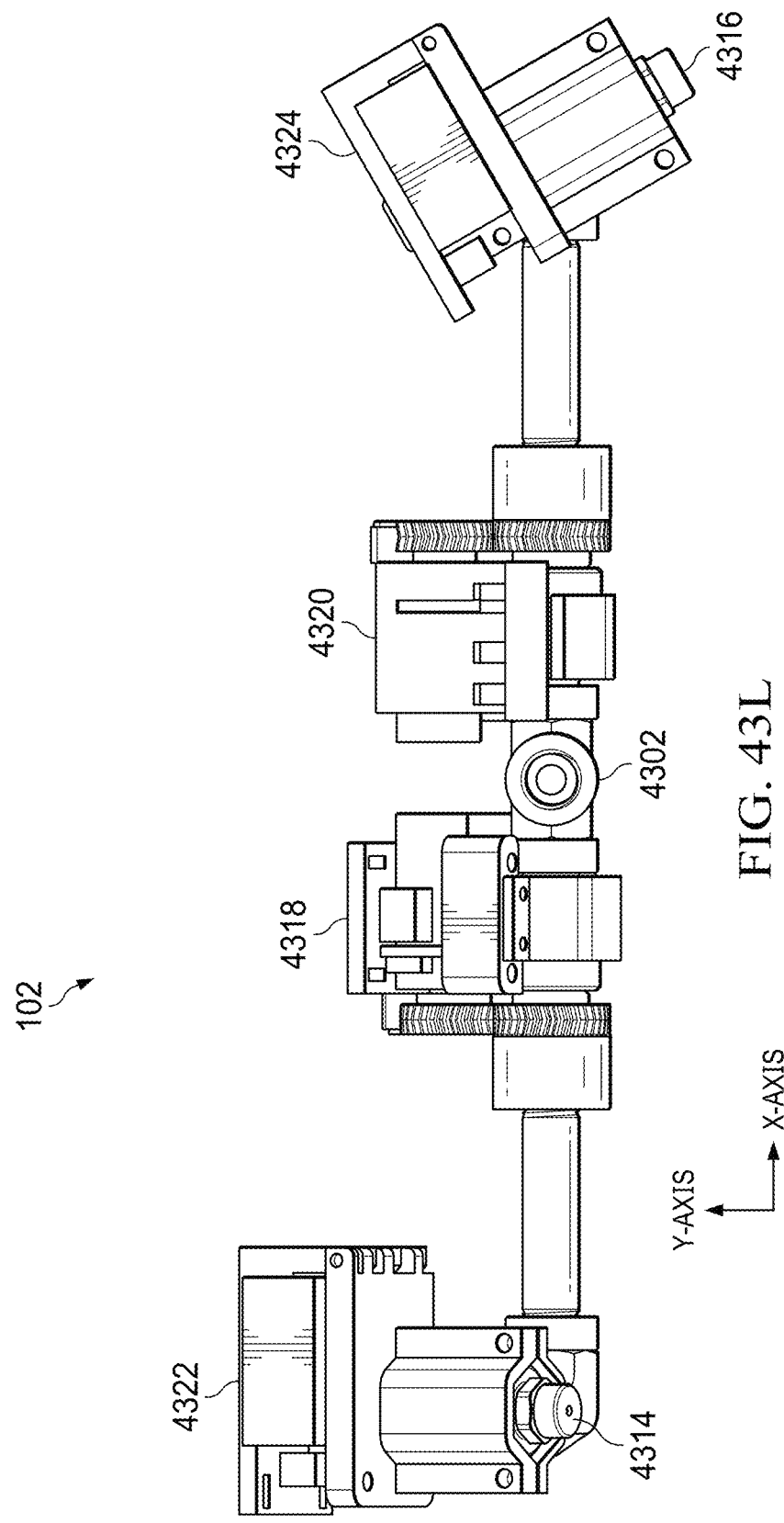
Figure 43M:
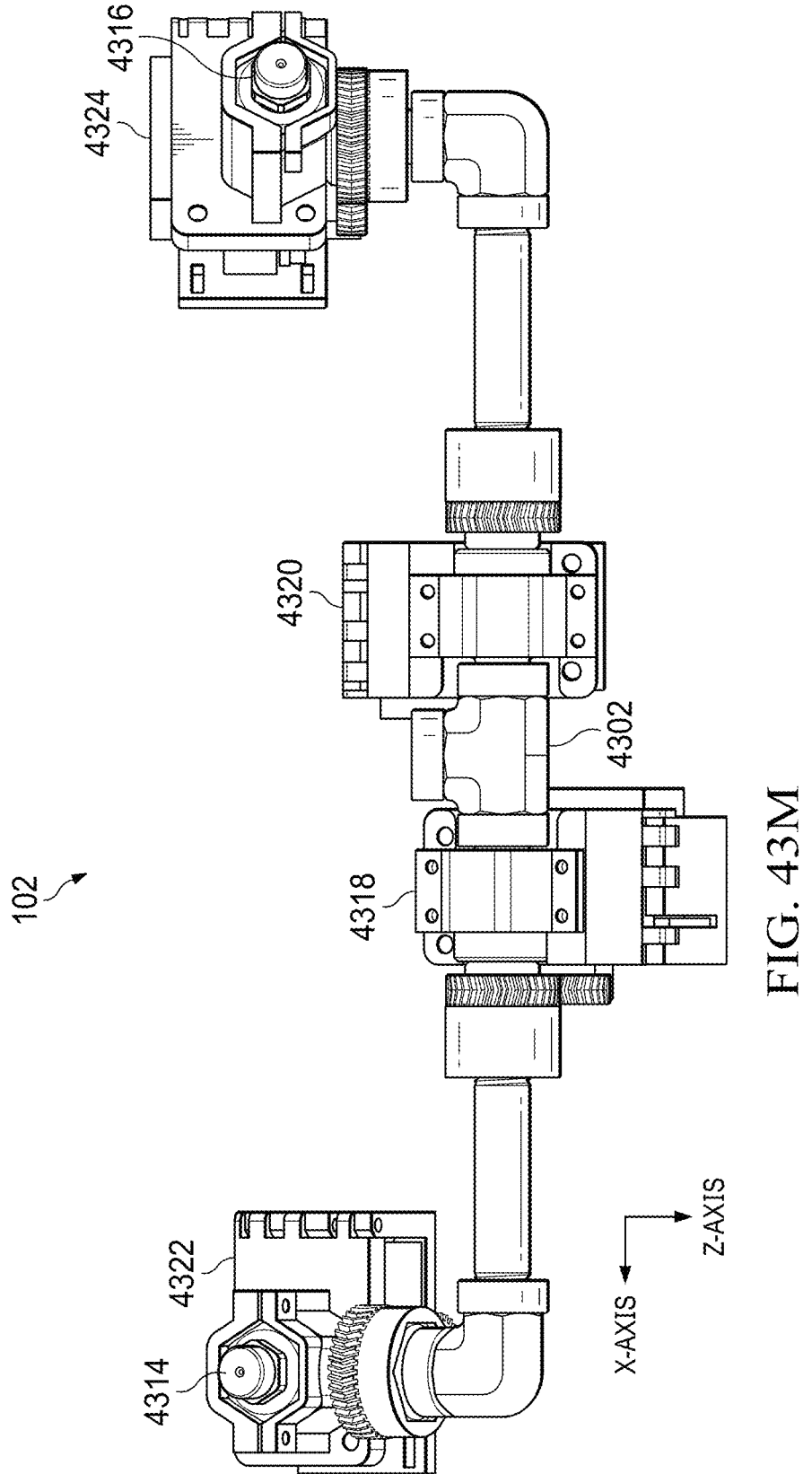
Figure 43N:
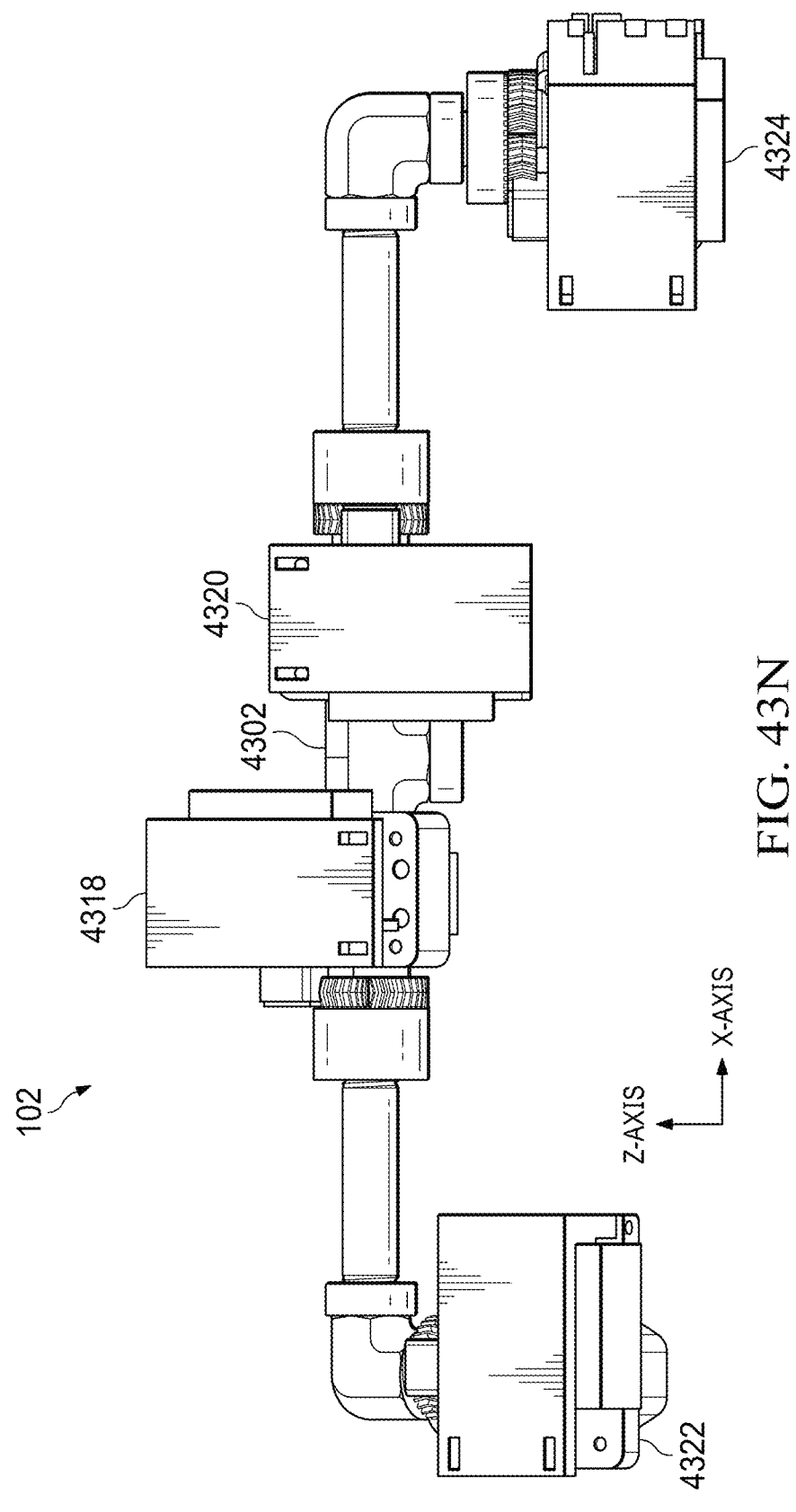
Figure 43O:
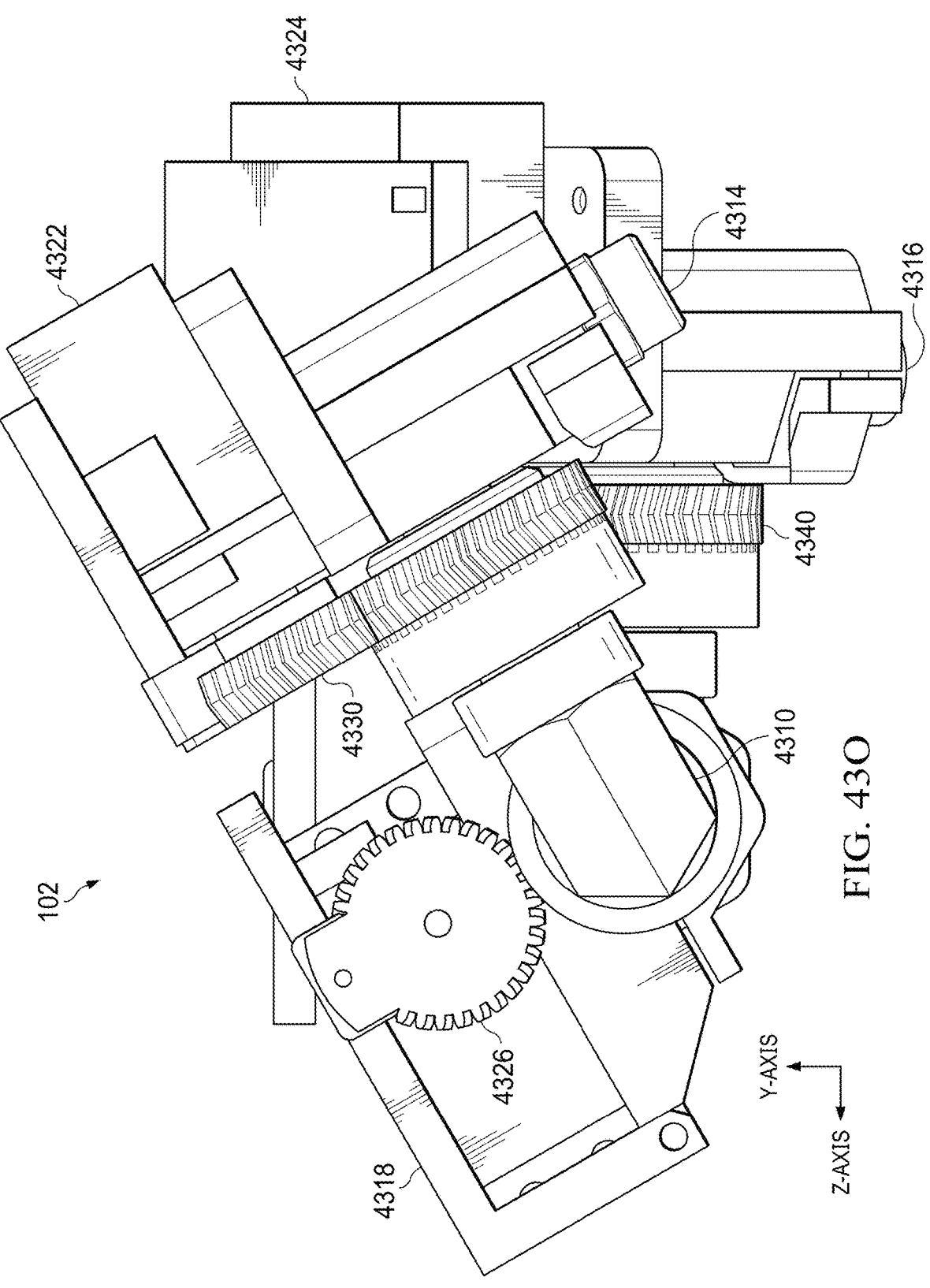

Referring to FIGS. 43A-43O, another embodiment of the hovering distribution device 102 is illustrated with servos for controlling movement. It is understood that while FIGS. 43A-43O use servos and gears for purposes of example, many different types of control mechanisms and mechanical interfaces that enable the movement of components of the hovering distribution device 102 may be used, including those that use gears, wheels, sprockets, belts, chains, drives, and/or pistons, whether based on mechanical, electrical, hydraulic, pneumatic, and/or other principles. Such movement may be relative to other components of the hovering distribution device 102 and/or or relative to one or more external reference points (e.g., the reel 104, the hose 106, and/or a coordinate system such as GPS).

In the present example, the hovering distribution device 102 includes a section 4302 having an inlet port 4304 configured to receive a hose (e.g., the hose 106 of FIG. 1). The section 4302 is coupled to arm assemblies 4306 and 4308. The arm assembly 4306 couples a nozzle 4314 to the section 4302 via an arm section 4310. The arm assembly 4308 couples a nozzle 4316 to the section 4302 via an arm section 4312.

In the present example, mechanisms (e.g., servos) 4318, 4320, 4322, and 4324 may be used to control the rotation of various portions of the hovering distribution device 102 relative to the section 4302 and/or one another. For purposes of clarity, servos are referenced in the present example using reference numbers 4318, 4320, 4322, and 4324, even though the reference numbers 4318, 4320, 4322, and 4324 may indicate housings containing the servos. It is understood that multiple rotations may be executed simultaneously, and that multiple rotations may be executed relative to a single nozzle (e.g., a nozzle may be rotated around both the x-axis and the z-axis). The servo 4318 may be used to rotate the arm 4310 around the x-axis relative to the section 4302 using gears 4326 and 4328. The servo 4320 may be used to rotate the arm 4312 around the x-axis relative to the section 4320 using gears 4334 and 4336. The servo 4322 may be used to rotate the nozzle 4314 around the z-axis relative to the section 4320 using gears 4330 and 4332. The servo 4324 may be used to rotate the nozzle 4316 around the z-axis relative to the section 4320 using gears 4338 and 4340.

Referring specifically to FIGS. 43A-43E, an example is shown with the nozzles 4314 and 4316 in a neutral position.

Referring specifically to FIGS. 43F-43J, an example is shown with the nozzles 4314 and 4316 rotated in the same direction around the z-axis.

Referring specifically to FIGS. 43K-43O, an example is shown with the nozzle 4314 rotated around the x-axis and the nozzle 4316 rotated around the z-axis.

Referring to FIGS. 44A-44G, another embodiment of the hovering distribution device 102 is illustrated with servos for controlling movement. It is understood that while FIGS. 44A-44G use servos and gears for purposes of example, many different types of control mechanisms and mechanical interfaces that enable the movement of components of the hovering distribution device 102 may be used, including those that use gears, wheels, sprockets, belts, chains, drives, and/or pistons, whether based on mechanical, electrical, hydraulic, pneumatic, and/or other principles. Such movement may be relative to other components of the hovering distribution device 102 and/or or relative to one or more external reference points (e.g., the reel 104, the hose 106, and/or a coordinate system such as GPS).

In the present example, the hovering distribution device 102 includes a section 4402 having an inlet port 4404 configured to receive a hose (e.g., the hose 106 of FIG. 1). The section 4402 is coupled to arm assemblies 4406 and 4408. The arm assembly 4406 couples a nozzle 4410 to the section 4402 via an arm section 4414. The arm assembly 4408 couples a nozzle 4412 to the section 4402 via an arm section 4416.

Figure 44A:
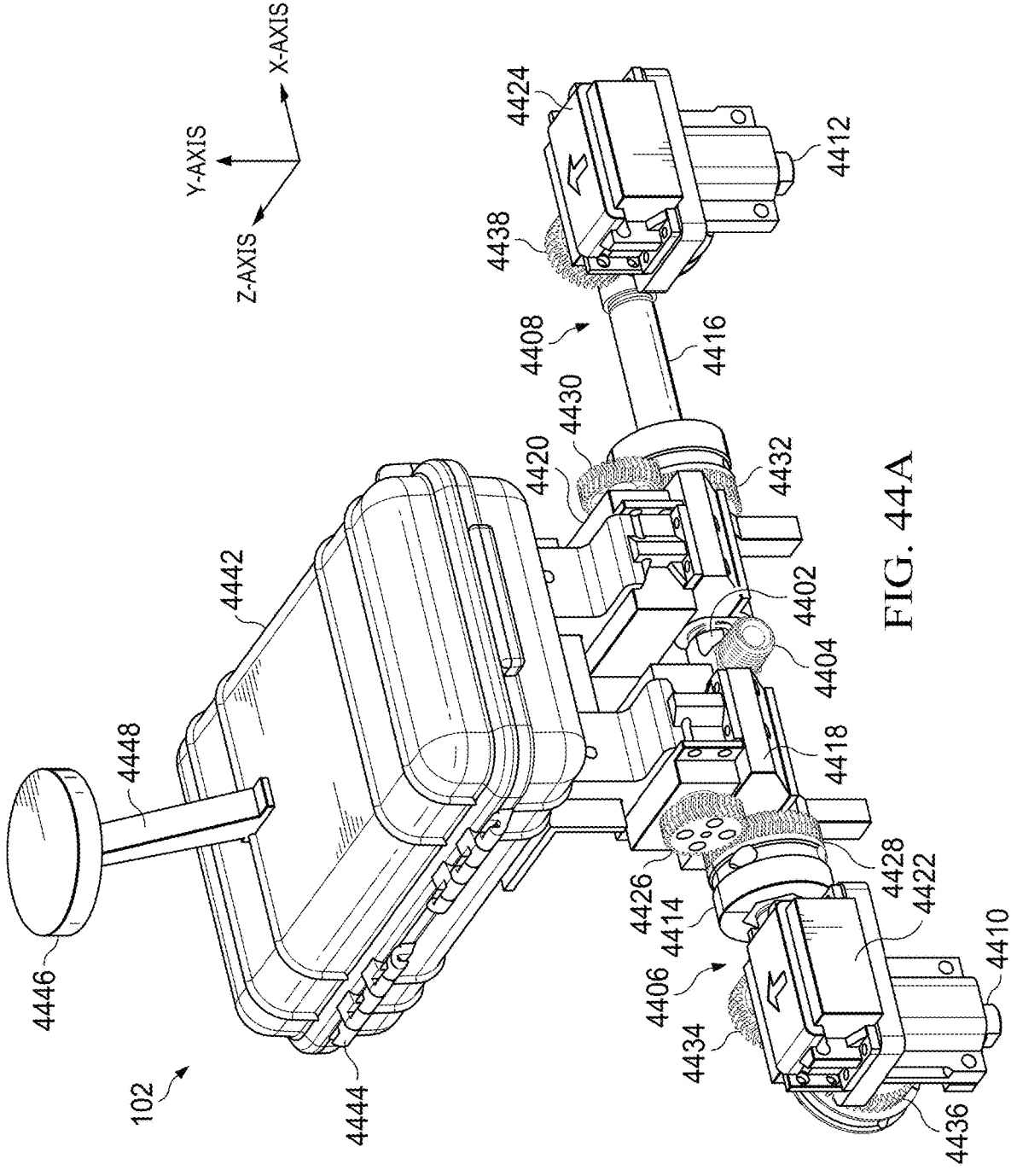
FIGS. 44A-44G illustrate another embodiment of a hovering distribution device.
Figure 44B:
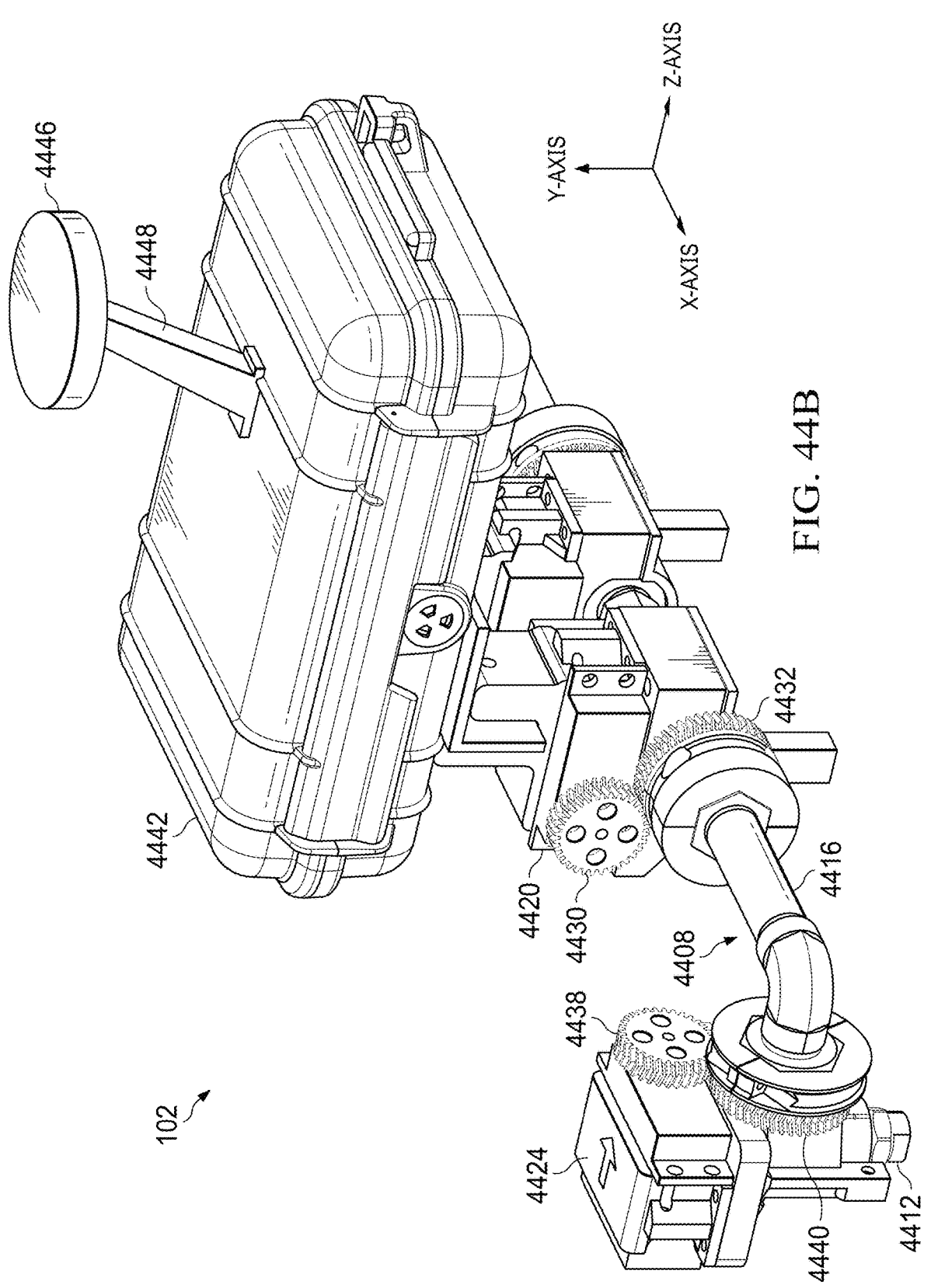
Figure 44C:
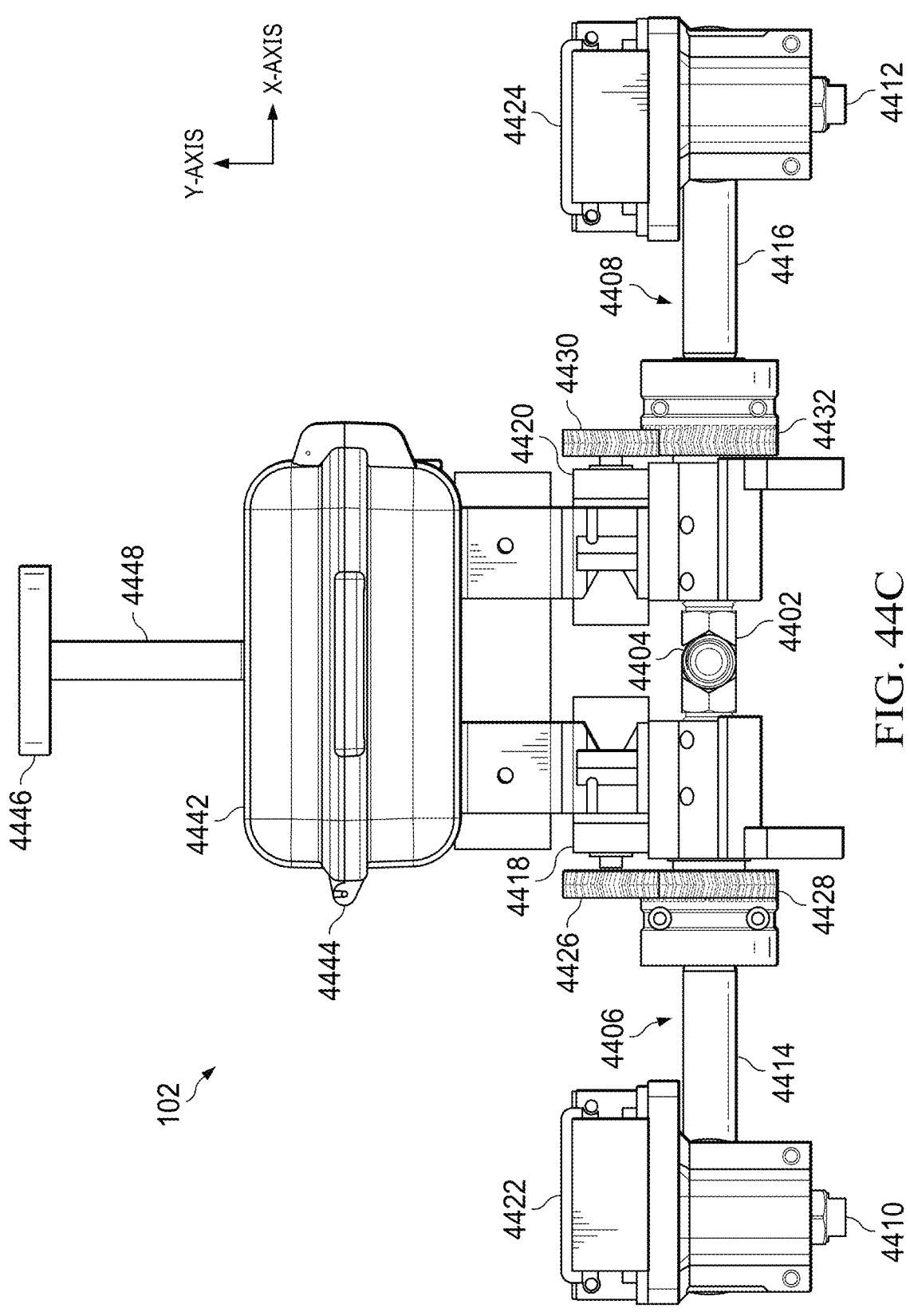
Figure 44D:
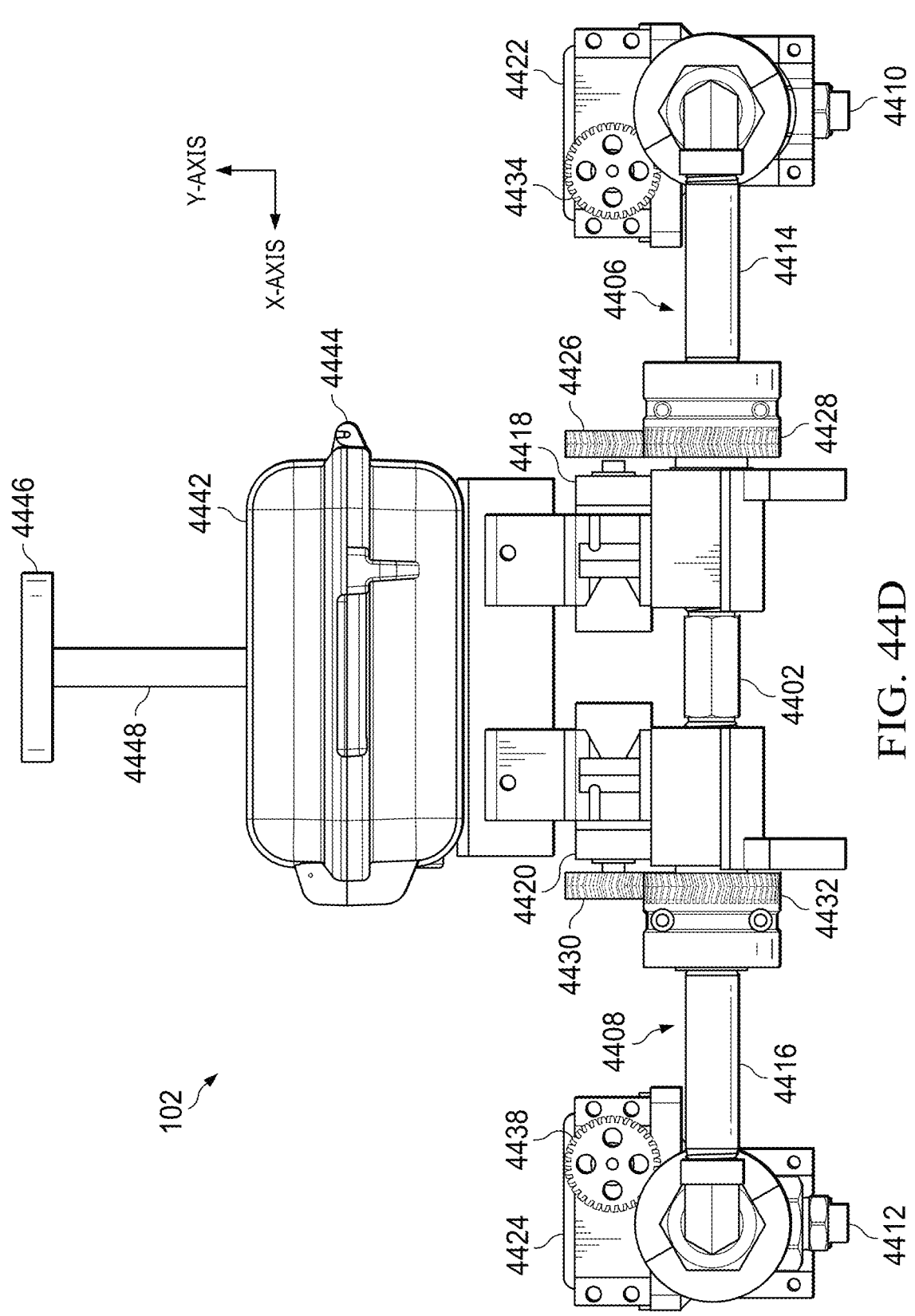
Figure 44E:
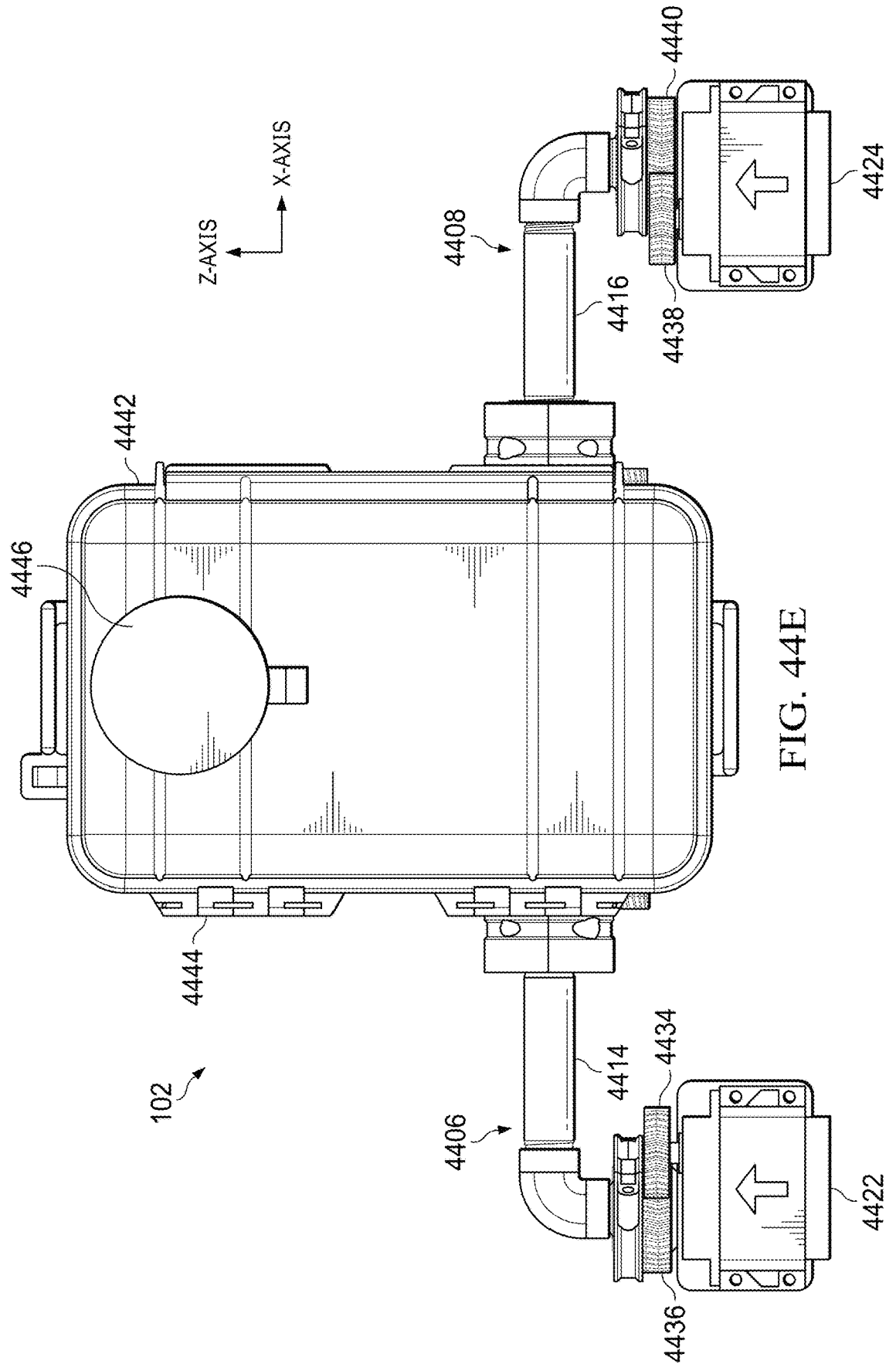
Figure 44F:
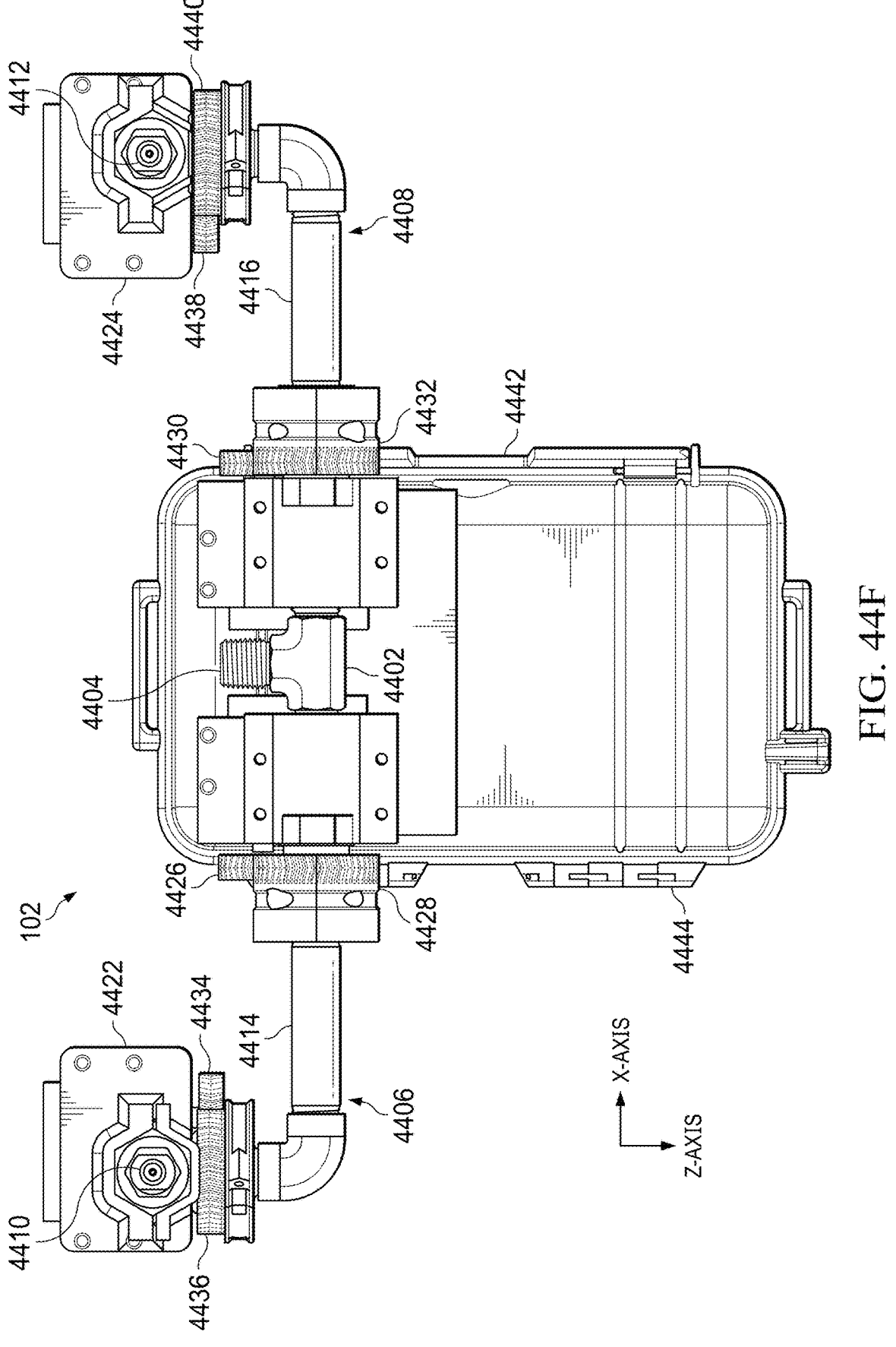
Figure 44G:
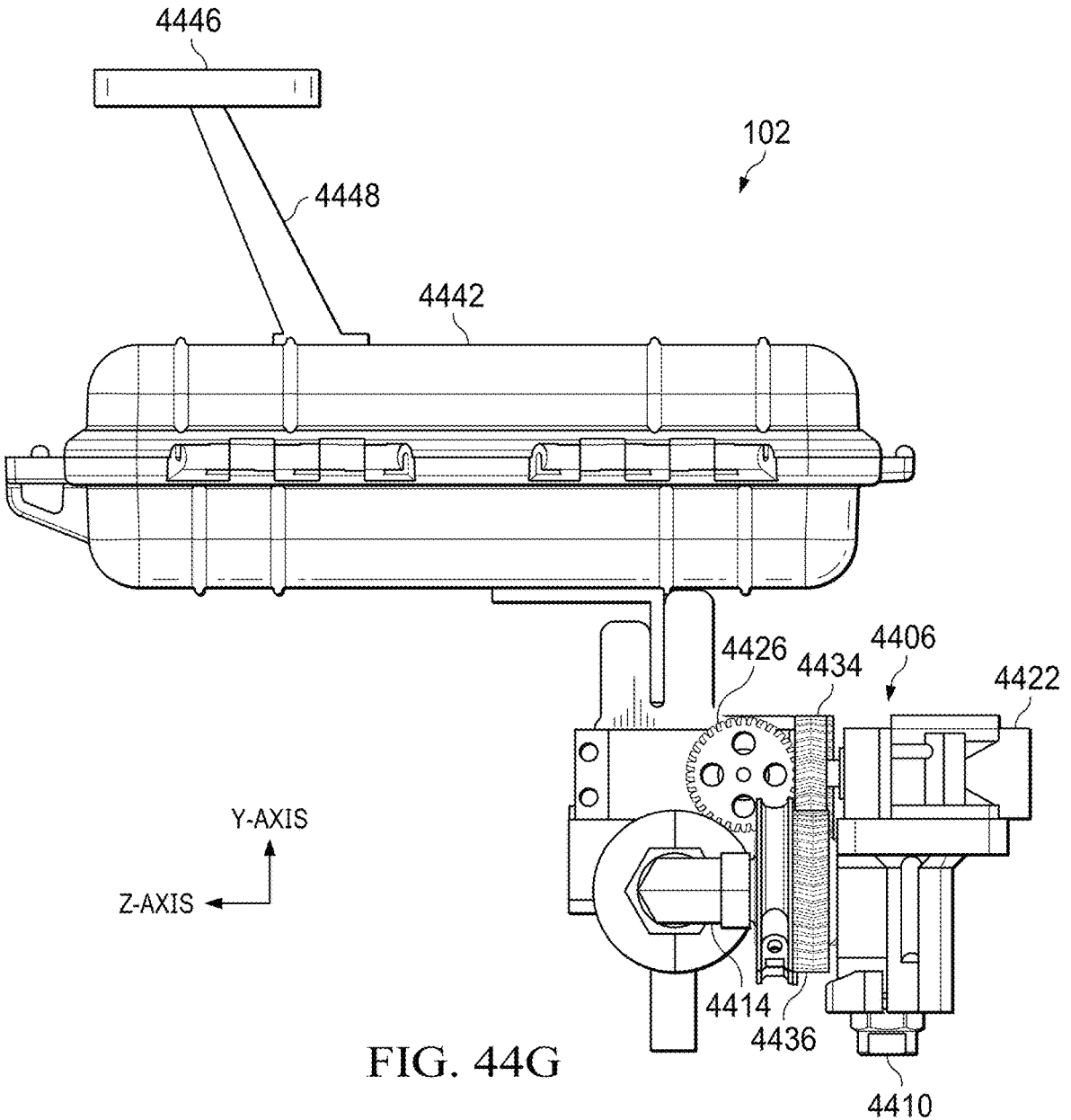

In the present example, mechanisms (e.g., servos) 4418, 4420, 4422, and 4424 may be used to control the rotation of various portions of the hovering distribution device 102 relative to the section 4402 and/or one another. For purposes of clarity, servos are referenced in the present example using reference numbers 4418, 4420, 4422, and 4424, even though the reference numbers 4418, 4420, 4422, and 4424 may indicate housings containing the servos. It is understood that multiple rotations may be executed simultaneously, and that multiple rotations may be executed relative to a single nozzle (e.g., a nozzle may be rotated around both the x-axis and the z-axis). The servo 4418 may be used to rotate the arm 4414 around the x-axis relative to the section 4402 using gears 4426 and 4428. The servo 4420 may be used to rotate the arm 4416 around the x-axis relative to the section 4402 using gears 4430 and 4432. The servo 4422 may be used to rotate the nozzle 4410 around the z-axis relative to the section 4402 using gears 4434 and 4436. The servo 4424 may be used to rotate the nozzle 4412 around the z-axis relative to the section 4402 using gears 4438 and 4440 (FIG. 44B).

In the present example, a compartment 4442 may be coupled to the section 4402 in various ways. The compartment 4442, which may be waterproof, may contain electronics (not shown) for the hovering distribution device 102. The compartment 4442 may be open or may be closable, as illustrated with hinges 4444. An antenna 4446 may be mounted to the container 4442 or elsewhere on the hovering distribution device 102, using a bracket 4448 and/or other coupling mechanisms. The bracket 4448 may be part of the antenna 4446 or may be separate.

Figure 45:
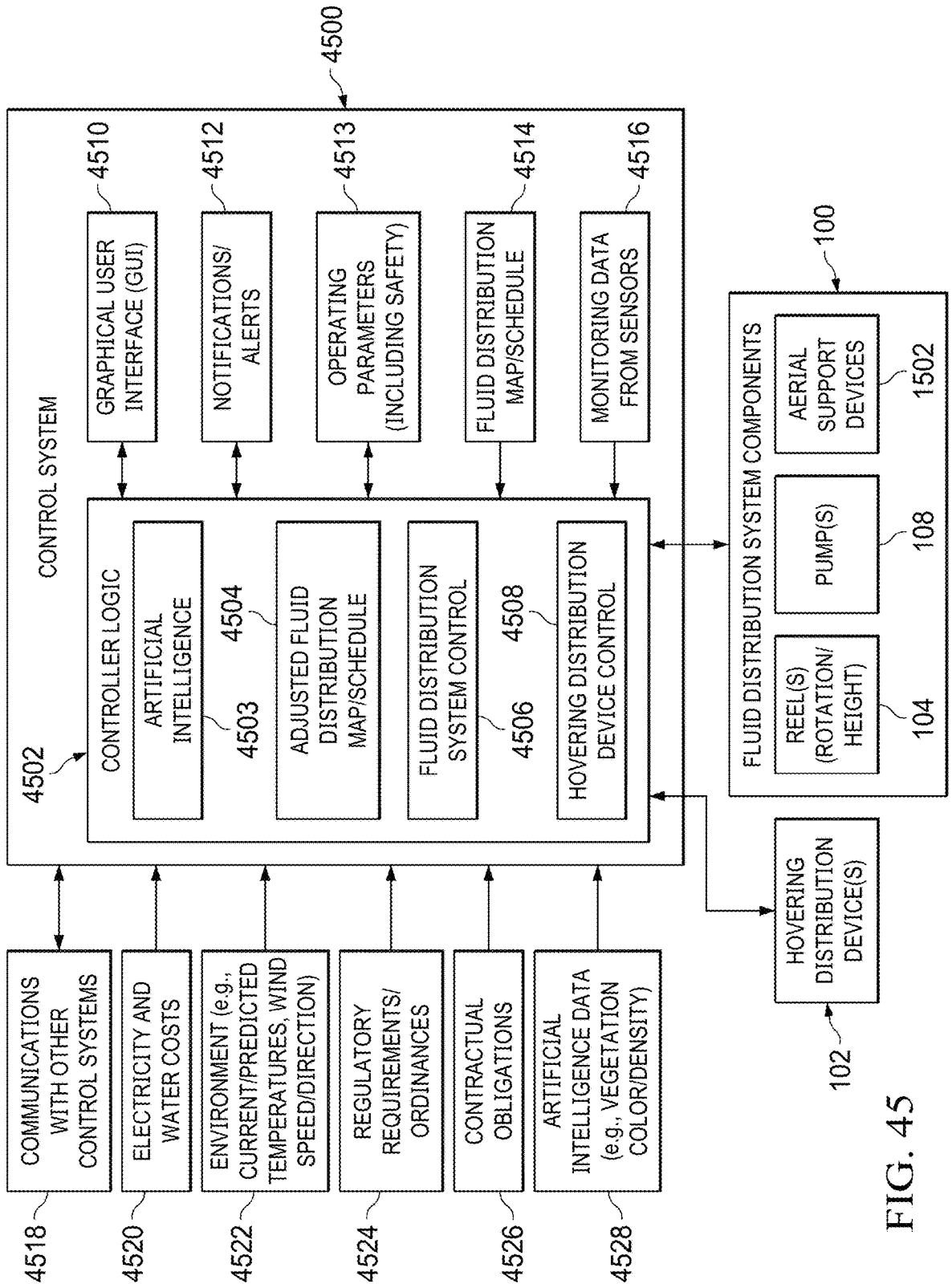
FIGS. 45 and 46 illustrate embodiments of a control system that may be used to manage a fluid distribution system and/or a hovering distribution device.

Referring to FIG. 45, one embodiment of a control system 4500 that may be used to control the fluid distribution system 100 and/or the hovering distribution device 102 is illustrated. The control system 4500 may be similar or identical to the control system 112 of FIGS. 1-3. In some embodiments, the control system 4500 may be configured to only control the hovering distribution device 102. For example, the pressure of the pump 108 may be relatively constant or may vary, and the control system 4500 may adjust the hovering distribution device 102 as needed to compensate. In other embodiments, the control system 4500 may control the pump 108 as well as the hovering distribution device 102, and/or other components of the fluid distribution system 100 such as the reel 104.

In the present example, the control system 4500 includes controller logic 4502 that may include executable instructions implemented via software and/or hardware. The controller logic 4502 may include artificial intelligence (AI) logic 4503 configured to analyze data and use such analyses to manage the operation of the fluid distribution system 100 and/or hovering distribution device 102, logic 4504 configured for modifying and managing an adjusted fluid distribution schedule and/or map, logic 4506 configured for controlling various components of the fluid distribution system 100 (e.g., rotation and/or vertical adjustment of reel(s) 104, operation of pump(s) 108, and/or operation of any controllable aerial support devices 1502), and/or logic 4508 configured for controlling one or more hovering distribution devices 102.

The controller logic 4502 may receive input and/or provide output via a graphical user interface (GUI) 4510, and may send and receive alerts and notifications 4512. The controller logic 4502 may receive operating parameters 4513, including priorities and safety parameters. The controller logic 4502 may receive one or more fluid distribution schedules and maps 4514. Such maps may include information regarding no fly zones and/or other restrictions that may prohibit or place limitations (e.g., maximum and/or minimum altitudes) on the use of the hovering distribution device 102. Examples of areas to which such restrictions may apply include cropland, golf courses, homes, airports, and other locations. Such restrictions may aid in preventing the hovering distribution device 102 from colliding with trees, power lines, and/or other obstacles. In some embodiments, such zones may be enforced in conjunction with wind mitigation to reduce the risk of entering the zones by dynamically extending a buffer region when winds are present in the appropriate direction as detected by local sensors and/or remote weather data.

The controller logic 4502 may receive monitoring data 4516 from sensors, which may include sensors that are positioned on components of the fluid distribution system 100, sensors positioned in and around the area across which fluid is to be distributed, and/or sensors on the hovering distribution device(s) 102. The sensors positioned on components of the fluid distribution system 100 may include sensors for vibration (e.g., to detect malfunctions or movement of the reel 104), rotation (e.g., to measure the amount of hose 106 that has been let out), pressure of the pump(s) 108, and/or other sensors to detect the operational status of various components of the fluid distribution system. In some embodiments, sensors may be positioned along the hose 106 and/or on a support structure (e.g., the support structures 1102 of FIGS. 11 and/or 1302 of FIGS. 13A-13G) to indicate hose direction based on the relative locations of the sensors. For example, this may be used to detect left/right motion of the hose (e.g., motion along the x-axis).

Other sensors that are positioned on components of the fluid distribution system 100 and the sensors positioned in and around the area across which fluid is to be distributed may include sensors for weather information, such as humidity, pressure, air and ground temperatures, wind speed and direction, safety, and/or other information. In some embodiments, wind compensation may be based on information detected using various mechanisms, such as a mechanical mechanism using a pressure induced vane for bias, a digital wind meter to measure wind gusts, computer vision to compensate for wind gusts, and/or a hose guide positioned a distance from the reel 104 to monitor strain on the hose caused by the wind. Cameras may be mounted for human viewing and/or for computer vision using visible light and/or other wavelengths (e.g., thermal imaging). Such cameras may be mounted on the hovering distribution device(s) 102 as well as on and/or around other parts of the fluid distribution system 100.

If a leak is detected, the controller logic 4502 may execute a safe exit process to ensure that the issue is dealt with before it becomes more serious. For example, the process may involve reducing fluid flow or shutting it off entirely. Messages may be sent and/or an alarm may sound onsite if the pressure involved may cause a catastrophic failure, particularly if high pressures are being used for the fluid. For example, if the hose 106 fails, the hose may flail uncontrollably, which may result in injury and/or property damage. Such proactive approaches to safety may involve each component of the fluid distribution system 100, with different actions being executed based on the particular components and/or severity of the potential problem.

The controller logic 4502 may monitor fluid pressure to detect filter and/or nozzle clogging before a failure occurs in order to make needed adjustments to provide sufficient and/or balanced fluid flow for continued operation without shutting down the hovering distribution device 102. In addition, the controller logic 4502 may monitor pressures within the fluid distribution system 100 not only for large leaks (e.g., catastrophic hose failures), but also to detect smaller, gradual pressure losses that may indicate pump wear or jet nozzle erosion. An automated response system may be implemented that reacts to such pressure losses and/or other events described herein through warnings and proactive action (e.g., shutting down when the hose 106 is cut).

In addition to using computer vision for the detection and avoidance of static and/or moving obstacles, computer vision may be used for such functions as monitoring the hose to determine its direction and/or location. Computer vision may be used to determine where water is flowing, whether overspray is occurring, boundary detection, and/or similar issues that can be addressed using vision based sensor information. It is understood that sensor information, including computer vision information, may be combined and/or otherwise correlated from multiple devices.

Boundary detection using computer vision may include the use of natural and/or artificial markers. For example, artificial markers may be installed specifically for identification by computer vision and/or existing artificial markers may be used, such as utility poles, roads, fences, and/or buildings. Natural markers (e.g., shrubs, trees, field edges, hills, and/or bodies of water) may be used in addition to, or as an alternative to, artificial markers.

Computer vision may be used to determine areas of vegetation that need water or need more or less water than is being provided. For example, visible and non-visible characteristics such as the color and/or shade of vegetation, the presence of wilting, the color of exposed soil, and/or heat levels (e.g., as detected via thermal imaging) may be used to determine water needs. Such characteristics may be compared to database information for the particular type of plant and/or other factors, such as the particular environment in which the plant is growing, to determine whether the plants are receiving a desired level of moisture. In some embodiments, color corrections may be made to adjust for variations in light that may result from the time of day and/or the presence or absence of clouds.

Computer vision may be used to identify the need for fertilizers and such identification may initiate the spraying of fertilizer. Computer vision may be used to identify the presence of weeds and/or insects, and such identification may initiate the spraying of herbicides and pesticides, respectively. The application of fertilizers, herbicides, and/or pesticides, whether applied alone or when mixed with fluid (e.g., water) and/or each other, may occur automatically or may require manual intervention and/or approval.

In some embodiments, the controller logic 4502 may receive thermal imaging information, computer vision information, hydration sensor information, and/or information from other detection mechanisms to identify areas in need of more or less fluid (e.g., underwatered or overwatered spots on a lawn, golf course, sports field, or cropland), or to identify where to most effectively apply fluid in a fire suppression or deicing scenario. Such information may come from sensors 4516 and/or from third parties, such as with environmental input 4522. For example, golf courses frequently have different water needs for different areas, such as greens, fairways, roughs, sand traps, and even hazards. Sensor information may be used to determine whether a particular area is receiving the needed amount of moisture for that area.

In some embodiments, sensors (e.g., cameras) may be used to identify and map the location of golf balls on and around golf courses while the hovering distribution device 102 is performing irrigation. Other anomalies (e.g., groundhog holes, divots, bottles, and/or other trash) may also be detected and mapped to aid in maintaining a clean and well repaired golf course. Cameras may also be used to identify a crop's readiness for being harvested, enabling crop monitoring during irrigation.

Sensors may be used to monitor the status of various components of the fluid distribution system 100 to detect operational status and to predict the need for maintenance. Sensors may also be used to monitor the status of various components of the fluid distribution system 100 for safety issues such as unexpected pressures within the hoses 106 and 110 and the pump(s) 108 that may indicate leakage, stoppages, and potential blowouts, hose stress, uncontrolled or unstable rotation of the reel 104, issues with the lift 1002 (FIGS. 10C and 10D) and/or with the support structures 1102 (FIG. 11) and 1302 (FIGS. 13A-13G), loss of control over the hovering distribution device 102, and/or other information that may represent a current or possible future safety concern. For example, if a leak is detected by a pressure sensor, computer vision, and/or other mechanisms, a safe exit process may be executed to ensure that the issue is dealt with before it becomes more serious.

The sensors on the hovering distribution device 102 may include sensors for detecting position and orientation of the device 102, fluid flow, nozzle orientation, temperature, wind speed and direction, potential collisions (e.g., with trees, power lines, and/or other obstacles), weight of the hose 106 being supported by the device 102, the operational status of various components of the device 102 itself, and/or other information. In some embodiments, the hovering distribution device 102 use thermal imaging information, computer vision information, hydration sensor information, and/or information from other detection mechanisms to identify areas in need of more or less fluid (e.g., underwatered or overwatered spots on a lawn, golf course, sports field, or cropland), to identify where to most effectively apply fluid in a fire suppression scenario, to identify and/or avoid obstacles, and/or for other purposes.

The hovering distribution device 102 may include features designed to minimize or eliminate potential injuries to people and animals in the vicinity. For example, the hovering distribution device 102 may be configured to detect possible interactions between people and animals and the hovering distribution device 102, the reel 104, and/or the hose 106. The interactions may be intentional (e.g., a child pulling on the hose 106 or a hawk attacking the hovering distribution device 102) or unintentional (e.g., a person or animal becoming entangled with the hose accidently and pulling down the hovering distribution device). When a potential interaction is detected or an actual interaction occurs, the hovering distribution device 102 may take action, such as powering down to avoid potential injury or moving to another location to continue its duties. The hovering distribution device 102 may use lights, noise, vibrations, and/or physical barriers (e.g., rubber protrusions to minimize bird contact) to warn people and/or frighten away animals such as birds. The hovering distribution device 102 may use computer vision, the detection of unexpected movement (e.g., via gyroscopes), and/or other methods to detect and/or respond to possible and/or actual interactions.

Other inputs may be received by the control system 4500 from external sources. For example, communications 4518 from other control systems may be received and the control system 4500 may respond to such systems if configured to do so. The communications between the control system 4500 and other control systems may be used to coordinate fluid distribution schedules and/or maps in order to provide efficiency over a larger area. In addition, such coordination may be used to ensure that the fluid distribution system(s) 100 managed by each control system will have sufficient resources (e.g., water pressure if a water source is shared between multiple fluid distribution systems) to execute their respective plans. In some embodiments, multiple control systems 4500 may collaborate to accomplish desired goals.

Electricity and/or water costs 4520 may be received by the control system 4500. Such costs may be used by the control system 4500 to execute the schedule when the one or both of the costs are below a particular threshold in order to minimize the electricity and/or water expenses resulting from execution of the schedule. The prioritization of such costs may be weighed against various parameters of the schedule. For example, if the costs are lowest at night, but the crops to be watered are susceptible to disease if watered at night, then the control system 4500 may be configured to prioritize watering during the day while taking the electricity and water costs into account as secondary considerations for the window within which the irrigation plan may be executed.

Environmental information 4522 may be received by the control system 4500. The environmental information 4522 may provide weather data, including past, present, and predicted future data. Accordingly, the environmental information 4522 may include past, present, and expected rainfall, humidity, wind directions and speeds, and air and ground temperatures. The environmental information 4522 may be received from third parties (e.g., weather websites and feeds) and from other control systems if applicable.

Regulatory requirements and federal, state, and local ordinances 4524 may be received by the control system 4500. For example, if an irrigation schedule is to be executed within a particular time window and some or all of that time window is under a local water rationing provision that prohibits watering during that time, the control system 4500 may override the schedule and shift the watering to a non-prohibited time. In a larger system, the control system 4500 may coordinate with other control systems to efficiently schedule around such ordinances. In another example, if a local ordinance prohibits overspray, the control system 4500 may prioritize the prevention of overspray at the cost of not irrigating portions of the map that may lead to overspray. Weather conditions (e.g., wind speed and direction) may be taken into account by the control system 4500 when making such determinations.

Contractual obligations 4526 may be received by the control system 4500. For example, if a contract requires that an area receive a certain amount of water on particular days of the week and the schedule does not comply with requirements, the control system 4500 may modify the schedule to be in compliance with the contract terms.

Artificial intelligence information 4528 may be received by the control system 4500. For example, one or more drones and/or the hovering distribution device 102 may be used to gather information by viewing vegetation color and/or density, detecting the presence of weeds, and obtaining other data. That information may then be processed by an artificial intelligence to determine actions such as whether the amount of irrigation needed for a particular area or whether a weed suppressant should be added to the fluid being distributed. Artificial intelligence may also be used to dynamically gather and analyze information related to grass and forest fires, and even structural fires, and then prepare a fluid distribution plan based on that information for immediate execution or for user review and modification. The information may be analyzed by a third party and/or may be received by the control system 4500 and analyzed using artificial intelligence 4503 for original or additional information, and/or to incorporate the information into an adjusted fluid distribution plan 4504.

In some embodiments, if the schedule and/or map cannot be executed without causing conflicts with ordinances 4524, contractual obligations 4526, and/or other concerns such as unexpected wind speeds that prevent proper irrigation, the control system 4500 may be configured to respond in various ways. For example, the control system 4500 may modify the schedule and/or map to create an adjusted schedule and/or map 4504. Additionally, or alternatively, the control system 4500 may send one or more alerts or notifications 4512 and wait for user input to correct the issue(s).

In other embodiments, the control system 4500 may create the adjusted schedule and/or map, and wait for user approval after sending the alert or notification rather than automatically executing the plan using the adjustments. In yet other embodiments, the control system 4500 may create the adjusted schedule and/or map, and begin execution while waiting for user input after sending the alert or notification.

It is understood that the components of the control system 4500 may take many different forms and may be configured in many different ways. Furthermore, one or more of the components may be combined or sub-divided into additional components, and the illustrated components are for purposes of example only. Due to the large number of possible configurations and the large number of possible uses, the configuration and/or appearance of a particular control system 4500 may be identical to, or very different from, the configuration and/or appearance of another control system. Regardless of their configuration and appearance, however, a common feature of such control systems is that they may be used to control the operation of the fluid distribution system 100 and/or the hovering distribution device 102.

Depending on the use of the control system 4500, the control system may be configured to execute a scheduled fluid distribution process, a dynamic fluid distribution process, or a combination thereof. For example, for irrigation, the control system 4500 may execute an irrigation plan that maps out locations, times, altitudes, fluid flow rates, and/or other parameters that are to be followed in order to carry out the plan. The plan may be followed precisely, or the control system 4500 may be configured to alter the plan according to various parameters and/or events that may override the plan. Events such as higher or lower temperatures, wind conditions that would prevent the plan from being properly executed, higher or lower water pressure than expected, changes in humidity, and/or similar events may cause the control system 4500 to modify the irrigation plan in order to achieve the desired goals.

In some embodiments, a user may directly control some or all of the control system's operation to control the position, orientation, and/or operation of the hovering distribution device 102 and/or components of the fluid distribution system 100. The control system 4500 may be run in a standard configuration or may be customized to tailor various operations and/or appearances (e.g., of the GUI 4510). At higher customization levels, the control system 4500 may dynamically optimize the operation of the hovering distribution device 102 and/or components of the fluid distribution system 100.

Accordingly, due to the control over fluid distribution provided by the control system 4500, an irrigation pattern may be preprogrammed and dynamically adjusted in real time. The positioning and orientation of the hovering distribution device 102 may be part of the preprogrammed pattern and, in some scenarios, may be adjusted in real time to compensate for wind and/or other factors. Alternatively, the control system 4500 may be configured to dynamically calculate the positioning and orientation of the hovering distribution device 102 to accomplish the preprogrammed pattern without the positioning and orientation of the device 102 being part of the preprogrammed pattern.

In another example, the control system 4500 may be used in a dynamic environment, such as a grass or structure fire. In such cases, the control system 4500 may execute a predefined plan with particular parameters input for the current event, may execute a predefined plan and automatically calculate needed changes, or execute a combination thereof. Additionally, or alternatively, the control system 4500 may use a dynamic model to react to the current event without a predefined plan, and/or may enter the dynamic model from a predefined plan or leave the dynamic model to enter the execution of a predefined plan. In some embodiments, a user may directly control some or all of the control system's operation to control the position, orientation, and/or operation of the hovering distribution device 102 and/or components of the fluid distribution system 100.

The control system 4500 may be configured to control the fluid distribution system 100 and/or the hovering distribution device 102 according to one or more prioritized parameters. For example, the control system 4500 may be configured to prioritize fluid distribution efficiency (e.g., minimizing fluid use while providing the defined amount of fluid), fluid distribution speed (e.g., using more fluid to complete the plan more quickly), minimizing overspray (e.g., near roads, structures, vehicles, and/or other objects), and/or based on other priorities. These priorities in turn may affect the pressure of the pump 108, the length of hose 106 released from the reel 104, and/or the positioning of the device 102 in terms of position (including altitude) and orientation.

For example, assume a scenario occurs where the hovering distribution device 102 is nearing a road while executing an irrigation plan, and the wind direction and speed indicate that overspray is likely to occur. If possible, the control system 4500 may lower the altitude of the hovering distribution device 102 to lessen the amount of time the fluid is in the air and may also vary the water pressure from the pump 108 and/or the orientation of the device 102. If the control system 4500 determines that it is not possible to irrigate the edge of the area without overspray occurring, the control system 4500 may move the hovering distribution device 102 away from that area. In such cases, the control system 4500 may send an alert or otherwise provide a notification that the edge was not irrigated according to plan. In some embodiments, if the control system 4500 later detects that the wind direction and/or speed have changed and overspray is unlikely to occur, the control system may return the hovering distribution device 102 to the area to finish irrigation of the edge.

The control system 4500 may be integrated with, or otherwise coupled to, a home or business automation system. For example, a home automation system may manage an alarm system, a sprinkler/irrigation system, a hot water tank, and/or a heating, ventilation, and air conditioning (HVAC) system. The control system 4500 may use information from the home automation system to manage an irrigation schedule. For example, assume the home's water usage peaks at certain times of the week due to laundry, showers, and other common events. Prior to the scheduled watering, the control system 4500 may verify that the scheduled time is not at a peak time, and if it is, may adjust the schedule accordingly.

When managing operations, the control system 4500 may take the current stage of a particular task into account, as well as environmental conditions and other factors, such as local watering ordinances. For example, assume that an irrigation schedule was interrupted and there is not enough time to finish the planned schedule before a local ordinance prevents irrigation due to a cutoff time. The control system 4500 may, if possible, increase the amount of water being used to speed up the irrigation schedule, or may determine that it should simply decrease the time for an area without increasing the fluid flow. Such decisions may be made dynamically (e.g., using an artificial intelligence or other logic) and/or may be based on one or more predefined operating parameters 4513 that have been provided to the control system 4500.

The control system 4500 may take longevity and reliability into account when managing the fluid distribution system 100 and/or the hovering distribution device 102. For example, bearings on the reel 104 may wear out, the structural integrity of the hoses 106 and 110 may weaken over time, and similar issues may occur with other components. Accordingly, the control system 4500 may manage the fluid distribution plan to minimize the long-term impact of such issues. For example, the control system 4500 may limit the rotation speed of the reel 104 to lessen the wear on the bearings that may be caused by heat and/or other factors. It is understood that many different factors may be taken into account when making adjustments for longevity and reliability, including ambient temperatures.

The control system 4500 may take noise into account when managing the fluid distribution system 100 and/or the hovering distribution device 102. For example, executing a fluid distribution plan with maximum fluid pressure may produce a significant amount of noise. This noise may be noticeable, particularly if components of the fluid distribution system 100 (e.g., the reel 104 and/or pump(s) 108) and/or the hovering distribution device 102 are relatively close to an occupied area. Accordingly, the control system 4500 may manage the fluid distribution plan to reduce the noise level when people are nearby and to allow the noise level to increase when the noise will have less impact.

Figure 46:
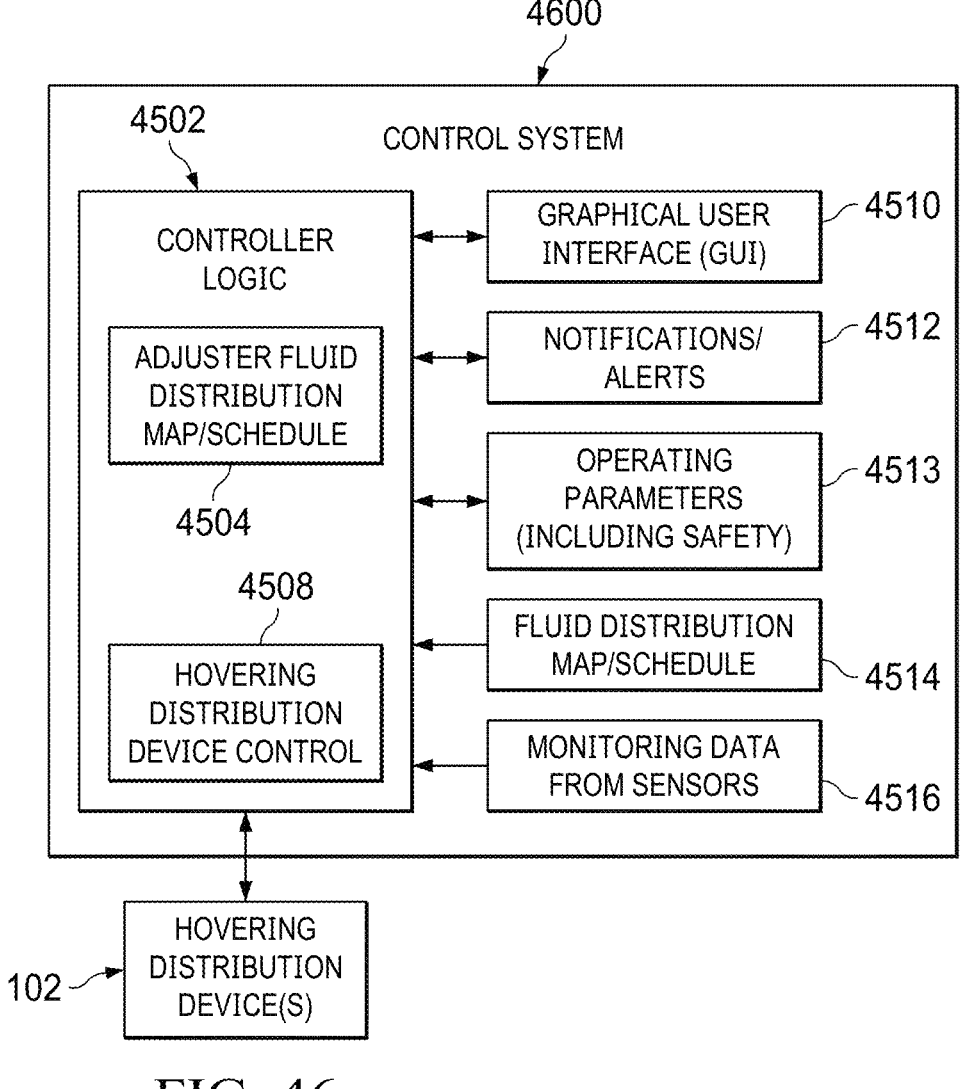

Referring to FIG. 46, another embodiment of a control system 4600 illustrates a simpler system that includes fewer, but similar or identical, components to those described with respect to the control system 4500 of FIG. 45. The control system 4600 may be used, for example, with the hovering distribution device 102 of FIGS. 2 and 3 where there are few or no other components of the fluid distribution system 100 present. In such embodiments, the control system 4600 may be primarily responsible for controlling the hovering distribution device 102. Although not shown, it is understood that one or more of the other inputs used by the control system 4500 (e.g., inputs 4518, 4520, 4522, 4524, 4526, and/or 4528) may be used by the control system 4600.

Figure 47:
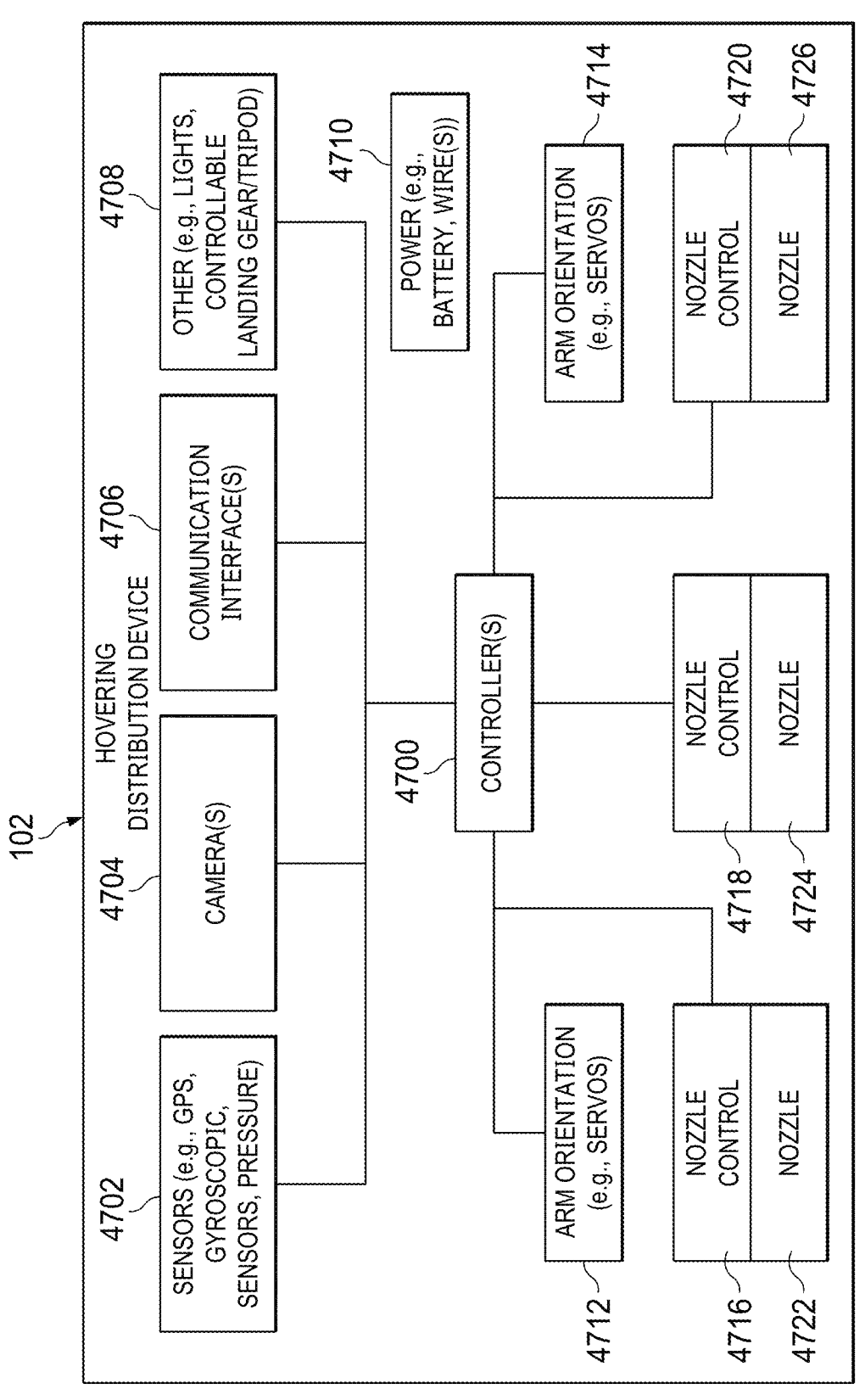
FIG. 47 illustrates one embodiment of various components of a hovering distribution device.

Referring to FIG. 47, one embodiment of a hovering distribution device 102 illustrates various components that may be used in such a device. It is understood that the hovering distribution device 102 may be configured in many different ways, and different implementations may include different hardware and/or software components. In the present example, one or more controllers 4700 may control the functions of the hovering distribution device 102, with control being autonomous, remote, and/or a combination thereof. For example, the controller(s) 4700 may execute some or all of the logic described above with respect to controller logic 4502 of FIGS. 45 and 46.

The controller 4700 may receive data from sensors 4702 and camera(s) 4704. One or more communication interfaces 4706 may be used to communicate via wireless and/or wireline channels. Other components 4708 may include lights (e.g., for night operations and/or for flight visibility), controllable landing gear if equipped, and/or for other functions. Some or all of the components 4702, 4704, 4706, and 4708, as well as the particular implementation of the controller 4700, may change based on the size of the hovering distribution device 102, the power available to the hovering distribution device 102, the particular purpose of the hovering distribution device 102 (e.g., home irrigation, crop irrigation, or firefighting), and/or based on other factors.

The controller 4700 may control the orientation of arm assemblies (if present) via servos and/or other control mechanisms 4712 and 4714. The controller 4700 may use nozzle control mechanisms 4716, 4718, and 4720 to control nozzles 4722, 4724, and 4726, respectively. As described elsewhere herein, the control of arm assemblies and nozzles may be accomplished in many different ways using many different mechanisms. One or more power sources 4710 may provide power to the controller 4700, some or all of the components 4702, 4704, 4706, and 4708, arm assembly controls 4712 and 4714, and/or nozzle control mechanisms 4716, 4718, and 4720. As described elsewhere herein, power may be obtained as electricity (e.g., from batteries, solar panels, and/or wires), from the fluid flow provided by the hose 106, and/or from other sources.

Figure 48A:
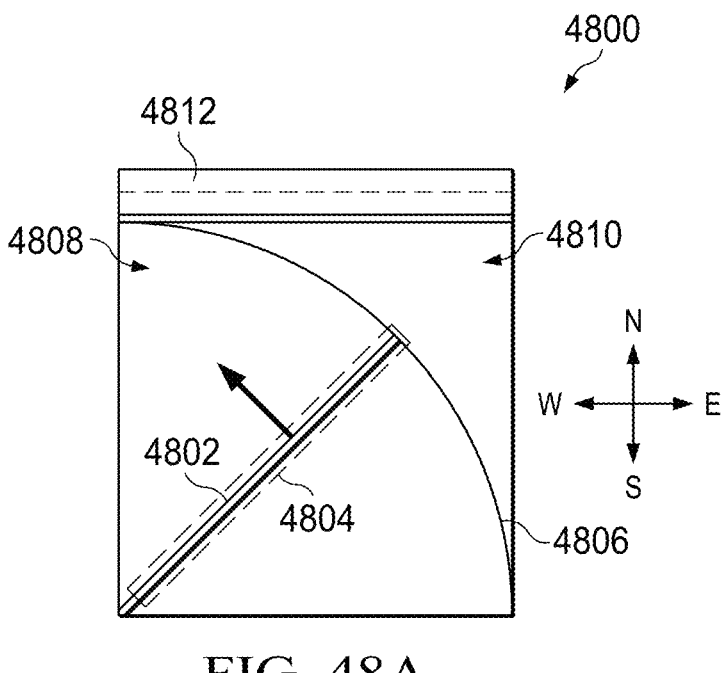
FIGS. 48A-49C illustrate embodiments of maps showing various irrigation examples.

Referring to FIG. 48A, in one embodiment, a map 4800 of an area is illustrated. In the present example, a conventional irrigation system is being used, such as a central pivot irrigation system. It is understood that other conventional irrigation systems may be used, such as a lateral move irrigation system and/or other relatively large and constrained irrigation systems. A primary pipe 4802 is rotating around the area represented on the map 4800 and irrigating an area 4804 proximate to the pipe. The pipe 4802 may travel with its outer end forming an arc 4806. This means that the area 4808 may be irrigated, but the area 4810 may not be irrigated. As the pipe 4802 approaches the north end of the irrigation area, overspray may occur that impacts a road 4812. Some central pivot systems may use attachments such as an end gun (not shown) to attempt to irrigate at least some portions of the area 4810, but such additions are often expensive and may lack efficiency and flexibility in adjusting to non-circular areas.

Figure 48B:
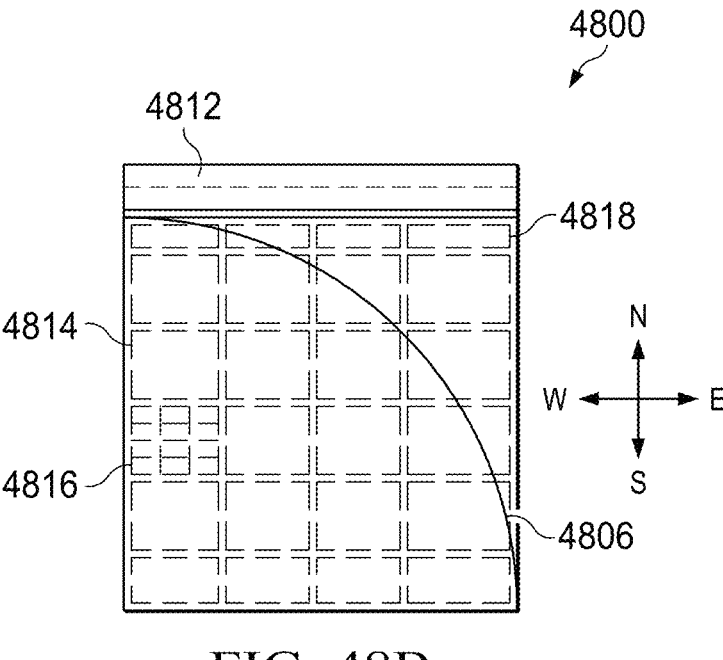

Referring to FIG. 48B, in one embodiment, the map 4800 is illustrated in pixelated form, with the arc 4806 remaining only to provide a reference to the map of FIG. 48A. The level of control provided by the control system 4500, in conjunction with the ability to position and orient the hovering distribution device 102 in real time, enables the fluid distribution mapping to be pixelated, with various areas representing pixels 4814. The size and/or shape of the pixels 4814 may vary and a pixel may be further divided into smaller pixels as desired as shown with pixel 4816. This enables the fluid distribution process to be tuned according to a particular pixel's needs.

The control system 4500 may control the fluid distribution system 100 and/or the hovering distribution device 102 in order to water one or more of the pixels in an optimized manner. This means the sizes and shapes of different areas defined by the pixels may vary widely and the control system 4500 may adjust the fluid control system 100 and/or the hovering distribution device 102 as needed, as long as the hovering distribution device 102 is able to reach an area. Accordingly, the hovering distribution device 102 may be able to provide fluid to an area in a relatively efficient manner as long as it is physically possible to do so (e.g., the hose 106 is long enough, there is enough water pressure from the pump 108, and/or there are no objects blocking the hose or the hovering distribution device 102 from moving as needed).

The control system 4500 may lower or raise the altitude of the hovering distribution device 102 by altering the water pressure provided by the pump(s) 108 and/or by manipulating nozzles of the device 102. For example, lowering water pressure may lower the amount of water being distributed by the hovering distribution device 102, but may also lower the altitude of the device 102 to ensure that the water is distributed over a smaller area in a more controlled manner. This can be illustrated with the map 4800, where the hovering distribution device 102 approaches the road 4812 and the control system 4500 may lower the altitude of the device 102 to irrigate narrower pixels 4818 in order to minimize or prevent overspray.

Figure 49A:
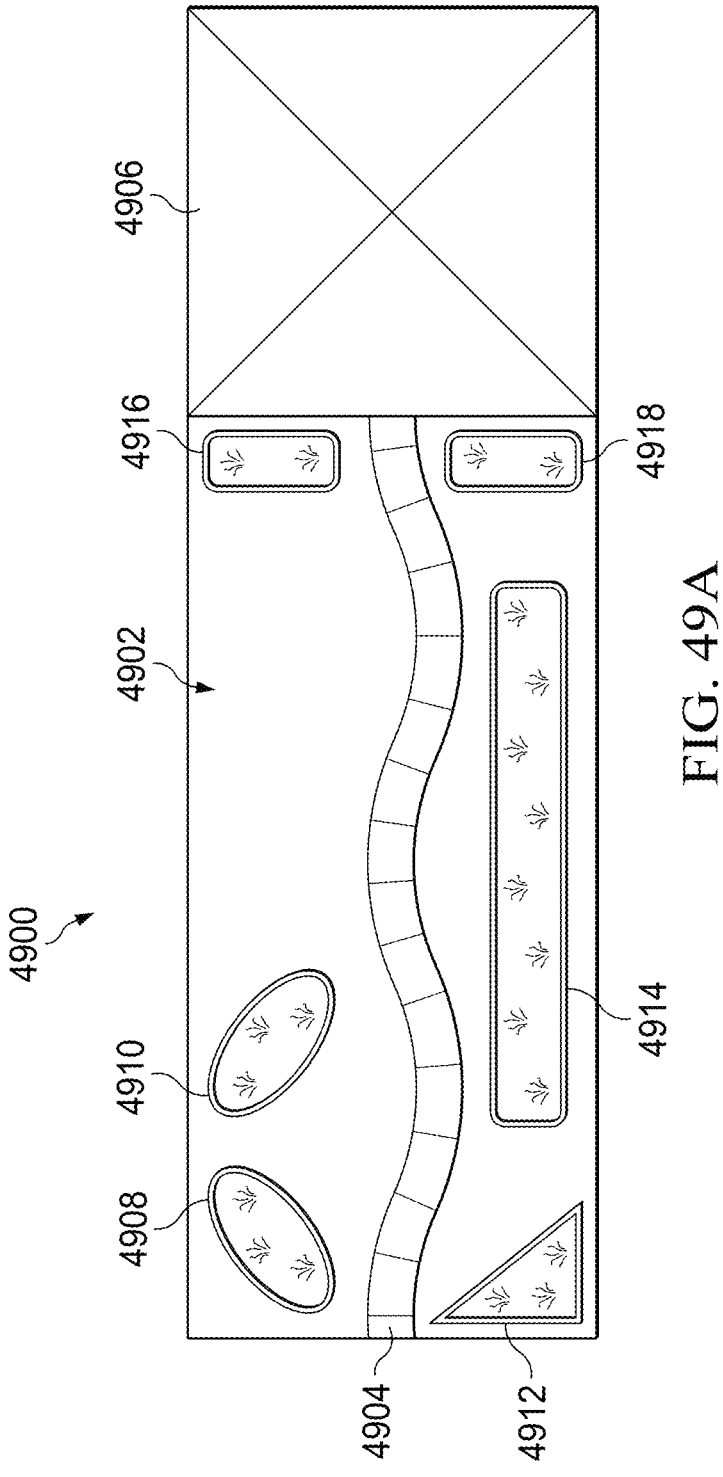
Figure 49B:
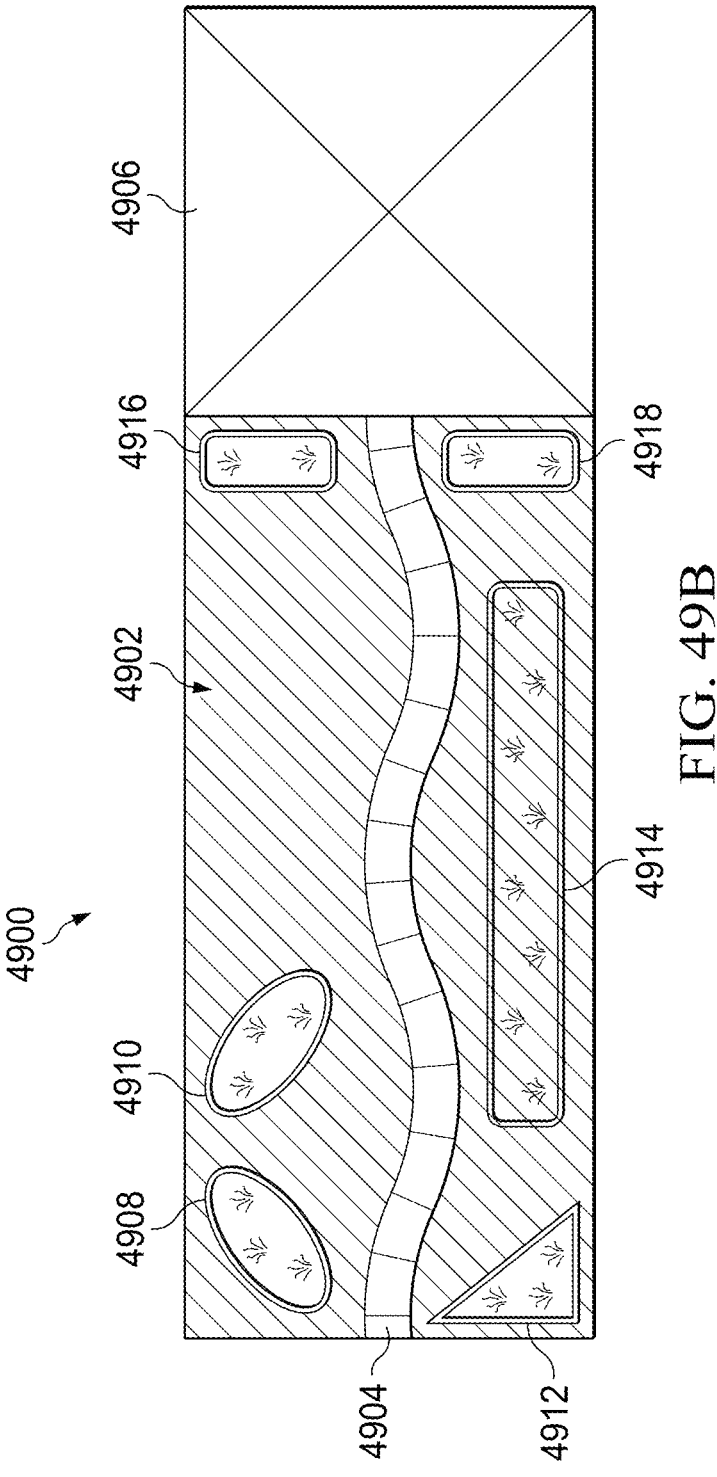

Referring to FIGS. 49A-49B, in one embodiment, a map 4900 of a residence is illustrated with a lawn 4902. A sidewalk 4904 leads across the lawn to a home 4906. Flowerbeds 4908, 4910, 4912, 4914, 4916, and 4918 are located around the lawn 4902. In FIG. 49B, the lawn 4902 has been selected for irrigation using the control system 4500 and the hovering distribution device 102. As irrigation of the flowerbed 4914 is consistent with that of the lawn 4902, the flowerbed 4914 is included in the irrigation plan for the lawn. The sidewalk 4904 and flowerbeds 4908, 4910, 4912, 4916, and 4918 have been excluded from the plan and will not be irrigated at this time based on the current plan.

In order to perform the irrigation process, the control system 4500 may maneuver the hovering distribution device 102 around the lawn, and may do so with sufficient precision to minimize or eliminate overspray on the excluded portions, including the sidewalk 4904. This may entail controlling the hovering distribution device 102 to follow a curving path around the edges of the sidewalk 4904 and the flowerbeds 4908 and 4910, as well as an angled path along one edge of the flowerbed 4912.

Figure 49C:
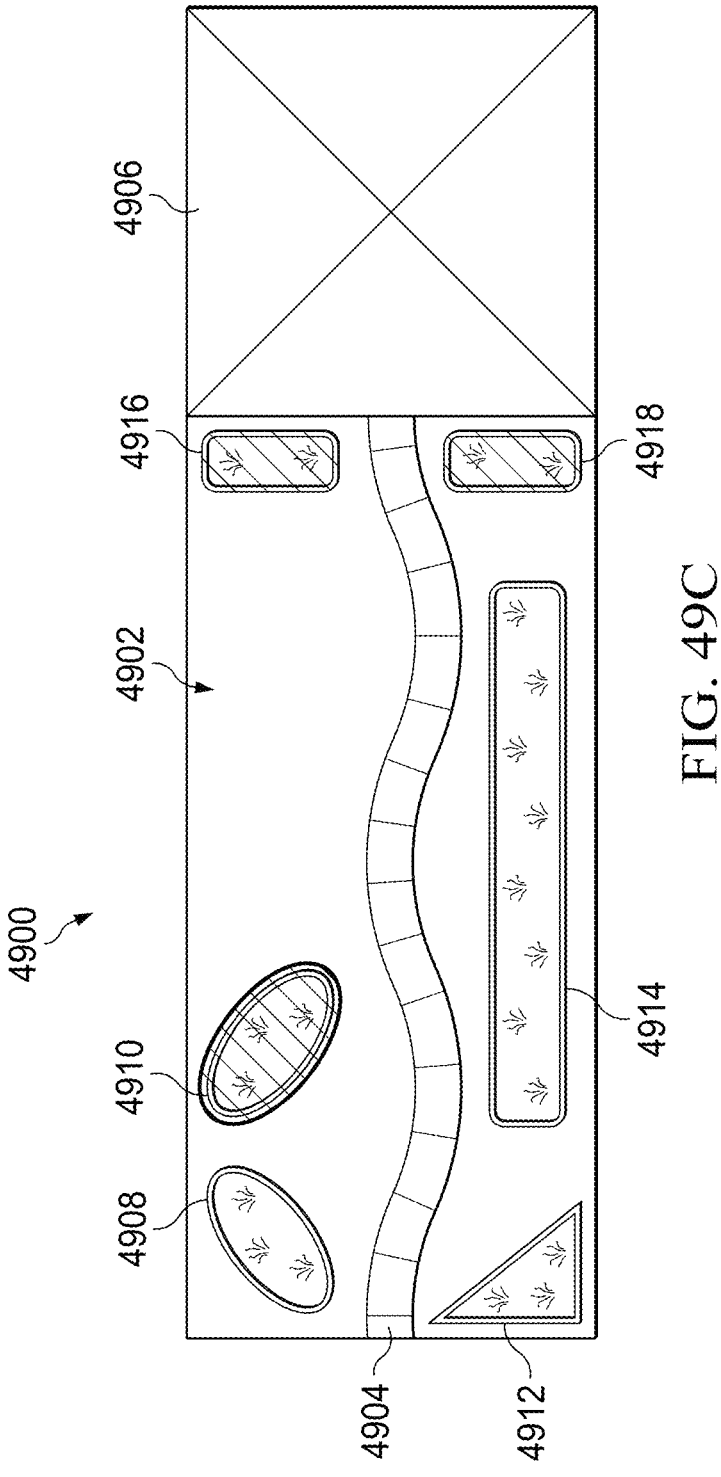

In FIG. 49C, the flowerbeds 4916 and 4918 have been selected for irrigation according to the present plan. In addition, a user has drawn a circle around or otherwise selected the flowerbed 4910 for irrigation. For example, this may override the currently preprogrammed plan and add the flowerbed 4910. In some embodiments, a user may draw, mark on, and/or otherwise graphically select an area or one or more portions of an area as fluid distribution targets using the GUI 4510 and/or another input device, such as a tablet, which is able to communicate with the control system 4500. Using menus, fields, sliders, buttons, and/or other input mechanisms, the user may indicate the amount of fluid needed (e.g., a particular volume, by raising or lowering the current amount, and/or by selecting options), the use of any additives and/or solids such as fertilizers, pesticides, and/or weed killers, and use any other available parameters to adjust the fluid distribution for a given area.

The control system 4500 may receive the input, map the input to the current map, and make any needed schedule changes. Such changes may be made to a stored plan or may be implemented in real time to allow full control over the current fluid distribution process. The ability to graphically interact with the control system 4500 in order to make changes to the map and/or schedule, as well as the current operation of the fluid distribution system 100 and/or the hovering distribution device 102, may simplify the creation and/or modification of plans and enable on the fly changes based on graphical input. The ability to graphically alter the fluid distribution process may also be used in dynamic environments, such as indicating a new position on a map to which a grassfire is spreading by circling or otherwise indicating the area on the map itself. The control system 4500 may then move the hovering distribution device 102 to the indicated area and make any needed adjustments to the fluid distribution process.

Figure 50:
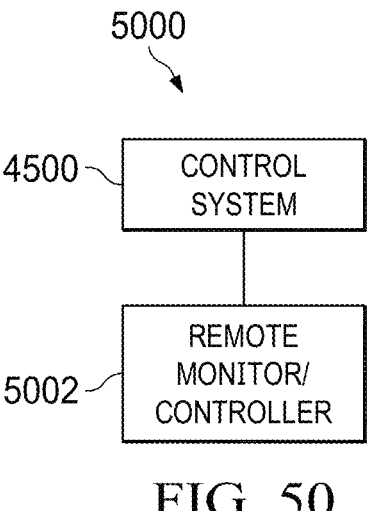
FIGS. 50 and 51 illustrate embodiments of environments with a remote monitor/controller and one or more control systems.

Referring to FIG. 50, one embodiment of an environment 5000 illustrates a remote monitor/controller 5002 coupled to the control system 4500. The remote monitor/controller 5002 may be used to monitor and/or manage the fluid distribution system 100 and hovering distribution device

102 via the control system 4500. In some embodiments, the remote monitor/controller 5002 may be able to directly monitor and/or manage the fluid distribution system 100 and hovering distribution device 102.

It is understood that the remote monitor/controller 5002 may have full access to the operations of the control system 4500, or access may be limited to certain functions for security or other reasons. Accordingly, the remote monitor/controller 5002 may access and execute some or all of the control system 4500 functionality depending on the particular configuration and/or access rights of the remote monitor/controller 5002. In some embodiments, the remote monitor/controller 5002 may calculate a fluid distribution plan and then send the plan to the control system 4500 for execution. The plan may be overridable or modifiable by local parameters or data, or may be unchangeable without permission from the remote monitor/controller 5002. In other embodiments, the remote monitor/controller 5002 may simply provide access to the control system 4500 for viewing, but may be unable to execute or alter the functionality of the control system.

Figure 51:
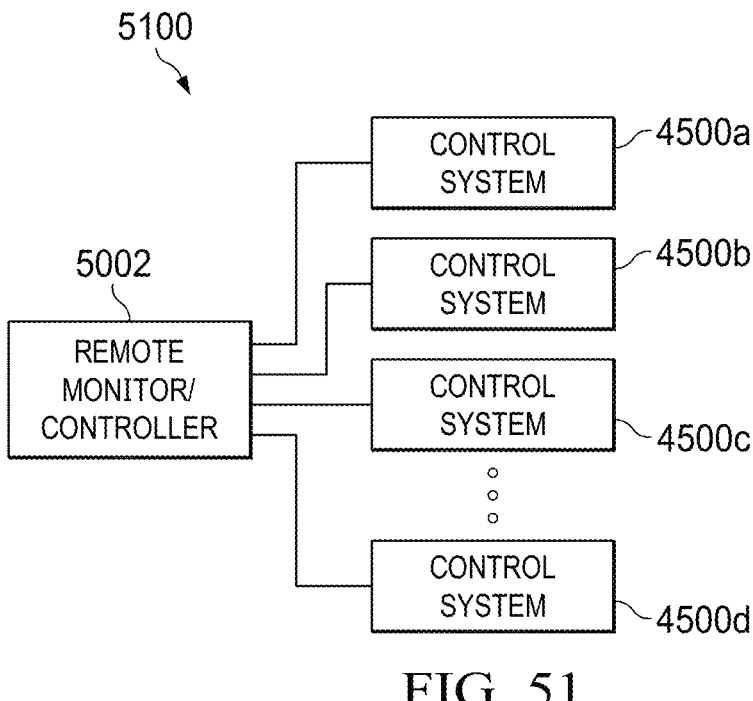

Referring to FIG. 51, one embodiment of an environment 5100 within which aspects of the present disclosure may be practiced illustrates the remote monitor/controller 5002 coupled to control systems 4500a-4500d. The remote monitor/controller 5002 may be used to monitor and/or manage the tasks and/or other operations of the control systems 4500a-4500d as described with respect to FIG. 50. The control systems 4500a-4500d may be used by a single home or business, may be part of a larger organization (e.g., a farm, park, nursery, office park, apartment complex, hotel, and/or other areas that may use the provided fluid distribution functionality), or may be in a distributed system that is associated only at the level of the remote monitor/controller 5002, such as a business that provides fluid distribution systems 100 and/or hovering distribution devices 102 on a contract basis. In other embodiments, a different remote monitor/controller 5002 may be used with one or more of the control systems 4500a-4500d, or the remote monitor/controller 5002 may monitor and/or control a fluid distribution system 100 and/or a hovering distribution device 102 without using a control system 4500a-4500d.

In other embodiments, the control systems 4500a-4500d may be managed locally as separate nodes, with each node working with other nodes (e.g., using a mesh or area network with no central controller). For example, a control system may be deployed where the first installed or activated control system 4500 is a master node, and later installed or activated control systems are slave nodes. Alternatively, or additionally, the control system 4500 with the highest bandwidth, most processing power, and/or other prioritized attributes may be the master node, and the master node may switch if parameters change or if the current master node becomes unavailable. Accordingly, it is understood that many different configurations of remote monitor/controllers 5002 and control systems 4500a-4500d may be implemented.

Figure 52:
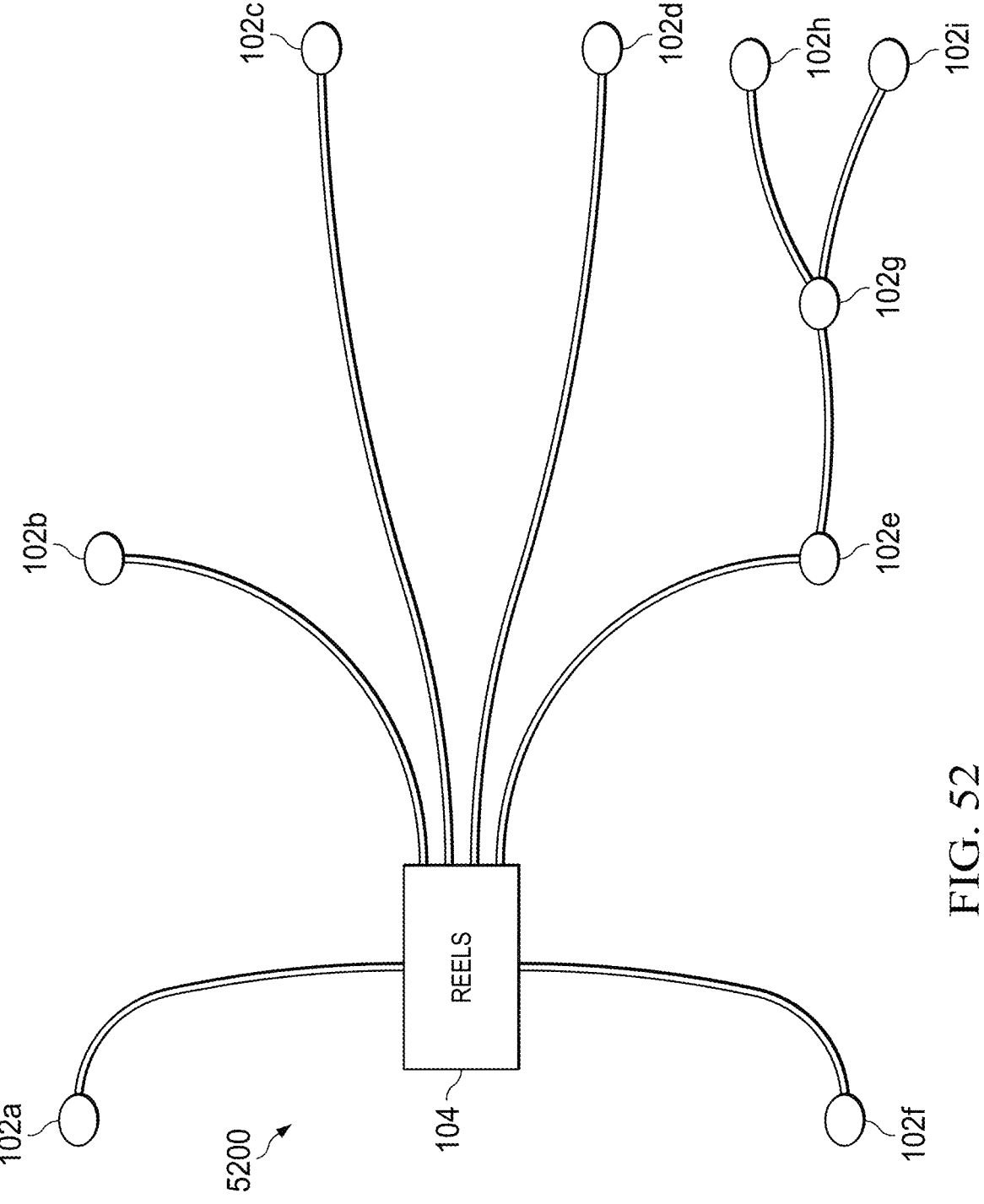
FIG. 52 illustrates one embodiment of an environment with multiple reels.

Referring to FIG. 52, one embodiment of an environment 5200 includes multiple reels 104 coupled to hovering distribution devices 102a-102i. As shown, the reels 104 may be at a relatively centralized location and used to service an area that can be reached based on possible hose lengths, available water pressure, and/or other factors. It is understood that reels 104 may also be distributed in other embodiments. In some embodiments, multiple hovering distribution devices may be coupled in series or in other configurations. For example, as shown by hovering distribution devices 102c, and 102g-102i, water may pass through hovering distribution device 102e to hovering distribution device 102g, and through hovering distribution device 102g to hovering distribution devices 102h and 102i. It is understood that such configurations may be limited by water pressure and/or other factors.

Figure 53C:
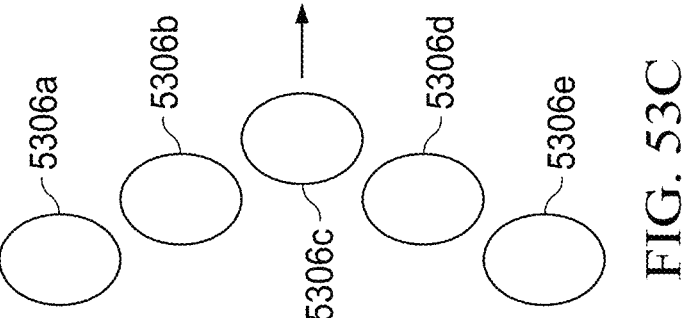
FIGS. 53A-53C illustrate embodiments of coverage areas.
Figure 53B:
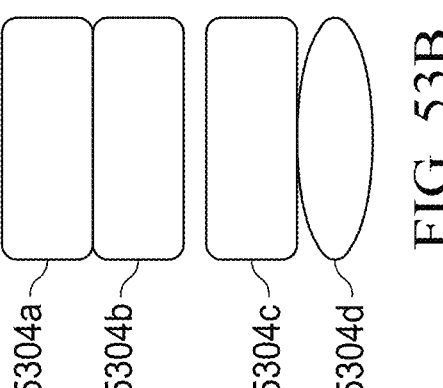
Figure 53A:
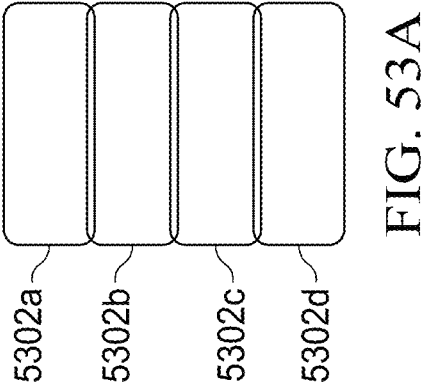

Referring to FIGS. 53A-53C, embodiments of coverage areas from one or more hovering distribution devices 102 are illustrated. The coverage areas 5302a-5302d (FIG. 53A), 5304a-5304d (FIG. 53B), and 5306a-5306e (FIG. 53C) may be any size and/or shape, may overlap, be adjacent, and/or leave gaps, and may provide different types of fluids. The hovering distribution devices 102 may move together and/or may follow alternate shaped routes and move at the same or different speeds.

Figure 54:
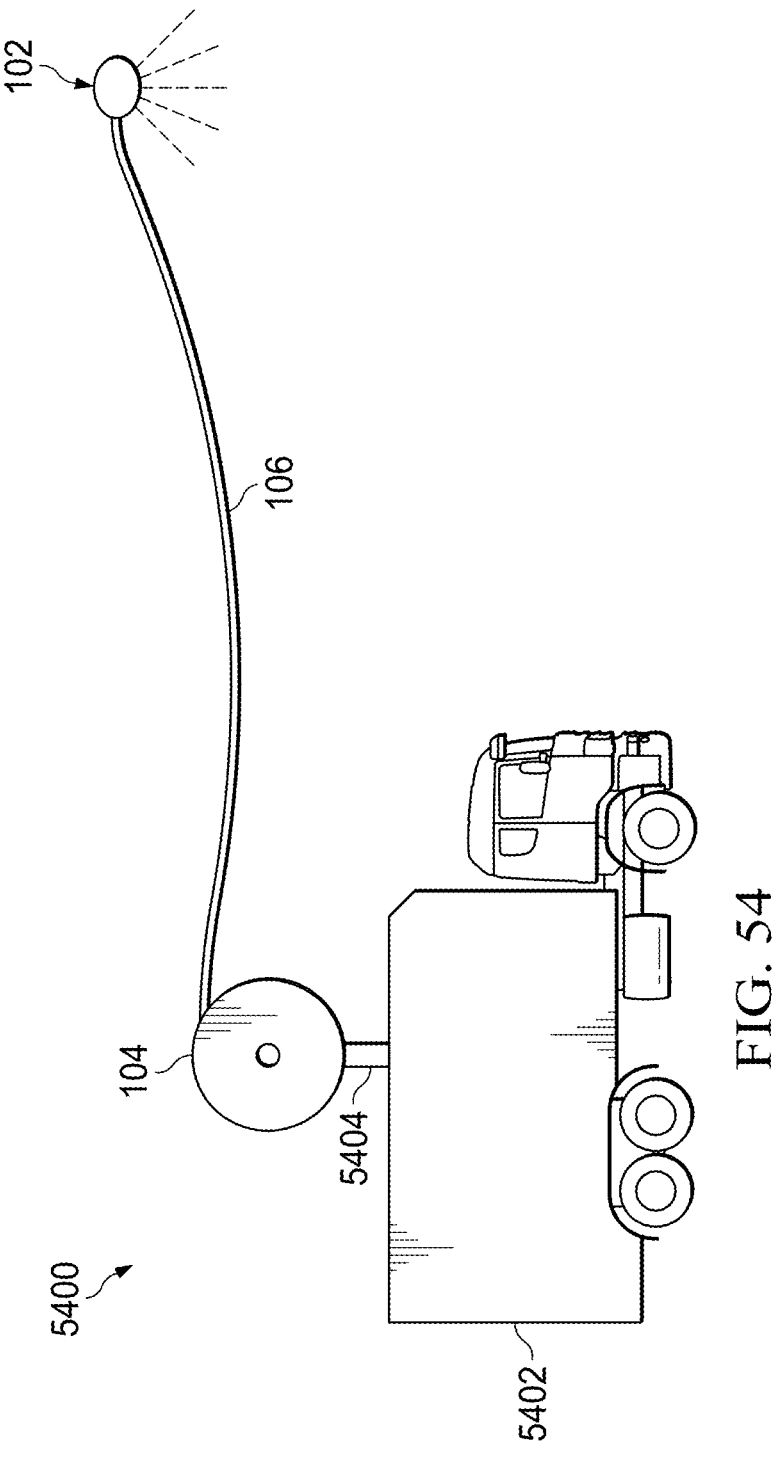
FIG. 54 illustrates one embodiment of a ground vehicle from which a hovering distribution device may be deployed.

Referring to FIG. 54, one embodiment of an environment 5400 includes a ground vehicle 5402 from which one or more hovering distribution devices 102 may be deployed. The vehicle 5402 may be covered (as shown) or may be a flatbed, pickup, or other open back vehicle. It is understood that while the vehicle 5402 is shown as a truck, it may be any type of powered or unpowered ground vehicle or trailer, including a train car. The vehicle 5402 may be designed for use in many different environments, and may include wheels, tracks, and/or other locomotion mechanisms depending on the terrain. The vehicle 5402 may be configured for a particular purpose (e.g., firefighting, irrigation, or cleaning) or may be configured for general purpose use.

In some scenarios, such as firefighting, the hovering distribution device 102 may offer advantages over traditional drones, regardless of the environment and deployment method used. For example, a traditional drone used in a firefighting scenario may blow air into the fire from its propellers, which is generally undesirable as this increases the flow of oxygen to the fire. Furthermore, a traditional drone accident may result in the drone's relatively large batteries being comprised (e.g., as a result of the crash or due to falling into the fire). As the hovering distribution device 102 may rely solely on fluid pressure and/or may use relatively small batteries for its electronics (e.g., rather than for lift), some or all of these scenarios may be minimized or eliminated.

The vehicle 5402 may include fluid tanks, pumps, heaters, motors, generators, and/or other devices to facilitate the deployment and use of the hovering distribution device 102. One or more support structures 5504 may be used to provide height and/or extension for the hose 106 as described in previous embodiments. It is understood that the configuration of a particular vehicle 5402 may depend on such factors as the vehicle's intended use, the environment (e.g., whether freezing temperatures may occur), the fluid(s) being distributed (e.g., firefighting foam, water, or cleaners), the availability of other fluid sources and/or resupply sources, and similar factors. For example, if the vehicle 5402 is used for firefighting, the availability of fire hydrants in the geographic area of use may be used to determine whether the vehicle needs to carry fluid and, if so, how much fluid should be carried. The presence of other fluid sources (e.g., ponds, moats, lakes, rivers, seas, and oceans) may also be considered if the vehicle 5402 is equipped with a pump to use such fluids with the hovering distribution device 102.

Figure 55:
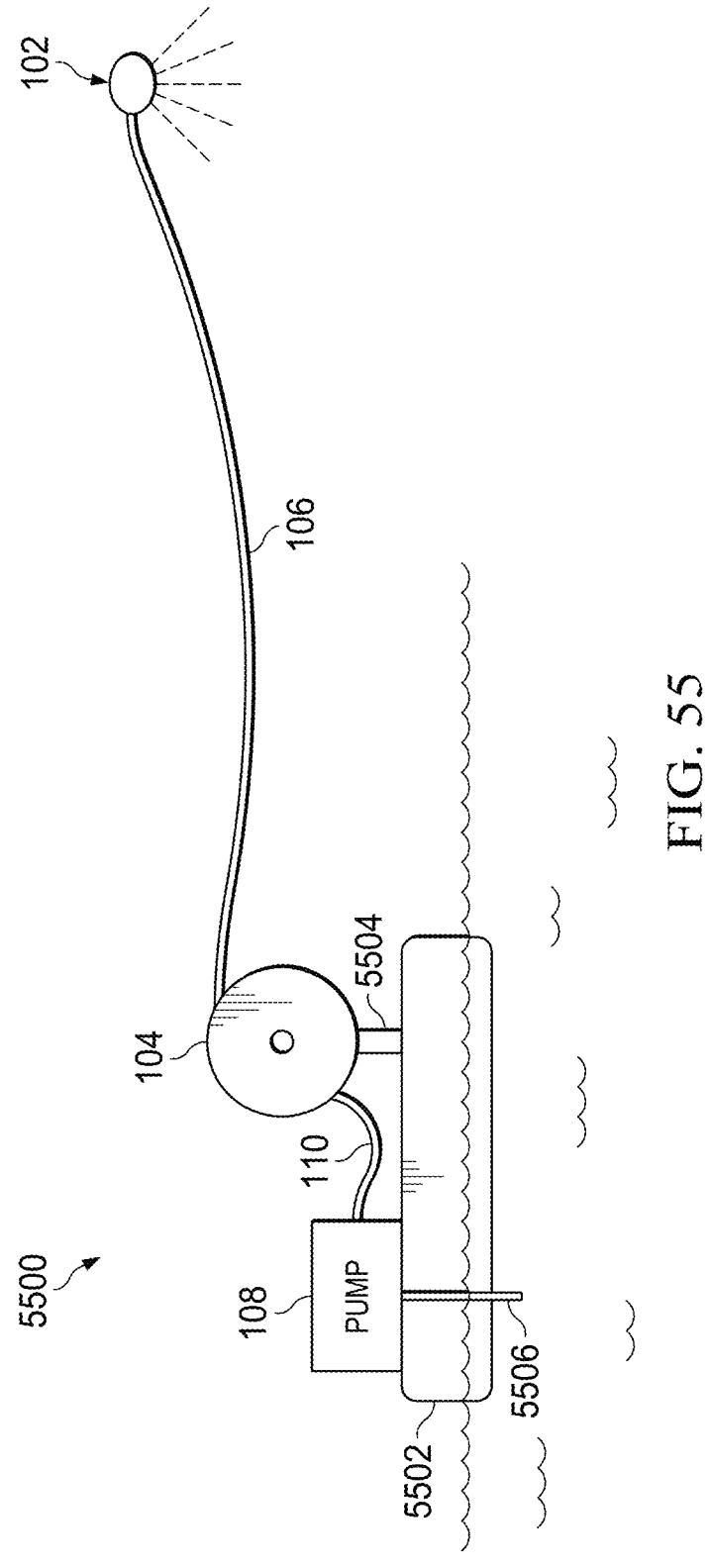
FIG. 55 illustrates one embodiment of a water vehicle from which a hovering distribution device may be deployed.

Referring to FIG. 55, one embodiment of an environment 5500 includes a water vehicle 5502 from which one or more hovering distribution devices 102 may be deployed. The vehicle 5502 may be covered or open. It is understood that the vehicle 5502 may be any type of powered or unpowered water vehicle, including buoys and barges. For example, the vehicle 5502 may be a fireboat that deploys one of more hovering distribution devices in order to fight fires involving ships or other water vehicles, oil rigs, docks, and/or waterfront structures.

In another example, the vehicle 5502 may be a capsule that has no significant movement mechanism, if any, other than localized movement for positioning. The capsule may be dropped into the water, either by itself or in conjunction with other such capsules, for deployment in a firefighting scenario involving ships or other water vehicles, oil rigs, docks, and/or waterfront structures. The associated hovering distribution device(s) 102 may be controlled remotely from a nearby boat, ship, or platform. Such capsules may then be recovered following their emergency deployment. This may provide the ability to attack fires from multiple angles using fewer fireboats, all while minimizing risks to human personnel.

The vehicle 5502 may be designed for use in many different environments. The vehicle 5502 may be configured for a particular purpose (e.g., firefighting, irrigation, or cleaning) or may be configured for general purpose use. The vehicle 5502 may include fluid tanks, pumps, heaters, motors, generators, and/or other devices to facilitate the deployment and use of the hovering distribution device 102. One or more support structures 5504 may be used to provide height and/or extension for the hose 106 as described in previous embodiments.

It is understood that the configuration of a particular vehicle 5502 may depend on such factors as the vehicle's intended use, the environment (e.g., whether freezing temperatures may occur), the fluid(s) being distributed (e.g., firefighting foam, water, or cleaners), the availability of other fluid sources and/or resupply sources, and similar factors. For example, if the vehicle 5502 is used for firefighting, the need for specialized firefighting fluids/foams may be used to determine whether the vehicle needs to carry such fluids and, if so, how much fluid should be carried. The vehicle 5502 may be equipped with a pump 108 to obtain water from the surrounding environment (e.g., ponds, moats, lakes, rivers, seas, and oceans) via a hose 5506 in order to use such fluids with the hovering distribution device 102.

Figure 56B:
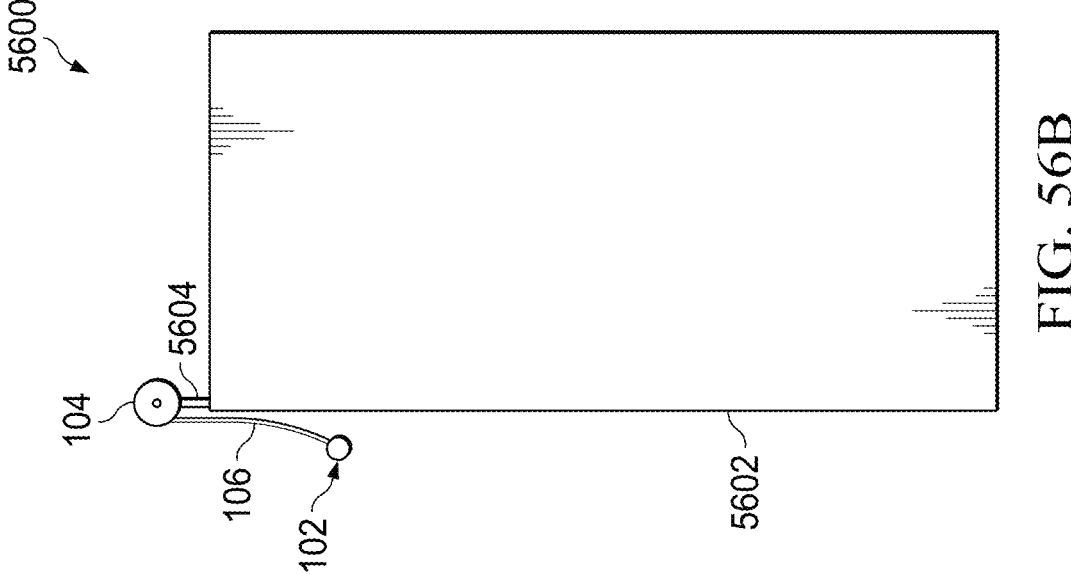
FIGS. 56A and 56B illustrate one embodiment of a structure from which a hovering distribution device may be deployed.
Figure 56A:
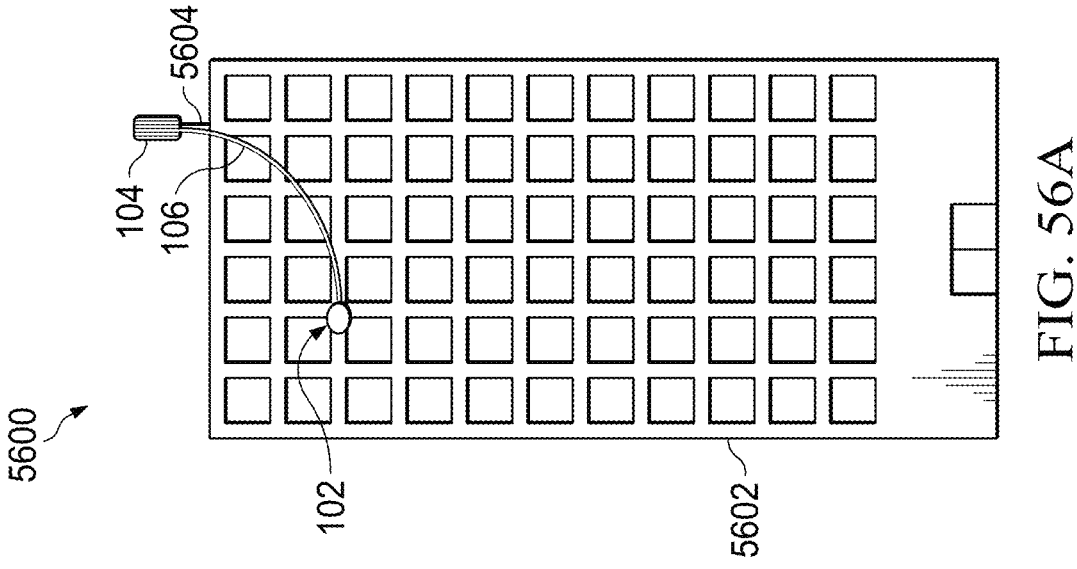

Referring to FIGS. 56A and 56B, one embodiment of an environment 5600 includes a structure 5602 from which one or more hovering distribution devices 102 may be deployed. In the present example, the structure 5602 includes a reel 104 and a support structure 5604 that are positioned on the roof of the structure. It is understood that the configuration of a particular deployment of the hovering distribution device 102 may depend on such factors as the intended use of the device (e.g., cleaning or firefighting), the environment (e.g., whether freezing temperatures may occur), the fluid(s) being distributed (e.g., firefighting foam, water, or cleaners), and similar factors. The support structure 5604 may be configured to extend and/or otherwise accommodate changes in the position of the hovering distribution device 102. In some embodiments, the support structure 5604 may be configured for movement around the roof of the structure 5602 using a track and/or other movement mechanisms.

Figure 57B:
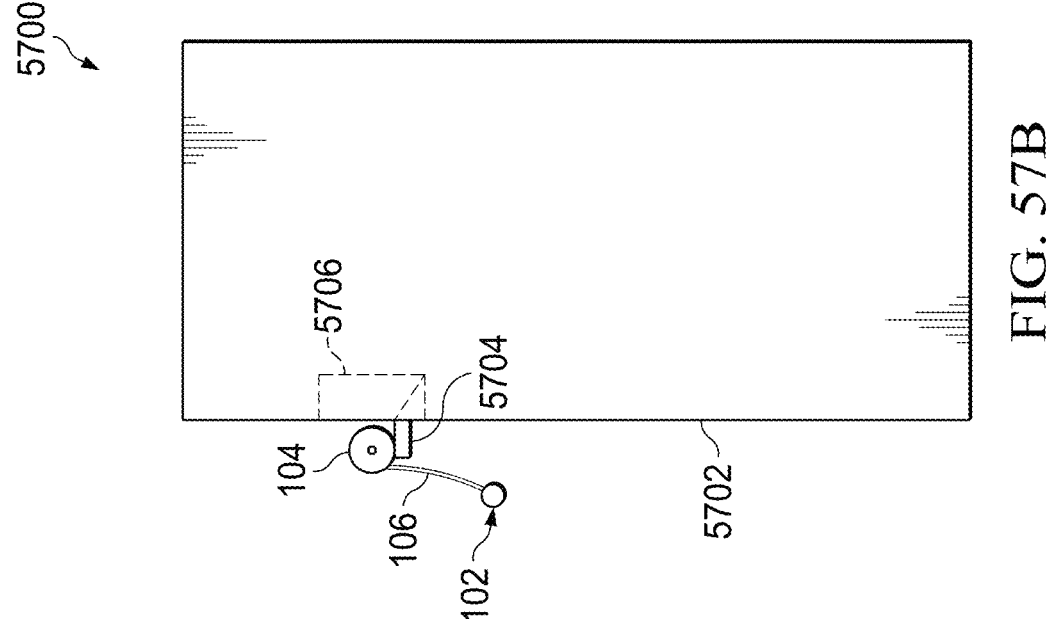
FIGS. 57A and 57B illustrate another embodiment of a structure from which a hovering distribution device may be deployed.
Figure 57A:
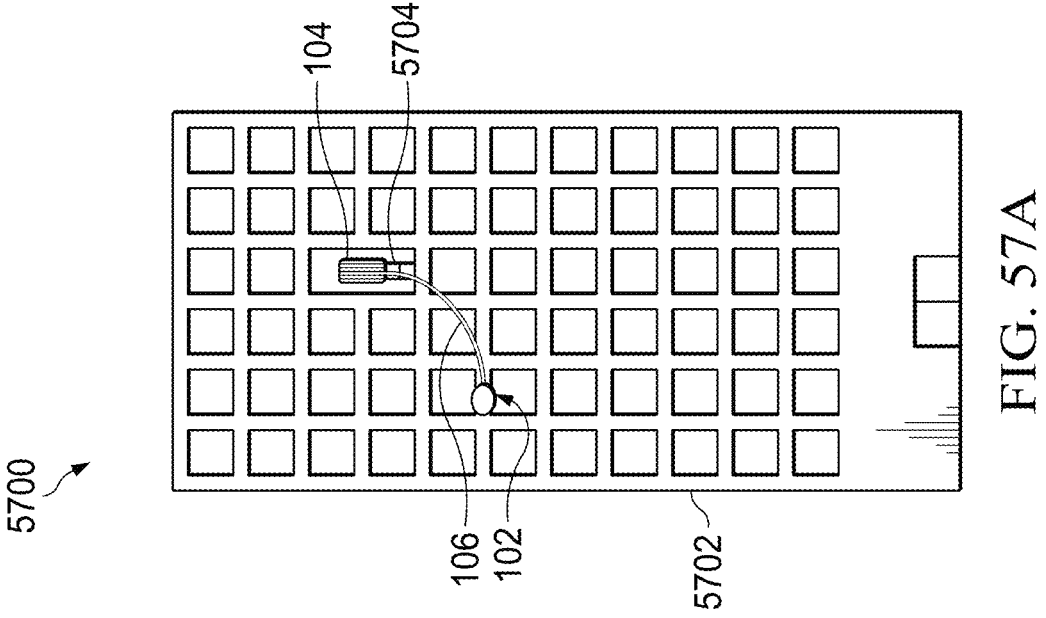

Referring to FIGS. 57A and 57B, one embodiment of an environment 5700 includes a structure 5702 from which one or more hovering distribution devices 102 may be deployed. In the present example, the structure 5702 includes a cavity 5706 that contains a reel 104 and a support structure 5704. When not in use, the cavity may be hidden by closed doors, decorative ornamentation, and/or in other ways. It is understood that the configuration of a particular deployment of the hovering distribution device 102 may depend on such factors as the intended use of the device (e.g., cleaning or firefighting), the environment (e.g., whether freezing temperatures may occur), the fluid(s) being distributed (e.g., firefighting foam, water, or cleaners), and similar factors. The support structure 5704 may be configured to extend from the cavity 5706 and/or otherwise accommodate changes in the position of the hovering distribution device 102.

With respect to cleaning in general, vehicles (e.g., cars, trucks, airplanes, boats, and ships), structures, and devices (e.g., solar panels) vary widely in size, shape, surface materials and textures, and ornamentation, and exist in many different environments. The amount of cleaning needed and the relative difficulty in cleaning depends not only on the characteristics of the surfaces being cleaned, but also on the environment. For example, in areas with sandstorms, relatively frequent cleaning may be needed for buildings and windows.

The hovering distribution device 102 described herein may be deployed for such cleaning. In some embodiments, the hovering distribution device 102 may be combined with computer vision to determine when cleaning is needed and/or to focus cleaning on particular areas. As the safety issues present when people must climb a structure and perform the cleaning are minimized or negated by using the hovering distribution device 102, more frequent cleaning may be performed, and such cleaning may be focused only on particular areas. When incorporated into car washes and large vehicle washes (e.g., for airplanes or ships), computer vision may be used to enable spot cleaning by the hovering distribution device 102.

Devices such as solar panels may be cleaned regularly to maintain their performance. However, as solar panels generally benefit from relatively high density, there may be little room for people to move around a particular panel or a set of panels to perform such cleaning. The hovering distribution device 102 may be deployed in cleaning such devices, and may be combined with computer vision to determine when cleaning is needed and to focus cleaning on particular areas. This may enable the reactive cleaning of solar panels based at least partially on economics, as well as the performance of cleaning tasks based on regular digitally controlled automated schedules. For example, a certain area of panels may suffer a drop in performance due to being dirty, and that drop in performance may justify deploying the hovering distribution device 102 to clean the panels in that area in order to increase their performance.

In other embodiments, the hovering distribution device 102 may be used with a distribution configuration (e.g., a misting or jet mode) that is able to create snow. For example, the hovering distribution device 102 may be used to cover a ski slope with enough moisture to create snow while maintaining heat in the hose to avoid freezing the hose. Using the hovering distribution device 102, the moisture may be distributed relatively evenly, thereby enabling the creation of fresh powder where needed.

The flow charts described herein illustrate various exemplary functions and operations that may occur within various environments. Accordingly, these flow charts are not exhaustive and that various steps may be excluded to clarify the aspect being described. For example, it is understood that some actions, such as network authentication processes, notifications, and handshakes, may have been performed prior to the first step of a flow chart. Such actions may depend on the particular type and configuration of communications engaged in by the system(s) used. Furthermore, other communication actions may occur between illustrated steps or simultaneously with illustrated steps.

Referring to FIG. 58, one embodiment of a method 5800 is illustrated that may be executed by the control system 4500 and/or the remote monitor/controllers 5002 (FIGS. 50 and 51). In step S802, a plan is received with a schedule and/or a map for fluid distribution. In step S804, the control system 4500 may determine any execution parameters not defined, such as the altitude of the hovering distribution vehicle 102 during various parts of the plan. In step S806, the control system 4500 may execute the plan by controlling the fluid distribution system 100 and/or the hovering distribution device 102.

Referring to FIG. 59, one embodiment of a method 5900 is illustrated that may be executed by the control system 4500 and/or the remote monitor/controllers 5002 (FIGS. 50 and 51). In step S902, a user designs and enters a fluid distribution plan for one or more hovering distribution devices 102. The plan may include a map, which may include GPS and/or other coordinates and/or location identifiers. For example, for crop irrigation, the map may define a specific path that the hovering distribution device 102 should follow, including individual rows and a direction of watering. In step S904, the plan may be stored for immediate or later execution. In step S906, the plan may be executed. In some embodiments, manual and/or automated adjustments may be made to the plan due to weather conditions, sensor data, the visual detection of animals, and/or other factors as described above in the present application.

In some embodiments, such as in firefighting, crowd control, and/or other dynamic environments, the plan may be more generalized. For example, sensor information (e.g., thermal sensors) and/or computer vision may be used to automatically direct the hovering distribution device 102 in a firefighting environment, with the plan defining particular actions based on the received information. For example, sensor information and/or computer vision may be used to identify hot spots in a fire and to direct the hovering distribution device 102 to those locations, to determine whether those spots are accessible for fluid, and/or to direct fluid placement. In some situations, manual control may be used in addition to, or as an alternative to, automated control.

Referring to FIG. 60, one embodiment of a method 6000 is illustrated that may be executed by the control system 4500 and/or the remote monitor/controllers 5002 (FIGS. 50 and 51). In step 6002, a user and/or an artificial intelligence system may review an area over which a hovering distribution device 102 is to be deployed. A map of the area may be developed using information acquired in one or more ways, such as manually acquired (e.g., a survey), using drones and/or other automated vehicles with cameras and/or measurement devices (e.g., altimeters and/or GPS), using satellite images, and/or using traditional maps.

In step 6004, artificial intelligence may be used to recognize obstacles (e.g., trees, buildings, utility poles, cell towers, and/or other potential obstructions) using the map and/or real time observations from a drone or other systems. This step may also include evaluating fluid needs (e.g., an amount of water) for a particular area based on color, vegetation, and/or similar factors. This step may also take shadows and similar visual factors into account, as such factors may alter the shades of grass and other vegetation, as well as affecting the evaluation of obstacles due to shadows.

In step 6006, an optimal reel placement may be charted for the area. The reel placement may take various factors into account, such as available water pressure, location of water access points, number of available reels 104, hose length for each reel, whether a reel is on a vertical lift, type of hovering distribution device(s) 102 (e.g., lift power, maximum fluid distribution area, and/or maximum range and/or altitude), availability of support structures and/or aerial support devices, the presence of obstacles, and/or similar information. Using such factors, the optimal reel placement may provide a coverage map that is the best fit for the available resources, and may include a plan to move a reel 104 if needed.

In step 6008, the optimal reel placement, together with the area map, may be used to divide the area into multiple pixels for watering, with the pixels used to control the hovering distribution device 102 as it distributes water at that location. It is understood that other factors, such as projected weather, real time wind readings, and/or other factors may be taken into account as described previously in the present application. Step 6008 may be executed concurrently with step 6006 in some embodiments, as the calculations needed to divide the area into pixels are related to the placement of reel(s) 104.

In step 6010, a heat map may be produced of the area before, during, and/or after a watering event. The heat map, which may include a watering history, may be used to update the area map for later watering events. For example, hot spots may be detected based on thermal imaging, vegetation color and/or growth, and/or sun patterns. As seasons progress and the position of the sun changes, such hotspots may move or appear/disappear. Accordingly, as shown in step 6012, the map for the area may be updated to account for various factors that may impact water needs, and the updates may result in changes to reel placement, how the area is pixelated, and/or the water distribution configuration (e.g., the amount of water, the length of time over target, and/or other variables) of the hovering distribution device 102.

Referring to FIG. 61, one embodiment of a method 6100 is illustrated that may be executed by the control system 4500 and/or the remote monitor/controllers 5002 (FIGS. 50 and 51). In step 6102, an amount of fluid thrust and a hose length are identified that are needed to achieve one or more desired fluid distribution positions and/or orientations of a hovering distribution device 102. Such thrust and hose length determinations may be based on many different factors as described in other embodiments herein, including fluid distribution plans, available fluid pressure, external factors such as weather, available support structures, and/or the lift capability of the hovering distribution device 102.

In step 6104, the fluid thrust and/or hose length may be controlled as needed to execute desired fluid distribution. Controlling the fluid thrust may include altering thrust vectors (e.g., direction and/or pressure of thrust), and may include altering the primary fluid distribution vector(s) if needed. Controlling the hose length may include extending and/or retracting the hose 106, as well as controlling any associated support structures. The control may include adjusting for external factors (e.g., wind, obstacles, and/or for safety) and/or changes in a fluid distribution plan.

Figure 62:
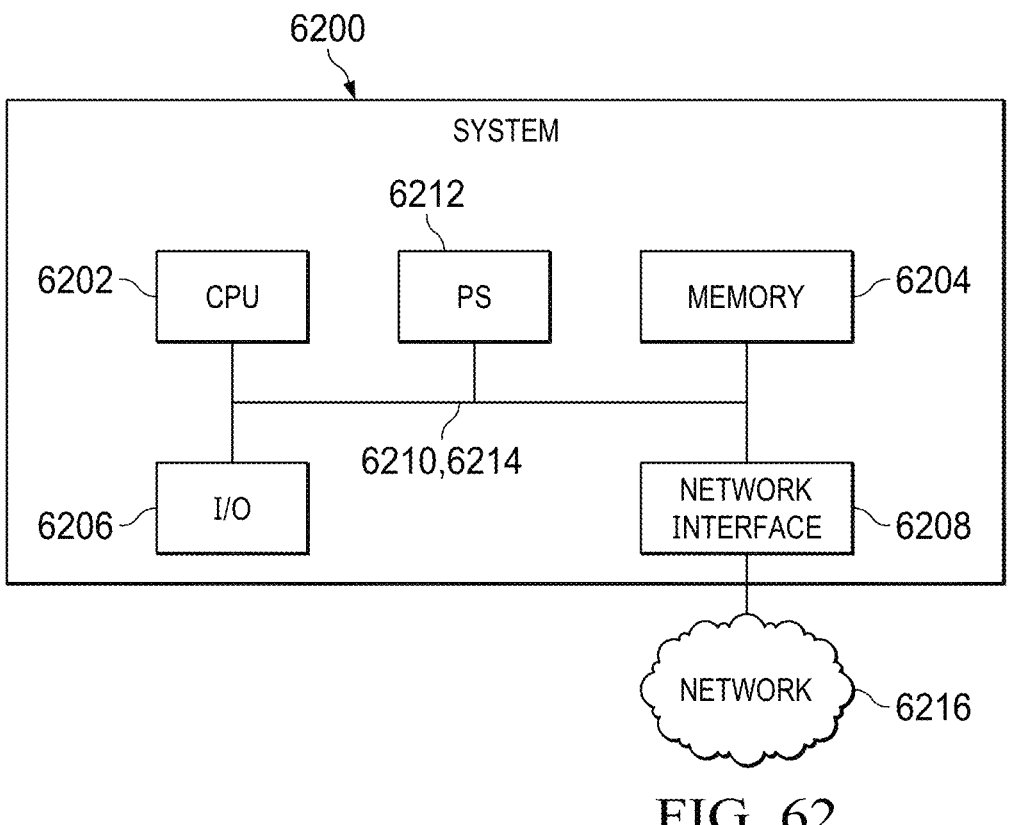
FIG. 62 is a simplified diagram of one embodiment of a computer system that may be used in embodiments of the present disclosure.

Referring to FIG. 62, one embodiment of a computer system 6200 is illustrated. The computer system 6200 is one possible example of a system component or computing device that may be used as part of the control system 112/4500, the hovering distribution device 102 (e.g., the controller(s) 4700 (FIG. 47)), and/or the remote monitor/controller 5002. The computer system 6200 may include a controller (e.g., a central processing unit ("CPU")) 6202, a memory unit 6204, an input/output ("I/O") device 6206, and a network interface 6208. The components 6202, 6204,

6206, and 6208 are interconnected by a transport system (e.g., a bus) 6210. A power supply (PS) 6212 may provide power to components of the computer system 6200, such as the CPU 6202 and memory unit 6204.

It is understood that the computer system 6200 may be differently configured and that each of the listed components may actually represent several different components. For example, the CPU 6202 may actually represent a multi-processor or a distributed processing system; the memory unit 6204 may include different levels of cache memory, main memory, hard disks, and remote storage locations; the I/O device 6206 may include monitors, keyboards, and the like; and the network interface 6208 may include one or more network cards providing one or more wired and/or wireless connections to a network 6216. Therefore, a wide range of flexibility is anticipated in the configuration of the computer system 6200.

The computer system 6200 may use any operating system (or multiple operating systems), including various versions of operating systems provided by Microsoft (such as WIN-DOWS), Apple (such as Mac OS X), UNIX, and LINUX, and may include operating systems specifically developed for handheld devices, personal computers, servers, aerial devices, and/or other specialized environments depending on the use of the computer system 6200, including manually controlled and autonomous vehicles. The operating system, as well as other instructions (e.g., for the processes described herein), may be stored in the memory unit 6204 and executed by the processor 6202. For example, if the computer system 6200 is the control system 112/4500, the memory unit 6204 may include instructions for performing some or all of the processes and functionality associated with the control system as described in the present disclosure.

The network 6216 may be a single network or may represent multiple networks, including networks of different types. For example, components within the fluid distribution system 100 may be coupled to a network that includes a cellular link coupled to a data packet network, or data packet link such as a wide local area network (WLAN) coupled to a data packet network. Accordingly, many different network types and configurations may be used to establish communications between components within the fluid distribution system 100 and with other devices and systems.

Exemplary network, system, and connection types include the internet, WiMax, local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with communications systems such as Global System for Mobile communications (GSM) and/or code division multiple access (CDMA) communications systems. Connections to such networks may be wireless or may use a conduit (e.g., digital subscriber conduits (DSL), cable conduits, and fiber optic conduits).

Communication may be accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)), and/or proprietary protocols. For example, signaling communications (e.g., session setup, management, and teardown) may use a protocol such as the Session Initiation Protocol (SIP), while data traffic may be communicated using a protocol such as the Real-time Transport Protocol (RTP), File Transfer Protocol (FTP), and/or Hyper-Text Transfer Protocol (HTTP). Communications may be connection-based (e.g., using a protocol such as the transmission control protocol/internet protocol (TCP/IP)) or connection-less (e.g., using a protocol such as the user datagram protocol (UDP)). It is understood that various types of communications may occur simultaneously.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. An unmanned hovering distribution device comprising:
a central section having a fluid inlet therein for receiving a hose, wherein the hovering distribution device is configured to receive pressurized liquid from the hose via the fluid inlet, and wherein a length of the hose controls a range of the hovering distribution device relative to a source of the pressurized liquid;
a first arm assembly extending from a first side of the central section by a first fluid conduit adapted to receive a first portion of the pressurized liquid, and a second arm assembly extending from a second side of the central section by a second fluid conduit adapted to receive a second portion of the pressurized liquid, and wherein each of the first and second arm assemblies includes
one or more nozzles configured to distribute at least a portion of the pressurized liquid onto a target surface while using the pressurized liquid to provide controllable thrust for lifting and moving the hovering distribution device relative to the target surface, wherein the controllable thrust provided by the one or more nozzles is needed both to provide liquid distribution onto the target surface and to provide sufficient lift for the hovering distribution device to be airborne, and wherein each of the first and second arm assemblies can be independently rotated through two planes of motion relative to the central section to point the respective first or second arm assembly's one or more nozzles in a desired direction; and
one or more controllers configured to execute a plurality of instructions stored on a computer memory, the instructions including instructions for controlling rotation of the first and second arm assemblies and for controlling at least one of a force and direction of a thrust vector for the one or more nozzles in order to use the one or more nozzles to provide the controllable thrust and to distribute the pressurized liquid onto the target surface in a controlled manner that optimizes liquid distribution while minimizing potential damage to the target surface.

2. The unmanned hovering distribution device of claim 1 wherein the one or more controllers are further configured to execute instructions for manipulating the thrust vector to execute a fluid distribution plan.

3. The unmanned hovering distribution device of claim 1 wherein at least a first nozzle of the one or more nozzles is configured to enable control over at least one of a direction and a force of the pressurized liquid passing through the first nozzle.

4. The unmanned hovering distribution device of claim 1 wherein the one or more nozzles includes:
at least two thrust nozzles configured to enable control over a direction and force of the pressurized liquid passing through each thrust nozzle to provide the controllable thrust; and
at least one fluid distribution nozzle configured to distribute the pressurized liquid onto the surface.

5. The unmanned hovering distribution device of claim 4 further comprising first, second, and third sections configured to be independently rotated relative to one another, wherein at least a first thrust nozzle is positioned in the first section, a second thrust nozzle is positioned in the second section, and a liquid distribution nozzle is positioned in the third section.

6. The unmanned hovering distribution device of claim 1 wherein at least one of the one or more nozzles is positioned on a lower surface of the hovering distribution device.

7. The unmanned hovering distribution device of claim 1 wherein at least one of the one or more nozzles is positioned on a side surface of the hovering distribution device.

8. An automated hovering distribution device comprising:
a central body having an inlet adapted to engage one end of a liquid supply hose to receive a liquid;
first and second arms coupled to, and positioned on opposite sides of, the central body;
first and second nozzle housings coupled to the first and second arms, respectively;
downward pointing first and second nozzles positioned on an underside of the first and second nozzle housings, respectively, and coupled via fluid channels to the inlet;
first and second control actuators positioned on the first and second arms and adapted to independently move each of the first and second nozzle housings through two planes of movement;
a plurality of sensors adapted to track a current height and a current orientation of the distribution device relative to a target surface;
a controller positioned within the central body, the controller in communication with the first and second control actuators and the plurality of sensors, the controller adapted to execute a plurality of instructions stored on a computer memory, the instructions including instructions for:
regulating the first and second control actuators to orient each of the first and second nozzles relative to a target surface using the current height and the current orientation; and
regulating a flow of the liquid expelled by the first and second nozzles to balance the current height of the distribution device above the target surface resulting from thrust provided by the expelled liquid with at least one of an amount and a pressure of the liquid being distributed onto the target surface by the first and second nozzles, wherein the flow is regulated in order to optimize distribution of the expelled liquid onto the target surface while minimizing potential damage to the target surface by the expelled liquid.

9. The automated hovering distribution device of claim 8 wherein the first and second control actuators include servos.

10. The automated hovering distribution device of claim 8 wherein the first and second control actuators include gears.

11. The automated hovering distribution device of claim 8 wherein the first and second control actuators are hydraulic.

12. The automated hovering distribution device of claim 8 wherein the first and second nozzles are adapted to control a force of the liquid passing through the respective nozzle in response to a signal from the controller.

13. The automated hovering distribution device of claim 8 wherein the first and second nozzles are adapted to control a distribution pattern of the liquid passing through the respective nozzle in response to a signal from the controller.

14. The automated hovering distribution device of claim 8 wherein an orientation of the first and second nozzles is fixed with respect to the first and second nozzle housings.

15. The automated hovering distribution device of claim 8 wherein a vector produced by each of the first and second nozzles can be reoriented, by the controller, with respect to the first and second nozzle housings.

16. The automated hovering distribution device of claim 8 further comprising instructions for controlling, by the controller, a reel to extend and retract the liquid supply hose to control a range of the hovering distribution device from the reel.

17. The automated hovering distribution device of claim 8 further comprising instructions for controlling, by the controller, a pump supplying the liquid to an opposite end of the liquid supply hose.

18. The automated hovering distribution device of claim 8 further comprising instructions for:

detecting a safety event; and responding to the safety event by at least one of changing a position of the hovering distribution device and shutting down the hovering distribution device.

19. The automated hovering distribution device of claim 8 further comprising instructions for controlling, by the controller, a support structure that manages at least one of a vertical position and a horizontal position of the hose at a point between the first and second ends.

*     *     *     *     *